(12) United States Patent
Klosin et al.

(10) Patent No.: US 8,609,794 B2
(45) Date of Patent: Dec. 17, 2013

(54) PROCESS FOR SELECTIVELY POLYMERIZING ETHYLENE AND CATALYST THEREFOR

(75) Inventors: Jerzy Klosin, Midland, MI (US); Pulikkottil J. Thomas, Midland, MI (US); Robert D. Froese, Midland, MI (US); Xiuhua Cui, Pearland, TX (US)

(73) Assignee: Dow Global Technologies, LLC., Midland, MI (US)

( * ) Notice: Subject to any disclaimer, the term of this patent is extended or adjusted under 35 U.S.C. 154(b) by 257 days.

(21) Appl. No.: 13/105,018

(22) Filed: May 11, 2011

(65) Prior Publication Data

US 2011/0282018 A1    Nov. 17, 2011

Related U.S. Application Data

(60) Provisional application No. 61/467,627, filed on Mar. 25, 2011.

(51) Int. Cl.
*C08F 4/76* (2006.01)
*C08F 4/64* (2006.01)
*B01J 31/00* (2006.01)

(52) U.S. Cl.
USPC ........... 526/172; 526/170; 526/160; 526/161; 526/348; 556/51; 502/103

(58) Field of Classification Search
USPC ................ 556/51; 526/172, 161, 170, 160
See application file for complete search history.

(56) References Cited

U.S. PATENT DOCUMENTS

| | | |
|---|---|---|
| 3,953,413 A | 4/1976 | Hwang et al. |
| 4,173,548 A | 11/1979 | Pullukat et al. |
| 4,330,646 A | 5/1982 | Sakurai et al. |
| 4,564,660 A | 1/1986 | Williams et al. |
| 4,612,300 A | 9/1986 | Coleman, III |
| 4,835,219 A | 5/1989 | Tajima et al. |
| 4,981,927 A | 1/1991 | Rekers et al. |
| 5,064,802 A | 11/1991 | Stevens et al. |
| 5,153,157 A | 10/1992 | Hlatky et al. |
| 5,296,433 A | 3/1994 | Siedle et al. |
| 5,321,106 A | 6/1994 | LaPointe |
| 5,350,723 A | 9/1994 | Neithamer et al. |
| 5,425,872 A | 6/1995 | Devore et al. |
| 5,625,087 A | 4/1997 | Devore et al. |
| 5,721,185 A | 2/1998 | LaPointe et al. |

(Continued)

FOREIGN PATENT DOCUMENTS

| | | | | |
|---|---|---|---|---|
| WO | WO 2007/136495 A2 | * | 11/2007 | ............ C08F 2/04 |
| WO | WO 2007/136496 A2 | * | 11/2007 | ............ C08F 2/04 |

(Continued)

OTHER PUBLICATIONS

Protective Groups in Organic Systhesis, 3rd. ed., Green, T.W. and Wuts, P.G., Wiley-Interscience, New York, 1999.

(Continued)

*Primary Examiner* — Rip A. Lee

(57) ABSTRACT

The present invention generally relates to a process that selectively polymerizes ethylene in the presence of an alpha-olefin, and to a metal-ligand complex (precatalyst) and catalyst useful in such processes, and to related compositions. The present invention also generally relates to ligands and intermediates useful for preparing the metal-ligand complex and to processes of their preparation.

4 Claims, 15 Drawing Sheets

(56) References Cited

U.S. PATENT DOCUMENTS

| | | |
|---|---|---|
| 5,783,512 A | 7/1998 | Jacobsen et al. |
| 5,869,575 A | 2/1999 | Kolthammer et al. |
| 5,883,204 A | 3/1999 | Spencer et al. |
| 5,919,983 A | 7/1999 | Rosen et al. |
| 6,103,657 A | 8/2000 | Murray |
| 6,696,379 B1 | 2/2004 | Carnahan et al. |
| 6,869,904 B2 | 3/2005 | Boussie et al. |
| 6,924,342 B2 | 8/2005 | Stevens et al. |
| 7,060,848 B2 | 6/2006 | Boussie et al. |
| 7,163,907 B1 | 1/2007 | Canich et al. |
| 7,355,089 B2 | 4/2008 | Chang et al. |
| 7,858,706 B2 | 12/2010 | Arriola et al. |
| 7,858,707 B2 | 12/2010 | Arriola et al. |
| 8,202,953 B2 * | 6/2012 | Konze et al. .................. 526/161 |
| 8,299,189 B2 * | 10/2012 | Boone et al. .................. 526/172 |
| 2004/0220050 A1 | 11/2004 | Frazier et al. |
| 2006/0025548 A1 | 2/2006 | Boussie et al. |
| 2006/0199930 A1 | 9/2006 | Li Pi Shan et al. |
| 2007/0167315 A1 | 7/2007 | Arriola et al. |
| 2007/0167578 A1 | 7/2007 | Arriola et al. |
| 2008/0262175 A1 | 10/2008 | Arriola et al. |
| 2008/0269412 A1 | 10/2008 | Carnahan et al. |
| 2008/0275189 A1 | 11/2008 | Carnahan et al. |
| 2008/0311812 A1 | 12/2008 | Arriola et al. |
| 2009/0186985 A1 | 7/2009 | Kuhlman et al. |
| 2010/0298515 A1 | 11/2010 | Marchand et al. |
| 2012/0108770 A1 * | 5/2012 | Aboelella et al. ............. 526/126 |

FOREIGN PATENT DOCUMENTS

| | | |
|---|---|---|
| WO | WO-2007136494 A2 | 11/2007 |
| WO | WO-2008067538 A2 | 6/2008 |
| WO | WO-2009012215 A1 | 1/2009 |
| WO | WO-2009097565 A1 | 8/2009 |
| WO | WO-2010151433 A1 | 12/2010 |

OTHER PUBLICATIONS

Randall, J.C., JMS-Rev. Macromol. Chem. Phys., C29, 201-317, 1989.

George Odian, Principals of Polymerization, Second Edition, John Wiley and Sons, 1970.

Redlich-Kwong-Soave (RKS) Equation of State, Chemical Engineering Science, 1972, pp. 1197-1203.

PCT/US2010/035096, International Search Report. Feb. 23, 2011.

PCT/US2010/035096, Written Opinion of the International Searching Authority, Feb. 23, 2011.

* cited by examiner

Scheme 2:

Scheme 3:

($R^7$ is $R^{7c}$ or $R^{7d}$);
($R^5$ is $R^{5c}$ or $R^{5d}$)

(Q)

Scheme 4:

Option A, B, C, or D

Option A: 1) Base
2) M(Cl)$_4$
3) X-Li or X-MgBr

Option B: 1) M(NR$^K$R$^L$)$_4$
2) X-Li or X-MgBr

Option C: organometallic M(X)$_4$

Option D: 1) M(Cl)$_4$
2) 4 mole equiv.
X-Li or X-MgBr

PROCESS FOR SELECTIVELY POLYMERIZING ETHYLENE AND CATALYST THEREFOR

This application claims benefit under 35 U.S.C. §119(a) of PCT International Application Number PCT/US2010/035096 filed May 17, 2010, and under 35 U.S.C. §119(e) of U.S. Provisional Application No. 61/467,627 filed Mar. 25, 2011, and the entire contents of both applications are hereby incorporated herein by reference.

The present invention generally relates to a process that selectively polymerizes ethylene in the presence of an alpha-olefin, and to a metal-ligand complex (precatalyst) and catalyst useful in such process, and to related compositions. The present invention also generally relates to ligands and intermediates useful for preparing the metal-ligand complex and to processes of their preparation. Other related inventions are described herein.

U.S. Pat. No. 6,869,904 B2 and U.S. Pat. No. 7,060,848 B2 mention, among other things, ligands, compositions, metal-ligand complexes and arrays with substituted bridged bis-aromatic or bridged bis-biaromatic ligands. The patents also mention methods of making and using the same and catalysts useful in transformations such as the polymerization of monomers into polymers. The catalysts have, among other things, high comonomer incorporation into ethylene/olefin copolymers, where such olefins are for example 1-octene, propylene or styrene. The catalysts also polymerize propylene into isotactic polypropylene. Also mentioned are a number of specific ligands including ligands LL102 to LL105. U.S. Pat. No. 6,869,904 B2 and U.S. Pat. No. 7,060,848 B2 do not mention or disclose any species of a metal-ligand complex or catalyst wherein the ligand is LL102, LL103, LL104, or LL105. Specific ligands LL102, LL103, LL104, LL105, LL133, and LL144 are mentioned in US 2006/0025548 A1. PCT International Patent Application Publication Number WO 2007/136494 A2 mentions, among other things, a catalyst composition comprising a zirconium complex of a polyvalent aryloxy ether and the use thereof in a continuous solution polymerization of ethylene, one or more C3-C30 olefins, and a conjugated or non-conjugated diene to prepare interpolymers having improved processing properties. The catalyst system contains a catalyst covalently bonded to an activator.

A problem addressed by the present invention includes providing new processes and catalysts for selectively polymerizing ethylene in the presence of an alpha-olefin.

BRIEF SUMMARY OF THE INVENTION

In some embodiments the present invention relates to a process for selectively polymerizing ethylene in a mixture comprising ethylene and an alpha-olefin, and to a metal-ligand complex (precatalyst) and catalyst useful in such process, and to related compositions. The present invention also generally relates to ligands and intermediates useful for preparing the metal-ligand complex and to processes of their preparation. Other related inventions are described herein. The invention process is especially useful for preparing polyethylenes, polyolefin mixtures or blends, and poly(ethylene alpha-olefin copolymers), including poly(ethylene alpha-olefin) block copolymers, also known as olefin block copolymers.

In a first embodiment, the present invention is a process for selectively polymerizing ethylene in the presence of an alpha-olefin, the process comprising a step of contacting together a catalytic amount of a catalyst, ethylene, and an alpha-olefin, wherein the catalyst comprises a mixture or reaction product of ingredients (a) and (b) that is prepared before the contacting step, wherein ingredient (a) comprises a metal-ligand complex (also referred to herein as a precatalyst) and ingredient (b) comprises an activating co-catalyst; ethylene comprises ingredient (c); and the alpha-olefin comprises ingredient (d) (ingredient letters are for ease of reference herein); the metal-ligand complex of ingredient (a) being one or more metal-ligand complexes of formula (I):

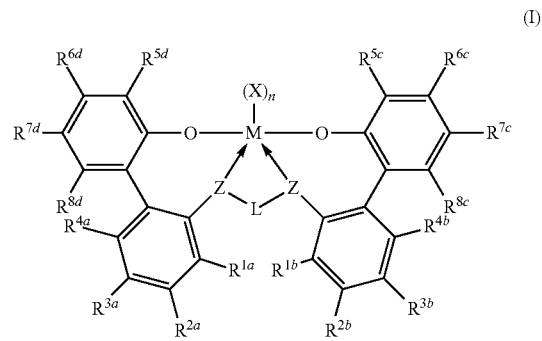

wherein:

M is titanium, zirconium, or hafnium, each independently being in a formal oxidation state of +2, +3, or +4;

n is an integer of from 0 to 3, wherein when n is 0, X is absent (i.e., $(X)_n$ is absent);

Each X independently is a monodentate ligand that is neutral, monoanionic, or dianionic; or two X are taken together to form a bidentate ligand that is neutral, monoanionic, or dianionic;

X and n are chosen in such a way that the metal-ligand complex of formula (I) is, overall, neutral;

Each Z independently is O, S, Nhydrocarbyl, or Phydrocarbyl;

L is hydrocarbylene or heterohydrocarbylene, wherein the hydrocarbylene has a portion that comprises a 1-carbon atom to 6-carbon atom linker backbone linking the Z atoms in formula (I) (to which L is bonded) and the heterohydrocarbylene has a portion that comprises a 1-atom to 6-atom linker backbone linking the Z atoms in formula (I), wherein each atom of the 1-atom to 6-atom linker backbone of the heterohydrocarbylene independently is a carbon atom or heteroatom, wherein each heteroatom independently is O, S, S(O), $S(O)_2$, $Si(R^C)_2$, $Ge(R^C)_2$, $P(R^P)$, or $N(R^N)$, wherein independently each $R^C$ is unsubstituted $(C_1-C_{18})$hydrocarbyl or the two $R^C$ are taken together to form a $(C_2-C_{19})$alkylene (e.g., the two $R^C$ together with the silicon atom to which they are both bonded form a 3-membered to 20-membered silacycloalkyl), each $R^P$ is unsubstituted $(C_1-C_{18})$hydrocarbyl; and each $R^N$ is unsubstituted $(C_1-C_{18})$hydrocarbyl, a hydrogen atom or absent (e.g., absent when N comprises —N= as in a N-containing heteroaryl);

At least one of $R^{1a}$, $R^{2a}$, $R^{1b}$, and $R^{2b}$ independently is a hydrocarbyl, heterohydrocarbyl, or halogen atom; and each of the others of $R^{1a}$, $R^{2a}$, $R^{1b}$, and $R^{2b}$ independently is a hydrogen, atom, hydrocarbyl, heterohydrocarbyl, or halogen atom;

Each of $R^{3a}$, $R^{4a}$, $R^{3b}$, $R^{4b}$, $R^{6c}$, $R^{7c}$, $R^{8c}$, $R^{6d}$, $R^{7d}$, and $R^{8d}$ independently is a hydrogen atom; hydrocarbyl; heterohydrocarbyl; or halogen atom;

Each of $R^{5c}$ and $R^{5d}$ independently is an aryl or heteroaryl;

Each of the aforementioned aryl, heteroaryl, hydrocarbyl, heterohydrocarbyl, hydrocarbylene, and heterohydrocarbylene groups independently is unsubstituted or substituted with one or more substituents $R^S$ (up to and including persubstitution by $R^S$); and Each $R^S$ independently is a halogen atom, polyfluoro substitution (that is one of the one or more substituents $R^S$ stands for two or more fluoro substituents, which formally respectively replace two or more hydrogen atoms of an unsubstituted version of the substituted group), perfluoro substitution (that is the one $R^S$ stands for as many fluoro substituents as carbon-bonded hydrogen atoms (i.e., $\underline{H}$—C) of an unsubstituted version of the substituted group that is substituted thereby), unsubstituted $(C_1-C_{18})$alkyl, $F_3C$—, $FCH_2O$—, $F_2HCO$—, $F_3CO$—, $R_3Si$—, $R_3Ge$—, $RO$—, $RS$—, $RS(O)$—, $RS(O)_2$—, $R_2P$—, $R_2N$—, $R_2C=N$—, $NC$—, $RC(O)O$—, $ROC(O)$—, $RC(O)N(R)$—, or $R_2NC(O)$—, or two of the $R^S$ are taken together to form an unsubstituted $(C_1-C_{18})$alkylene, wherein each R independently is an unsubstituted $(C_1-C_{18})$alkyl;

wherein the activating co-catalyst of the ingredient (b) comprises one or more activating co-catalysts, or a reaction product thereof, wherein the ratio of total number of moles of the one or more metal-ligand complexes of formula (I) to total number of moles of the one or more activating co-catalysts is from 1:10,000 to 100:1;

wherein the contacting step is performed under olefin polymerizing conditions (described later) and prepares a rich polyethylene in presence of unpolymerized alpha-olefin (e.g., a $(C_3-C_{40})$alpha-olefin); and wherein the process forms reactive chains (in situ) and is characterizable by a reaction rate constant $k_{11}$ for adding the ethylene (a monomer) to a first reactive chain end comprising an ethylene residual; a reaction rate constant $k_{12}$ for adding the alpha-olefin (a comonomer) to a second reactive chain end comprising an ethylene residual; and a reactivity ratio $r_1$ equal to $k_{11}$ divided by $k_{12}$ of greater than 14, preferably greater than or equal to 20 (i.e., $r_1=k_{11}/k_{12} \geq 20$). For determining $r_1$, preferably the olefin polymerization conditions comprise a polymerization temperature of at least 140 degrees Celsius (° C.). Preferably, the polymerization temperature for determining $r_1$ is at most 190° C. The General procedure for selective polymerization of ethylene in the presence of a $(C_3-C_{40})$ alpha-olefin described later is preferred for determining $r_1$.

The first and second reactive chain ends, and thus the ethylene residuals thereof, can be different or, preferably, the same. The term "rich polyethylene" means a polymeric molecule, or rich polyethylene segment thereof, substantially comprising ethylene repeat units (as a result of high ethylene polymerization selectivity characterized by the high reactivity ratio $r_1$); or a mixture or blend of two or more such polymeric molecules. For example, in some embodiments the rich polyethylene segment of the latter polymeric molecule typically is a portion of a poly(ethylene alpha-olefin) copolymer. The invention process can prepare the poly(ethylene alpha-olefin) copolymer when it further employs an optional promiscuous olefin polymerization catalyst according to one of the embodiments described later, including preparing a poly(ethylene alpha-olefin) block copolymer according to one of the chain shuttling embodiments described later. In other embodiments the invention process produces a rich polyethylene or a polyolefin blend or mixture comprising the rich polyethylene, preferably wherein the rich polyethylene contains no or a minimal amount (e.g., less than 5 mole percent by nuclear magnetic resonance) of alpha-olefin-derived repeat units.

In a second embodiment the present invention is the catalyst comprising or prepared from the one or more metal-ligand complexes of formula (I) and one or more activating co-catalysts, or a reaction product thereof (i.e., a reaction product of a reaction of at least one of the one or more metal-ligand complexes of formula (I) with at least one of the one or more activating co-catalysts), wherein the ratio of total number of moles of the one or more metal-ligand complexes of formula (I) to total number of moles of the one or more activating co-catalysts is from 1:10,000 to 100:1. Typically, the catalyst is prepared in a suitable aprotic solvent (e.g., alkane(s), aromatic hydrocarbon(s), excess olefin monomer, or a mixture thereof).

The present invention also contemplates a catalyst system (i.e., a catalyst composition) comprising the aforementioned ingredients (a) and (b). In some embodiments the invention catalyst system further comprises a molecular weight control agent as an ingredient (e), and, optionally the promiscuous olefin polymerization catalyst as an ingredient (f). Ingredients (e) and (f) are described later. The invention also contemplates additional ingredients of the catalyst system as described later.

In another embodiment the present invention is the metal-ligand complex of formula (I).

In still another embodiment the present invention is a ligand of formula (Q):

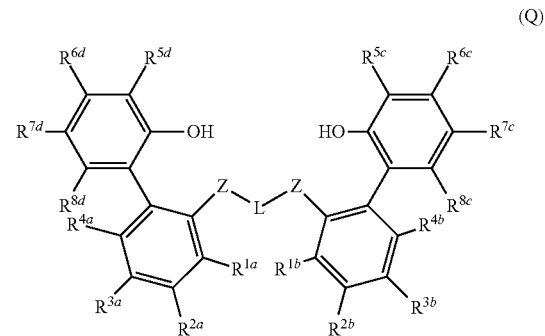

(Q)

or a Group 1 or 2 metal salt thereof, wherein the Group 1 or 2 metal is a cation of any one of the metals of Groups 1 and 2 of the Periodic Table of the Elements; and L, Z, $R^{1a}$, $R^{2a}$, $R^{3a}$, $R^{4a}$, $R^{1b}$, $R^{2b}$, $R^{3b}$, $R^{4b}$, $R^{5c}$, $R^{6c}$, $R^{7c}$, $R^{8c}$, $R^{5d}$, $R^{6d}$, $R^{7d}$, and $R^{8d}$ are as defined previously except at least one of $R^{1a}$, $R^{2a}$, $R^{3a}$, and $R^{3b}$ is not methyl when $R^{7c}$ and $R^{7d}$ are each methyl.

The invention also contemplates a process for preparing the metal-ligand complex of formula (I); a process for preparing the ligand of formula (Q) or the Group 1 or 2 metal salt thereof; and contemplates intermediates in the preparation thereof. The processes are as described later herein.

The ligand of formula (Q) or the Group 1 or 2 metal salt thereof, is useful in the process of preparing the metal-ligand complex of formula (I), which in turn is useful in the process of preparing the invention catalyst.

The metal-ligand complex of formula (I) and invention catalyst derived therefrom with the one or more activating co-catalysts are useful in the invention process. Preferred embodiments of the invention process independently are characterizable by one or more activities of the invention catalyst, one or more properties of the polyolefin prepared thereby, or a combination thereof. Especially preferred properties are those improved over closest prior art, if any. The invention process is characterizable by its aforementioned high selectivity for polymerizing ethylene in presence of the alpha-olefin (e.g., ($C_3$-$C_{40}$)alpha-olefin) or other polymerizable olefin (e.g., styrene). This high ethylene polymerizing selectivity is surprising. Upon careful investigation and without being bound by theory, it has been discovered from 3-dimensional x-ray crystal structures of some of the metal-ligand complexes of formula (I) that $R^{5c}$ sterically interacts with either $R^{1a}$ or $R^{2a}$, or both $R^{1a}$ and $R^{2a}$, as the case may be; or $R^{5d}$ sterically interacts with either $R^{1b}$ or $R^{2b}$, or both $R^{1b}$ and $R^{2b}$, as the case may be; or a combination of such steric interactions thereof when the at least one of $R^{1a}$, $R^{1b}$, $R^{2a}$, and $R^{2b}$, or the aforementioned combinations thereof, is not a hydrogen atom. In some embodiments at least one of $R^{1a}$ and $R^{1b}$ is not a hydrogen atom or at least one of $R^{2a}$ and $R^{2b}$ is hydrocarbyl having at least 4 carbon atoms or a heterohydrocarbyl having at least 3 carbon atoms. It is also believed that these steric interactions happen in such a way so as to cause the invention catalyst prepared from the metal-ligand complex of formula (I) to polymerize ethylene more selectively than it polymerizes the sterically larger alpha-olefin (or other larger olefin comonomer) during the invention process (i.e., the invention catalyst preferentially polymerizes ethylene in the presence of the alpha-olefin). Again without being bound by theory, it is believed that such steric interactions cause the invention catalyst prepared with or from the metal-ligand complex of formula (I) to adopt a conformation that allows ethylene to access the M substantially more easily than the invention catalyst allows the alpha-olefin to do so. The resulting difference in polymerization rates (i.e., selectivity) between ethylene and the alpha-olefin with the invention catalyst in the invention process can be characterized by the aforementioned reactivity ratio $r_1$. These valuable steric interactions have been discovered for the metal-ligand complex of formula (I). Accordingly, the process of the first embodiment (also referred to herein as the "invention process") selectively gives the rich polyethylene (e.g., a high density polyethylene) or rich polyethylene segment of the poly(ethylene alpha-olefin) copolymer in the presence of alpha-olefin, which is substantially unpolymerized thereby.

The invention process advantageously is versatile. For example in some embodiments the invention process can be adapted as described later to further employ a molecular weight control agent so as to prepare a molecular weight-controlled rich polyethylene or molecular weight-controlled poly(ethylene alpha-olefin) copolymer, as the case may be. In some embodiments the invention process can be adapted as described later to further employ a combination of a chain shuttling agent (CSA) and a promiscuous olefin polymerization catalyst so as to prepare the poly(ethylene alpha-olefin) copolymer, and preferably a poly(ethylene alpha-olefin) block copolymer. The poly(ethylene alpha-olefin) block copolymer comprises one or more rich polyethylene segments and one or more segments having higher mole percent incorporation of the alpha-olefin (as a residual thereof) than has the rich polyethylene segment(s). The rich polyethylene segment(s) of the poly(ethylene alpha-olefin) block copolymer are sometimes referred to herein as polyethylene hard segment(s) or simply hard segments. The segments of the poly(ethylene alpha-olefin) block copolymer having the higher mole percent incorporation of the alpha-olefin are formed with the invention process further employing a promiscuous olefin polymerization catalyst having a reactivity ratio $r_1 < 10$ and are sometimes referred to herein as soft segments. The CSA shuttles a growing polymeryl chain between the invention catalyst and the promiscuous olefin polymerization catalyst. Thus the poly(ethylene alpha-olefin) block copolymer so prepared comprises hard and soft segments. In other embodiments the invention process lacks a CSA and can be adapted as described later to prepare a polyolefin polymer blend or mixture, wherein at least one polyolefin of the polymer blend or mixture comprises at least a rich polyolefin or the rich polyethylene segment of the poly(ethylene alpha-olefin) copolymer.

In other examples of the versatility of the invention process, the rich polyethylene or rich polyethylene segment-containing poly(ethylene alpha-olefin) copolymer prepared by the invention process can be readily separated, if desired, from any remaining (unpolymerized) ethylene and polymerizable higher olefin monomer (e.g., ($C_3$-$C_{40}$)alpha-olefin) by conventional means (e.g., filtering/washing the rich polyethylene-containing material or stripping or evaporating of the higher polymerizable olefin monomer). The process of the present invention works with any mole ratio of moles of alpha-olefin to moles of ethylene. Another advantage of the present invention process is that it is capable of preparing the rich polyethylene or rich polyethylene segment of the poly (ethylene alpha-olefin) copolymer in circumstances where it would be desirable to do so in the presence of the larger polymerizable olefin (i.e., a higher polymerizable olefin wherein "higher" means higher number of carbon atoms). Such circumstances include, but are not limited to, use of ethylene/alpha-olefin feed mixtures to prepare the aforementioned polyolefin polymer blend or mixture, wherein at least one polyolefin of the polyolefin polymer blend or mixture comprises the rich polyethylene or the rich polyethylene segment of the poly(ethylene alpha-olefin) copolymer. Another advantage is that in some embodiments the invention process functions as a continuous process that is capable of preparing in some embodiments new polyolefin polymer blends or mixtures or new poly(ethylene alpha-olefin) block copolymers, both of which are thus part of the present invention.

The invention process advantageously can prepare novel rich polyethylenes and rich polyethylene segment-containing polyolefins. Thus, the present invention also contemplates new rich polyethylenes and rich polyethylene segment-containing poly(ethylene alpha-olefin) copolymers, including block copolymers thereof, i.e., the poly(ethylene alpha-olefin) block copolymers, prepared by the invention process. Further the rich polyethylenes prepared by the invention process typically contain vinyl groups. The invention also contemplates modified polymers prepared by functionalizing by known means such vinyl groups to give polar group functionalized derivatives thereof. If desired the polar group functionalized derivatives can be reacted with complimentary-reacting monomers or oligomers so as to form polar group functionalized copolymers.

As used herein the term "poly(ethylene alpha-olefin) block copolymer" is used interchangeably herein with the terms "olefin block copolymer," "OBC," "ethylene/α-olefin block interpolymer," and "ethylene/α-olefin block copolymer". The terms "alpha-olefin" and "α-olefin" are used interchangeably herein. The term "ethylene" means ethene, i.e., $H_2C=CH_2$. The term "olefin block copolymer" means at least one molecule comprising at least two chemically distinct polyolefinyl segments wherein adjacent polyolefinyl segments are covalently bonded to each other and are preferably joined end-to-end in a linear manner. Preferably OBC means a composition that contains a sufficient amount of such molecules such that the composition may be properly classified as a block copolymer. In a preferred embodiment at least some of the blocks differ in a manner as described in U.S. Pat. No. 7,858,706 B2, column 8, line 61, to column 9, line 2.

The rich polyethylenes (e.g., a high density polyethylene) and rich polyethylene-containing materials (e.g., the rich polyethylene-containing poly(ethylene alpha-olefin) copolymers, including the poly(ethylene alpha-olefin) block copolymers) prepared by embodiments of the invention process are useful in numerous applications such as, for example, synthetic lubricants and, especially for the OBCs, elastic films for hygiene applications (e.g., for diaper covers); flexible molded goods for appliances, tools, consumer goods (e.g., toothbrush handles), sporting goods, building and construction components, automotive parts, and medical applications (e.g., medical devices); flexible gaskets and profiles for appliance (e.g., refrigerator door gaskets and profiles), building and construction, and automotive applications; adhesives for packaging (e.g., for use in manufacturing corrugated cardboard boxes), hygiene applications, tapes, and labels; and foams for sporting goods (e.g., foam mats), packaging, consumer goods, and automotive applications.

Additional embodiments are described in the drawings and the remainder of the specification, including the claims.

BRIEF DESCRIPTION OF THE DRAWING(S)

Some embodiments of the present invention are described herein in relation to the accompanying drawing(s), which will at least assist in illustrating various features of the embodiments.

DETAILED DESCRIPTION OF THE INVENTION

The various embodiments of the present invention that are summarized previously are incorporated here by reference. For convenience, the rich polyethylene and rich polyethylene segment of the poly(ethylene alpha-olefin) copolymer is sometimes referred to herein simply as the rich polyethylene. Preferably, every aspect of the invention excludes every metal-ligand complex of formula (I) and catalyst based on any one or more of the following ligands:

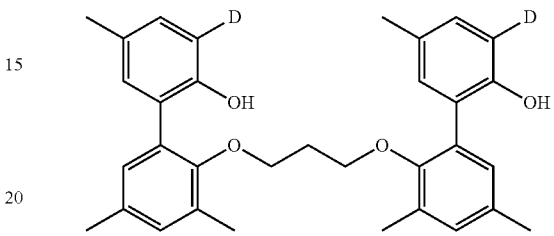

(a) Each D is anthracen-9-yl;
(b) Each D is 1,2,3,4,5,6,7,8-octahydroanthracen-9-yl;
(c) Each D is 9H-carbozol-9-yl; or
(d) Each D is 3,5-bis(1,1-dimethylethyl)phenyl;

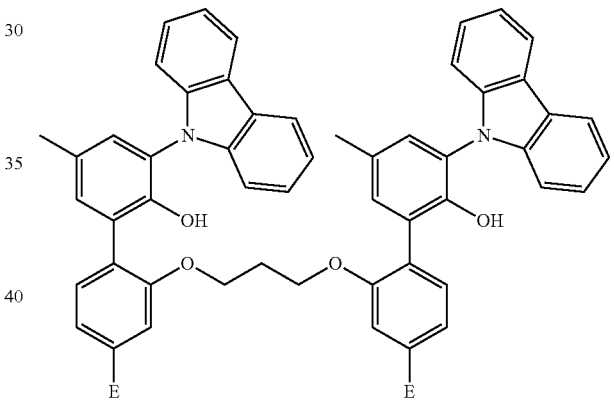

(e) Each E is 1,1-dimethylethyl; or
(f) Each E is methoxy.

Ligands (a) to (f) are the same as ligands LL102, LL103, LL104, LL105, LL133, and LL144, respectively, of US 2006/0025548A1.

Figure 4:
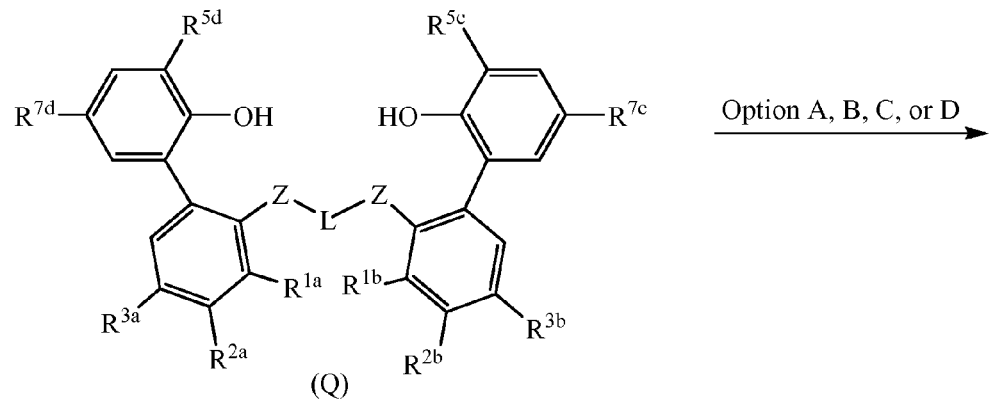
FIG. 4 shows an illustrative procedure of Scheme 4 for preparing the metal-ligand complex of formula (I) from the ligand of formula (Q).
Figure 4:
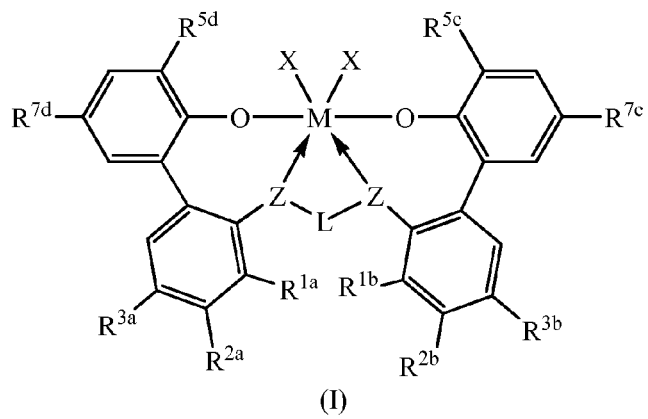

As indicated by the aforementioned usefulness of the ligand of formula (Q) or the Group 1 or 2 metal salt thereof, in the process of preparing the metal-ligand complex of formula (I), which in turn is useful in the process of preparing the invention catalyst, and as illustrated in FIG. 4, in some embodiments, the metal-ligand complex of formula (I) is prepared with the ligand of formula (Q) such that in formula (I) at least one of $R^{1a}$, $R^{1b}$, $R^{3a}$, $R^{3b}$ is not methyl when $R^{7c}$ and $R^{7d}$ are each methyl, and the catalyst is preferably prepared with or from such metal ligand complex of formula (I), and the process preferably employs such catalyst.

Unless otherwise stated, each U.S. patent and patent application, or if portions are referenced only the portions thereof, referenced in this Detailed Description of the Present Invention is hereby incorporated herein by reference.

In the present application, any lower limit of a range of numbers, or any preferred lower limit of the range, may be combined with any upper limit of the range, or any preferred upper limit of the range, to define a preferred aspect or embodiment of the range. Each range of numbers includes all numbers, both rational and irrational numbers, subsumed within that range (e.g., the range from about 1 to about 5 includes, for example, 1, 1.5, 2, 2.75, 3, 3.80, 4, and 5).

Conflict Resolution: what is written in the present specification controls any conflict with what is written in a patent or patent application publication, or a portion thereof that is incorporated by reference. The structure controls any conflict with a compound name. Any non-international system of units value controls any conflict with an International System (SI) of Units value. A drawing controls any conflict with the written description thereof.

In some embodiments, each of the chemical groups (e.g., X, L, $R^{1a}$, etc.) of the metal-ligand complex of formula (I) is unsubstituted, that is, can be defined without use of a substituent $R^S$. In other embodiments, at least one of the chemical groups of the metal-ligand complex of formula (I) independently contain one or more of the substituents $R^S$. Preferably, accounting for all chemical groups, there are not more than a total of 20 $R^S$, more preferably not more than a total of 10 $R^S$, and still more preferably not more than a total of 5 $R^S$ in the metal-ligand complex of formula (I). Where the invention compound contains two or more substituents $R^S$, each $R^S$ independently is bonded to a same or different substituted chemical group. When two or more $R^S$ are bonded to a same chemical group, they independently are bonded to a same or different carbon atom or heteroatom, as the case may be, in the same chemical group up to and including persubstitution of the chemical group.

The term "persubstitution" means each hydrogen atom (H) bonded to a carbon atom or heteroatom of a corresponding unsubstituted compound or functional group, as the case may be, is replaced by a substituent (e.g., $R^S$). The term "polysubstitution" means at least two, but not all, hydrogen atoms (H) bonded to carbon atoms or heteroatoms of a corresponding unsubstituted compound or functional group, as the case may be, are replaced by substituents (e.g., $R^S$). In some embodiments, at least one $R^S$ is polyfluoro substitution or perfluoro substitution. For present purposes "polyfluoro substitution" and "perfluoro substitution" each count as one $R^S$ substituent. In some embodiments each $R^S$ independently is selected from a group consisting of a halogen atom and any one of polyfluoro substitution, unsubstituted $(C_1-C_{18})$alkyl, $F_3C$—, $FCH_2O$—, $F_2HCO$—, $F_3CO$—, $R_3Si$—, $R_3Ge$—, $RO$—, $RS$—, $RS(O)$—, $RS(O)_2$—, $R_2P$—, $R_2N$—, $R_2C=N$—, $NC$—, $RC(O)O$—, $ROC(O)$—, $RC(O)N(R)$—, and $R_2NC(O)$—, wherein each R independently is an unsubstituted $(C_1-C_{18})$alkyl. In some embodiments each $R^S$ independently is selected from a group consisting of a halogen atom, unsubstituted $(C_1-C_{18})$alkyl, and any one of polyfluoro substitution, $F_3C$—, $FCH_2O$—, $F_2HCO$—, $F_3CO$—, $R_3Si$—, $R_3Ge$—, $RO$—, $RS$—, $RS(O)$—, $RS(O)_2$—, $R_2P$—, $R_2N$—, $R_2C=N$—, $NC$—, $RC(O)O$—, $ROC(O)$—, $RC(O)N(R)$—, and $R_2NC(O)$—. In some embodiments each $R^S$ independently is selected from a group consisting of an unsubstituted $(C_1-C_{18})$alkyl and any one of $F_3C$—, $FCH_2O$—, $F_2HCO$—, $F_3CO$—, $R_3Si$—, $R_3Ge$—, $RO$—, $RS$—, $RS(O)$—, $RS(O)_2$—, $R_2P$—, $R_2N$—, $R_2C=N$—, $NC$—, $RC(O)O$—, $ROC(O)$—, $RC(O)N(R)$—, and $R_2NC(O)$—. In some embodiments two $R^S$ are taken together to form an unsubstituted $(C_1-C_{18})$alkylene. Still more preferably substituents $R^S$ independently are unsubstituted $(C_1-C_{18})$alkyl, F, unsubstituted $(C_1-C_{18})$alkylene, or a combination thereof; and even more preferably unsubstituted $(C_1-C_8)$alkyl or unsubstituted $(C_1-C_8)$alkylene. The $(C_1-C_{18})$alkylene and $(C_1-C_8)$alkylene substituents are especially useful for forming substituted chemical groups that are bicyclic or tricyclic analogs, as the case may be, of corresponding monocyclic or bicyclic unsubstituted chemical groups.

The term "hydrocarbylene" means a hydrocarbon diradical having at least one carbon atom wherein each hydrocarbon diradical independently is aromatic or non-aromatic; saturated or unsaturated; straight chain or branched chain; cyclic or acyclic; unsubstituted or substituted; or a combination of at least two thereof. The radicals of the hydrocarbon diradical can be on same or, preferably, different carbon atoms. The term "alkylene" is a hydrocarbylene wherein the hydrocarbon diradical is non-aromatic, saturated, straight chain or branched, acyclic, and unsubstituted or substituted. The term "hydrocarbyl" is as defined previously for hydrocarbylene except whereas hydrocarbylene is the diradical, the hydrocarbyl is a monoradical and so has a hydrogen atom in place of the second radical of the diradical. The term "alkyl" is a hydrocarbyl wherein the hydrocarbon radical is non-aromatic, saturated, straight chain or branched, acyclic, and unsubstituted or substituted. Preferably, the substituent of the substituted alkyl is aryl. The term "heterohydrocarbylene" means a heterohydrocarbon diradical having at least one carbon atom and from 1 to 6 heteroatoms; wherein each heterohydrocarbon diradical independently is aromatic or non-aromatic; saturated or unsaturated; straight chain or branched chain; cyclic or acyclic; unsubstituted or substituted; or a combination of at least two thereof. The radicals of the heterohydrocarbon diradical can be on same or, preferably, different atoms, each radical-bearing atom independently being carbon or heteroatom. The term "heterohydrocarbyl" is as defined previously for heterohydrocarbylene except whereas heterohydrocarbylene is the diradical, the heterohydrocarbyl is a monoradical.

In some embodiments the present invention contemplates unsubstituted chemical groups or molecules described herein have an upper limit of at most 40 carbon atoms, but the invention includes other embodiments having upper limits of lower or higher numbers of carbon atoms (e.g., at most any one of 4, 6, 8, 10, 12, 15, 20, 30, 39, 60, 100, 1,000, and 100,000 carbons). Likewise in some embodiments the present invention contemplates such unsubstituted chemical groups or molecules have a lower limit of at least 1 carbon atom, but the invention includes embodiments having higher lower limits (e.g., at least any one of 2, 3, 4, 5, 6, 7, and 8 carbons), especially higher lower limits as would be well known for a smallest aspect of the chemical group or molecule (e.g., at least 3 carbons for a cycloalkyl or alpha-olefin).

Preferably, each hydrocarbyl independently is an unsubstituted or substituted alkyl, cycloalkyl (having at least 3 carbon atoms), $(C_3-C_{20})$cycloalkyl-$(C_1-C_{20})$alkylene, aryl (having at least 6 carbon atoms), or $(C_6-C_{20})$aryl-$(C_1-C_{20})$alkylene. Preferably, each of the aforementioned hydrocarbyl groups independently has a maximum of 40, more preferably 20, and still more preferably 12 carbon atoms.

Preferably, each alkyl independently has a maximum of 40, more preferably 20, sill more preferably 12, and still more preferably 8 carbon atoms. Examples of unsubstituted $(C_1-C_{40})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and $(C_{45})$alkyl. The $(C_{45})$alkyl is, for example, a $(C_{27}-C_{40})$alkyl substituted by one $R^S$, which is a $(C_{18}-C_5)$alkyl, respectively. Preferably, each $(C_1-C_5)$alkyl independently is methyl, trifluoromethyl, ethyl, 1-propyl, 2-methylethyl, or 1,1-dimethylethyl.

Preferably, each aryl independently has from 6 to 40 carbon atoms. The term "$(C_6-C_{40})$aryl" means an unsubstituted or substituted (by at least one $R^S$) mono-, bi- or tricyclic aromatic hydrocarbon radical of from 6 to 40, preferably from 6 to 14, ring carbon atoms, and the mono-, bi- or tricyclic radical comprises 1, 2 or 3 rings, respectively, wherein the 1 ring is aromatic; at least one of the 2 or 3 rings is aromatic; and the 2 or 3 rings independently are fused or non-fused. Other aryl groups (e.g., $(C_6-C_{10})$aryl)) are defined in an analogous manner. Preferably, $(C_6-C_{40})$aryl has a maximum of 20 carbon atoms (i.e., $(C_6-C_{20})$aryl), more preferably 18 carbon atoms, still more preferably 10 carbon atoms, and even more preferably 6 carbon atoms. Examples of unsubstituted $(C_6-C_{40})$aryl are unsubstituted $(C_6-C_{20})$aryl; unsubstituted $(C_6-C_{18})$aryl; phenyl; $(C_3-C_6)$cycloalkyl-phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6-C_{40})$aryl are substituted $(C_6-C_{20})$aryl; substituted $(C_6-C_{18})$ aryl; 2-$(C_1-C_5)$alkyl-phenyl; 2,4-bis$(C_1-C_5)$alkyl-phenyl; 2,4-bis[$(C_{20})$alkyl]-phenyl; polyfluorophenyl; pentafluorophenyl; and fluoren-9-one-1-yl.

Preferably, each cycloalkyl independently has from 3 to 40 carbon atoms. The term "$(C_3-C_{40})$cycloalkyl" means a saturated cyclic hydrocarbon radical of from 3 to 40 carbon atoms that is unsubstituted or substituted by at least one $R^S$. Other cycloalkyl groups (e.g., $(C_3-C_{12})$alkyl)) are defined in an analogous manner. Preferably, $(C_3-C_{40})$cycloalkyl has a maximum of 20 carbon atoms (i.e., $(C_3-C_{30})$cycloalkyl), more preferably 10 carbon atoms, and still more preferably 6 carbon atoms. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Preferably, each hydrocarbylene independently has from 1 to 40 carbon atoms. Examples of $(C_1-C_{40})$hydrocarbylene are unsubstituted or substituted $(C_6-C_{40})$arylene, $(C_3-C_{40})$cycloalkylene, and $(C_1-C_{40})$alkylene (e.g., $(C_1-C_{20})$alkylene). In some embodiments, the diradicals are on a same carbon atom (e.g., —CH$_2$—) or on adjacent carbon atoms (i.e., 1,2-diradicals), or are spaced apart by one, two, etc. intervening carbon atoms (e.g., respective 1,3-diradicals, 1,4-diradicals, etc.). Preferred is a 1,2-, 1,3-, 1,4-, or an alpha, omega-diradical, and more preferably a 1,2-diradical. The alpha, omega-diradical is a diradical that has a maximum carbon backbone spacing between the radical carbons. More preferred is a 1,2-diradical version of $(C_6-C_{18})$arylene, $(C_3-C_{20})$cycloalkylene, or $(C_2-C_{20})$alkylene; a 1,3-diradical version of $(C_6-C_{18})$arylene, $(C_4-C_{20})$cycloalkylene, or $(C_3-C_{20})$alkylene; or a 1,4-diradical version of $(C_6-C_{18})$arylene, $(C_6-C_{20})$cycloalkylene, or $(C_4-C_{20})$alkylene.

Preferably, each alkylene independently has from 1 to 40 carbon atoms. The term "$(C_1-C_{40})$alkylene" means a saturated straight chain or branched chain diradical (i.e., the radicals are not on ring atoms) of from 1 to 40 carbon atoms that is unsubstituted or substituted by at least one $R^S$. Other alkylene groups (e.g., $(C_1-C_{12})$alkylene)) are defined in an analogous manner. Examples of unsubstituted $(C_1-C_{40})$alkylene are unsubstituted $(C_1-C_{20})$alkylene, including unsubstituted 1,2-$(C_2-C_{10})$alkylene; 1,3-$(C_3-C_{10})$alkylene; 1,4-$(C_4-C_{10})$alkylene; —CH$_2$—, —CH$_2$CH$_2$—, —(CH$_2$)$_3$—,

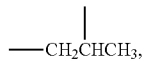

—(CH$_2$)$_4$—, —(CH$_2$)$_5$—, —(CH$_2$)$_6$—, —(CH$_2$)$_7$—, —(CH$_2$)$_8$—, and —(CH$_2$)$_4$C(H)(CH$_3$)—. Examples of substituted $(C_1-C_{40})$alkylene are substituted $(C_1-C_{20})$alkylene, —CF$_2$—, —C(O)—, and —(CH$_2$)$_{14}$C(CH$_3$)$_2$(CH$_2$)$_5$— (i.e., a 6,6-dimethyl substituted normal-1,20-eicosylene). Since as mentioned previously two $R^S$ may be taken together to form a $(C_1-C_{18})$alkylene, examples of substituted $(C_1-C_{40})$alkylene also include 1,2-bis(methylene)cyclopentane, 1,2-bis(methylene)cyclohexane, 2,3-bis(methylene)-7,7-dimethyl-bicyclo[2.2.1]heptane, and 2,3-bis(methylene)bicyclo[2.2.2]octane.

Preferably, each cycloalkylene independently has from 3 to 40 carbon atoms. The term "$(C_3-C_{40})$cycloalkylene" means a cyclic diradical (i.e., the radicals are on ring atoms) of from 3 to 40 carbon atoms that is unsubstituted or substituted by at least one $R^S$. Examples of unsubstituted $(C_3-C_{40})$cycloalkylene are 1,3-cyclopropylene, 1,1-cyclopropylene, and 1,2-cyclohexylene. Examples of substituted $(C_3-C_{40})$cycloalkylene are 2-oxo-1,3-cyclopropylene and 1,2-dimethyl-1,2-cyclohexylene.

Preferably, each heterohydrocarbyl independently has from 1 to 40 carbon atoms. The term "$(C_1-C_{40})$heterohydrocarbyl" means a heterohydrocarbon radical of from 1 to 40 carbon atoms and the term "$(C_1-C_{40})$heterohydrocarbylene means a heterohydrocarbon diradical of from 1 to 40 carbon atoms, and each heterohydrocarbon independently has at least one heteroatom B($R^C$) O; S; S(O); S(O)$_2$; Si($R^C$)$_2$; Ge($R^C$)$_2$; P($R^P$); and N($R^N$), wherein independently each $R^C$ is unsubstituted $(C_1-C_{18})$hydrocarbyl, each $R^P$ is unsubstituted $(C_1-C_{18})$hydrocarbyl; and each $R^N$ is unsubstituted $(C_1-C_{18})$hydrocarbyl or absent (e.g., absent when N comprises —N= or tri-carbon substituted N). The radicals of the diradical can be on same or different type of atoms (e.g., both on saturated acyclic atoms or one on an acyclic atom and one on aromatic atom). Other heterohydrocarbyl (e.g., $(C_1-C_{12})$heterohydrocarbyl)) and heterohydrocarbylene groups are defined in an analogous manner. Preferably, the heteroatom(s) is O; S; S(O); S(O)$_2$; Si($R^C$)$_2$; P($R^P$); or N($R^N$). The heterohydrocarbon radical and each of the heterohydrocarbon diradicals independently is on a carbon atom or heteroatom thereof, although preferably is on a carbon atom when bonded to a heteroatom in formula (I) or to a heteroatom of another heterohydrocarbyl or heterohydrocarbylene. Each $(C_1-C_4)$heterohydrocarbyl and $(C_1-C_{40})$heterohydrocarbylene independently is unsubstituted or substituted (by at least one $R^S$), aromatic or non-aromatic, saturated or unsaturated, straight chain or branched chain, cyclic (including mono- and poly-cyclic, fused and non-fused polycyclic) or acyclic, or a combination of two or more thereof; and each is respectively the same as or different from another.

Preferably, the $(C_1-C_{40})$heterohydrocarbyl independently is unsubstituted or substituted $(C_1-C_{40})$heteroalkyl, $(C_1-C_{40})$hydrocarbyl-B($R^C$)—, $(C_1-C_{40})$hydrocarbyl-O—, $(C_1-C_{40})$hydrocarbyl-S—, $(C_1-C_{40})$hydrocarbyl-S(O)—, $(C_1-C_{40})$hydrocarbyl-S(O)$_2$—, $(C_1-C_{40})$hydrocarbyl-Si($R^C$)$_2$—, $(C_1-C_{40})$hydrocarbyl-Ge($R^C$)$_2$—, $(C_1-C_{40})$hydrocarbyl-N($R^N$)—, $(C_1-C_{40})$hydrocarbyl-P($R^P$)—, $(C_1-C_{40})$hydrocarbyl-P($R^P$)—$(C_1-C_{20})$alkylene-S—, $(C_2-C_{40})$heterocycloalkyl, $(C_2-C_{19})$heterocycloalkyl-$(C_1-C_{20})$alkylene, $(C_3-C_{20})$cycloalkyl-$(C_1-C_{19})$heteroalkylene, $(C_2-C_{19})$heterocycloalkyl-$(C_1-C_{20})$heteroalkylene, $(C_1-C_{40})$heteroaryl, $(C_1-C_{19})$heteroaryl-$(C_1-C_{20})$alkylene, $(C_6-C_{20})$ aryl-($C_1$-$C_{19}$)heteroalkylene, or ($C_1$-$C_{19}$)heteroaryl-($C_1$-$C_{20}$)heteroalkylene. More preferably, each of the aforementioned groups has a maximum of 20 carbon atoms (not counting carbon atoms from any $R^S$).

Preferably, each heteroaryl independently has from 1 to 40 carbon atoms. The term "($C_1$-$C_{40}$)heteroaryl" means an unsubstituted or substituted (by at least one $R^S$) mono-, bi- or tricyclic heteroaromatic hydrocarbon radical of from 1 to 40 total carbon atoms and from 1 to 4 heteroatoms; from 1 to 44 total ring atoms, preferably from 5 to 10 total ring atoms, and the mono-, bi- or tricyclic radical comprises 1, 2 or 3 rings, respectively, wherein the 1-ring is heteroaromatic; at least one of the 2 or 3 rings is heteroaromatic; and the 2 or 3 rings independently are fused or non-fused. Other heteroaryl groups (e.g., ($C_1$-$C_{12}$)heteroaryl)) are defined in an analogous manner. The monocyclic heteroaromatic hydrocarbon radical is a 5-membered or 6-membered ring. The 5-membered ring has from 1 to 4 carbon atoms and from 4 to 1 heteroatoms, respectively, each heteroatom being O, S, N, or P, and preferably O, S, or N. Examples of 5-membered ring heteroaromatic hydrocarbon radical are pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 4 or 5 carbon atoms and 2 or 1 heteroatoms, the heteroatoms being N or P, and preferably N. Examples of 6-membered ring heteroaromatic hydrocarbon radical are pyridine-2-yl; pyrimidin-2-yl; and pyrazin-2-yl. The bicyclic heteroaromatic hydrocarbon radical preferably is a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical preferably is a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl, which may also be named as a dibenzo-1H-pyrrole-1-yl. An example of the fused 6,5,6-ring system is 9H-carbazol-9-yl. An example of the fused 6,6,6-ring system is acrydin-9-yl. The 5-membered rings and 6-membered rings of the fused 5,6-; 6,6-; 5,6,5-; 5,6,6-; 6,5,6-; and 6,6,6-ring systems independently can be as described above for 5-membered and 6-membered rings, respectively, except where the ring fusions occur.

The aforementioned heteroalkyl and heteroalkylene groups are saturated straight or branched chain radicals or diradicals, respectively, containing at least one carbon atom and at least one heteroatom (up to 4 heteroatoms) $Si(R^C)_2$, $Ge(R^C)_2$, $P(R^P)$, $N(R^N)$, N, O, S, S(O), and $S(O)_2$ as defined above, wherein each of the heteroalkyl and heteroalkylene groups independently are unsubstituted or substituted by at least one $R^S$.

Preferably, each heterocycloalkyl independently has from 2 to 40 carbon atoms. The term "($C_2$-$C_{40}$)heterocycloalkyl" means a cyclic diradical (i.e., the radicals are on ring atoms) of from 2 to 40 carbon atoms and from 1 to 4 heteroatoms, as described previously, that is unsubstituted or substituted by at least one $R^S$. Examples of unsubstituted ($C_2$-$C_{40}$)heterocycloalkyl are unsubstituted ($C_2$-$C_{20}$)heterocycloalkyl, unsubstituted ($C_2$-$C_{10}$)heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thia-cyclononyl, and 2-aza-cyclodecyl.

The term "halogen atom" means fluorine atom (F), chlorine atom (Cl), bromine atom (Br), or iodine atom (I) radical. Preferably each halogen atom independently is the Br, F, or Cl radical, and more preferably the F or Cl radical. The term "halide" means fluoride ($F^-$), chloride ($Cl^-$), bromide ($Br^-$), or iodide ($I^-$) anion. Preferably, halide is $Cl^-$ or $Br^-$.

Unless otherwise indicated herein the term "heteroatom" means O, S, S(O), $S(O)_2$, $Si(R^C)_2$, $Ge(R^C)_2$, $P(R^P)$, or $N(R^N)$, wherein independently each $R^C$ is unsubstituted ($C_1$-$C_{18}$)hydrocarbyl or the two $R^C$ are taken together to form a ($C_2$-$C_{19}$) alkylene (e.g., the two $R^C$ together with the silicon atom to which they are both bonded form a 3-membered to 20-membered silacycloalkyl), each $R^P$ is unsubstituted ($C_1$-$C_{18}$)hydrocarbyl; and each $R^N$ is unsubstituted ($C_1$-$C_{18}$)hydrocarbyl, a hydrogen atom, or absent (absent when N comprises —N= as in a N-containing heteroaryl). Preferably there is no germanium (Ge) atom in the invention compound or complex.

Preferably, there are no O—O, S—S, or O—S bonds, other than O—S bonds in an S(O) or $S(O)_2$ diradical functional group, in the metal-ligand complex of formula (I). More preferably, there are no O—O, N—N, P—P, N—P, S—S, or O—S bonds, other than O—S bonds in an S(O) or $S(O)_2$ diradical functional group, in the metal-ligand complex of formula (I).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, and (in heteroatom-containing groups) carbon-nitrogen, carbon-phosphorous, and carbon-silicon double bonds, not including any such double bonds that may be present in substituents $R^S$, if any, or in (hetero)aromatic rings, if any.

In the metal-ligand complex of formula (I) and ligand of formula (Q) certain variables and chemical groups n, M, X, Z, L, $R^{1a}$, $R^{2a}$, $R^{3a}$, $R^{4a}$, $R^{1b}$, $R^{2b}$, $R^{3b}$, $R^{4b}$, $R^{5c}$, $R^{6c}$, $R^{7c}$, $R^{8c}$, $R^{5d}$, $R^{6d}$, $R^{7d}$, and $R^{8d}$, as the formulas allow, are preferred. Examples of such preferred groups follow.

Preferably M is zirconium or hafnium, and more preferably M is hafnium. In some embodiments M is zirconium. In some embodiments M is titanium. In some embodiments M is in a formal oxidation state of +2. In some embodiments M is in a formal oxidation state of +3. In some embodiments M is in a formal oxidation state of +4. The invention contemplates any combination of a preferred M and a preferred formal oxidation state.

In some embodiments n is 0. In some embodiments n is 1. In some embodiments n is 2. In some embodiments n is 3.

The X groups are not critical. Certain X are preferred. In some embodiments each X independently is the monodentate ligand. Preferably when there are two or more X monodentate ligands, each X is the same. In some embodiments the monodentate ligand is the monoanionic ligand. The monoanionic ligand has a net formal oxidation state of −1. Each monoanionic ligand preferably independently is hydride, hydrocarbyl carbanion, heterohydrocarbyl carbanion, halide, nitrate, carbonate, phosphate, sulfate, $HC(O)O^-$, hydrocarbyl$C(O)O^-$, $HC(O)N(H)^-$, hydrocarbyl$C(O)N(H)^-$, hydrocarbyl$C(O)N$($C_1$-$C_{20}$)hydrocarbyl)$^-$, $R^K R^L B^-$, $R^K R^L N^-$, $R^K O^-$, $R^K S^-$, $R^K R^L P^-$, or $R^M R^K R^L Si^-$, wherein each $R^K$, $R^L$, and $R^M$ independently is hydrogen, hydrocarbyl, or heterohydrocarbyl, or $R^K$ and $R^L$ are taken together to form a $(C_2$-$C_{40})$hydrocarbylene or heterohydrocarbylene and $R^M$ is as defined above.

In some embodiments at least one monodentate ligand of X independently is the neutral ligand. Preferably the neutral ligand is a neutral Lewis base group that is $R^X NR^K R^L$, $R^K OR^L$, $R^K SR^L$, or $R^X PR^K R^L$, wherein each $R^X$ independently is hydrogen, hydrocarbyl, $[(C_1$-$C_{10})$hydrocarbyl$]_3$Si, $[(C_1$-$C_{10})$hydrocarbyl$]_3$Si$(C_1$-$C_{10})$hydrocarbyl, or heterohydrocarbyl and each $R^K$ and $R^L$ independently is as defined above.

In some embodiments, each X is a monodentate ligand that independently is a halogen atom, unsubstituted $(C_1$-$C_{20})$hydrocarbyl, unsubstituted $(C_1$-$C_{20})$hydrocarbylC(O)O—, or $R^K R^L N$— wherein each of $R^K$ and $R^L$ independently is an unsubstituted $(C_1$-$C_{20})$hydrocarbyl. In some embodiments each monodentate ligand X is a chlorine atom, $(C_1$-$C_{10})$hydrocarbyl (e.g., $(C_1$-$C_6)$alkyl or benzyl), unsubstituted $(C_1$-$C_{10})$hydrocarbylC(O)O—, or $R^K R^L N$— wherein each of $R^K$ and $R^L$ independently is an unsubstituted $(C_1$-$C_{10})$hydrocarbyl.

In some embodiments there are at least two X and the two X are taken together to form the bidentate ligand. In some embodiments the bidentate ligand is a neutral bidentate ligand. Preferably the neutral bidentate ligand is a diene of formula $(R^D)_2 C{=}C(R^D)$—$C(R^D){=}C(R^D)_2$, wherein each $R^D$ independently is H, unsubstituted $(C_1$-$C_6)$alkyl, phenyl, or naphthyl. In some embodiments the bidentate ligand is a monoanionic-mono (Lewis base) ligand. The monoanionic-mono (Lewis base) ligand preferably is a 1,3-dionate of formula (D): $R^E$—$C(O^-){=}CH$—$C({=}O)$—$R^E$ (D), wherein each $R^D$ independently is H, unsubstituted $(C_1$-$C_6)$alkyl, phenyl, or naphthyl. In some embodiments the bidentate ligand is a dianionic ligand. The dianionic ligand has a net formal oxidation state of −2. Preferably each dianionic ligand independently is carbonate, oxalate (i.e., $^-O_2CC(O)O^-$), $(C_2$-$C_{40})$hydrocarbylene dicarbanion, heterohydrocarbylene dicarbanion, phosphate, or sulfate.

As used herein, the term "carbonate" means an ionic substance consisting of zero or one cations $Q^X$ and an anion of the empirical formula $CO_3^{-2}$, the ionic substance having an overall −1 or −2 charge. The term "nitrate" means an ionic substance consisting of an anion of the empirical formula $NO_3^-$, the ionic substance having an overall −1 charge. The term "oxalate" means an ionic substance consisting of zero or one cations $Q^X$ and an anion of the empirical formula $^-OC(O)C(O)O^-$, the ionic substance having an overall −1 or −2 charge. The term "phosphate" means an ionic substance consisting of zero, one, or two cations $Q^X$ and an anion of the empirical formula $PO_4^{-3}$, the ionic substance having an overall −1, −2, or −3 charge. The term "sulfate" means an ionic substance consisting of zero or one cations $Q^X$ and an anion of the empirical formula $SO_4^{-2}$, the ionic substance having an overall −1 or −2 charge. In each of the ionic substances, preferably $Q^X$ independently is an inorganic cation of hydrogen atom, lithium, sodium, potassium, calcium, or magnesium, including hemi calcium and hemi magnesium.

As previously mentioned, number and charge (neutral, monoanionic, dianionic) of X are selected depending on the formal oxidation state of M such that the metal-ligand complex of formula (I) is, overall, neutral.

In some embodiments each X is the same, wherein each X is methyl; ethyl; 1-propyl; 2-propyl; 1-butyl; 2,2-dimethylpropyl; trimethylsilylmethyl; phenyl; benzyl; or chloro. In some embodiments n is 2 and each X is the same.

In some embodiments at least two X are different. In some embodiments n is 2 and each X is a different one of methyl; ethyl; 1-propyl; 2-propyl; 1-butyl; 2,2-dimethylpropyl; trimethylsilylmethyl; phenyl; benzyl; and chloro.

The integer n indicates number of X. Preferably n is 2 or 3 and at least two X independently are monoanionic monodentate ligands and a third X, if present, is a neutral monodentate ligand. In some embodiments n is 2 at two X are taken together to form a bidentate ligand. In some embodiments the bidentate ligand is 2,2-dimethyl-2-silapropane-1,3-diyl or 1,3-butadiene.

More preferably X and n independently are as defined as in any one of the Examples described later.

Certain Z groups in formula (I) are preferred. In some embodiments each Z is different. In some embodiments one Z is O and one Z is $NCH_3$. In some embodiments one Z is O and one Z is S. In some embodiments one Z is S and one Z is Nhydrocarbyl (e.g., $NCH_3$). In some embodiments each Z is the same. In some embodiments each Z is O. In some embodiments each Z is S. In some embodiments each Z is Nhydrocarbyl (e.g., $NCH_3$). In some embodiments at least one, and in some embodiments each Z is Phydrocarbyl (e.g., $PCH_3$).

A certain L group in formula (I) are preferred. In some embodiments L is the hydrocarbylene. Preferably the aforementioned portion that comprises a 1-carbon atom to 6-carbon atom linker backbone of the hydrocarbylene of L comprises a 2-carbon atom to 5-carbon atom, and more preferably a 3-carbon atom or 4-carbon atom linker backbone linking the Z atoms in formula (I) to which L is bonded. In some embodiments L comprises the 1-carbon atom linker backbone (e.g., L is —$CH_2$— or $C({=}O)$). In some embodiments L comprises the 2-carbon atom linker backbone (e.g., L is —$CH_2 CH_2$— or —$CH(CH_3)CH(CH_3)$—). In some embodiments L comprises the 3-carbon atom linker backbone (e.g., L is —$CH_2 CH_2 CH_2$—; —$CH(CH_3)CH_2 CH(CH_3)$—; —$CH(CH_3)CH(CH_3)CH(CH_3)$—; —$CH_2 C(CH_3)_2 CH_2$—); 1,3-cyclopentane-diyl; or 1,3-cyclohexane-diyl. In some embodiments L comprises the 4-carbon atom linker backbone (e.g., L is —$CH_2 CH_2 CH_2 CH_2$—; —$CH_2 C(CH_3)_2 C(CH_3)_2 CH_2$—; 1,2-bis(methylene)cyclohexane; or 2,3-bis(methylene)-bicyclo[2.2.2]octane). In some embodiments L comprises the 5-carbon atom linker backbone (e.g., L is —$CH_2 CH_2 CH_2 CH_2 CH_2$— or 1,3-bis(methylene)cyclohexane). In some embodiments L comprises the 6-carbon atom linker backbone (e.g., L is —$CH_2 CH_2 CH_2 CH_2 CH_2 CH_2$— or 1,2-bis(ethylene)cyclohexane).

Preferably L is the hydrocarbylene and the hydrocarbylene of L is a $(C_2$-$C_{12})$hydrocarbylene, and more preferably $(C_3$-$C_8)$hydrocarbylene. In some embodiments the hydrocarbylene is an unsubstituted alkylene. In some embodiments the hydrocarbylene is a substituted alkylene. In some embodiments the hydrocarbylene is an unsubstituted cycloalkylene or substituted cycloalkylene, wherein each substituent independently is $R^S$, wherein preferably the $R^S$ independently is $(C_1$-$C_4)$alkyl.

In some embodiments L is the unsubstituted alkylene, and more preferably L is an acyclic unsubstituted alkylene, and still more preferably the acyclic unsubstituted alkylene is —$CH_2 CH_2$—, —$CH_2 CH_2 CH_2$—, cis —$CH(CH_3)CH_2 CH(CH_3)$—, trans —$CH(CH_3)CH_2 CH(CH_3)$—, —$CH(CH_3)CH_2 CH(CH_3)_2$—, —$CH(CH_3)CH(CH_3)CH(CH_3)$—, —$CH_2 C(CH_3)_2 CH_2$—, —$CH_2 CH_2 CH_2 CH_2$—, or —$CH_2 C(CH_3)_2 C(CH_3)_2 CH_2$—. In some embodiments L is the substituted alkylene, and more preferably L is a alkylene-substituted alkylene, and still more preferably the alkylene-substituted alkylene is trans-1,2-bis(methylene)cyclopentane, cis-1,2-bis(methylene)cyclopentane, trans-1,2-bis(methylene)cyclohexane, or cis-1,2-bis(methylene)cyclohexane. In some embodiments the alkylene-substituted alkylene is exo-2,3-bis(methylene)bicyclo[2.2.2]octane or exo-2,3-bis(methylene)-7,7-dimethyl-bicyclo[2.2.1]heptane. In some embodiments L is the unsubstituted cycloalkylene, and more preferably L is cis-1,3-cyclopentane-diyl or cis-1,3-cyclohexane-diyl. In some embodiments L is the substituted cycloalkylene, and more preferably L is a alkylene-substituted cycloalkylene, and still more preferably L is the alkylene-substituted cycloalkylene that is exo-bicyclo[2.2.2]octan-2,3-diyl.

In some embodiments L is the heterohydrocarbylene. Preferably the aforementioned portion that comprises a 1-atom to 6-atom linker backbone of the heterohydrocarbylene of L comprises a from 2-atom to 5-atom, and more preferably a 3-atom or 4-atom linker backbone linking the Z atoms in formula (I) to which L is bonded. In some embodiments L comprises the 1-atom linker backbone (e.g., L is —CH(OCH$_3$)— or —Si(CH$_3$)$_2$—). In some embodiments L comprises the 2-atom linker backbone (e.g., L is —CH$_2$CH(OCH$_3$)— or —CH$_2$Si(CH$_3$)$_2$—). In some embodiments L comprises the 3-atom linker backbone (e.g., L is —CH$_2$CH$_2$CH(OCH$_3$)—, —CH$_2$Si(CH$_3$)$_2$CH$_2$—, or —CH$_2$Ge(CH$_3$)$_2$CH$_2$—). The "—CH$_2$Si(CH$_3$)$_2$CH$_2$—" may be referred to herein as a 1,3-diradical of 2,2-dimethyl-2-silapropane. In some embodiments L comprises the 4-atom linker backbone (e.g., L is —CH$_2$CH$_2$OCH$_2$— or —CH$_2$P(CH$_3$)CH$_2$CH$_2$—). In some embodiments L comprises the 5-atom linker backbone (e.g., L is —CH$_2$CH$_2$OCH$_2$CH$_2$— or —CH$_2$CH$_2$N(CH$_3$)CH$_2$CH$_2$—). In some embodiments L comprises the 6-atom linker backbone (e.g., L is —CH$_2$CH$_2$C(OCH$_3$)$_2$CH$_2$CH$_2$CH$_2$—, —CH$_2$CH$_2$CH$_2$S(O)$_2$CH$_2$CH$_2$—, or —CH$_2$CH$_2$S(O)CH$_2$CH$_2$CH$_2$—). In some embodiments each atom of the 1-atom to 6-atom linker backbone is a carbon atom (the heteroatom(s) of the (C$_1$-C$_{40}$)heterohydrocarbylene thereby being elsewhere therein). In some embodiments one of the atoms of the 1-atom to 6-atom linker backbone is a heteroatom and the rest of the from 1 to 6 atoms, if any, are carbon atoms. In some embodiments two of the from 2 to 6 atoms of the 2-atom to 6-atom linker backbone independently are heteroatoms and the rest of the from 2 to 6 atoms, if any, are carbon atoms. In some embodiments at least one heteroatom is the Si(R$^C$)$_2$. In some embodiments each R$^C$ is unsubstituted (C$_1$-C$_{18}$)hydrocarbyl. In some embodiments the two R$^C$ are taken together to form a (C$_2$-C$_{19}$)alkylene (i.e., the 3-membered to 20-membered silacycloalkyl). In some embodiments at least one heteroatom is the O. In some embodiments at least one heteroatom is the S(O). In some embodiments at least one heteroatom is the S(O)$_2$. In some embodiments at least one heteroatom is the P(R$^P$). In some embodiments at least one heteroatom is the N(R$^N$). Preferably, there are no O—O, S—S, or O—S bonds, other than O—S bonds in the S(O) or S(O)$_2$ diradical functional group, in —Z-L-Z—. More preferably, there are no O—O, N—N, P—P, N—P, S—S, or O—S bonds, other than O—S bonds in an S(O) or S(O)$_2$ diradical functional group, in —Z-L-Z—. Preferably the (C$_1$-C$_{40}$)heterohydrocarbylene is (C$_1$-C$_{11}$)heterohydrocarbylene, and more preferably (C$_1$-C$_7$)heterohydrocarbylene. More preferably the (C$_1$-C$_7$)heterohydrocarbylene of L is —CH$_2$Si(CH$_3$)$_2$CH$_2$—; —CH$_2$CH$_2$Si(CH$_3$)$_2$CH$_2$—; or CH$_2$Si(CH$_3$)$_2$CH$_2$CH$_2$—. Still more preferably the (C$_1$-C$_7$)heterohydrocarbylene of L is —CH$_2$Si(CH$_3$)$_2$CH$_2$—, —CH$_2$Si(CH$_2$CH$_3$)$_2$CH$_2$—, —CH$_2$Si(isopropyl)$_2$CH$_2$—, —CH$_2$Si(tetramethylene)CH$_2$—, or —CH$_2$Si(pentamethylene)CH$_2$—. The —CH$_2$Si(tetramethylene)CH$_2$— is named 1-silacyclopentan-1,1-dimethylene. The —CH$_2$Si(pentamethylene)CH$_2$— is named 1-silacyclohexan-1,1-dimethylene.

More preferably L is defined as in any one of the Examples described later.

Certain R$^{1a}$, R$^{2a}$, R$^{1b}$, and R$^{2b}$ groups are preferred. In some embodiments one of R$^{1a}$, R$^{2a}$, R$^{1b}$, and R$^{2b}$ independently is a hydrocarbyl, heterohydrocarbyl, or halogen atom; and each of the others of R$^{1a}$, R$^{2a}$, R$^{1b}$, R$^{2b}$ is a hydrogen atom. In some such embodiments it is each of R$^{2a}$, R$^{1b}$, R$^{2b}$ that is a hydrogen atom. In other such embodiments it is each of R$^{1a}$, R$^{1b}$, and R$^{2b}$ that is a hydrogen atom.

In some embodiments two of R$^{1a}$, R$^{2a}$, R$^{1b}$, R$^{2b}$ independently are a hydrocarbyl, heterohydrocarbyl, or halogen atom; and each of the others of R$^{1a}$, R$^{2a}$, R$^{1b}$, and R$^{2b}$ is a hydrogen atom. In some such embodiments it is each of R$^{1b}$ and R$^{2b}$ that is a hydrogen atom. In other such some embodiments it is each of R$^{2a}$ and R$^{2b}$ that is a hydrogen atom. In still other such some embodiments it is each of R$^{1a}$ and R$^{1b}$ that is a hydrogen atom.

In some embodiments three of R$^{1a}$, R$^{2a}$, R$^{1b}$, R$^{2b}$ independently are a hydrocarbyl, heterohydrocarbyl, or halogen atom; and the other of R$^{1a}$, R$^{2a}$, R$^{1b}$, and R$^{2b}$ is a hydrogen atom. In some such embodiments it is R$^{1b}$ that is a hydrogen atom. In other such some embodiments it is R$^{2b}$ that is a hydrogen atom.

In some embodiments each of R$^{1a}$, R$^{2a}$, R$^{1b}$, R$^{2b}$ independently is a hydrocarbyl, heterohydrocarbyl, or halogen atom.

In some embodiments one of R$^{1a}$ and R$^{1b}$ independently is a hydrocarbyl, heterohydrocarbyl, or halogen atom, and the other of R$^{1a}$ and R$^{1b}$ independently is a hydrogen atom, hydrocarbyl, heterohydrocarbyl, or halogen atom. In some embodiments one of R$^{1a}$ and R$^{1b}$ independently is a hydrocarbyl or halogen atom, and the other of R$^{1a}$ and R$^{1b}$ independently is a hydrogen atom, hydrocarbyl, heterohydrocarbyl, or halogen atom. In some embodiments each of R$^{1a}$ and R$^{1b}$ independently is a hydrocarbyl or halogen atom. In some embodiments at least one of R$^{1a}$ and R$^{1b}$ is hydrocarbyl. In some embodiments at least one of R$^{1a}$ and R$^{1b}$ is halogen atom.

In some embodiments one of R$^{2a}$ and R$^{2b}$ independently is a hydrocarbyl, heterohydrocarbyl, or halogen atom, and the other of R$^{2a}$ and R$^{2b}$ independently is a hydrogen atom, hydrocarbyl, heterohydrocarbyl, or halogen atom. In some embodiments one of R$^{2a}$ and R$^{2b}$ independently is a hydrocarbyl or halogen atom, and the other of R$^{2a}$ and R$^{2b}$ independently is a hydrogen atom, hydrocarbyl, heterohydrocarbyl, or halogen atom. In some embodiments each of R$^{2a}$ and R$^{2b}$ independently is a hydrocarbyl or halogen atom. In some embodiments at least one of R$^{2a}$ and R$^{2b}$ is hydrocarbyl. In some embodiments at least one of R$^{2a}$ and R$^{2b}$ is halogen atom.

Certain R$^{3a}$ and R$^{3b}$ are preferred. In some embodiments each of R$^{3a}$ and R$^{3b}$ is a hydrogen atom. In some embodiments one of R$^{3a}$ and R$^{3b}$ independently is a hydrocarbyl, heterohydrocarbyl, or halogen atom, and the other of R$^{3a}$ and R$^{3b}$ independently is a hydrogen atom, hydrocarbyl, heterohydrocarbyl, or halogen atom. In some embodiments one of R$^{3a}$ and R$^{3b}$ independently is a hydrocarbyl or halogen atom, and the other of R$^{3a}$ and R$^{3b}$ independently is a hydrogen atom, hydrocarbyl, heterohydrocarbyl, or halogen atom. In some embodiments each of R$^{3a}$ and R$^{3b}$ independently is a hydrocarbyl, heterohydrocarbyl, or halogen atom. In some embodiments each of R$^{3a}$ and R$^{3b}$ independently is a hydrocarbyl or halogen atom. In some embodiments at least one of R$^{3a}$ and R$^{3b}$ is hydrocarbyl. In some embodiments at least one of R$^{3a}$ and R$^{3b}$ is halogen atom.

Certain combinations of R$^{1a}$, R$^{1b}$, R$^{2a}$, R$^{2b}$ are preferred. In some embodiments R$^{1a}$ is a hydrogen atom; R$^{1b}$ is a hydrocarbyl, heterohydrocarbyl, or halogen atom; R$^{2a}$ independently is a hydrocarbyl, heterohydrocarbyl, or halogen atom; and $R^{2b}$ independently is a hydrogen atom, hydrocarbyl, heterohydrocarbyl, or halogen atom. In some embodiments $R^{1b}$ independently is hydrocarbyl or halogen atom.

In some embodiments each of $R^{1a}$ and $R^{1b}$ is a hydrogen atom; and at least one, and preferably each of $R^{2a}$ and $R^{2b}$ independently is a hydrocarbyl, heterohydrocarbyl, or halogen atom. In some embodiments at least one and preferably each of the $R^{2a}$ and $R^{2b}$ independently is hydrocarbyl or halogen atom.

In some embodiments at least three of $R^{1a}$, $R^{1b}$, $R^{2a}$, and $R^{2b}$ independently is a hydrocarbyl, heterohydrocarbyl, or halogen atom; and the remaining one of $R^{1a}$, $R^{1b}$, $R^{2a}$, $R^{2b}$ independently is a hydrogen atom, hydrocarbyl, heterohydrocarbyl, or halogen atom. In some embodiments at least three and in other embodiments each of $R^{1a}$, $R^{1b}$, $R^{2a}$, and $R^{2b}$ independently is a hydrocarbyl or halogen atom. When at least one of $R^{1a}$, $R^{1b}$, $R^{2a}$, $R^{2b}$ is a F, preferably it is $R^{1a}$, $R^{1b}$, or each of $R^{1a}$ and $R^{1b}$ that is F.

Certain combinations of $R^{2a}$, $R^{2b}$, $R^{3a}$, and $R^{3b}$ are preferred. In some embodiments $R^{2a}$ is a hydrogen atom; $R^{2b}$ is a hydrocarbyl, heterohydrocarbyl, or halogen atom; $R^{3a}$ independently is a hydrocarbyl, heterohydrocarbyl, or halogen atom; and $R^{3b}$ independently is a hydrogen atom, hydrocarbyl, heterohydrocarbyl, or halogen atom. In some embodiments $R^{2b}$ independently is hydrocarbyl or halogen atom.

In some embodiments each of $R^{2a}$, $R^{2b}$, $R^{3a}$, and $R^{3b}$ independently is a hydrocarbyl, heterohydrocarbyl, or halogen atom. In some embodiments at least one and preferably each of the $R^{2a}$, $R^{2b}$, $R^{3a}$, and $R^{3b}$ independently is hydrocarbyl or halogen atom.

In some embodiments at least three of $R^{2a}$, $R^{2b}$, $R^{3a}$, and $R^{3b}$ independently is a hydrocarbyl, heterohydrocarbyl, or halogen atom; and the remaining one of $R^{2a}$, $R^{2b}$, $R^{3a}$, and $R^{3b}$ independently is a hydrogen atom, hydrocarbyl, heterohydrocarbyl, or halogen atom. In some embodiments at least three and in other embodiments each of $R^{2a}$, $R^{2b}$, $R^{3a}$, and $R^{3b}$ independently is a hydrocarbyl or halogen atom.

Certain combinations of $R^{1a}$, $R^{1b}$, $R^{2a}$, $R^{2b}$, $R^{3a}$, $R^{3b}$ are more preferred. In some embodiments $R^{2a}$ and $R^{2b}$ are each hydrogen atom and $R^{1a}$, $R^{1b}$, $R^{3a}$, and $R^{3b}$ independently is hydrocarbyl, heterohydrocarbyl, or halogen atom; and more preferably $R^{2a}$ and $R^{2b}$ are each hydrogen atom and each of $R^{1a}$ and $R^{1b}$ independently is ($C_1$-$C_6$)hydrocarbyl, ($C_1$-$C_5$) heterohydrocarbyl, fluorine atom, or chlorine atom, and each of $R^{3a}$, and $R^{3b}$ independently is ($C_1$-$C_{12}$)hydrocarbyl, ($C_1$-$C_{11}$)heterohydrocarbyl, fluorine atom, chlorine atom, or bromine atom. In some embodiments $R^{1a}$ and $R^{1b}$ are each hydrogen atom; each of $R^{2a}$ and $R^{2b}$ independently is ($C_1$-$C_8$) hydrocarbyl, ($C_1$-$C_7$)heterohydrocarbyl, fluorine atom, chlorine atom, or bromine atom; and each of $R^{3a}$, and $R^{3b}$ independently is ($C_1$-$C_{12}$)hydrocarbyl, ($C_1$-$C_{11}$) heterohydrocarbyl, fluorine atom, chlorine atom, or bromine atom.

Preferably each hydrocarbyl, whenever used to define $R^{1a}$, $R^{1b}$, $R^{2a}$, $R^{2b}$, $R^{3a}$, or $R^{3b}$, independently is an alkyl or cycloalkyl. Preferably the alkyl is ($C_1$-$C_{12}$)alkyl, more preferably ($C_1$-$C_8$)alkyl, still more preferably ($C_1$-$C_6$)alkyl, and even more preferably ($C_1$-$C_4$)alkyl. Preferably the cycloalkyl is ($C_3$-$C_6$)cycloalkyl, and more preferably ($C_3$-$C_4$)cycloalkyl. Preferably the ($C_3$-$C_4$)cycloalkyl is cyclopropyl. Preferably the ($C_1$-$C_4$)alkyl is methyl, ethyl, 1-propyl, 2-propyl, 1-butyl, 2-butyl, 2-methylpropyl, or 1,1-dimethylethyl, and more preferably methyl, ethyl, 2-propyl, or 1,1-dimethylethyl. In some embodiments the ($C_1$-$C_4$)alkyl is ethyl, 2-propyl, or 1,1-dimethylethyl. Preferably each halogen atom, whenever used to define $R^{1a}$, $R^{1b}$, $R^{2a}$, $R^{2b}$, $R^{3a}$, and $R^{3b}$, independently is a fluorine atom or chlorine atom.

In some embodiments of the metal-ligand complex of formula (I) each of $R^{2a}$ and $R^{2b}$ is a hydrogen atom and at least one, and in some embodiments each of $R^{1a}$, $R^{1b}$, $R^{3a}$, and $R^{3b}$ independently is methyl; ethyl; 2-propyl; 1,1-dimethylethyl; mono-, di-, or trifluoromethyl; methoxy; ethoxy; 1-methylethoxy; mono-, di-, or trifluoromethoxy; halogen atom; cyano; nitro; dimethylamino; aziridin-1-yl; or cyclopropyl. In some embodiments at least one, and in some embodiments each of $R^{2a}$ and $R^{2b}$ is a hydrogen atom and each of $R^{1a}$, $R^{1b}$, $R^{3a}$, and $R^{3b}$ independently is methyl; ethyl; 1-propyl; 2-propyl; 1-butyl; 1,1-dimethylethyl; cyano; dimethylamino; methoxy; trifluoromethyl; bromine atom; fluorine atom, or chlorine atom.

In some embodiments of the metal-ligand complex of formula (I) each of $R^{1a}$ and $R^{1b}$ is a hydrogen atom and at least one, and in some embodiments each of $R^{2a}$, $R^{2b}$, $R^{3a}$, and $R^{3b}$ independently is methyl; ethyl; 2-propyl; 1,1-dimethylethyl; mono-, di-, or trifluoromethyl; methoxy; ethoxy; 1-methylethoxy; mono-, di-, or trifluoromethoxy; halogen atom; cyano; nitro; dimethylamino; aziridin-1-yl; or cyclopropyl. In some embodiments at least one, and in some embodiments each of $R^{1a}$ and $R^{1b}$ is a hydrogen atom and each of $R^{2a}$, $R^{2b}$, $R^{3a}$, $R^{3b}$ independently is methyl; ethyl; 1-propyl; 2-propyl; 1-butyl; 1,1-dimethylethyl; cyano; dimethylamino; methoxy; trifluoromethyl; bromine atom; fluorine atom, or chlorine atom.

In some embodiments the metal-ligand complex of formula (I) and ligand of formula (Q) one of $R^{1a}$ and $R^{1b}$ is methyl; the other of $R^{1a}$ and $R^{1b}$ is as in any one of the preferred embodiments described herein. More preferably in some of such embodiments each of $R^{2a}$ and $R^{2b}$ is a hydrogen atom and each of $R^{3a}$ and $R^{3b}$ independently is as in any one of the preferred embodiments described herein.

In some embodiments the metal-ligand complex of formula (I) and ligand of formula (Q) at least one, and more preferably at least one of $R^{1a}$ and $R^{1b}$ independently is ethyl; 2-propyl; mono-, di-, or trifluoromethyl; methoxy; ethoxy; 1-methylethoxy; mono-, di-, or trifluoromethoxy; halogen atom; cyano; nitro; dimethylamino; aziridin-1-yl; or cyclopropyl. More preferably in such embodiments at least one, and more preferably each of $R^{2a}$ and $R^{2b}$ is a hydrogen atom and each of $R^{3a}$ and $R^{3b}$ independently is as in any one of the preferred embodiments described herein. In some of such embodiments preferably at least one, and more preferably each of $R^{1a}$ and $R^{1b}$ is a halogen atom or ($C_1$-$C_6$)alkyl, and still more preferably a ($C_1$-$C_4$)alkyl, fluorine or chlorine atom. In some embodiments at least one, and preferably each of $R^{1a}$ and $R^{1b}$ is the fluorine atom. In some embodiments at least one, and preferably each of $R^{1a}$ and $R^{1b}$ is the chlorine atom. In some embodiments at least one, and preferably each of $R^{1a}$ and $R^{1b}$ is ($C_1$-$C_4$)alkyl, and more preferably methyl.

In some embodiments $R^{1a}$ and $R^{1b}$ are the same as each other. In other embodiments $R^{1a}$ and $R^{1b}$ are different. In some embodiments $R^{2a}$ and $R^{2b}$ are the same as each other. In other embodiments $R^{2a}$ and $R^{2b}$ are different. In some embodiments $R^{3a}$ and $R^{3b}$ are the same as each other. In other embodiments $R^{3a}$ and $R^{3b}$ are different.

In some embodiments $R^{1a}$ and $R^{1b}$ are the same as each other and $R^{3a}$ and $R^{3b}$ are the same as each other. In some embodiments $R^{1a}$ and $R^{3a}$ are the same as each other and $R^{1b}$ and $R^{3b}$ are the same as each other. In some embodiments $R^{1a}$, $R^{1b}$, $R^{3a}$, and $R^{3b}$ are all the same. In some embodiments $R^{1a}$ and $R^{3a}$ are different and $R^{1b}$ and $R^{3b}$ are different. Preferably in such embodiments each of $R^{2a}$ and $R^{2b}$ is a hydrogen atom.

In some embodiments $R^{2a}$ and $R^{2b}$ are the same as each other and $R^{3a}$ and $R^{3b}$ are the same as each other. In some embodiments $R^{2a}$ and $R^{3a}$ are the same as each other and $R^{2b}$ and $R^{3b}$ are the same as each other. In some embodiments $R^{2a}$, $R^{2b}$, $R^{3a}$, $R^{3b}$ are all the same. In some embodiments $R^{2a}$ and $R^{3a}$ are different and $R^{2b}$ and $R^{3b}$ are different. Preferably in such embodiments each of $R^{1a}$ and $R^{1b}$ is a hydrogen atom.

In some embodiments of the metal-ligand complex of formula (I) or the ligand of formula (Q), at least one of $R^{1a}$, $R^{1b}$, $R^{3a}$, $R^{3b}$, $R^{7c}$, and $R^{7d}$ is not methyl. In some embodiments of the metal-ligand complex of formula (I) or the ligand of formula (Q) at least one of $R^{7c}$, $R^{7d}$, $R^{3a}$, and $R^{3b}$ is not methyl.

In some embodiments at least one, and in some embodiments each of $R^{1a}$, $R^{1b}$, $R^{2a}$, $R^{2b}$, $R^{3a}$, and $R^{3b}$ independently is methyl; ethyl; 1-propyl; 2-propyl; 1-butyl; 1,1-dimethylethyl; cyano; dimethylamino; methoxy; trifluoromethyl; bromine atom; fluorine atom, or chlorine atom.

More preferably $R^{1a}$, $R^{1b}$, $R^{2a}$, $R^{2b}$, $R^{3a}$, and $R^{3b}$ are defined as in any one of the Examples described later.

Certain $R^{4a}$ and $R^{4b}$ are preferred. In some embodiments each of $R^{4a}$ and $R^{4b}$ is a hydrogen atom. In some embodiments at least one and in some embodiments each of $R^{4a}$ and $R^{4b}$ independently is as defined previously for $R^{1a}$ and $R^{1b}$, respectively. When $R^{4a}$ or $R^{4b}$ independently is as defined previously for $R^{1a}$ or $R^{1b}$, respectively, or both, $R^{4a}$ and $R^{1a}$ independently may be the same or different and $R^{4b}$ and $R^{1b}$ independently may be the same or different. In some embodiments at least one, and in some embodiments each of $R^{4a}$ and $R^{4b}$ independently is methyl; ethyl; 1-propyl; 2-propyl; 1-butyl; 1,1-dimethylethyl; cyano; dimethylamino; methoxy; trifluoromethyl; bromine atom; fluorine atom, or chlorine atom.

Certain of $R^{6c}$, $R^{8c}$, $R^{6d}$, and $R^{8d}$ are preferred. In some embodiments each of $R^{6c}$, $R^{8c}$, $R^{6d}$, and $R^{8d}$ is a hydrogen atom. In some embodiments one of $R^{6c}$, $R^{8c}$, $R^{6d}$, and $R^{8d}$ independently is hydrocarbyl; heterohydrocarbyl; or halogen atom, and each of the remainder of $R^{6c}$, $R^{8c}$, $R^{6d}$, and $R^{8d}$ is a hydrogen atom. In some embodiments two or more of $R^{6c}$, $R^{8c}$, $R^{6d}$, and $R^{8d}$ independently is hydrocarbyl; heterohydrocarbyl; or halogen atom, and each of the remainder, if any, of $R^{6c}$, $R^{8c}$, $R^{6d}$, and $R^{8d}$ is a hydrogen atom. In some embodiments at least one of $R^{6c}$ and $R^{8c}$ or at least one of $R^{6d}$ and $R^{8d}$, and in some embodiments at least one of $R^{6c}$ and $R^{8c}$ and at least one of $R^{6d}$ and $R^{8d}$, is fluoro; cyano; methyl; ethyl; isopropyl; 1-butyl; or tertiary-butyl. More preferably $R^{6c}$, $R^{8c}$, $R^{6d}$, and $R^{8d}$ are defined as in any one of the Examples described later.

Certain $R^{7c}$ and $R^{7d}$ are preferred. In some embodiments at least one of $R^{7c}$ and $R^{7d}$ independently is hydrocarbyl; heterohydrocarbyl; or halogen atom and the remainder, if any, of $R^{7c}$ and $R^{7d}$ is a hydrogen atom. In some embodiments each of $R^{7c}$ and $R^{7d}$ independently is hydrocarbyl; heterohydrocarbyl; or halogen atom. Preferably each of $R^{7c}$ and $R^{7d}$ independently is hydrocarbyl or halogen atom. In some embodiments each of $R^{7c}$ and $R^{7d}$ independently is a halogen atom or alkyl, more preferably a $(C_1-C_{12})$alkyl, still more preferably a $(C_2-C_8)$alkyl, and even more preferably a $(C_4-C_8)$alkyl. In some embodiments each of $R^{7c}$ and $R^{7d}$ independently is bromo; cyano; ethyl; isopropyl; 1-butyl; tertiary-butyl; 1,1-dimethylpropan-1-yl; 1,1-dimethylbutan-1-yl; 1,1-dimethylpentan-1-yl; 1,1-dimethylhexan-1-yl; or 2,4,4-trimethylpentan-2yl, and still more preferably methyl, tertiary-butyl, or 2,4,4-trimethylpentan-2yl (i.e., $(CH_3)_3CCH_2C(CH_3)_2$—). In some embodiments $R^{7c}$ and $R^{7d}$ are the same as each other. Preferably each of $R^{7c}$ and $R^{7d}$ is 2,4,4-trimethylpentan-2yl. In some embodiments $R^{7c}$ and $R^{7d}$ are different from each other. More preferably $R^{7c}$ and $R^{7d}$ are defined as in any one of the Examples described later.

Certain $R^{5c}$ and $R^{5d}$ are preferred. In some embodiments $R^{5c}$ and $R^{5d}$ are the same as each other. In some embodiments $R^{5c}$ and $R^{5d}$ are different from each other.

In some embodiments at least one, and more preferably each of $R^{5c}$ and $R^{5d}$ independently is $(C_6-C_{40})$aryl. Preferably the $(C_6-C_{40})$aryl is a $(C_6-C_{18})$aryl and more preferably $(C_6-C_{12})$aryl. In some embodiments the $(C_6-C_{40})$aryl is a substituted phenyl and preferably a 2,4-disubstituted phenyl wherein each substituent is $R^S$, 2,5-disubstituted phenyl wherein each substituent is $R^S$; or 2,6-disubstituted phenyl wherein each substituent is $R^S$; and more preferably wherein each $R^S$ independently is phenyl, methyl, ethyl, isopropyl, or tertiary-butyl, and still more preferably 2,6-dimethylphenyl or 2,6-diisopropylphenyl. In some embodiments the $(C_6-C_{40})$aryl is a 3,5-disubstituted phenyl wherein each substituent is $R^S$, and more preferably wherein each $R^S$ independently is phenyl, methyl, ethyl isopropyl, or tertiary-butyl, and still more preferably 3,5-di(tertiary-butyl)phenyl or 3,5-diphenylphenyl. In some embodiments the $(C_6-C_{40})$aryl is a 2,4,6-trisubstituted phenyl wherein each substituent is $R^S$, and more preferably wherein each $R^S$ independently is phenyl, methyl, isopropyl, or tertiary-butyl; In some embodiments the $(C_6-C_{40})$aryl is a naphthyl or substituted naphthyl wherein each substituent is $R^S$, and more preferably wherein each $R^S$ independently is phenyl, methyl, ethyl, isopropyl, or tertiary-butyl, and still more preferably 1-naphthyl, 2-methyl-1-naphthyl, or 2-naphthyl. In some embodiments the $(C_6-C_{40})$aryl is a 1,2,3,4-tetrahydronaphthyl, and more preferably 1,2,3,4-tetrahydronaphth-5-yl or 1,2,3,4-tetrahydronaphth-6-yl. In some embodiments the $(C_6-C_{40})$aryl is an anthracenyl, and more preferably anthracen-9-yl. In some embodiments the $(C_6-C_{40})$aryl is a 1,2,3,4-tetrahydroanthracenyl, and more preferably 1,2,3,4-tetrahydroanthracen-9-yl. In some embodiments the $(C_6-C_{40})$aryl is a 1,2,3,4,5,6,7,8-octahydroanthracenyl, and more preferably 1,2,3,4,5,6,7,8-octahydroanthracen-9-yl, In some embodiments the $(C_6-C_{40})$aryl is a phenanthrenyl, and more preferably a phenanthren-9-yl. In some embodiments the $(C_6-C_{40})$aryl is a 1,2,3,4,5,6,7,8-octahydrophenanthrenyl, and more preferably 1,2,3,4,5,6,7,8-octahydrophenanthren-9-yl. As mentioned before, each of the aforementioned $(C_6-C_{40})$aryl independently is unsubstituted or substituted by one or more substituents $R^S$. In some embodiments the $(C_6-C_{40})$aryl is unsubstituted. Preferred unsubstituted $(C_6-C_{40})$aryl is unsubstituted inden-6-yl; 2,3-dihydro-1H-inden-6-yl; naphthalene-2-yl; or 1,2,3,4-tetrahydronaphthalen-6-yl; and more preferably unsubstituted naphthalen-1-yl; 1,2,3,4-tetrahydronaphthalen-5-yl; anthracen-9-yl; 1,2,3,4-tetrahydroanthracen-9-yl; or 1,2,3,4,5,6,7,8-octahydroanthracen-9-yl. As mentioned for $(C_6-C_{40})$aryl before, each of the aforementioned $(C_6-C_{40})$aryl independently is unsubstituted or substituted by one or more substituents $R^S$. In some embodiments the $(C_6-C_{40})$aryl is substituted by from 1 to 4 $R^S$, wherein $R^S$ is as described previously. Preferably there are 1 or 2 $R^S$ substituents in each substituted $(C_6-C_{40}$, and more preferably 2 $R^S$ substituents in each substituted phenyl. Preferably each $R^S$ of the substituted $(C_6-C_{40})$aryl of $R^{5c}$ and $R^{5d}$ independently is an unsubstituted $(C_3-C_{10})$hydrocarbyl, more preferably an unsubstituted $(C_4-C_8)$hydrocarbyl, still more preferably phenyl or an unsubstituted $(C_4-C_{10})$alkyl, and even more preferably an unsubstituted tertiary $(C_4-C_8)$alkyl (e.g., tertiary-butyl or tertiary-octyl (i.e., 1,1-dimethylhexyl)). Examples of preferred substituted $(C_6-C_{40})$aryl are a 2,6-disubstituted-phenyl having same substituent $R^S$ (e.g., 2,6-dimethylphenyl; 2,6-diethylphenyl; 2,6-bis(1-methylethyl)phenyl; and 2,6-diphenylphenyl); a 3,5-disubstituted-phenyl having same substituent $R^S$ (e.g., 3,5-dimethylphenyl; 3,5-bis(trifluoromethyl)phenyl; 3,5-bis(1-methylethyl)phenyl; and 3,5-bis(1,1-dimethylethyl)phenyl; and 3,5-diphenyl-phenyl); 2,4,6-trisubstituted-phenyl having same substituent $R^S$ (e.g., 2,4,6-trimethylphenyl; and 2,4,6-tris(1-methylethyl)phenyl); 1-methyl-2,3-dihydro-1H-inden-6-yl; 1,1-dimethyl-2,3-dihydro-1H-inden-6-yl; 1-methyl-1,2,3,4-tetrahydronaphthalen-5-yl; and 1,1-dimethyl-1,2,3,4-tetrahydronaphthalen-5-yl.

In some embodiments at least one, and more preferably each of $R^{5c}$ and $R^{5d}$ independently is heteroaryl. Preferably the heteroaryl has at least one nitrogen atom-containing aromatic ring. More preferably the heteroaryl is a pyridinyl, indolyl, indolinyl, quinolinyl, 1,2,3,4-tetrahydroquinolinyl, isoquinolinyl, 1,2,3,4-tetrahydroisoquinolinyl, carbazolyl, 1,2,3,4-tetrahydrocarbazolyl, or 1,2,3,4,5,6,7,8-octahydrocarbazolyl. In some embodiments the heteroaryl is carbazolyl or a substituted carbazolyl, preferably a 2,7-disubstituted carbazolyl or 3,6-disubstituted carbazolyl, and more preferably 2,7-disubstituted 9H-carbazol-9-yl or 3,6-disubstituted 9H-carbazol-9-yl, wherein each substituent is $R^S$, more preferably wherein each $R^S$ independently is phenyl, methyl, ethyl, isopropyl, or tertiary-butyl, still more preferably 3,6-di(tertiary-butyl)-carbazolyl, 3,6-di(tertiary-octyl)-carbazolyl, 3,6-diphenylcarbazolyl, or 3,6-bis(2,4,6-trimethylphenyl)-carbazolyl, and more preferably 3,6-di(tertiary-butyl)-carbazol-9-yl, 3,6-di(tertiary-octyl)-carbazol-9-yl, 3,6-diphenyl-carbazol-9-yl, or 3,6-bis(2,4,6-trimethylphenyl)-carbazol-9-yl. Examples of 2,7-disubstituted carbazolyl are the foregoing 3,6-disubstituted carbazolyl where the 3,6-substituents are moved to 2,7-positions, respectively. Tertiary-octyl is 1,1-dimethylhexyl. In some embodiments the heteroaryl is 1,2,3,4-tetrahydrocarbazolyl, preferably a 1,2,3,4-tetrahydrocarbazol-9-yl. As mentioned before for heteroaryl, each of the aforementioned heteroaryl independently is unsubstituted or substituted by one or more substituents $R^S$. Preferably each of the indolyl, indolinyl, and tetrahydro- and octahydro-containing heteroaryl is bonded via its ring nitrogen atom to the phenyl rings bearing $R^{5c}$ or $R^{5d}$ in formula (I). In some embodiments the heteroaryl is unsubstituted. Preferred unsubstituted heteroaryl is unsubstituted quinolin-4-yl, quinolin-5-yl, or quinolin-8-yl, (the quinolinyl N being at position 1); 1,2,3,4-tetrahydroquinolin-1-yl (the tetrahydroquinolinyl N being at position 1); isoquinolin-1-yl, isoquinolin-4-yl, isoquinolin-5-yl, or isoquinolin-8-yl (the isoquinolinyl N being at position 2); 1,2,3,4-tetrahydroisoquinolin-2-yl (the tetrahydroisoquinolinyl N being at position 2); 1H-indol-1-yl (the indolyl N being at position 1); 1H-indolin-1-yl (the indolinyl N being at position 1); 9H-carbazol-9-yl (the carbazolyl N being at position 9), which may also be named as a dibenzo-1H-pyrrole-1-yl; 1,2,3,4-tetrahydrocarbazolyl-9-yl (the tetrahydrocarbazolyl N being at position 9); or 1,2,3,4,5,6,7,8-octahydrocarbazolyl-9-yl (the octahydrocarbazolyl N being at position 9). In some embodiments the heteroaryl is substituted by from 1 to 4 $R^S$. Preferably there are 1 or 2 $R^S$ substituents in each substituted heteroaryl. Preferably each $R^S$ of the substituted heteroaryl of $R^{5c}$ and $R^{5d}$ independently is an unsubstituted $(C_3-C_{10})$hydrocarbyl, more preferably an unsubstituted $(C_4-C_8)$hydrocarbyl, still more preferably phenyl or an unsubstituted $(C_4-C_{10})$alkyl, and even more preferably an unsubstituted tertiary $(C_4-C_8)$ alkyl (e.g., tertiary-butyl or tertiary-octyl (i.e., 1,1-dimethylhexyl)). Preferably the substituted heteroaryl is a 2,7-disubstituted quinolin-4-yl, 2,7-disubstituted quinolin-5-yl, or 3,6-disubstituted quinolin-8-yl; 3,6-disubstituted 1,2,3,4-tetrahydroquinolin-1-yl; 4-monosubstituted isoquinolin-5-yl; 2-monosubstituted 1,2,3,4-tetrahydroisoquinolin-2-yl; 3-monosubstituted 1H-indol-1-yl; 3-monosubstituted 1H-indolin-1-yl; 2,7-disubstituted 9H-carbazol-9-yl; 3,6-disubstituted 9H-carbazol-9-yl; 3,6-disubstituted 1,2,3,4-tetrahydrocarbazolyl-9-yl; or 3,6-disubstituted 1,2,3,4,5,6,7,8-octahydrocarbazolyl-9-yl. Examples of preferred substituted heteroaryl are 4.6-bis(1,1-dimethylethyl)pyridine-2-yl; 4,6-diphenylpyridin-2-yl; 3-phenyl-1H-indol-1-yl; 3-(1,1-dimethylethyl)-1H-indol-1-yl; 3,6-diphenyl-9H-carbazol-9-yl; 3,6-bis[2',4',6'-tris(1,1-dimethylphenyl)]-9H-carbazol-9-yl; and more preferably each of $R^{5c}$ and $R^{5d}$ is 3,6-bis(1,1-dimethylethyl)-9H-carbazol-9-yl. The term "tertiary butyl" means 1,1-dimethylethyl. More preferably $R^{5C}$ and $R^{5d}$ are defined as in any one of the Examples described later.

In some embodiments the aforementioned steric interactions are those between $R^{5c}$ and $R^{1a}$ and between $R^{5d}$ and $R^{1b}$ wherein each of $R^{1a}$ and $R^{1b}$ is not a hydrogen atom and is otherwise as described in any one of the preferred embodiments. In some embodiments the aforementioned valuable steric interactions are those between $R^{5c}$ and $R^{2a}$ and between $R^{5d}$ and $R^{2b}$ wherein each of $R^{2a}$ and $R^{2b}$ is not a hydrogen atom and is otherwise as described in any one of the preferred embodiments. Preferably each of $R^{2a}$ and $R^{2b}$ independently has a sufficiently high degree of steric bulk such that volumes of $R^{2a}$ and $R^{2b}$ independently are equal to or greater than volume of ethyl; more preferably equal to or greater than volume of 2-propyl; and still more preferably equal to or greater than volume of 1,1-dimethylethyl. In some embodiments wherein each of $R^{1a}$ and $R^{1b}$ is a hydrogen atom, at least one and preferably both of $R^{2a}$ and $R^{2b}$ independently is $(C_2-C_{40})$hydrocarbyl or a chlorine atom.

In some embodiments at least one of $R^{1a}$, $R^{2a}$, and $R^{3a}$ independently is different than the respective one of $R^{1b}$, $R^{2b}$, and $R^{3b}$. In other embodiments at least one of $R^{1a}$, $R^{2a}$, $R^{3a}$, $R^{4a}$, $R^{5d}$, $R^{6d}$, $R^{7d}$, $R^{8d}$ independently is different than the respective one of $R^{1b}$, $R^{2b}$, $R^{3b}$, $R^{4b}$, $R^{5c}$, $R^{6c}$, $R^{7c}$, and $R^{8c}$. In such other embodiments, a two-dimensional representation of such a metal-ligand complex of formula (I) can be characterized as being C1-symmetric, More preferably, each of $R^{1a}$ and $R^{1b}$ are the same, each of $R^{2a}$ and $R^{2b}$ are the same, and each of $R^{3a}$ and $R^{3b}$ are the same. Still more preferably, each of $R^{1a}$, $R^{2a}$, $R^{3a}$, $R^{4a}$, $R^{5d}$, $R^{6d}$, $R^{7d}$, and $R^{8d}$ independently is the same as the respective one of $R^{1b}$, $R^{2b}$, $R^{3b}$, $R^{4b}$, $R^{5c}$, $R^{6c}$, $R^{7c}$, and $R^{8c}$. In such still more preferred embodiments, a two-dimensional representation of such a metal-ligand complex of formula (I) can be characterized as being C2-symmetric, In some embodiments the metal-ligand complex of formula (I) each Z is O, each of $R^{2a}$ and $R^{2b}$ is a hydrogen atom, and each of $R^{5c}$ and $R^{5d}$ independently is the heteroaryl. More preferred in such embodiments is a metal-ligand complex of any one of formulas (Ia) to (Ie):

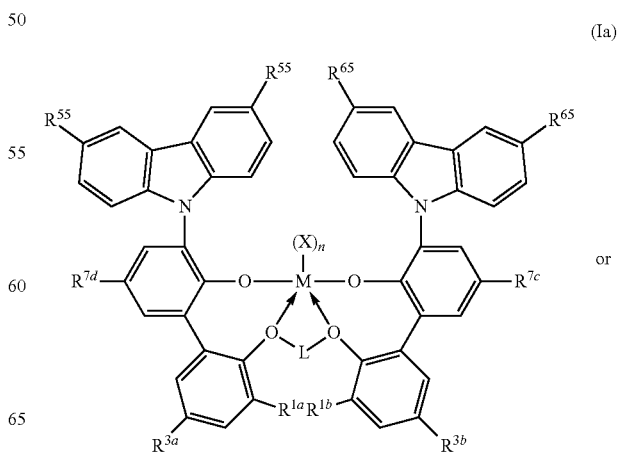

(Ia)

or (Ib)

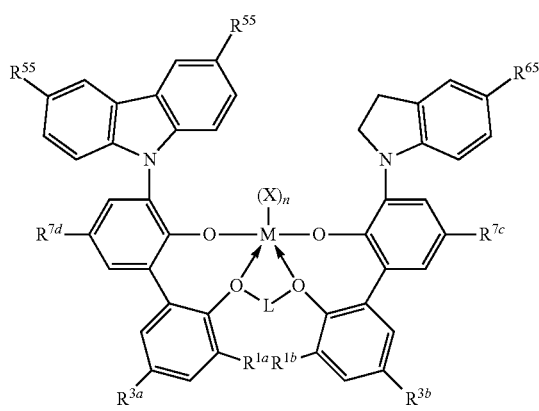

(Ic)

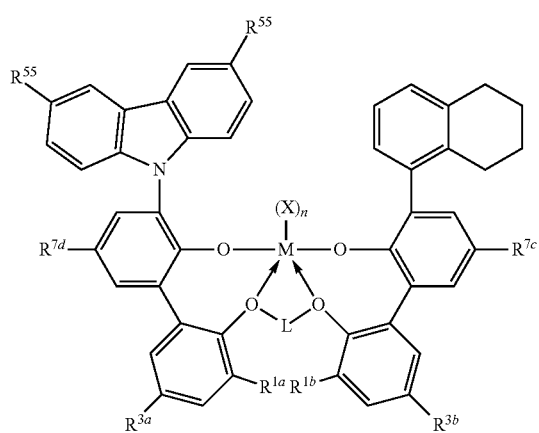

(Id)

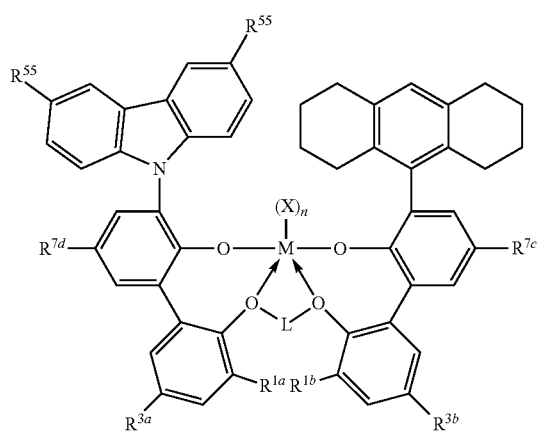

(Ie)

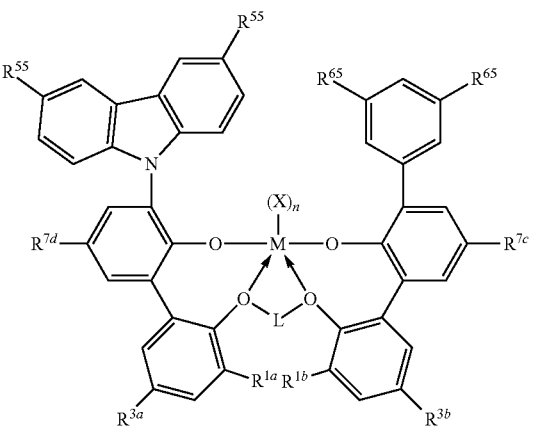

wherein M, X, $R^{1a}$, $R^{1b}$, $R^{3a}$, $R^{3b}$, $R^{7c}$, $R^{7d}$, and L are as defined previously and each $R^{55}$ and $R^{65}$ is as defined previously. Preferably each $R^{55}$ and $R^{65}$ independently is a hydrogen atom or an unsubstituted $(C_1-C_{12})$alkyl.

In some embodiments the metal-ligand complex of formula (I) each Z is O, each of $R^{1a}$, and $R^{1b}$ is a hydrogen atom, and each of $R^{5c}$ and $R^{5d}$ independently is the heteroaryl. More preferred in such embodiments is a metal-ligand complex of any one of formulas (If) to (Ij):

(If)

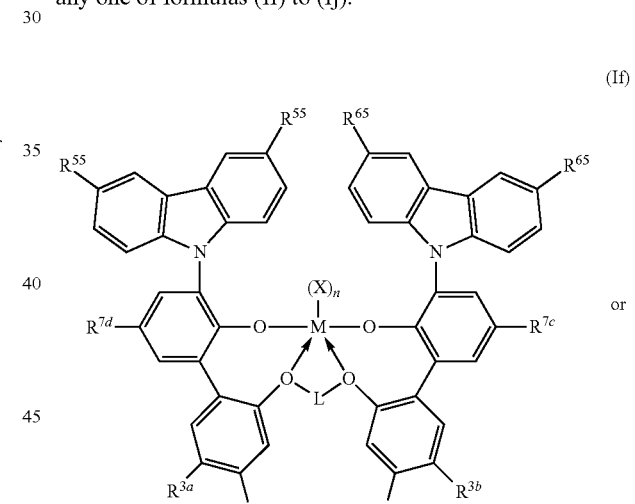

(Ig)

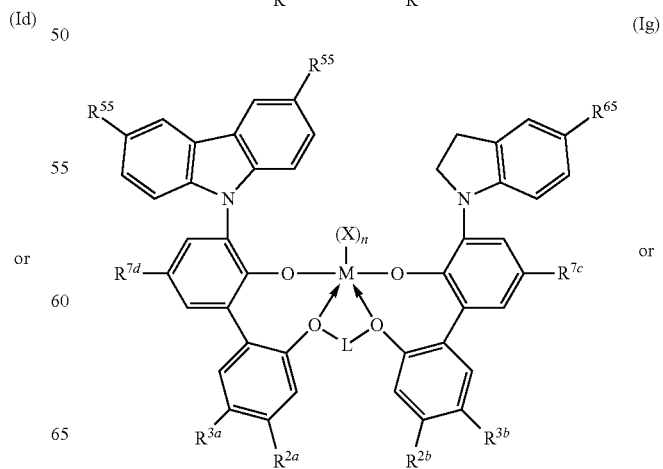

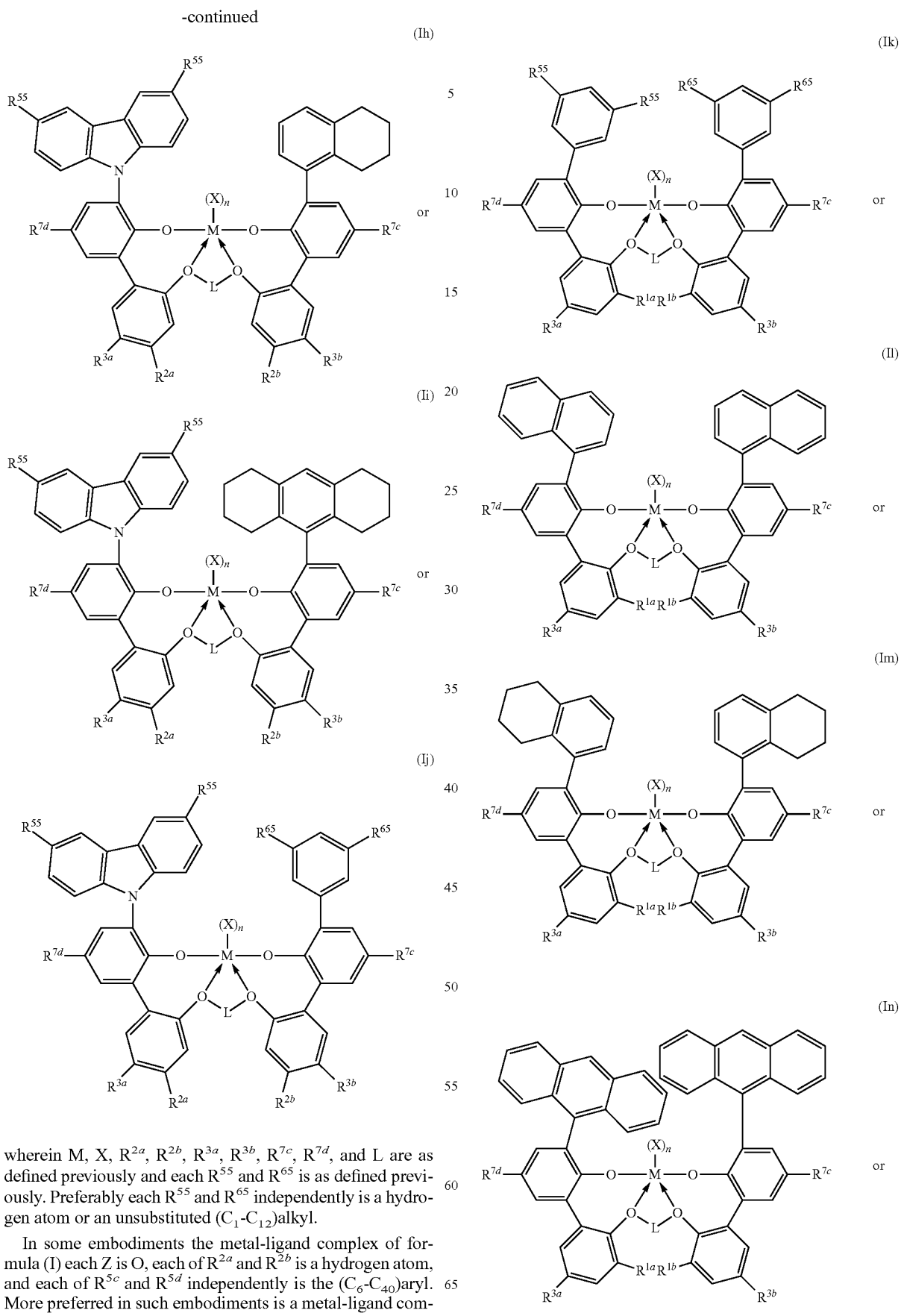

wherein M, X, $R^{2a}$, $R^{2b}$, $R^{3a}$, $R^{3b}$, $R^{7c}$, $R^{7d}$, and L are as defined previously and each $R^{55}$ and $R^{65}$ is as defined previously. Preferably each $R^{55}$ and $R^{65}$ independently is a hydrogen atom or an unsubstituted $(C_1-C_{12})$alkyl.

In some embodiments the metal-ligand complex of formula (I) each Z is O, each of $R^{2a}$ and $R^{2b}$ is a hydrogen atom, and each of $R^{5c}$ and $R^{5d}$ independently is the $(C_6-C_{40})$aryl. More preferred in such embodiments is a metal-ligand complex of any one of formulas (Ik) to (Io):

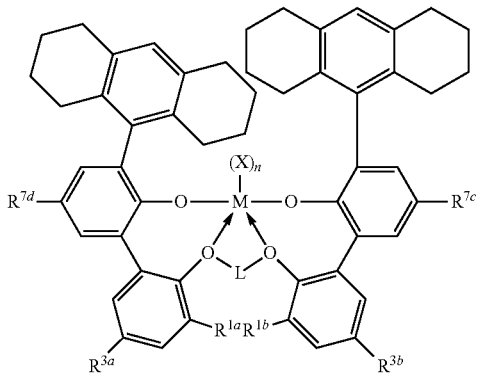
(Io)

wherein M, X, $R^{1a}$, $R^{1b}$, $R^{3a}$, $R^{3b}$, $R^{7c}$, $R^{7d}$, and L are as defined previously and each $R^{55}$ and $R^{65}$ is as defined previously. Preferably each $R^{55}$ and $R^{65}$ independently is a hydrogen atom or an unsubstituted $(C_1-C_{12})$alkyl.

In some embodiments the metal-ligand complex of formula (I) each Z is O, each of $R^{3a}$ and $R^{3b}$ is a hydrogen atom, and each of $R^{5c}$ and $R^{5d}$ independently is the heteroaryl. More preferred in such embodiments is a metal-ligand complex of any one of formulas (Ip) to (Iq):

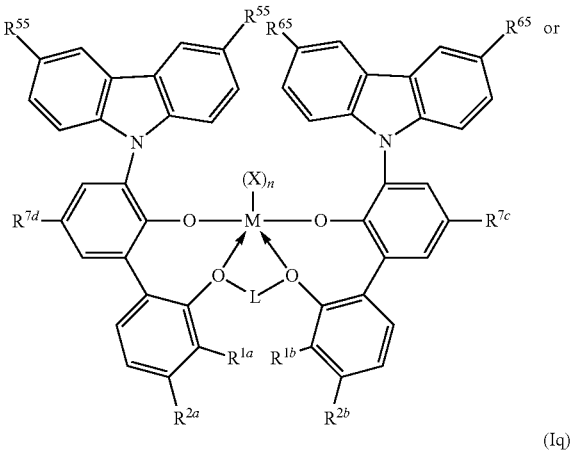
(Ip)

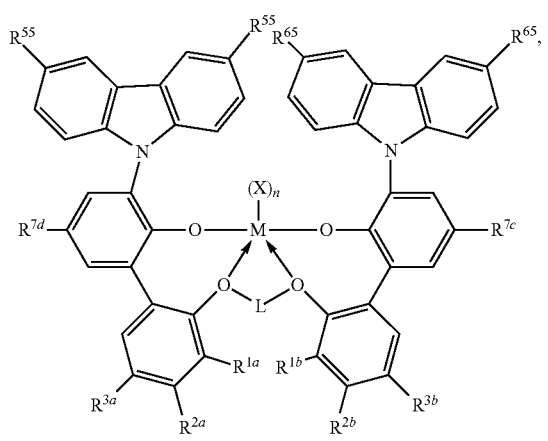
(Iq)

wherein M, X, $R^{7c}$, $R^{7d}$, and L are as defined previously and each $R^{55}$ and $R^{65}$ is as defined previously. Preferably each $R^{55}$ and $R^{65}$ independently is a hydrogen atom or an unsubstituted $(C_1-C_{12})$alkyl. The metal-ligand complex of formula (Ip) is more preferred.

As mentioned above for the metal-ligand complex of any one of formulas (Ia) to (Iq), the M, X, L, $R^{1a}$, $R^{2a}$, $R^{3a}$, $R^{1b}$, $R^{2b}$, $R^{3b}$, $R^{7c}$, and $R^{7d}$, as the case may be, are as defined for the same of formula (I) (i.e., as M, X, L, $R^{1a}$, $R^{2a}$, $R^{3a}$, $R^{1b}$, $R^{2b}$, $R^{3b}$, $R^{7c}$, and $R^{7d}$ of formula (I)). Preferably M is hafnium or zirconium, and more preferably hafnium. Preferably each X is a monodentate ligand. In some embodiments of the metal-ligand complex of any one of formulas (Ia) to (Iq), n is 2 or 3 and at least two X independently are monoanionic monodentate ligands and a third X, if present, is a neutral monodentate ligand. In some embodiments L is —CH$_2$CH$_2$—, —CH$_2$CH$_2$CH$_2$—, —CH(CH$_3$)CH$_2$CH(CH$_3$)—, —CH$_2$C(CH$_3$)$_2$CH$_2$—, —CH$_2$CH$_2$CH$_2$CH$_2$—, 1,2-bis(methylene)cyclohexane, or —CH$_2$Si(CH$_3$)$_2$CH$_2$—. In some embodiments each of $R^{1a}$, $R^{2a}$, $R^{3a}$, $R^{1b}$, $R^{2b}$, $R^{3b}$ independently is hydrogen atom, methyl; ethyl; 2-propyl; 1,1-dimethylethyl; mono-, di-, or trifluoromethyl; methoxy; ethoxy; 1-methylethoxy; mono-, di-, or trifluoromethoxy; halogen atom; cyano; nitro; dimethylamino; aziridin-1-yl; or cyclopropyl, wherein at least one of $R^{1a}$, $R^{2a}$, and $R^{3a}$ independently is not the hydrogen atom and at least one of $R^{1b}$, $R^{2b}$, and $R^{3b}$ independently is not the hydrogen atom. In some embodiments each of $R^{7c}$ and $R^{7d}$ independently is $(C_4-C_8)$ alkyl. In some embodiments of the metal-ligand complex of any one of formulas (Ia) to (Iq), $R^{1b}$, $R^{2a}$, $R^{2b}$, $R^{3a}$, and $R^{3b}$, where present, are not hydrogen and otherwise, $R^{2a}$, $R^{2b}$, $R^{3a}$, and $R^{3b}$ independently are as respectively defined for said formula.

In some embodiments the metal-ligand complex of formula (I) is the metal-ligand complex of any one of the formulas (Ia) to (Iq) except each Z that is O is replaced by a Z that is S. In some embodiments the metal-ligand complex of formula (I) is the metal-ligand complex of any one of the formulas (Ia) to (Iq) except each Z that is O is replaced by a Z that is Nhydrocarbyl. In some embodiments the metal-ligand complex of formula (I) is the metal-ligand complex of any one of the formulas (Ia) to (Iq) except each Z that is O is replaced by a Z that is Phydrocarbyl.

In some embodiments the ligand of formula (Q) corresponds to a demetalated dihydro analog of the metal-ligand complex of formulas (Ia) to (Iq) (i.e., is a ligand of formula (Qa) to (Qo), respectively, wherein M and X and n have been deleted and H has been added to each phenolate oxygen, wherein there are two phenolate oxygen atoms in formula (I), each phenolate oxygen being bonded to M via a bond depicted by a straight line "—"). In some embodiments the invention is the ligand of formula (Q). In some embodiments the invention is the Group 1 or 2 metal salt of the ligand of formula (Q). The Group 1 or 2 metal salt includes monometal salts, bimetal salts, and hemimetal salts. Examples of the monometal salt are Na(Q-H) and [CaOH](Q-H), wherein "Q-H" means a monodeprotonated ligand of formula (Q) having a formal charge of −1. Examples of the bimetal salts are Na$_2$(Q-2H) and K$_2$(Q-2H), wherein "Q-2H" means a doubly deprotonated (i.e., demetalated dihydro) ligand of formula (Q) having a formal charge of −2. Examples of the hemimetal salts are Ca(Q-H)$_2$ and Mg(Q-H)$_2$.

The Group 1 or 2 metal salt of the ligand of formula (Q) can be prepared by conventional means. For example, the Group 1 or 2 metal salt of the ligand of formula (Q) can be prepared by contacting the ligand of formula (Q) with from one to two mole equivalents of a corresponding metal base such as, for example, a metal alkoxide, metal hydroxide, metal bicarbonate, or metal carbonate, wherein the metal of the metal base is the cation of the metal of Group 1 or 2. Preferably the contacting is performed in a polar aprotic solvent (e.g., dimethylformamide, dimethylsulfoxide, acetone, or a mixture thereof), polar protic solvent (e.g., methanol, water, or a mixture thereof), or a mixture thereof. Alternatively the Group 1 or 2 metal salt can be directly prepared in situ without going through the conjugate acid that is the ligand of formula (Q). The Group 1 or 2 metal salt of the ligand of formula (Q) can be converted back to the ligand of formula (Q) (i.e., back to its conjugate acid form) by conventional means such as, for example, acidifying with an acid (e.g., acetic acid or hydrochloric acid) a solution or mixture of the Group 1 or 2 metal salt of the ligand of formula (Q) in a polar solvent.

Syntheses of some of the ligands (e.g., the ligand of formula (Q)) employed to prepare the metal-ligand complexes of formula (I) may utilize starting materials, intermediates, or reaction products that contain more than one reactive functional group. During chemical reactions, a reactive functional group may be protected from unwanted side reactions by a protecting group that renders the reactive functional group substantially inert to the reaction conditions employed. A protecting group is selectively introduced onto a starting material or intermediate prior to carrying out the reaction step for which the protecting group is needed. Once the protecting group is no longer needed, the protecting group can be removed. It is well within the ordinary skill in the art to introduce protecting groups during a synthesis and then later remove them. Procedures for introducing and removing protecting groups are known, for example, in Protective Groups in Organic Synthesis, 3rd ed., Greene T. W. and Wuts P. G., Wiley-Interscience, New York, 1999. The following moieties are examples of protecting groups that may be utilized to protect amino, hydroxy), or other functional groups: carboxylic acyl groups such as, for example, formyl, acetyl, and trifluoroacetyl; alkoxycarbonyl groups such as, for example, ethoxycarbonyl, tert-butoxycarbonyl (BOC), $\beta,\beta,\beta$-trichloroethoxycarbonyl (TCEC), and $\beta$-iodoethoxycarbonyl; aralkyloxycarbonyl groups such as, for example, benzyloxycarbonyl (CBZ), para-methoxybenzyloxycarbonyl, and 9-fluorenylmethyloxycarbonyl (FMOC); trialkylsilyl groups such as, for example, trimethylsilyl (TMS) and tert-butyldimethylsilyl (TBDMS); and other groups such as, for example, triphenylmethyl (trityl), tetrahydropyranyl, vinyloxycarbonyl, ortho-nitrophenylsulfenyl, diphenylphosphinyl, para-toluenesulfonyl (Ts), mesyl, trifluoromethanesulfonyl, methoxymethyl (MOM), and benzyl. Examples of procedures for removing protecting groups include hydrogenolysis of CBZ groups using, for example, hydrogen gas at about 3.4 atmospheres in the presence of a hydrogenation catalyst such as 10% palladium on carbon, acidolysis of BOC or MOM groups using, for example, hydrogen chloride in dichloromethane or trifluoroacetic acid (TFA) in dichloromethane, reaction of silyl groups with fluoride ions, and reductive cleavage of TCEC groups with zinc metal.

The invention contemplates preparing the metal-ligand complex of formula (I) and ligands of formula (Q) by any suitable method. The method of preparation is not critical. Preferably the method employs a convergent synthesis approach involving coupling together of two primary intermediates. Preferred illustrative procedures are described below and shown in FIGS. 1 to 4.

Figure 1:
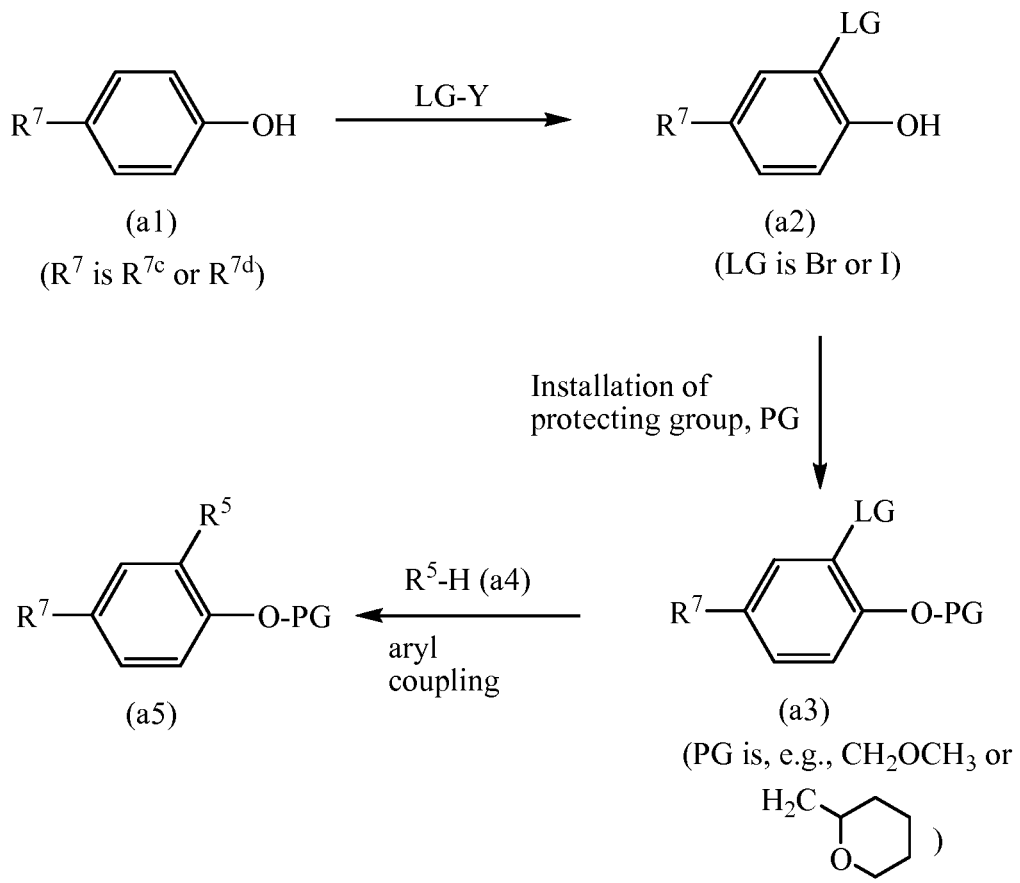
FIG. 1 shows an illustrative procedure of Scheme 1 for preparing a first primary intermediate useful in a convergent synthesis of the ligand of formula (Q).

An illustrative procedure for preparing a first primary intermediate of formula useful in the convergent synthesis is shown in Scheme 1 in FIG. 1. In Scheme 1, the first primary intermediate is of formula (a5). The preparation of the first primary intermediate of formula (a5) starts with an electrophilic aromatic substitution reaction of phenol (a1) with a source of a leaving group LG, wherein LG is, for example, Br or I, to give functionalized phenol (a2). Depending on particular $R^4$ employed in Scheme 1, phenol (a1) is available from commercial suppliers or can be readily prepared by a person of ordinary skill in the art. The source of the leaving group LG-Y can be, for example, $Br_2$, N-bromosuccinimide (NBS), or $I_2$. If desired the $Br_2$ and $I_2$ can be prepared in situ such as by a procedure described later in certain Preparations. The oxygen of functionalized phenol (a2) can then be protected with a hydroxyl protecting group, PG, such as, for example, a methoxymethyl or tetrahydropyran-2-ylmethyl so as to form protected phenol (a3), which also has the leaving group LG. Protected phenol (a3) can be coupled with a source of $R^5$ (e.g., source of the hydrocarbyl or heterohydrocarbyl) such as, for example, $R^5$—H (a4) via an aryl coupling reaction so as to prepare first primary intermediate (a5). Such aryl coupling reactions are known for a variety of types of source of $R^5$ and include copper-mediated nitrogen arylation reactions where the H in $R^5$—H (a4) is bonded to a nitrogen atom of $R^5$, especially a nitrogen atom of a heteroaryl group; and palladium-mediated carbon arylation reactions where the H in $R^5$—H (a4) is bonded to an aromatic, alkenyl, or alkynyl carbon atom of $R^5$. The reactions described in Scheme 1 preferably are carried out under a substantially inert gas atmosphere in an anhydrous aprotic solvent such as, for example, diethyl ether, toluene, xylenes, tetrahydrofuran, diethylene glycol dimethyl ether, or a combination thereof and at a temperature in a range of from about $-78°$ C. to about $200°$ C. Preferably, the reactions are carried out at atmospheric pressure.

Figure 2:
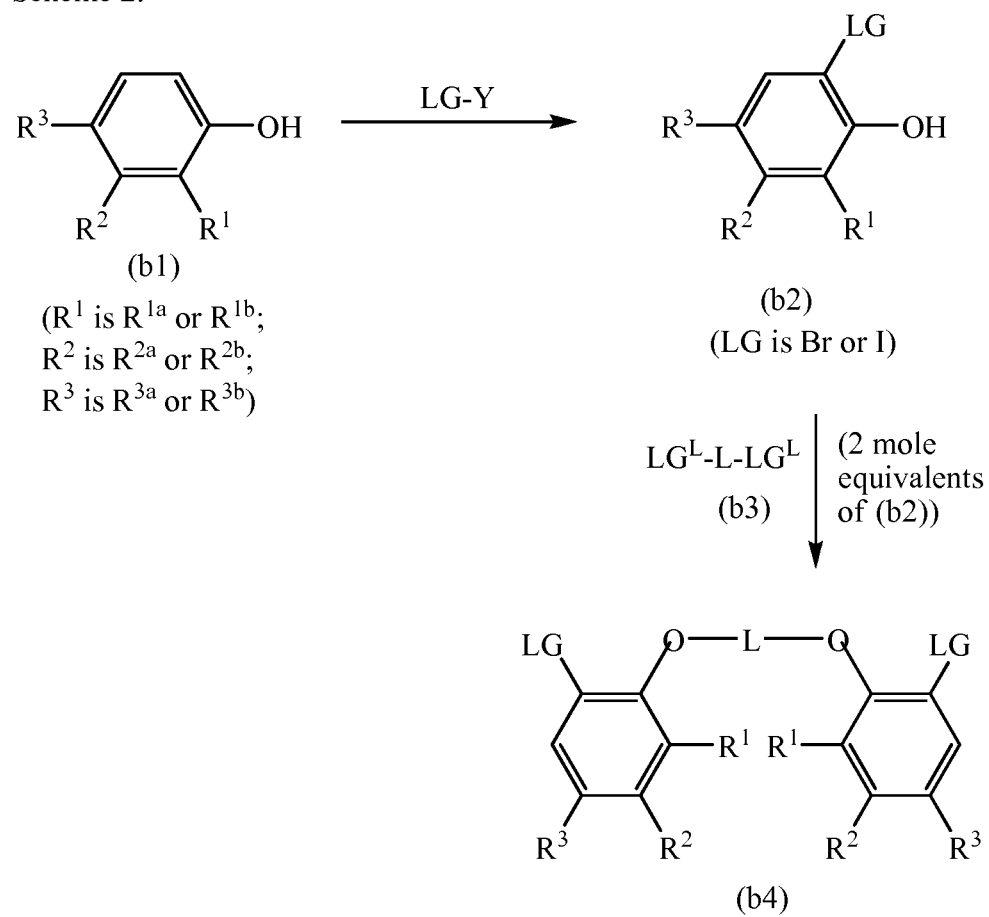
FIG. 2 shows an illustrative procedure of Scheme 2 for preparing a second primary intermediate useful in the convergent synthesis of the ligand of formula (Q).

An illustrative procedure for preparing a second primary intermediate useful in the convergent synthesis is shown in Scheme 2 in FIG. 2. In Scheme 2, the second primary intermediate is of formula (b4). The preparation of the second primary intermediate of formula (b4) starts with an electrophilic aromatic substitution reaction of phenol (b1) with a source of a leaving group LG, wherein LG is, for example, Br or I, to give functionalized phenol (b2). The source of the leaving group LG-Y can be the same as described previously for Scheme 1. Depending on particular $R^1$, $R^2$, and $R^3$ employed in Scheme 2, phenol (b1) is available from commercial suppliers or can be readily prepared by a person of ordinary skill in the art. Two mole equivalents (mole equiv.), more or less, of functionalized phenol (b2) can then be reacted with a source of linker L, wherein the source is $LG^L$-L-$LG^L$ (b3), wherein L is as defined for formula (I), to give second primary intermediate (b4). $LG^L$ are leaving groups suitable for be displaced in a nucleophilic substitution reaction by a phenol or phenolate anion. Examples of suitable $LG^L$ are bromide, iodide, trifluoromethanesulfonate, tosylate, and trifluoroacetate. The reactions described in Scheme 2 preferably are carried out under a substantially inert gas atmosphere in an anhydrous aprotic solvent such as, for example, diethyl ether, toluene, xylenes, tetrahydrofuran, diethylene glycol dimethyl ether, or a combination thereof and at a temperature in a range of from about $-78°$ C. to about $200°$ C. Preparation of second primary intermediate (b4) can also be carried out in polar organic solvents such as, for example, acetone, ethyl acetate, acetonitrile, ethanol, a mixture thereof, and water-containing mixtures thereof. Preferably, the reactions are carried out at atmospheric pressure.

Figure 3:
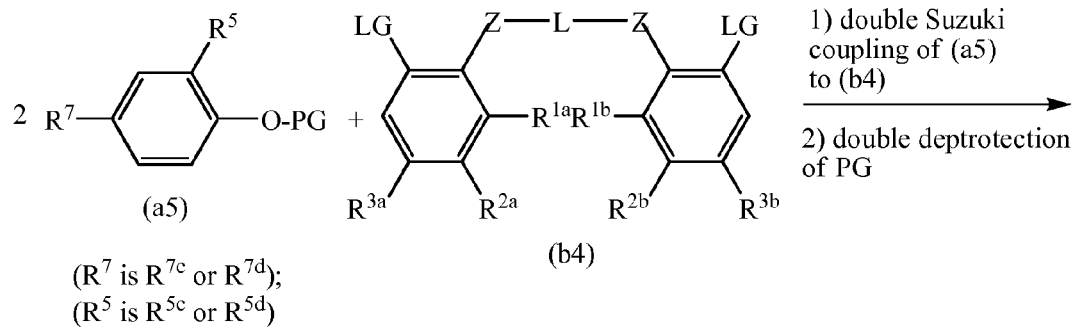
FIG. 3 shows an illustrative procedure of Scheme 3 for preparing the ligand of formula (Q) from the first and second primary intermediates.
Figure 3:
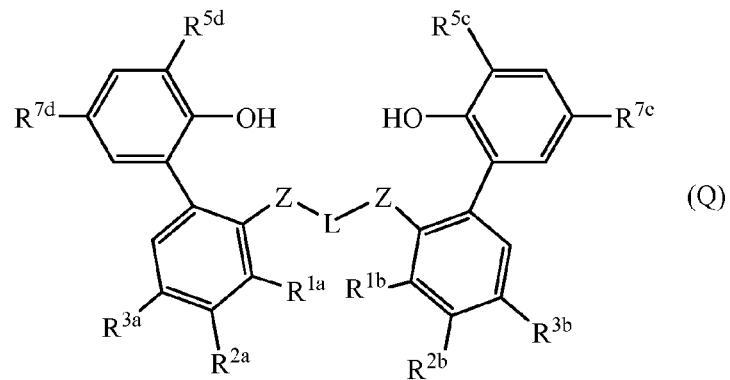

An illustrative procedure for preparing the ligand of formula (Q) from the first and second primary intermediates is shown in Scheme 3 in FIG. 3. In Scheme 3, the preparation of the ligand of formula (Q) starts with a double Suzuki coupling of first primary intermediate (a5) (prepared as shown in Scheme 1) with second primary intermediate (b4) (prepared as shown in Scheme 2) to give a doubly PG-protected analog of ligand of formula (Q) (not shown), followed by double deprotection of the doubly PG-protected analog of ligand of formula (Q) that removes both protecting groups PG therefrom to give the ligand of formula (Q). The reactions described in Scheme 3 preferably are carried out under a substantially inert gas atmosphere in an anhydrous aprotic solvent such as, for example, diethyl ether, toluene, xylenes, tetrahydrofuran, diethylene glycol dimethyl ether, or a combination thereof and at a temperature in a range of from about −78° C. to about 200° C. The double-deprotection reaction can also be carried out in polar organic solvents such as, for example, acetic acid, acetone, ethyl acetate, acetonitrile, ethanol, a mixture thereof, and water-containing mixtures thereof and preferably further employs a deprotecting agent such as, for example, an acid (e.g., HCl in ethanol or trifluoroacetic acid in methylene chloride), a hydrogenolysis reaction (e.g., when PG is, for example, benzyl or CBZ) employing hydrogen gas and a palladium catalyst. Preferably, the reactions are carried out at atmospheric pressure.

An illustrative procedure for preparing the metal-ligand complex of formula (I) from the ligand of formula (Q) is shown in Scheme 4 in FIG. 4. In Scheme 4, the preparation of the metal-ligand complex of formula (I) involves reacting the ligand of formula (Q) (prepared as shown in Scheme 3) with a source or sources of M and X as shown, for example, in Options A to D. In option A, the compound of formula (Q) is doubly deprotonated with a non-nucleophilic base to give bisphenolate in situ (not shown), which is then allowed to react with a metal halide such as $M(Cl)_4$, wherein M is Zr, Hf, or Ti, followed by reaction of the resulting metal-ligand complex with a organometallic compound such as, for example, an organolithium (X—Li) or Grignard reagent (X—MgBr) (or organosodium (X—Na) or organopotassium (X—K)), wherein X is as defined above to give the compound of formula (I). Alternatively in option B, the compound of formula (Q) reacts with a metal-amido compound $M(NR^K R^L)_4$ wherein $R^K$ and $R^L$ are as defined previously for formula (I) to give an intermediate in situ (not shown), which then reacts with the organometallic compound X—Li or X—MgBr (e.g., organolithium or Grignard reagent) to give the compound of formula (I). In yet another option C, the compound of formula (Q) reacts with an organometallic compound $M(X)_4$ to give the compound of formula (I). In yet another alternative option D, the compound of formula (Q) reacts with the metal halide such as $M(Cl)_4$, followed by reaction of the resulting metal-ligand complex with 4 mole equivalents of an organometallic compound X—Li or X—MgBr such as, for example, methyl lithium or methyl magnesium bromide to give the compound of formula (I). The reactions described in Scheme 4 preferably are carried out under a substantially inert gas atmosphere in an anhydrous aprotic solvent such as, for example, toluene, xylenes, tetrahydrofuran, diethylene glycol dimethyl ether, or a combination thereof and at a temperature in a range of from about −78° C. to about 200° C. Preferably, the reactions are carried out at atmospheric pressure.

The invention contemplates procedures for preparing the metal-ligand complex of formula (I) and ligands of formula (Q) other than the previously described procedures illustrated in FIGS. 1 to 4. Such other procedures would be readily known to one of ordinary skill in the art in view of the teachings described herein. Examples of such other procedures are those readily adapted from procedures in U.S. Pat. No. 7,060,848 B2.

Turning to the invention catalyst, as mentioned previously, the invention process employs catalytic amounts of the invention catalyst. When more than one catalyst is employed in the invention process, each catalyst independently will be employed in a catalytic amount. The term "catalytic amount" means less than a stoichiometric quantity based on number of moles of a product-limiting stoichiometric reactant employed in the invention process. The catalytic amount is also equal to or greater than a minimum amount of the metal-ligand complex of formula (I) that is necessary for at least some product of the catalyzed reaction to be formed and detected (e.g., by mass spectrometry). The minimum catalytic amount preferably is 0.0001 mole percent of the number of moles of a product-limiting stoichiometric reactant. In the invention process the product-limiting stoichiometric reactant for the invention catalyst typically will be ethylene. Preferably, the catalytic amount of the metal-ligand complex of formula (I) used to prepare the invention catalyst is from 0.001 mol % to 50 mol % of the moles of ethylene or $(C_3-C_{40})$alpha-olefin, whichever is lower. More preferably, the catalytic amount of the metal-ligand complex of formula (I) is at least 0.01 mol %, still more preferably at least 0.05 mol %, and even more preferably at least 0.1 mol %. Also more preferably, the catalytic amount of the metal-ligand complex of formula (I) is 40 mol % or less, and still more preferably 35 mol % or less.

A particularly preferred invention catalyst is one that can achieve a high selectivity for polymerizing ethylene in the presence of the $(C_3-C_{40})$alpha-olefin in the invention process, wherein the high selectivity is characterized by the reactivity ratio $r_1$ described previously. More preferably for the invention process, the reactivity ratio $r_1$ is greater than 30, still more preferably greater than 39 or 40, still more preferably greater than 50, even more preferably greater than 60, even more preferably greater than 80, and yet more preferably greater than 90. When the reactivity ratio $r_1$ for the invention process approaches infinity, incorporation of the alpha-olefin into (or onto) the rich polyethylene produced thereby approaches 0 mole percent (mol %). In some embodiments, the rich polyethylene or rich polyethylene segment of the poly(ethylene alpha-olefin) copolymer is characterized as having 6 mol % or less, more preferably less than 3 mol %, and still more preferably 2.3 mol % or less of the residual of the alpha-olefin covalently incorporated therein. The mol % is characterized as having at least 0.01 mol %, in other embodiments at least 0.1 mol %, and in still other embodiments at least 1.0 mol % of the residual of the $(C_3-C_{40})$ alpha-olefin covalently incorporated therein. Said mol % are preferably determined by nuclear magnetic spectroscopy (NMR) spectroscopy as described later, but in some embodiments may alternatively be determined by the FT-IR spectroscopy as described later. Preferably, the residuals of the alpha-olefin and ethylene are approximately randomly distributed in the soft segment of the poly(ethylene alpha-olefin) block copolymer.

Preferably the invention catalyst is characterized as having a minimum catalyst efficiency or higher. The catalyst efficiency is calculated by dividing the number of grams of rich polyethylene, or poly(ethylene alpha-olefin) copolymer, prepared by the number of grams of metal(M) in ingredient (a) (i.e., M in metal-ligand complex of formula (I)) employed (i.e., catalyst efficiency=g PE prepared/g M in metal-ligand complex of formula (I) employed). Preferably when the catalyst efficiency is determined employing ethylene and 1-octene as described later at a polymerization reaction temperature of 170° C. and 0.10 micromole (μmol) of the metal-ligand complex of formula (I), 0.12 μmol of the activating co-catalyst, bis(octadecyl)methylammonium tetrakis(pentafluorophenyl)borate ($[HNMe(C_{18}H_{37})_2][B(C_6F_5)_4]$, abbreviated as BOMATPB, or, still more preferably a mixture comprising BOMATPB, wherein the mixture is designated herein as "BOMATPB$^{mix}$" and is derived from bis(hydrogenated-tallowalkyl)methylamine, wherein the mixture is prepared according to a procedure of Example 2 of U.S. Pat. No. 6,121,185 (e.g., Preparation D)), and 1.0 μmol of another activating co-catalyst that is a triisobutylaluminum-modified methylalumoxane-3A (MMAO-3A), hydrogen gas, and a mixed alkanes solvent, according to the experimental procedure described later. The bis(hydrogenated-tallowalkyl)methylamine is obtained from Akzo Nobel under the trade name ARMEEN M2HT. BOMATPB$^{mix}$ is preferred over BOMATPB for practical reasons as it is cheaper to manufacture than is BOMATPB. Number of moles of BOMATPB$^{mix}$ is calculated by assuming the BOMATPB$^{mix}$ is 100% BOMATPB. The BOMATPB can be prepared as described in Example 1 of U.S. Pat. No. 6,121,185 (e.g., Preparation A). Using such a process preferably the catalyst efficiency is greater than 740,000, more preferably greater than 960,000, still more preferably greater than 1,480,000, and even more preferably greater than 1,900,000. Preferably when the catalyst efficiency is determined employing ethylene and 1-octene as described later at a polymerization reaction temperature of 170° C. and 0.08 μmol of the metal-ligand complex of formula (I), 0.096 μmol of the BOMATPB or BOMATPB$^{mix}$, and 0.8 μmol of MMAO-3A, the catalyst efficiency is greater than 1,1,480,000. Preferably when the catalyst efficiency is determined employing ethylene and 1-octene as described later at a polymerization reaction temperature of 170° C. and 0.075 μmol of the metal-ligand complex of formula (I), 0.09 μmol of the BOMATPB or BOMATPB$^{mix}$, and 0.75 μmol of MMAO-3A, the catalyst efficiency is greater than 970,000, more preferably greater than 1,060,000, and still more preferably greater than 1,090,000. Preferably when the catalyst efficiency is determined employing ethylene and 1-octene as described later at a polymerization reaction temperature of 170° C. and 0.05 μmol of the metal-ligand complex of formula (I), 0.06 μmol of the BOMATPB or BOMATPB$^{mix}$, and 0.5 μmol of MMAO-3A, the catalyst efficiency is greater than 920,000, more preferably greater than 940,000, and still more preferably greater than 2,900,000. More preferably the catalyst efficiency is as defined as in any one of the Examples described later.

In some embodiments, the invention catalyst, invention catalyst system or composition, or both further comprises one or more solvents (e.g., as in a solvated form of the invention catalyst), diluents (described later), or a combination thereof, as described herein. In other embodiments, the invention catalyst still further comprises a dispersant, e.g., an elastomer, preferably dissolved in the diluent. In these embodiments, the invention catalyst preferably comprises a homogeneous catalyst.

In some embodiments, the each olefin polymerization catalyst is rendered catalytically active by contacting it to, or reacting it with, a cocatalyst (sometimes referred to as an activating cocatalyst or co-catalyst) or by using an activating technique such as those that are known in the art for use with metal (e.g., Group 4) olefin polymerization reactions. Where there are two or more such catalysts, they can be activated by the same or different cocatalyst or same or different activating technique. Many cocatalysts and activating techniques have been previously taught with respect to different metal-ligand complexes in the following USPNs: U.S. Pat. No. 5,064,802; U.S. Pat. No. 5,153,157; U.S. Pat. No. 5,296,433; U.S. Pat. No. 5,321,106; U.S. Pat. No. 5,350,723; U.S. Pat. No. 5,425,872; U.S. Pat. No. 5,625,087; U.S. Pat. No. 5,721,185; U.S. Pat. No. 5,783,512; U.S. Pat. No. 5,883,204; U.S. Pat. No. 5,919,983; U.S. Pat. No. 6,696,379; and U.S. Pat. No. 7,163,907. Preferred cocatalysts (activating co-catalysts) for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis (explained in more detail hereinafter). Combinations of one or more of the foregoing cocatalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Preferably the alkyl of the foregoing alkyl-aluminums is from 1 to 10 carbon atoms. Triethylaluminum is more preferred. Aluminoxanes and their preparations are known at, for example, U.S. Pat. No. 6,103,657. Examples of preferred polymeric or oligomeric alumoxanes are methylalumoxane, triisobutylaluminum-modified methylalumoxane, and isobutylalumoxane. Other preferred cocatalysts are tri(($C_6$-$C_{18}$)aryl)boron compounds and halogenated (including perhalogenated) derivatives thereof, (e.g., tris(pentafluorophenyl)borane, trityl tetrafluoroborate, or, more preferably the BOMATPB or BOMATPB$^{mix}$)). In some embodiments at least two of the cocatalysts are used in combination with each other.

The ratio of total number of moles of one or more metal-ligand complexes of formula (I) to total number of moles of one or more of the activating co-catalysts is from 1:10,000 to 100:1. Preferably, the ratio is at least 1:5000, more preferably at least 1:1000; and 10:1 or less, more preferably 1:1 or less. When an alumoxane alone is used as the activating co-catalyst, preferably the number of moles of the alumoxane that are employed is at least 100 times the number of moles of the metal-ligand complex of formula (I). When tris(pentafluorophenyl)borane alone is used as the activating co-catalyst, preferably the number of moles of the tris(pentafluorophenyl) borane that are employed to the total number of moles of one or more metal-ligand complexes of formula (I) form 0.5:1 to 10:1, more preferably from 1:1 to 6:1, still more preferably from 1:1 to 5:1. The remaining activating co-catalysts are generally employed in approximately mole quantities equal to the total mole quantities of one or more metal-ligand complexes of formula (I).

As mentioned before, in some embodiments the invention catalyst further is employed in the invention process with the molecular weight control agent. In these molecular weight control embodiments of the invention process the molecular weight control agent is an ingredient (e) and the process gives the molecular weight-controlled rich polyethylene. Examples of molecular weight control agents are trialkyl aluminum compounds or other chain shuttling agents, or, preferably hydrogen ($H_2$).

As mentioned before, in some embodiments the invention catalyst is employed with the combination of the chain shuttling agent and the promiscuous olefin polymerization catalyst. In these chain shuttling embodiments of the invention process the chain shuttling agent (CSA) is an ingredient (e) and the promiscuous olefin polymerization catalyst is an ingredient (f). If desired, in some embodiments the molecular weight control agent can also be employed as another ingredient (e). The chain shuttling embodiments of the invention process give a poly(ethylene alpha-olefin) block copolymer. The invention catalyst, where it is employed in the chain shuttling embodiments of the invention process, gives at least one polyethylene hard segment of the poly(ethylene alpha-olefin) block copolymer in the presence of the alpha-olefin and the promiscuous olefin polymerization catalyst gives at least one soft segment of the poly(ethylene alpha-olefin) block copolymer, the soft segment comprising residuals of ethylene and the alpha-olefin. The contacting step comprises a continuous polymerization process that is performed under olefin polymerizing conditions and prepares a poly(ethylene alpha-olefin) block copolymer in one polymerization reactor, the poly(ethylene alpha-olefin) block copolymer comprising a segment rich in polyethylene (a hard segment) characterizable by a high melting temperature ($T_m > 100$ degrees Celsius) and a segment rich in residuals from the alpha-olefin and ethylene (a soft segment). Preferably the alpha-olefin employed in the chain shuttling embodiments of the invention process is a ($C_3$-$C_{40}$)alpha-olefin.

Chain shuttling agents are known. As used herein, the term "chain shuttling agent" means a molecule characterizable, without limitation, as functioning in the chain shuttling embodiments of the invention process in such a way that polymer chains are transferred between two distinct catalysts with different monomer selectivities in a single polymerization reactor. That is, the chain shuttling agent (CSA) is a molecule characterizable, without limitation, as functioning in such a way that during the continuous process polymer chains are transferred between the catalyst comprising a mixture or reaction product of ingredients (a) and (b) and the promiscuous olefin polymerization catalyst. Typically, chain shuttling agents comprise a first metal that is Al, B, or Ga, the first metal being in a formal oxidation state of +3; or a second metal that is Zn or Mg, the second metal being in a formal oxidation state of +2. Preferred chain shuttling agents are ($C_1$-$C_{12}$)hydrocarbyl substituted gallium or zinc compounds (e.g., diethyl zinc) as described in US 2008/0269412 A1. Other suitable chain shuttling agents are described in US 2009/0186985 A1; U.S. Pat. No. 7,355,089 B2 and each of its US patent family members; US 2008/0262175 A1; US 2008/0269412 A1; U.S. Pat. No. 7,858,707 B2; and US 2008/0275189 A1.

In some embodiments, when preparing the poly(ethylene alpha-olefin) block copolymer according to the immediately aforementioned embodiments of the invention process, the process employs a catalyst system comprising a mixture or reaction product of: (A) a first olefin polymerization catalyst, the first olefin polymerization catalyst being characterized as having a high comonomer incorporation index (described later, e.g., a comonomer incorporation index of 15 mole percent of comonomer or higher); (B) a second olefin polymerization catalyst, the second olefin polymerization catalyst being characterized as having a comonomer incorporation index that is less than 90 percent of the comonomer incorporation index of the first olefin polymerization catalyst; and (C) a chain shuttling agent; wherein the second olefin polymerization catalyst comprises the invention catalyst as described in the first embodiment.

The "first olefin polymerization catalyst" is interchangeably referred to herein as "Catalyst (A)." In some embodiments, the first olefin polymerization catalyst (Catalyst (A)) means the aforementioned "promiscuous olefin polymerization catalyst." The "second olefin polymerization catalyst" is interchangeably referred to herein as "Catalyst (B)." The first and second olefin polymerization catalysts (i.e., Catalyst (A)_and Catalyst (B)) have different ethylene and ($C_3$-$C_{40}$) alpha-olefin selectivities.

In some embodiments more than one Catalysts (B), more than one Catalysts (A), or both independently can be employed in the invention process, including the chain shuttling embodiments of the invention process. More preferably, the invention catalyst that comprises a mixture or reaction product of the ingredients (a) and (b) as described in the first embodiment is a Catalyst (B), but not Catalyst (A). Preferably, the comonomer incorporation index of Catalyst (B) is less than 50 percent and more preferably less than 5 percent of the comonomer incorporation index of Catalyst (A). Preferably, the comonomer incorporation index for Catalyst (A) is greater than 20 mol %, more preferably greater than 30 mol %, and still more preferably greater than 40 mol % incorporation of comonomer.

The invention catalyst is employed in the invention process to selectively polymerize ethylene. Other catalysts (e.g., the promiscuous olefin polymerization catalyst) may also be employed to polymerize at least one other polymerizable olefin. Promiscuous olefin polymerization catalysts are known. The promiscuous olefin polymerization catalyst (ingredient (f)) is a catalyst useful for copolymerizing ethylene and the ($C_3$-$C_{40}$)alpha-olefin and is characterizable as having a reactivity ratio $r_1$ of less than 20 ($r_1 < 20$), and preferably $r_1 < 14$ wherein reactivity ratio $r_1$ is as defined previously.

Preferably the Catalyst (A) of the catalyst system and the promiscuous olefin polymerization catalyst independently is a non-invention Catalyst (A) described in US 2004/0220050 A1; US 2006/0199930 A1; US 2007/0167578 A1; US 2008/0275189 A1; US 2008/0311812 A1; U.S. Pat. No. 7,355,089 B2; or WO 2009/012215 A2. More preferred are the catalysts described in US 2007/0167578 A1, paragraphs numbered [0138] to [0476]. Also in some of such embodiments, the catalyst system further comprises a non-invention Catalyst (B) (i.e., a Catalyst (B) that is other than the invention catalyst that comprises a mixture or reaction product of the ingredients (a) and (b), wherein ingredients (a) and (b) are as described previously for the first embodiment), the non-invention Catalyst (B) being a Catalyst (B) described in US 2004/0220050 A1; US 2006/0199930 A1; US 2007/0167578 A1; US 2008/0275189 A1; US 2008/0311812 A1; U.S. Pat. No. 7,355,089 B2; or WO 2009/012215 A2.

Representative non-invention Catalysts (A) and (B) is Catalyst (A1) is [N-(2,6-di(1-methylethyl)phenyl)amido)(2-isopropylphenyl)(α-naphthalen-2-diyl(6-pyridin-2-diyl) methane)]hafnium dimethyl, prepared according Example 1 of US 2004/0220050 A1, and having the structure:

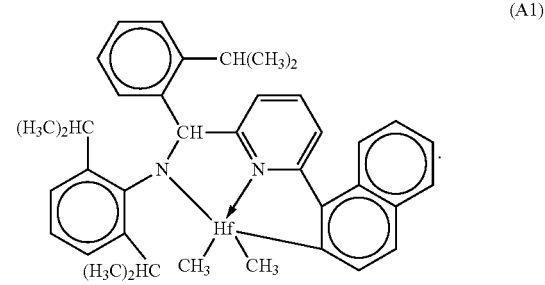

(A1)

In some embodiments, the amount of the ($C_3$-$C_{40}$)alpha-olefin comonomer incorporated into a polyolefin such as the rich polyethylene or a segment of a polyolefin copolymer such as the rich polyethylene segment of the of the poly (ethylene alpha-olefin) copolymer (e.g., the hard and soft segments of the poly(ethylene alpha-olefin) block copolymer) is characterized by the aforementioned comonomer incorporation index. As used herein, the term, "comonomer incorporation index", refers to the mole percent of residuals of comonomer incorporated into an ethylene/comonomer copolymer, or ethylene-derived hard segment thereof, prepared under representative olefin polymerization conditions (described later herein), ideally under steady-state, continuous solution polymerization conditions in a hydrocarbon diluent at 100° C., 4.5 megapascals (MPa) ethylene pressure (reactor pressure), greater than 92 percent (more preferably greater than 95 percent) ethylene conversion, and greater than 0.01 percent comonomer conversion. The selection of metal-ligand complexes or catalyst compositions having the greatest difference in comonomer incorporation indices results in copolymers from two or more monomers having the largest difference in block or segment properties, such as density.

Monomer and comonomer content of the polyolefins prepared by the invention process may be measured using any suitable technique such as, for example, infrared (IR) spectroscopy, especially the aforementioned FT-IR spectroscopy, and nuclear magnetic resonance (NMR) spectroscopy, with techniques based on NMR spectroscopy being preferred and carbon-13 NMR spectroscopy being more preferred. Using carbon-13 NMR spectroscopy, prepare an analysis sample from a polymer sample of the high density polyethylene or poly(ethylene alpha-olefin) block copolymer by adding approximately 3 g of a 50/50 mixture of tetrachloroethane-$d^2$/orthodichlorobenzene to 0.4 g of the polymer sample in a 10 millimeter (mm) NMR tube. Dissolve and homogenize the polymer sample by heating the tube and its contents to 150° C. Collect carbon-13 NMR spectroscopy data using a JEOL Eclipse™ 400 MHz spectrometer or a Varian Unity Plus™ 400 MHz spectrometer, corresponding to a carbon-13 resonance frequency of 100.5 MHz. Acquire the carbon-13 data using 4000 transients per data file with a 6 second pulse repetition delay. To achieve minimum signal-to-noise for quantitative analysis, add multiple data files together. The spectral width is 25,000 Hz with a minimum file size of 32,000 data points. Analyze the analysis sample at 130° C. in a 10 mm broad band probe. Determine the comonomer incorporation with the carbon-13 data using Randall's triad method (Randall, J. C.; JMS-Rev. Macromol. Chem. Phys., C29, 201-317 (1989), which is incorporated by reference herein in its entirety.

In certain circumstances the comonomer incorporation index may be determined directly, for example by the use of NMR spectroscopic techniques described previously or by IR spectroscopy. If NMR or IR spectroscopic techniques cannot be used, then any difference in comonomer incorporation is indirectly determined. For polymers formed from multiple monomers this indirect determination may be accomplished by various techniques based on monomer reactivities.

For copolymers produced by a given catalyst, the relative amounts of comonomer and monomer in the copolymer and hence the copolymer composition is determined by relative rates of reaction of comonomer and monomer. Mathematically the molar ratio of comonomer to monomer is given by $$\frac{F_2}{F_1} = \left(\frac{[\text{comonomer}]}{[\text{monomer}]}\right)_{polymer} = \frac{R_{p2}}{R_{p1}} \quad (1)$$

Here $R_{p2}$ and $R_{p1}$ are the rates of polymerization of comonomer and monomer respectively and $F_2$ and $F_1$ are the mole fractions of each in the copolymer. Because $F_1+F_2=1$ we can rearrange this equation to $$F_2 = \frac{R_{p2}}{R_{p1} + R_{p2}} \quad (2)$$

The individual rates of polymerization of comonomer and monomer are typically complex functions of temperature, catalyst, and monomer/comonomer concentrations. In the limit as comonomer concentration in the reaction media drops to zero, $R_{p2}$ drops to zero, $F_2$ becomes zero and the polymer consists of pure monomer. In the limiting case of no monomer in the reactor $R_{p1}$ becomes zero and $F_2$ is one (provided the comonomer can polymerize alone).

For most homogeneous catalysts the ratio of comonomer to monomer in the reactor largely determines polymer composition as determined according to either the Terminal Copolymerization Model or the Penultimate Copolymerization Model.

For random copolymers in which the identity of the last monomer inserted dictates the rate at which subsequent monomers insert, the terminal copolymerization model is employed. In this model insertion reactions of the type

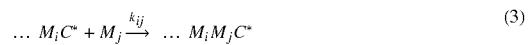

where $C^*$ represents the catalyst, $M_i$ represents monomer i, and $k_{ij}$ is the rate constant having the rate equation $$R_{pij}=k_{ij}[\ldots M_iC^*][M_j] \quad (4)$$

The comonomer mole fraction (i=2) in the reaction media is defined by the equation:

$$f_2 = \frac{[M_2]}{[M_1]+[M_2]} \quad (5)$$

A simplified equation for comonomer composition can be derived as disclosed in George Odian, *Principles of Polymerization*, Second Edition, John Wiley and Sons, 1970, as follows:

$$F_2 = \frac{r_1(1-f_2)^2 + (1-f_2)f_2}{r_1(1-f_2)^2 + 2(1-f_2)f_2 + r_2 f_2^2}. \quad (6)$$

From this equation the mole fraction of comonomer in the polymer is solely dependent on the mole fraction of comonomer in the reaction media and two temperature dependent reactivity ratios defined in terms of the insertion rate constants as:

$$r_1 = \frac{k_{11}}{k_{12}} \quad r_2 = \frac{k_{22}}{k_{21}}. \quad (7)$$

Alternatively, in the penultimate copolymerization model, the identities of the last two monomers inserted in the growing polymer chain dictate the rate of subsequent monomer insertion. The polymerization reactions are of the form

and the individual rate equations are:

$$R_{pijk}=k_{ijk}[\ldots M_iM_j=C^*][M_k] \quad (9).$$

The comonomer content can be calculated (again as disclosed in George Odian, Supra.) as:

$$\frac{(1-F_2)}{F_2} = \frac{1 + \frac{r'_1 X(r_1 X + 1)}{(r'_1 X + 1)}}{1 + \frac{r'_2(r_2 + X)}{X(r'_2 + X)}} \quad (10)$$

where X is defined as:

$$X = \frac{(1-f_2)}{f_2} \quad (11)$$

and the reactivity ratios are defined as:

$$r_1 = \frac{k_{111}}{k_{112}} \quad r'_1 = \frac{k_{211}}{k_{212}} \quad (12)$$
$$r_2 = \frac{k_{222}}{k_{221}} \quad r'_2 = \frac{k_{122}}{k_{121}}.$$

For this model as well the polymer composition is a function only of temperature dependent reactivity ratios and comonomer mole fraction in the reactor. The same is also true when reverse comonomer or monomer insertion may occur or in the case of the interpolymerization of more than two monomers.

Reactivity ratios for use in the foregoing models may be predicted using well known theoretical techniques or empirically derived from actual polymerization data. Suitable theoretical techniques are disclosed, for example, in B. G. Kyle, *Chemical and Process Thermodynamics*, Third Addition, Prentice-Hall, 1999 and in Redlich-Kwong-Soave (RKS) Equation of State, *Chemical Engineering Science*, 1972, pp 1197-1203. Commercially available software programs may be used to assist in deriving reactivity ratios from experimentally derived data. One example of such software is Aspen Plus from Aspen Technology, Inc., Ten Canal Park, Cambridge, Mass. 02141-2201 USA.

As mentioned before, the invention process employs olefin polymerizing conditions. In some embodiments, the olefin polymerizing conditions independently produce the invention catalyst in situ that is formed by combination or reaction of the metal-ligand complex of formula (I) and the one or more activating co-catalysts of ingredient (b). The invention catalyst system comprises the invention catalyst and at least one other ingredient of the invention process. Such other ingredients include, but are not limited to, (i) olefin monomer(s); (ii) another metal-ligand complex of formula (I); (iii) one or more of non-invention Catalysts (A); (iv) one or more of non-invention Catalysts (B); (v) chain shuttling agent; (vi) a catalyst stabilizer (if any); (vii) a solvent (if any); and (viii) a mixture of any two or more thereof.

Olefin polymerizing conditions independently refer to reaction conditions such as solvent(s), atmosphere(s), temperature(s), pressure(s), time(s), and the like that are preferred for giving, after 15 minutes reaction time, at least a 10 percent (%), more preferably at least 20%, and still more preferably at least 30% reaction yield of the rich polyethylene or rich polyethylene segment of the poly(ethylene alpha-olefin) copolymer, from the invention process. In some embodiments the rich polyethylene segment of the poly(ethylene alpha-olefin) copolymer is the polyethylene hard segment of a poly(ethylene alpha-olefin) block copolymer. Preferably, the invention process is independently are run under an inert atmosphere (e.g., under an inert gas consisting essentially of, for example, nitrogen gas, argon gas, helium gas, or a mixture of any two or more thereof). Other atmospheres are contemplated, however, and these include sacrificial olefin in the form of a gas and hydrogen gas (e.g., as a polymerization termination agent). In some aspects, the invention process independently is run without any solvent, i.e., is a neat process that is run in a neat mixture of ingredients (a) to (d). In other aspects, the neat mixture further contains additional ingredients (e.g., catalyst stabilizer such as triphenylphosphine) other than solvent(s). In still other aspects, the invention process is run with a solvent or mixture of two or more solvents, i.e., is a solvent-based process that is run as a solvent-containing mixture of ingredients (a) to (d), and at least one solvent, e.g., an aprotic solvent. Preferably, the neat process or solvent-based process is run at a temperature of the neat mixture or solvent-containing mixture of from −20° C. to about 300° C. In some embodiments, the temperature is at least 30° C., and more preferably at least 40° C. One of the advantages of the invention catalysts is that they functional well at high ethylene polymerization temperatures (e.g., more than 130° C.), even in presence of an alpha-olefin and without incorporating undesired amounts of the alpha-olefin. In some embodiments, the temperature is at least 100° C. In some embodiments, the temperature is at least 120° C. In some embodiments, the temperature is at least 130° C. In some embodiments, the temperature is at least 150° C. In some embodiments, the temperature is 200° C. or lower. In some embodiments, the temperature is 180° C. or lower. In some embodiments, the temperature is 160° C. or lower. A convenient temperature is from about 130° C. to about 190° C. (e.g., 150° C. or 170° C. or 190° C.). Preferably the invention process independently is run under a pressure of from about 0.9 atmospheres (atm) to about 10 atm (i.e., from about 91 kiloPascals (kPa) to about 1010 kPa). More preferably, the pressure is about 1 atm (i.e., about 101 kPa).

In some embodiments, polymerizable olefins useful in the invention process are $(C_2-C_{40})$hydrocarbons consisting of carbon and hydrogen atoms and containing at least 1, and preferably no more than 3, and more preferably no more than 2, carbon-carbon double bonds. In some embodiments, from 1 to 4 hydrogen atoms of the $(C_2-C_{40})$hydrocarbons are replaced, each by a halogen atom, preferably fluoro or chloro to give halogen atom-substituted $(C_2-C_{40})$hydrocarbons as the useful polymerizable olefins. The $(C_2-C_{40})$hydrocarbons (not halogen atom-substituted) are preferred. Preferred polymerizable olefins (i.e., olefin monomers) useful for making the polyolefins are ethylene and polymerizable $(C_3-C_{40})$olefins. The $(C_3-C_{40})$olefins include an alpha-olefin, a cyclic olefin, styrene, and a cyclic or acyclic diene. In some embodiments at least one of the other polymerizable olefin is the alpha-olefin, and more preferably a $(C_3-C_{40})$alpha-olefin. In some embodiments the $(C_3-C_{40})$alpha-olefin is a $(C_4-C_{40})$ alpha-olefin, more preferably a $(C_6-C_{40})$alpha-olefin, still more preferably a $(C_7-C_{40})$alpha-olefin, and even more preferably a $(C_8-C_{40})$alpha-olefin. Preferably, the alpha olefin comprises the $(C_3-C_{40})$ alpha-olefin, more preferably a branched chain $(C_3-C_{40})$alpha-olefin, still more preferably a linear-chain $(C_3-C_{40})$alpha-olefin, even more preferably a linear chain $(C_3-C_{40})$alpha-olefin of formula (A): $CH_2=CH_2-(CH_2)_zCH_3$ (A), wherein z is an integer of from 0 to 40, and yet even more preferably a linear-chain $(C_3-C_{40})$ alpha-olefin that is 1-propene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, or a linear chain ($C_{20}$-$C_{24}$)alpha-olefin. Preferably the cyclic olefin is a ($C_3$-$C_{40}$)cyclic olefin. Preferably, the cyclic or acyclic diene is a ($C_4$-$C_{40}$)diene, preferably an acyclic diene, more preferably an acyclic conjugated ($C_4$-$C_{40}$)diene, more preferably an acyclic 1,3-conjugated ($C_4$-$C_{40}$)diene, and still more preferably 1,3-butadiene.

Polyolefins that can be made by an invention process include, for example, rich polyethylene and interpolymers that comprise residuals of ethylene and one or more polymerizable ($C_3$-$C_{40}$)olefins. Preferred homopolymers are high density polyethylene. Preferred interpolymers are those prepared by co-polymerizing a mixture of two or more polymerizable olefins such as, for example, ethylene/propylene, ethylene/1-butene, ethylene/1-pentene, ethylene/1-hexene, ethylene/4-methyl-1-pentene, ethylene/1-octene, ethylene/styrene, ethylene/propylene/butadiene and other EPDM terpolymers. Preferably, the polyolefin is an ethylene homopolymer (e.g., a high density polyethylene), an ethylene/alpha-olefin interpolymer (i.e., poly(ethylene alpha-olefin) copolymer such as, for example, a poly(ethylene 1-octene)), or an ethylene/alpha-olefin/diene interpolymer (i.e., a poly(ethylene alpha-olefin diene) terpolymer such as, for example, a poly(ethylene 1-octene 1,3-butadiene).

Preferably in the invention process, the mole ratio of (moles of ($C_3$-$C_{40}$)alpha-olefin)/(moles of ethylene) is 0.1 or higher, more preferably 0.30 or higher, still more preferably 0.50 or higher, and even more preferably 0.75 or higher (e.g., 1.0 or higher).

In another embodiment, the present invention is a polyolefin, preferably the rich polyethylene (e.g., in an isolated form or as part of an intermediate mixture with the alpha-olefin) prepared by the invention process.

The invention olefin polymerization reactions can be run in one reactor or multiple reactors, the multiple reactors being two reactors, or more than two reactors. For example, single reactor, multiple catalyst processes are useful in the present invention. In one embodiment, two or more catalysts are introduced into a single reactor under the olefin polymerization conditions, wherein at least the first one of the catalysts is an invention catalyst and each catalyst inherently produces a mixture or blend of different polyolefin copolymers. The terms "mixture" and "blend" as applied to the polyolefin copolymers are synonymous. In one embodiment, a relatively high molecular weight product ($M_w$ from 100,000 to over 1,000,000, more preferably 200,000 to 500,000) polyolefin is formed from one of the catalysts while a product of a relatively low molecular weight ($M_w$ 1,2,000 to 300,000) polyolefin is formed from another of the catalysts. The two or more catalysts can have similar or different comonomer incorporation ability, different molecular weight capability, or a combination thereof. The resulting mixture or blend of different polyolefin copolymers will have properties dependent on the ratio of the two or more catalysts that are employed in the single reactor. Suitable combinations of polyolefin molecular weight, comonomer incorporation ability, processes, and ratios of catalysts for such products are disclosed in U.S. Pat. No. 6,924,342. The invention catalysts are compatible with other olefin polymerization catalysts, including Ziegler/Natta catalysts. Due to this compatibility, the second catalyst composition may comprise another invention catalyst, a metallocene or other π-bonded ligand group containing metal-ligand complex (including constrained geometry metal-ligand complexes), or a polyvalent heteroatom ligand group containing metal-ligand complex, especially polyvalent pyridylamine or imidizolylamine based complexes and tetradentate oxygen-ligated biphenylphenol based Group 4 metal-ligand complexes. Preferably, the invention catalyst is prepared from and the invention process employs three or fewer, more preferably two, and still more preferably one metal-ligand complex of formula (I) per reactor.

Examples of suitable processes and systems employing multiple reactors include such processes and systems as are disclosed in U.S. Pat. No. 3,914,342. The multiple reactors, preferably two reactors, can be operated in series or in parallel, with at least one invention catalyst being employed in at least one of the reactors. In some embodiments one, two, or, when employing more than two reactors, three or more of the multiple reactors contain the two or more catalysts described in the immediately preceding paragraph (single reactor paragraph). Polyolefin products from these reactors can have similar or different densities. The final polymer product is a mixture or blend of effluents of different polyolefin copolymers from the two or more, preferably two, reactors. The effluents of different polyolefin copolymers are combined by mixing or blending prior to being subjected to devolatilization so as to result in a uniform mixing or blending of the different polyolefin copolymers. In another embodiment, the molecular weight of the different polyolefin copolymers from the two or more reactors is nearly the same but the densities vary to the extent that one of the reactors produces a first polyolefin copolymer with density in the range of 0.865-0.895, while another reactor produces a second polyolefin copolymer with a different density in the range of 0.885-0.950. When two reactors and two catalysts, at least one of which is an invention catalyst, are employed, such a dual reactor/dual catalyst invention process allows for the preparation of a mixture or blend polyolefin copolymers with tailored properties. In some embodiments employing the dual reactors, two reactors are connected in series, that is, the effluent from a first reactor is charged to a second reactor and, optionally, fresh monomer, solvent and hydrogen is added to the second reactor. Olefin polymerization conditions are adjusted in the second reactor so that they are different from the olefin polymerization conditions that were employed in the first reactor such that a weight ratio of weight of the polyolefin copolymer produced in the first reactor to weight of the polyolefin copolymer produced in the second reactor is ideally in the range of from 20:80 to 80:20. This embodiment of a dual reactor process is capable of producing a mixture or blend of different polyolefin copolymers having broadened molecular weight distribution or polydispersity index (PDI). In addition, in a more preferred embodiment, the invention process produces a mixture or blend of different polyolefin copolymers that comprises high and low molecular weight polyolefin copolymer components, wherein the high molecular weight polyolefin copolymer component contains higher quantities of comonomer (lower density) incorporated therein than quantities of comonomer that are contained in the low molecular weight polyolefin copolymer component.

In some embodiments one of the two reactors of the dual reactor embodiment, including the first of two reactors operating in series, contains a heterogeneous Ziegler-Natta catalyst or a chromium containing catalyst, such as one of the numerous such catalysts known in the art. Examples of Ziegler-Natta catalysts include, but are not limited to, titanium-based catalysts supported on $MgCl_2$, and additionally comprise compounds of aluminum containing at least one aluminum-alkyl bond. Suitable Ziegler-Natta catalysts and their preparation include, but are not limited to, those disclosed in U.S. Pat. Nos. 4,612,300, 4,330,646, and 5,869,575. Suitable chromium based catalysts are those disclosed in U.S. Pat. Nos. 4,981,927, 4,835,219, 4,564,660, 4,173,548, 3,953, 413, and elsewhere. The invention catalyst is contained in the same or different one of the two reactors.

The mixture or blend of different polyolefin copolymers and invention process for preparing same are preferred. Especially preferred is such a mixture or blend containing the rich polyethylene or rich polyethylene segment-containing poly(ethylene alpha-olefin) copolymer produced by the invention process.

In another embodiment the present invention is the poly(ethylene alpha-olefin) copolymer prepared by certain embodiments of the invention process. A particularly valuable type of poly(ethylene alpha-olefin) copolymer is the aforementioned poly(ethylene alpha-olefin) block copolymer or, simply, an olefin block copolymer (OBC). OBCs are characterized as having at least one so-called "hard segment" or block comprising residuals of ethylene monomer and at least one so-called "soft segment" or block comprising residuals of an alpha-olefin (also known as an alpha-olefin and 1-olefin) monomer. OBCs are available from The Dow Chemical Company, Midland, Mich., USA under the trade name INFUSE™ Olefin Block Copolymers. INFUSE™ Olefin Block Copolymers are useful in a variety of forms and applications such as, for example, those listed at www.dow.com/infuse. Part of a preparation of an OBC involves a process that, among other steps, selectively polymerizes ethylene in the presence of the alpha-olefin to form the one or more hard segments of the OBC. More preferably, the poly(ethylene alpha-olefin) block copolymer is characterizable as having a melting temperature of greater than 100 degrees Celsius, and more preferably greater than 120° C., as determined by Differential Scanning Calorimetry using the procedure described later.

The poly(ethylene alpha-olefin) block copolymers comprise ethylene residuals and one or more copolymerizable α-olefin comonomer residuals (i.e., ethylene and one or more copolymerizable α-olefin comonomers in polymerized form). The poly(ethylene alpha-olefin) block copolymers are characterized by multiple blocks or segments of two or more polymerized monomer units differing in chemical or physical properties. That is, the ethylene/α-olefin interpolymers are block interpolymers, preferably multi-block interpolymers or copolymers. The terms "interpolymer" and copolymer" are used interchangeably herein. In some embodiments a polyolefin block of the copolymer can be characterized as being a hard or soft block. "Hard" blocks or segments refer to crystalline or semi-crystalline blocks of polymerized units in which in some embodiments contain ethylene, preferably ethylene is present in an amount greater than about 80 mole percent, and preferably greater than 88 mole percent. In other words, the comonomer content in the hard segments is less than 20 mole percent, and preferably less than 12 weight percent. In some embodiments, the hard segments comprise all or substantially all ethylene. Such hard blocks are sometimes referred to herein as "rich polyethylene" blocks or segments. "Soft" blocks or segments, on the other hand, refer to blocks of polymerized units in which the comonomer content is greater than 20 mole percent, preferably greater than 25 mole percent, up to 100 mole percent. In some embodiments, the comonomer content in the soft segments can be greater than 20 mole percent, greater than 25 mole percent, greater than 30 mole percent, greater than 35 mole percent, greater than 40 mole percent, greater than 45 mole percent, greater than 50 mole percent, or greater than 60 mole percent. "Soft" blocks or segments may refer to amorphous blocks or segments or with levels of crystallinity lower than that of the "hard" blocks or segments A preferred poly(olefin monomer-olefin comonomer) block copolymer is a poly(olefin monomer-olefin comonomer) that is characterizable as being a multiblock interpolymer having blocks or segments of two or more polymerized monomer units differing in chemical or physical properties, and characterizable as being mesophase separated. Such copolymers are sometimes referred to herein as "mesophase-separated olefin multiblock interpolymers." Preferably, each poly(olefin monomer-olefin comonomer) independently is characterizable as being mesophase separated and having a PDI of 1.4 or greater.

In some embodiments, the poly(olefin monomer-olefin comonomer) block copolymer is an ethylene/alpha-olefin interpolymer, such as those described in US 2010/0298515 A1, preferably a block copolymer, which comprises a hard segment and a soft segment, and is characterized by a $M_w/M_n$ in the range of from about 1.4 to about 2.8 and (a), (b), (c), (d), (e), (f), or (g): (a) paragraph [0074] of US 2010/0298515 A1; or (b) paragraph [0075] of US 2010/0298515 A1; or (c) paragraph [0076] of US 2010/0298515 A1; or (d) paragraph [0077] of US 2010/0298515 A1; or (e) paragraph [0078] of US 2010/0298515 A1; or (f) paragraph [0079] of US 2010/0298515 A1; or (g) paragraph [0107] of US 2010/0298515 A1; wherein the US 2010/0298515 A1 paragraphs referenced in this paragraph, and their relevant supporting characterization methods as described in paragraphs [0291] to [0326] of US 2010/0298515 A1, are incorporated by reference here; and wherein the ethylene/alpha-olefin block interpolymer is mesophase separated.

In some embodiments the poly(olefin monomer-olefin comonomer) block copolymer is an ethylene/alpha-olefin interpolymer, such as that described in U.S. Pat. No. 7,355,089 and US 2006/0199930 A1, wherein the interpolymer is preferably a block copolymer, and comprises a hard segment and a soft segment, and the ethylene/alpha-olefin interpolymer (a), (b), (c), (d), (e), (0, (g), or (h): (a) paragraph [0049] of US 2006/0199930 A1; or (b) paragraphs [0049] and [0051] of US 2006/0199930 A1; or (c) paragraph [0053] of US 2006/0199930 A1; or (d) paragraph [0052] of US 2006/0199930 A1; or (e) paragraph [0056] of US 2006/0199930 A1; or (f) paragraphs [0047] and [0052] of US 2006/0199930 A1; or (g) paragraph [0047] of US 2006/0199930 A1; or (h) paragraph [0065] of US 2006/0199930 A1; wherein the US 2006/0199930 A1 paragraphs referenced in this paragraph and their relevant supporting characterization methods as described in paragraphs [0169] to [0202] of in US 2006/0199930 A1, are incorporated by reference here.

Other embodiments comprise polyolefins and processes such as those described in US 2007/0167315 A1, US 2008/0311812 A1, and US 2007/0167578 A1; and WO 2009/097565.

In some embodiments a preferred invention process can achieve a minimum molecular weight distribution or polydispersity index (PDI) of the polyolefin product produced thereby. In some embodiments the PDI is greater than 2.4, in other embodiments the PDI is greater than 4.0, in other embodiments the PDI is greater than 6.0, and in still other embodiments the PDI is greater than 8.0. In some embodiments the PDI is less than 11. More preferably the PDI is as defined as in any one of the Examples described later.

In some embodiments a preferred invention process can achieve a productivity ratio of weight of polyolefin produced per weight of ethylene employed, as determined employing ethylene and 1-octene as described later at a polymerization reaction temperature of 170° C., wherein the productivity ratio of the polyolefin produced to ethylene employed is greater than 1.00, preferably greater than 1.10, more preferably greater than 1.40, and still more preferably greater than 2.50. More preferably the productivity ratio is as defined as in any one of the Examples described later.

Materials, Methods and Preparations

General Considerations All solvents and reagents are obtained from commercial sources and used as received unless indicated otherwise. Purify hexanes solvent through a column of activated alumina followed by a column of Q5 copper oxide on alumina (Cu-0226 S is obtained from (Engelhard subsidiary of BASF Corporation). Purify tetrahydrofuran (THF) and diethyl ether through columns of activated alumina Synthesize and store all metal-ligand complexes in a Vacuum Atmospheres inert atmosphere glove box under a dry nitrogen atmosphere. Record NMR spectra on a 300 megahertz (MHz) Varian INOVA spectrometer. Report chemical shifts in parts per million (δ) versus tetramethylsilane and referenced to residual protons in a deuterated solvent.

Determining percent incorporation of 1-octene and polymer density by FT-IR Spectroscopy: Deposit 140 microliters (µL) of each polymer solution onto a silica wafer, heat at 140° C. until the 1,2,4-trichlorobenzene (TCB) evaporates, and analyze using a Nicolet Nexus 670 FT-IR with 7.1 version software equipped with an AutoPro auto sampler.

Gel permeation chromatography (GPC): Determine weight average molecular weight ($M_w$) and polydispersity index: Determine $M_w$ and ratio of $M_w/M_n$ (polydispersity index or PDI) using a Polymer Labs™ 210 high temperature gel permeation chromatograph. Prepare samples using 13 mg of polyethylene polymer that is diluted with 16 mL of 1,2,4-trichlorobenzene (stabilized with butylated hydroxy toluene (BHT)), heat and shake at 160° C. for 2 hours.

Determining melting and crystallization temperatures and heat of fusion by Differential Scanning Calorimetry (DSC; DSC 2910, TA Instruments, Inc.)): First heat samples from room temperature to 180° C. at a heating rate of 10° C. per minute. After being held at this temperature for 2 to 4 minutes, cool the samples to −40° C. at a cooling rate of 10° C. per minute; hold the sample at the cold temperature for 2 to 4 minutes, and then heat the sample to 160° C.

Analyzing end groups by proton-nuclear magnetic resonance ($^1$H-NMR) spectroscopy using a Varian 600 MHz NMR instrument and deuterated tetrachloroethane.

Abbreviations (meanings): r.t. (room temperature); g (gram(s)); mL (milliliter(s)); ° C. (degrees Celsius); mmol (millimole(s)); MHz (MegaHertz); Hz (Hertz).

Examples of general synthetic methods are as described in U.S. Pat. No. 7,060,848 B2.

Preparation 1: preparation of intermediate, 3,6-bis(1,1-dimethylethyl)-9H-carbazole, (P1).

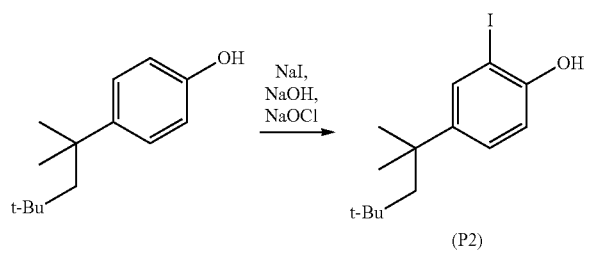

To a 500 mL three-necked round bottom flask equipped with an over head stirrer, nitrogen gas bubbler, and an addition funnel add 20.02 g (120.8 mmol) of carbazole, 49.82 g (365.5 mmol) of $ZnCl_2$, and 300 mL of nitromethane at room temperature. To the resulting dark brown slurry add 49.82 g (365.5 mmol) of 2-chloro-2-methylpropane (also known as tertiary-butyl chloride or t-BuCl) dropwise from the addition funnel over the period of 2.5 hours. After completing the addition, stir the resulting slurry for an additional 18 hours. Pour the reaction mixture into 800 mL of ice cold water, extract with 3×500 mL methylene chloride, combine and dry the extracts with anhydrous magnesium sulfate, filter, and concentrate the filtrate first by rotary evaporation and then by evaporation under high vacuum to remove nitromethane. Dissolve the resulting residue first in hot methylene chloride (70 mL) followed by hot hexanes (50 mL), allow the resulting solution to cool to room temperature and then placed it in a refrigerator overnight. Isolate the solids formed and wash the isolated solids with cold hexanes and then place them under high vacuum to yield 10.80 g (32.0%) of (P1) as off white crystals.

$^1$H NMR (400 MHz, $CDCl_3$) δ 8.11 (d, J=1.6 Hz, 2H), 7.75 (s, 1H), 7.48 (dd, J=8.5, 1.9 Hz, 2H), 7.31 (d, J=8.5 Hz, 2H), 1.48 (s, 18H).

$^{13}$C NMR (101 MHz, $CDCl_3$) δ 142.17 (s), 137.96 (s), 123.45 (s), 123.28 (s), 116.11 (s), 109.97 (s), 34.73 (s), 32.09 (s).

Preparation 2: preparation of intermediate, 2-iodo-4-(2,4,4-trimethylpentan-2-yl)phenol, (P2).

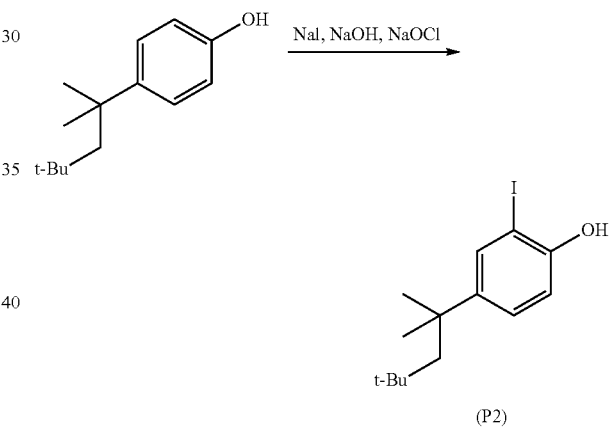

To a stirred solution of 10.30 g (50.00 mmol) of 4-(2,4,4-trimethylpentan-2-yl)phenol in 125 mL of methanol at 0° C., add 7.48 g (50.00 mmol) of NaI and 2.00 g (50 mmol) of NaOH. To the resulting mixture add 86 mL of 5% aqueous NaOCl solution (commercial bleach) over a one hour period. Stir the resulting slurry for one more hour at 0° C. Then add 30 mL of aqueous 10% $Na_2S_2O_3$ solution, and acidify the resulting reaction mixture with addition of dilute hydrochloric acid. Extract the resulting mixture with methylene chloride, wash the resulting organic layer with brine, and dry it over anhydrous magnesium sulfate. Remove volatiles and purify the resulting residue by flash chromatography on silica gel eluting with 5 volume percent (vol %) ethyl acetate in hexanes to yield 11.00 g (66%) of (P2) as a viscous oil.

$^1$H NMR ($CDCl_3$) δ 7.60 (d, J=2.5 Hz, 1H), 7.25 (dd, J=8.5 and 2.2 Hz, 1H), 6.90 (d, J=8.5 Hz, 1H), 5.13 (s, 1H), 1.69 (s, 2H), 1.32 (s, 6H) and 0.74 (s, 9H).

$^{13}$C{$^1$H} NMR ($CDCl_3$) δ 152.21, 144.52, 135.56, 128.03, 114.17, 85.36, 56.92, 38.01, 32.43, 31.90 and 31.64.

GCMS (m/e): 332 ($M^+$).

Preparation 3: preparation of intermediate, 2-iodo-1-(methoxymethoxy)-4-(2,4,4-trimethylpentan-2-yl)benzene, (P3).

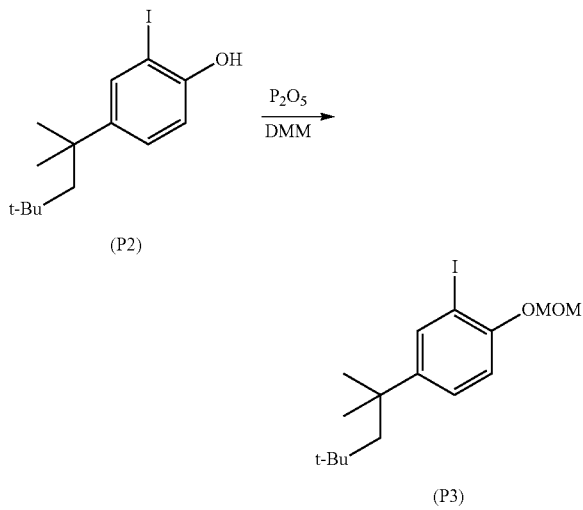

(A general procedure for methoxymethyl-ether (MOM-ether synthesis.) To a stirred solution of 4-(2,4,4-trimethylpentan-2-yl)phenol (P2) (9.50 g, 28.61 mmol, Preparation 2) and dimethoxymethane (25 mL, 286.2 mmol; DMM) in 150 mL of methylene chloride under the nitrogen atmosphere, add 14.00 g (99.29 mmol) of $P_2O_5$ in portions over a period of 1.5 hours. After the final addition, stir the resulting reaction mixture for another 1.5 hours. Then decant the resulting solution, and pass the decanted liquid through a small bed of silica gel. Wash the resulting solution successively with water and brine, and dry the washed solution over anhydrous magnesium sulfate. Pass the dried solution through a small bed of silica gel, and remove solvent to yield 9.90 g (92%) of pure (P3) as a viscous oil.

$^1$H NMR ($C_6D_6$) δ 7.88 (d, J=2.2 Hz, 1H), 7.03 (dd, J=2.5 Hz and 8.5 Hz, 1H), 6.89 (d, J=8.8 Hz, 1H), 4.82 (s, 2H), 3.12 (s, 3H), 1.53 (s, 2H), 1.15 (s, 6H) and 0.70 (s, 9H).

$^{13}$C{$^1$H} NMR ($C_6D_6$) δ 154.47, 145.69, 137.49, 127.40, 114.45, 95.12, 87.32, 56.98, 56.03, 38.11, 32.55.

Preparation 4: preparation of intermediate, 3,6-di-tert-butyl-9-(2-(methoxymethoxy)-5-(2,4,4-trimethylpentan-2-yl)phenyl)-9H-carbazole, (P4).

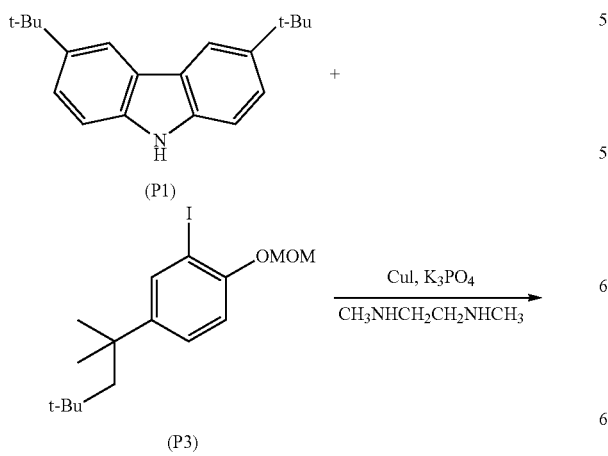

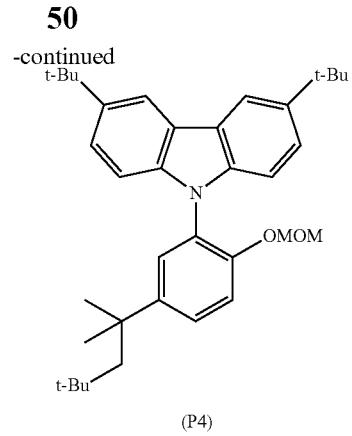

Heat a mixture of 4.96 g (13.18 mmol) of 2-iodo-1-(methoxymethoxy)-4-(2,4,4-trimethylpentan-2-yl)benzene (P3), Preparation 3; 3.68 g (13.18 mmol) of 3,6-di-t-butylcarbazole (P1), Preparation 1; 0.53 g (2.6 mmol) of CuI, 8.42 g (39.54 mmol) of $K_3PO_4$, and 0.63 g (4.13 mmol) of N,N'-dimethylethylenediamine in 25 mL of toluene under nitrogen atmosphere to reflux and reflux for 24 hours. Cool the reaction mixture, dilute it with 25 mL of THF, and filter to remove solid. Concentrate the filtrate to give a solid residue. Crystallize the solid residue from acetonitrile to yield 5.5 g (90%) of (P4) as white solid.

$^1$H NMR (CDCl$_3$) δ 8.17 (d, J=2.4 Hz, 2H), 7.46 (m, 4H), 7.33 (d, J=7.8 Hz, 1H), 7.09 (d, J=8.6 Hz, 2H), 4.94 (s, 2H), 3.21 (s, 3H), 1.76 (s, 2H), 1.50 (s, 18H), 1.40 (s, 6H) and 0.83 (s, 9H).

$^{13}$C{$^1$H} NMR (CDCl$_3$) δ 151.37, 144.89, 142.16, 139.87, 127.85, 126.81, 126.63, 123.34, 122.99, 116.34, 116.03, 109.45, 95.13, 57.00, 56.07, 38.25, 34.70, 32.40, 32.07, 31.84, 31.57.

Preparation 5: preparation of intermediate, 2-(2-iodo-4-(2,4,4-trimethylpentan-2-yl)phenoxy)tetrahydro-2H-pyran, (P5).

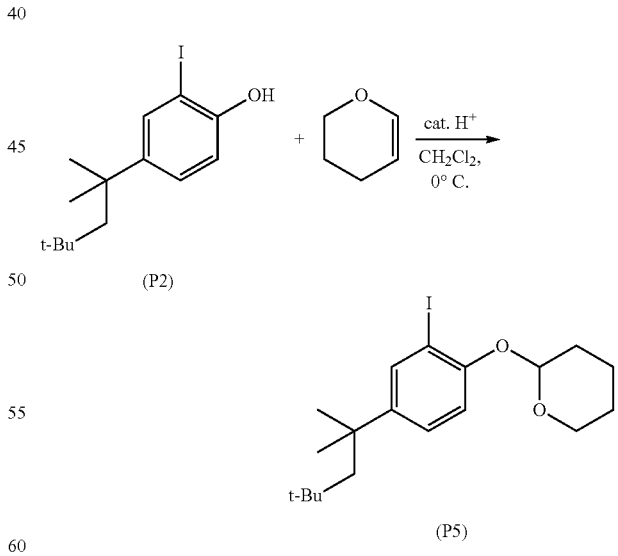

To a stirred solution of 4.91 g (14.78 mmol) of 4-(2,4,4-trimethylpentan-2-yl)phenol (P2) and 1.50 g (17.83 mmol) of 3,4-dihydropyran in 5 mL of methylene chloride at 0° C. add 0.039 g (0.205 mmol) of para-toluenesulfonic acid monohydrate. The resulting solution quickly becomes purple. Allow solution to warm to room temperature, and stir thereat for approximately 10 minutes. Then add 0.018 g (0.178 mmol) of triethylamine, and the resulting mixture turned yellow. Dilute the mixture with 50 mL of methylene chloride, and successively wash the diluted mixture with 50 mL each of 1M NaOH, water, and brine. Dry the organic phase with anhydrous magnesium sulfate, filter, and concentrate to give a crude material. Purify the crude material by flash chromatography on silica gel using 5 vol % ethyl acetate in hexanes to yield 5.18 g (93.12%) of (P5) as a golden oil.

$^1$H NMR (CDCl$_3$) δ 7.74 (d, J=2.3 Hz, 1H), 7.27 (dd, J=2.3 and 8.6 Hz, 1H), 6.99 (d, J=8.6 Hz, 1H), 5.49 (m, 1H), 3.91 (m, 1H), 3.61 (m, 1H), 2.20-1.60 (m, 6H), 1.69 (s, 2H), 1.34 (s, 6H) and 0.75 (s, 9H).

$^{13}$C{$^1$H} NMR (CDCl$_3$) δ 153.27, 145.49, 136.98, 127.08, 114.44, 96.72, 87.09, 61.69, 56.91, 37.95, 32.33, 31.81, 31.52, 31.44, 30.26, 25.27, 18.36.

Preparation 6: preparation of intermediate, 3,6-di-tert-butyl-9-(2-(tetrahydro-2H-pyran-2-yloxy)-5-(2,4,4-trimethylpentan-2-yl)phenyl)-9H-carbazole, (P6).

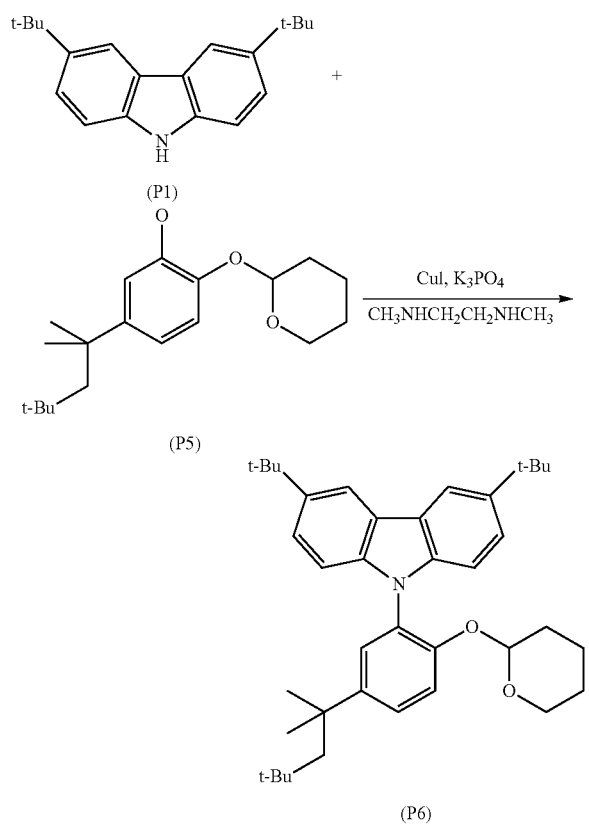

To a 50 mL three necked round bottom flask equipped with a stir bar and condenser under N$_2$ atmosphere add 20 mL of dry toluene, 5.00 g (12.01 mmol) of 2-(2-iodo-4-(2,4,4-trimethylpentan-2-yl)phenoxy)tetrahydro-2H-pyran (P5), Preparation 5; 3.56 g (12.01 mmol) of 3,6-di-t-butyl carbazole (P1), Preparation 1; 0.488 g (2.56 mmol) of CuI, 7.71 g (36.22 mmol) of K$_3$PO$_4$, and 0.338 g (3.84 mmol) of N,N'-dimethylethylenediamine. Reflux the reaction mixture for 48 hours, cool it, filter it through a bed of silica gel, rinse the silica gel with tetrahydrofuran (THF), and concentrate the organics to give a crude residue. Crystallize the crude residue using acetonitrile to yield 4.57 g (67.01%) of (P6) as a white solid.

$^1$H NMR (CDCl$_3$) δ 8.13 (t, J=1.71 Hz, 1H), 7.48 (d, J=2.4 Hz, 1H), 7.40 (m, 3H), 7.31 (d, J=8.68 Hz, 1H), 7.14 (d, J=8.68 Hz, 1H), 7.08 (d, J=8.56 Hz, 1H), 5.22 (t, J=2.81 Hz, 1H), 3.72 (td, J=11.12 and 2.8 Hz, 1H), 3.47 (dt, J=11.12 and 3.47 Hz, 1H), 1.75 (s, 2H), 1.474 (s, 9H), 1.472 (s, 9H), 1.394 (s, 3H), 1.391 (s, 3H), 1.37-1.12 (m, 6H) and 0.82 (s, 9H).

$^{13}$C{$^1$H} NMR (CDCl$_3$) δ 150.96, 144.22, 142.07, 140.02, 127.49, 126.60, 126.56, 123.14, 123.12, 122.96, 116.37, 115.88, 115.72, 110.18, 109.52, 97.02, 61.56, 57.03, 38.23, 34.69, 32.41, 32.07, 31.86, 31.72, 31.50, 29.98, 25.06, 17.61.

Preparation 7: preparation of intermediate, 2,4-difluoro-6-iodophenol, (P7).

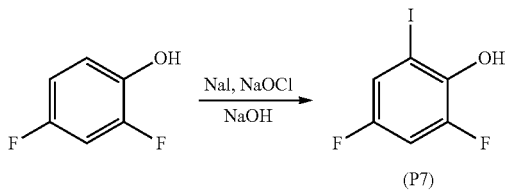

To a stirred solution of 10 g of 2,4-difluorophenol in 300 mL of methanol at 0° C., add 22.5 g (150.2 millimoles (mmol) of NaI and 3.08 g (77 mmol) of NaOH. To the resulting mixture add 175 mL of 5% aqueous NaOCl solution (commercial bleach) over a one hour period. Stir the resulting slurry for one more hour at 0° C. Add 100 mL of 10% aqueous Na$_2$S$_2$O$_3$ solution, and acidify the resulting reaction mixture by adding dilute hydrochloric acid. Extract the resulting mixture with methylene chloride, wash the resulting organic layer with brine and dry it over anhydrous magnesium sulfate. Remove solvent and purify the residue by flash chromatography using 50 vol % methylene chloride in hexanes to yield 8.10 g (41.16%) of pure 2,4-difluoro-6-iodophenol (P7) as a white solid.

$^1$H NMR (CDCl$_3$) δ 7.24 (m, 1H), 6.90 (m, 1H) and 5.30 (s, 1H).

$^{13}$C{$^1$H} NMR (126 MHz, CDCl$_3$) δ 155.88 (dd, J=245.8, 11.1 Hz), 148.90 (dd, J=247.0, 12.4 Hz), 140.77 (d, J=18.5 Hz), 120.44 (dd, J=24.9, 4.0 Hz), 104.93 (dd, J=26.8, 22.7 Hz), 83.27 (dd, J=10.4, 1.5 Hz).

$^{19}$F NMR (282 MHz) δ −118.84 (m), −128.95 (m).

GCMS (m/e): 256 (M$^+$).

Preparation 8: preparation of intermediate, 1,3-bis(2,4-difluoro-6-iodophenoxy)propane, (P8).

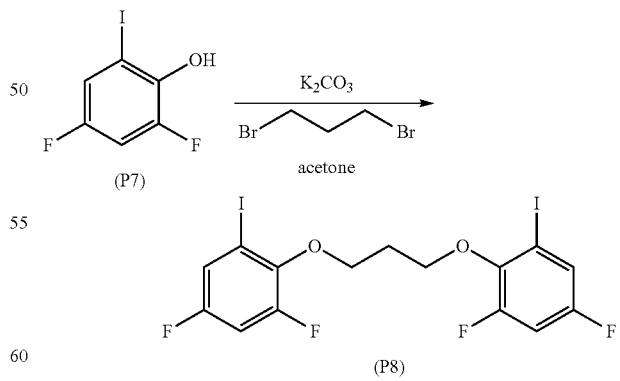

To a solution of 7.68 g (30 mmol) of 2,4-difluoro-6-iodophenol (P7), Preparation 7 and 3.03 g (15 mmol) of 1,3-dibromopropane in 125 mL of acetone add 12.42 g (90 mmol) of potassium carbonate. Reflux the resulting reaction mixture for 48 hours. Cool the reaction mixture to room temperature, filter it, and extract the resulting filtrate thoroughly with methylene chloride. Combine methylene chloride extracts and concentrate them by rotary evaporation. Crystallize the resulting solid from hexanes to yield 3.4 g (41.1%) of (P8) as a white solid.

$^1$H NMR (CDCl$_3$) δ 7.28 (m, 2H), 6.80 (m, 2H), 4.31 (t, J=6.18 Hz, 4H) and 2.33 (quintet, J=6.18 Hz, 2H).

$^{13}$C{$^1$H} NMR (126 MHz, CDCl$_3$) δ 158.02 (dd, J=249.1, 11.9 Hz), 154.04 (dd, J=253.9, 12.7 Hz), 143.75 (dd, J=12.4, 4.1 Hz), 121.02 (dd, J=24.5, 3.6 Hz), 105.65 (dd, J=26.3, 23.8 Hz), 91.46 (dd, J=10.4, 2.4 Hz), 71.17 (d, J=4.8 Hz), 30.89 (s).

$^{19}$F NMR (282 MHz, CDCl$_3$) δ −114.45 (m), −121.09, m).

GCMS (m/e): 552 (M$^+$).

Preparation 9: preparation of intermediate, 2,4-dichloro-6-iodophenol, (P9).

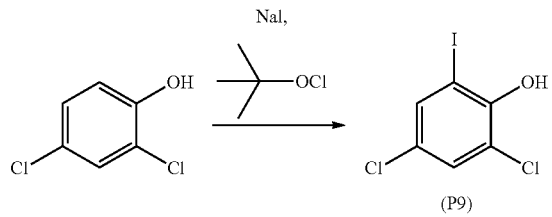

(t-Butyl hypochlorite Method)

To a solution of 6.52 g (40 mmol) of 2,4-dichlorophenol and 7.76 g (52 mmol) of sodium iodide in 80 mL of acetonitrile and 16 mL of water at room temperature add 5.64 g (52 mmol) of tert-butyl hypochlorite dropwise over a period of 30 minutes. Stir the reaction mixture for 3 hours at ambient temperature. Dilute the reaction mixture with 200 mL of ethyl acetate. Wash the resulting organic solution successively with 5% aqueous sodium thiosulfate solution and brine and dry over anhydrous magnesium sulfate. Remove the solvent and then crystallize from hexanes to yield 5.9 g (51%) of (P9) as a slightly colored solid.

$^1$H NMR (CDCl$_3$) δ 7.60 (d, J=2.5 Hz, 1H), 7.32 (d, J=2.5 Hz, 1H) and 5.87 (s, 1H). $^{13}$C{$^1$H}NMR (CDCl$_3$) δ 149.80, 136.86, 129.17, 126.21, 119.12 and 83.21.

GCMS (m/e): 289 (M$^+$).

Preparation 10: preparation of intermediate, 1,3-bis(2,4-dichloro-6-iodophenoxy)propane, (P10).

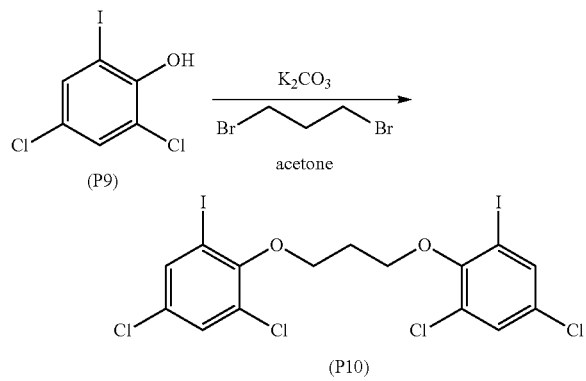

In a manner similar to the preparation of (P8) (Preparation 8) except use (P9) (Preparation 9) instead of (P7), prepare crude 1,3-bis(2,4-dichloro-6-iodophenoxy)propane (P10) from 6.0 g of 2,4-dichloro-6-iodophenol (P9) and purify by crystallization from acetonitrile to yield 5.20 g (81.37%) of (P10) as a white solid.

$^1$H NMR (CDCl$_3$) δ 7.67 (d, J=2.5 Hz, 2H), 7.38 (d, J=2.5 Hz, 2H), 4.26 (t, J=6.5 Hz, 4H) and 2.47 (quintet, J=6.5 Hz, 2H).

$^{13}$C{$^1$H} NMR (CDCl$_3$) δ 153.75, 137.08, 130.43, 130.23, 127.89, 92.82, 70.79 and 31.00.

Preparation 11: preparation of intermediate, 2-iodo-4-chloro-6-methylphenol, (P11).

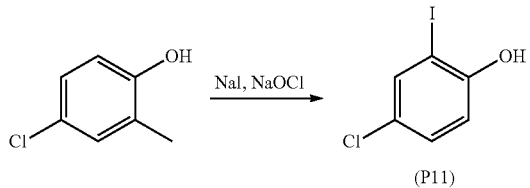

To a stirred solution of 5.00 g (35.00 mmol) of 2-methyl-4-chlorophenol (available from Aldrich Chemical Company) in 100 mL of methanol at 0° C., add 6.83 g (45.57 mmol) of NaI and 1.40 g (35.00 mmol) of NaOH. To the resulting mixture add 65 mL of 5% aqueous NaOCl solution (commercial bleach) over one hour period. The resulting slurry is stirred for one more hour at 0° C. After the addition of 20 mL of 10% Na$_2$S$_2$O$_3$ solution, the reaction mixture is acidified by dilute hydrochloric acid. The mixture is extracted with methylene chloride. The organic layer is washed with brine and dried over anhydrous magnesium sulfate. Removal of the solvent followed by purification by recrystallization from hexanes gives 3.80 g (40.5%) of (P11) as white solid.

$^1$H NMR (CDCl$_3$) δ 7.43 (dd, J=0.55 and 2.5 Hz, 1H), 7.06 (d, J=2.5 Hz, 1H), 5.23 (s, 1H) and 2.26 (s, 3H).

$^{13}$C{$^1$H} NMR (CDCl$_3$) δ 151.70, 134.28, 131.11, 125.88, 125.55, 85.34 and 17.22.

GCMS (m/e): 268 (M$^+$).

Preparation 12: preparation of intermediate, 1,3-bis(4-chloro-2-iodo-6-methylphenoxy)propane, (P12).

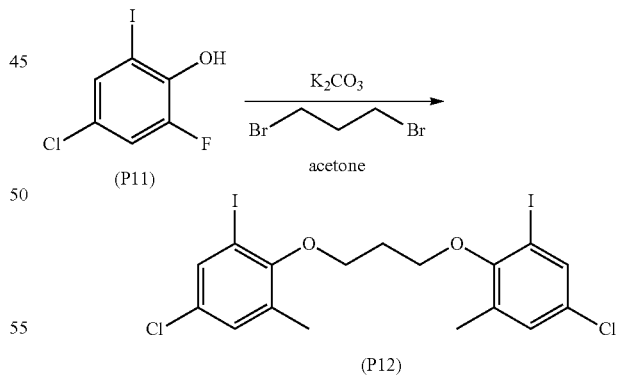

To a solution of 3.50 g (13.05 mmol) of 2-iodo-4-chloro-6-methylphenol (P11) (Preparation 11) and 1.32 g (6.53 mmol) of 1,3-dibromopropane in 75 mL of acetone add 5.40 g (39.1 mmol) of K$_2$CO$_3$. Reflux the reaction mixture for 36 hours. Cool the reaction mixture to room temperature, filter it, and the concentrate the resulting filtrate by rotary evaporation. The residue thus obtained is crystallized from acetonitrile to obtain 2.80 g (74.3%) of the bridge compound as white solid.

¹H NMR (CDCl₃) δ 7.59 (d, J=2.4 Hz, 2H), 7.14 (d, J=2.4 Hz, 2H), 4.09 (t, J=6.5 Hz, 4H), 2.44 (quintet, J=6.5 Hz, 2H) and 2.32 (s, 6H).

¹³C{¹H} NMR (CDCl₃) δ156.01, 136.21, 133.26, 131.32, 129.81, 92.24, 70.07, 31.05, 17.20.

GCMS (m/e): 577 (M⁺).

Preparations 13a to 13d: preparation of intermediates, 2,4-dimethyl-6-iodophenol (P13a); 4-chloro-2-ethyl-6-iodophenol, (P13b); 4-fluoro-6-iodo-2-methylphenol, (P13c), and 4-fluoro-6-iodo-2-trifluoromethylphenol, (P13d).

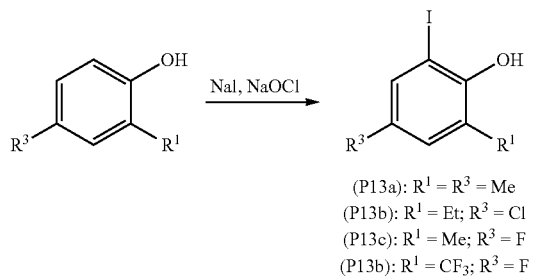

(P13a): R¹ = R³ = Me
(P13b): R¹ = Et; R³ = Cl
(P13c): R¹ = Me; R³ = F
(P13b): R¹ = CF₃; R³ = F

In separate reactions, each run in a manner similar to the preparation of (P2) (Preparation 2), except use 2,4-dimethylphenol; 4-chloro-2-ethylphenol; 4-fluoro-2-methylphenol; or 4-fluoro-2-trifluoromethylphenol instead of the 4-(2,4,4-trimethylpentan-2-yl)phenol, respectively, prepare crude (P13a) to (P13d). Purify each of crude (P13a) to (P13d) by crystallization to respectively obtain each of purified (P13a) to (P13d) as a solid.

Preparations 14a to 14d: preparation of intermediates, 1,3-bis(2,4-dimethyl-6-iodophenoxy)propane, (P14a); 1,3-bis(4-chloro-2-ethyl-6-iodophenoxy)propane, (P14b); 1,3-bis(4-fluoro-6-iodo-2-methylphenoxy)propane, (P14c); and 1,3-bis(4-fluoro-6-iodo-2-trifluoromethylphenoxy)propane, (P14d).

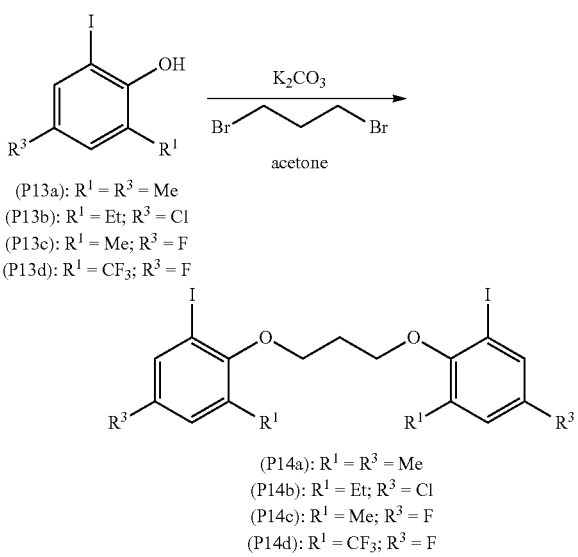

(P13a): R¹ = R³ = Me
(P13b): R¹ = Et; R³ = Cl
(P13c): R¹ = Me; R³ = F
(P13d): R¹ = CF₃; R³ = F (P14a): R¹ = R³ = Me
(P14b): R¹ = Et; R³ = Cl
(P14c): R¹ = Me; R³ = F
(P14d): R¹ = CF₃; R³ = F

In separate reactions, each run in a manner similar to the preparation of (P8) (Preparation 8), except use 2,4-dimethyl-6-iodophenol (P13a); 4-chloro-2-ethyl-6-iodophenol, (P13b); 4-fluoro-6-iodo-2-methylphenol, (P13c), or 4-fluoro-6-iodo-2-trifluoromethylphenol, (P13d) instead of (P7), respectively prepare crude 1,3-bis(2,4-dimethyl-6-iodophenoxy)propane, (P14a); 1,3-bis(4-chloro-2-ethyl-6-iodophenoxy)propane, (P14b); 1,3-bis(4-fluoro-6-iodo-2-methylphenoxy)propane, (P14c); and 1,3-bis(4-fluoro-6-iodo-2-trifluoromethylphenoxy)propane, (P14d). Purify each of crude (P14a), (P14b), (P14c), and (P14d) by crystallization from acetonitrile to respectively yield each of purified (P14a), (P14b), (P14c), or (P14d) as a solid.

Preparations 15a and 15b: preparation of intermediates, 1,4-bis(4-chloro-2-iodo-6-methylphenoxy)butane, (P15a); and 1,2-bis(4-chloro-2-iodo-6-methylphenoxy)ethane, (P15b).

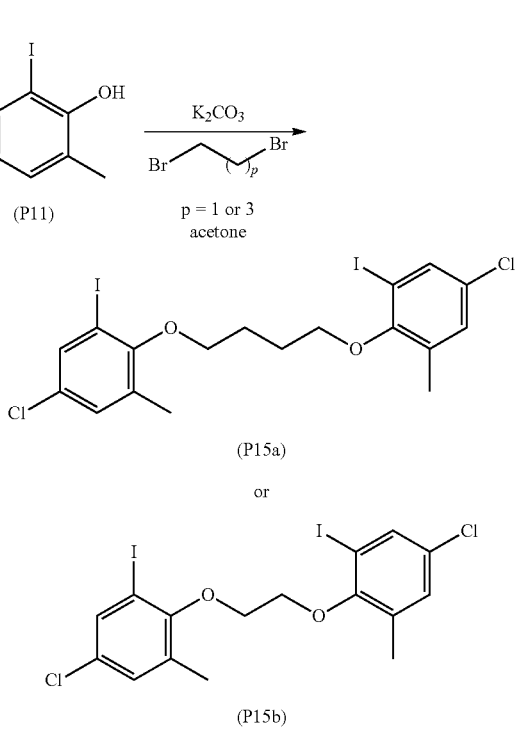

In separate reactions and in a manner similar to the preparation of (P8) (Preparation 8) except use (P11) (Preparation 11) instead of (P7) and either 1,4-dibromobutane or 1,2-di(para-tosyloxy)ethane instead of 1,3-dibromopentane, respectively prepare each of crude 1,4-bis(4-chloro-2-iodo-6-methylphenoxy)butane, (P15a); and 1,2-bis(4-chloro-2-iodo-6-methylphenoxy)ethane, (P15b) and purify each of crude (P15a) and (P15b) by crystallization from acetonitrile to yield each of purified (P15a) or (P15b) as a solid.

Preparation 16: Preparation of 9-(2-(methoxymethoxy)-5-(2,4,4-trimethylpentan-2-yl)phenyl)-9H-carbazole

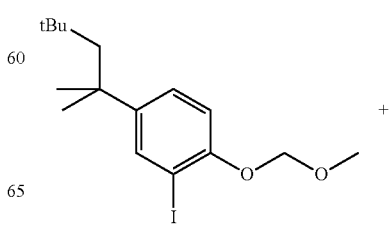

-continued

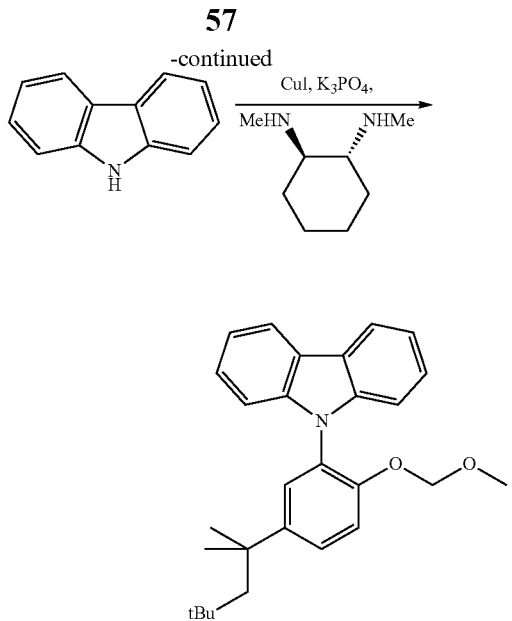

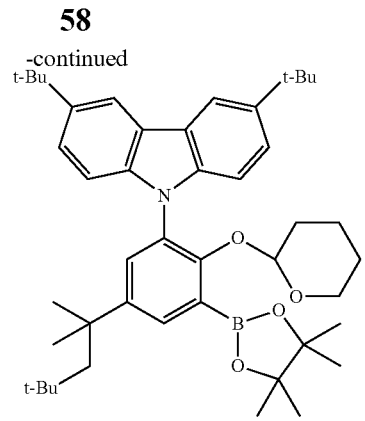

To 30 mL of dry toluene add 2-iodo-1-(methoxymethoxy)-4-(2,4,4-trimethylpentan-2-yl)benzene (1.50 g, 3.986 mmol), carbazole (0.633 g, 3.786 mmol), $K_3PO_4$ (1.71 g, 8.034 mmol), CuI (0.158 g, 0.830 mmol) and trans-N,N-dimethylcyclohexane-1,2-diamine (0.158 g, 1.111 mmol). Reflux the reaction mixture for 48 hours, cool, filter, and concentrate to give material. Purify material by flash chromatography using 3% ethyl acetate in hexanes to give 0.49 g (29.6%) of 9-(2-(methoxymethoxy)-5-(2,4,4-trimethylpentan-2-yl)phenyl)-9H-carbazole as off-white powder. $^1$H NMR (400 MHz, $CDCl_3$) δ 8.19-8.14 (m, 2H), 7.50-7.25 (m, 7H), 7.19-7.13 (m, 2H), 4.93 (s, 2H), 3.16 (s, 3H), 1.76 (s, 2H), 1.40 (s, 6H), 0.82 (s, 9H). $^{13}$C NMR (101 MHz, $CDCl_3$) δ 151.41 (s), 144.96 (s), 141.46 (s), 127.95 (s), 127.19 (s), 126.13 (s), 125.68 (s), 123.11 (s), 120.13 (s), 119.39 (s), 116.20 (s), 110.05 (s), 94.99 (s), 56.99 (s), 56.06 (s), 38.27 (s), 32.40 (s), 31.85 (s), 31.58 (s);

MS m/e 416 (M+Na)$^+$.

Preparation 17: Preparation of 3,6-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole

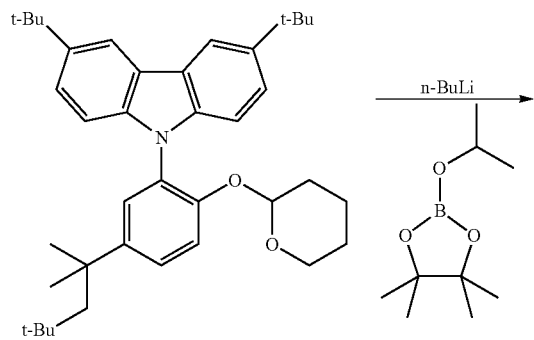

To a stirred solution of 2.5 g (4.4 mmol) of (P6) in 40 mL of THF at 0° C. under nitrogen atmosphere 2.8 mL (7.0 mmol) of n-butyl lithium (2.5 M solution in hexanes) add over a period of 5 minutes. Stir solution at 0° C. for 3 hours. Add 2-isopropoxy-4,4,5,5-tetramethyl-1,3,2-dioxaborolane (1.44 mL, 7.0 mmol), and continue stirring at 0° C. for 1 more hour. Slowly warm the reaction mixture to room temperature and stir for 18 hours. Concentrate the reaction mixture to dryness by rotary evaporation, and add 100 mL of ice cold water. Extract mixture with methylene chloride, wash the organic layer with brine, dry over anhydrous magnesium sulfate, remove the solvent, and crystallize residue from acetonitrile to give 2.4 g (78.6%) of 3,6-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole as white solid. $^1$H NMR ($CDCl_3$) δ 8.30-7.96 (m, 2H), 7.81 (d, J=2.5 Hz, 1H), 7.58-7.32 (m, 3H), 7.14 (d, J=8.6 Hz, 2H), 4.85 (d, J=2.8 Hz, 1H), 2.76 (td, J=11.0, 2.7 Hz, 1H), 2.59 (dd, J=7.9, 3.5 Hz, 1H), 1.73 (s, 2H), 1.67-0.87 (m, 6H), 1.46 (s, 9H), 1.45 (s, 9H), 1.38 (s, 9H), 1.37 (s, 9H), 0.78 (s, 9H); $^{13}$C{$^1$H} NMR ($CDCl_3$) δ 156.25, 145.86, 142.05, 142.01, 139.79, 139.78, 133.82, 130.61, 129.72, 123.39, 123.37, 123.05, 115.59, 115.55, 110.20, 110.11, 101.41, 83.64, 61.20, 56.95, 38.37, 34.68, 32.42, 32.08, 31.90, 31.45, 29.97, 25.06, 25.04, 24.79, 18.16. MS m/e 716.38 (M+Na).

Preparation 18: Preparation of 4-chloro-2-fluoro-6-iodophenol.

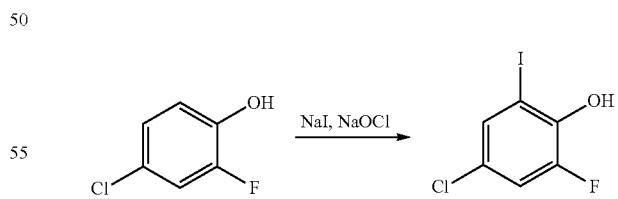

Replicate Preparation 7 except use 4-chloro-2-fluorophenol to give crude compound. Crystallize from hexanes to afford 3.85 g (42%) of 4-chloro-2-fluoro-6-iodophenol as white crystals. $^1$H NMR (400 MHz, $CDCl_3$) δ 7.46 (t, J=2.1 Hz, 1H), 7.11 (dd, J=9.8, 2.4 Hz, 1H), 5.46 (s, 1H). $^{13}$C NMR (101 MHz, $CDCl_3$) δ 150.27 (s), 147.81 (s), 142.98 (d, J=14.4 Hz), 133.22 (d, J=3.8 Hz), 126.08 (d, J=9.3 Hz), 117.07 (s), 116.85 (s), 84.29 (d, J=1.1 Hz). $^{19}$F NMR (376 MHz, $CDCl_3$) δ −131.45 (dd, J=9.8, 1.8 Hz). GCMS (m/e): 272 (M$^+$).

Preparation 19: Preparation of 1,3-propanediol bis(4-methylbenzenesulfonate).

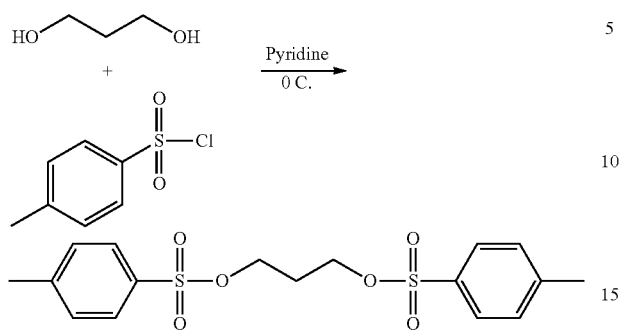

To a solution of 116.36 g (610.37 mmol) of tosyl chloride in 200 mL of anhydrous pyridine add 19.26 g (253.09 mmol) of 1,3-propanediol in 50 mL of anhydrous pyridine dropwise over the period of two hours at 0-10° C. Stir the reaction mixture for an additional four hours, then pour it into 500 mL of ice cold water. Collect the white precipitate that forms by filtration, wash filter cake with water, dilute aqueous sulfuric acid (10 wt. %), dilute aqueous sodium carbonate (1M), and again with water. Crystallize the wet product from acetone to afford 80.68 g (83%) of 1,3-propanediol bis(4-methylbenzenesulfonate) as off white powder. $^1$H NMR (400 MHz, CDCl$_3$) δ 7.77-7.69 (m, 4H), 7.37-7.30 (m, 4H), 4.05 (t, J=6.0 Hz, 4H), 2.44 (s, 6H), 1.99 (p, J=6.0 Hz, 2H). $^{13}$C{$^1$H} NMR (101 MHz, CDCl$_3$) δ 145.01, 132.65, 129.92, 127.84, 65.83, 28.67, 21.61. MS (m/e): 408 (M+Na).

Preparation 20: Preparation of 1,3-bis(4-chloro-2-fluoro-6-iodophenoxy)propane.

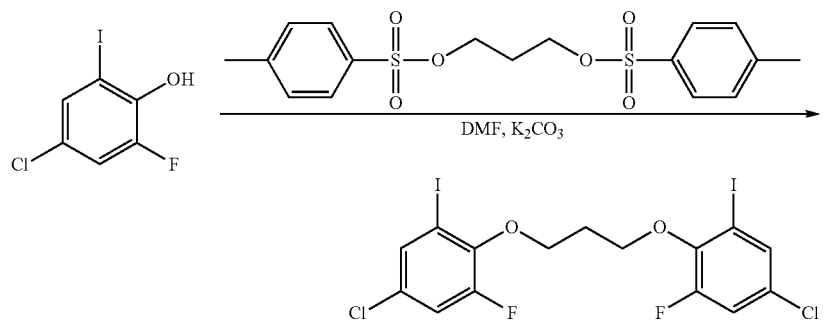

To a stirred solution of 3.21 g (11.78 mmol) of 2-iodo-4-chloro-6-fluorophenol and 2.28 g (5.95 mmol) of 1,3-propanediol bis(4-methylbenzenesulfonate) in 50 mL of DMF add 3.31 g (23.94 mmol) of potassium carbonate. Reflux the reaction mixture for 30 minutes, cool to room temperature, concentrate to dryness, and take up the residue in 50/50 methylene chloride and water. Extract into methylene chloride, and wash the organic solution with 2N NaOH then brine, dry over anhydrous magnesium sulfate, filter through a pad of silica gel, and concentrate by rotary evaporation. Purify the resulting crude product by crystallization from acetonitrile to yield 1.94 g (56%) of 1,3-bis(4-chloro-2-fluoro-6-iodophenoxy)propane as white solid. $^1$H NMR (400 MHz, CDCl$_3$) δ 7.52 (d, J=1.7 Hz, 2H), 7.10 (dd, J=10.6, 2.3 Hz, 2H), 4.36 (t, J=5.9 Hz, 4H), 2.31 (p, J=6.0 Hz, 2H). $^{13}$C{$^1$H} NMR (101 MHz, CDCl$_3$) δ 153.75 (d, J=254.8 z Hz), 145.81 (d, J=12.0 Hz), 133.77 (d, J=3.6 Hz), 129.32 (d, J=10.1 Hz), 117.98 (d, J=23.4 Hz), 92.07 (d, J=2.1 Hz), 71.01 (d, J=6.1 Hz), 30.89 (s). $^{19}$F NMR (376 MHz, CDCl$_3$) δ −123.93 (d, J=10.5 Hz). GCMS (m/e): 584 (M$^+$).

Preparation 21: Preparation of 4-chloro-2-(hydroxypropan-2-yl)phenol.

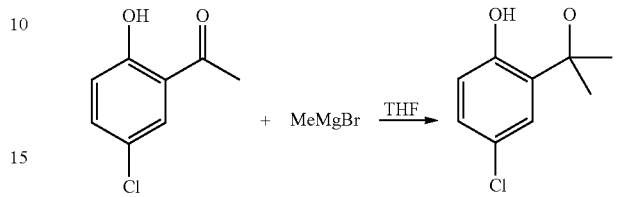

Cool 4-chloro-2-hydroxyacetophenone (4.992 g, 29.26 mmol) and 85 mL of dried THF in a dried flask to 0-10° C., and add dropwise 90 mL of 1 M methyl magnesium bromide (90 mmol). Keep the reaction cold, and stir for 4 hours before quenching with saturated NH$_4$Cl and an equivalent volume of water. Separate the mixture, and extract the aqueous phase with diethyl ether. Wash the combined organic phases with water then brine, dry with calcium chloride, filter, and concentrate to give a golden oil of crude compound, which is crystallized using hexanes to give 4.48 g (82%) of 4-chloro-2-(hydroxypropan-2-yl)phenol as off white needles. $^1$H NMR (400 MHz, CDCl$_3$) δ 8.92 (s, 1H), 7.09 (dd, J=8.6, 2.6 Hz, 1H), 7.02 (d, J=2.6 Hz, 1H), 6.77 (d, J=8.6 Hz, 1H), 2.51 (s, 1H), 1.64 (s, 6H). $^{13}$C NMR (101 MHz, CDCl$_3$) δ 154.13, 132.28, 128.63, 125.27, 124.24, 118.83, 75.89, 30.26. MS: m/e 186.

Preparation 22: Preparation of 4-chloro-2-isopropylphenol.

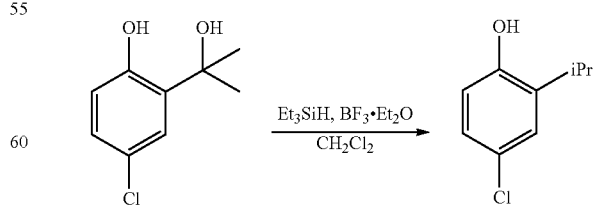

To a −10° C. solution of 4-chloro-2-(hydroxypropan-2-yl)phenol (6.00 g, 32.15 mmol) in 100 mL of methylene chloride add triethylsilane (31.0 mL, 194.08 mmol) and boron trifluo ride diethyl etherate (66 mL, 520.82 mmol) dropwise over a period of 10 minutes. Keep the reaction mixture cold and stir for an additional hour before quenching with aqueous sodium bicarbonate. Separate the mixture, and extract the aqueous phase with methylene chloride. Wash combined organic phases with aqueous sodium bicarbonate and brine, dry over anhydrous magnesium sulfate, filter, and concentrate to give a purple oil. Purify by flash chromatography using 25% ethyl acetate in hexanes to give 4.37 g (80%) of pure 4-chloro-2-isopropylphenol as a clear oil. $^1$H NMR (400 MHz, CDCl$_3$) δ 7.15 (d, J=2.6 Hz, 1H), 7.01 (dd, J=8.5, 2.6 Hz, 1H), 6.66 (d, J=8.5 Hz, 1H), 4.77 (s, 1H), 3.17 (sept, 1H), 1.24 (d, J=6.9 Hz, 6H). $^{13}$C NMR (101 MHz, CDCl$_3$) δ 151.26, 136.37, 126.56, 126.36, 125.81, 116.46, 27.14, 22.33. MS: m/e 171.

Preparation 23: Preparation of 4-chloro-2-iodo-6-isopropylphenol.

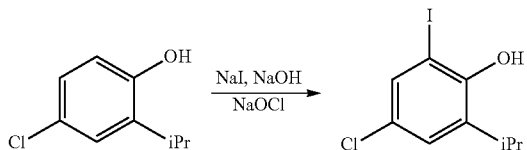

Replicate Preparation 7 except use 4-chloro-2-isopropylphenol to give 3.90 g (86%) of pure 4-chloro-2-iodo-6-isopropylphenol as a dark red oil. $^1$H NMR (400 MHz, CDCl$_3$) δ 7.45 (d, J=2.5 Hz, 1H), 7.13 (d, J=2.5 Hz, 1H), 5.26 (s, 1H), 3.27 (sept, 1H), 1.21 (d, J=6.9 Hz, 6H). $^{13}$C NMR (101 MHz, CDCl$_3$) δ 150.76, 136.49, 134.10, 127.23, 126.16, 86.25, 28.58, 22.18. MS: m/e 297.

Preparation 24: Preparation of 1,3-bis(4-chloro-2-iodo-6-isopropylphenoxy)propane.

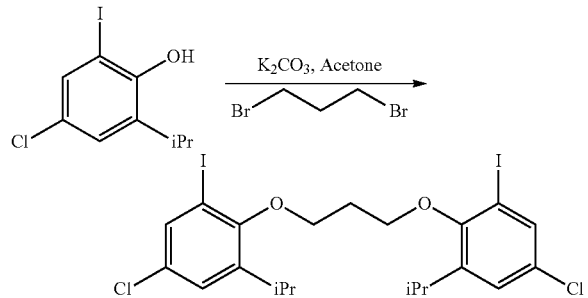

Replicate Preparation 8 except use 4-chloro-2-iodo-6-isopropylphenol to give 2.87 g (77%) of pure 1,3-bis(4-chloro-2-iodo-6-isopropylphenoxy)propane as white powder. $^1$H NMR (400 MHz, CDCl$_3$) δ 7.60 (d, J=2.5 Hz, 2H), 7.20 (d, J=2.4 Hz, 2H), 4.09 (t, J=6.4 Hz, 4H), 3.32 (sept, 2H), 2.47 (p, J=6.4 Hz, 2H), 1.22 (d, J=6.9 Hz, 12H). $^{13}$C NMR (101 MHz, CDCl$_3$) δ 154.73, 144.29, 136.10, 130.49, 127.29, 92.53, 71.27, 31.15, 27.79, 23.69. MS: m/e 632.

Preparation 25: Preparation of 2-(3-bromopropoxy)-5-chloro-1-iodo-3-methylbenzene.

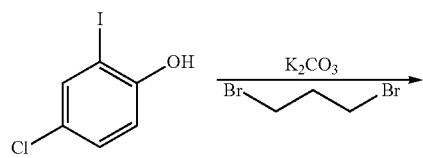

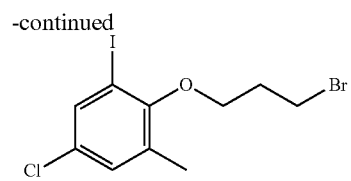

To a solution of 9.37 g (34.90 mmol) of (P11) and 9.78 g (70.76 mmol) of potassium carbonate in 240 mL of acetone add 70 mL of 1,3-dibromopropane. Reflux overnight, filter, then concentrate, resulting in a brown oil, which is purified by flash chromatography using 2% ethyl acetate in hexanes to give 11.61 g (85%) of 2-(3-bromopropoxy)-5-chloro-1-iodo-3-methylbenzene as a clear oil. $^1$H NMR (400 MHz, CDCl$_3$) δ 7.60-7.55 (m, 1H), 7.16-7.10 (m, 1H), 3.94 (t, J=5.8 Hz, 2H), 3.70 (t, J=6.5 Hz, 2H), 2.38 (p, J=6.1 Hz, 2H), 2.31 (s, 3H). $^{13}$C NMR (101 MHz, CDCl$_3$) δ 155.43 (s), 136.18 (s), 133.31 (s), 131.33 (s), 129.94 (s), 92.16 (s), 69.97 (s), 33.25 (s), 30.02 (s), 17.03 (s). GCMS (m/e): 390 (M$^+$).

Preparation 26: Preparation of 5-chloro-2-(3-(4-chloro-2-iodophenoxy)propoxy)-1-iodo-3-methylbenzene.

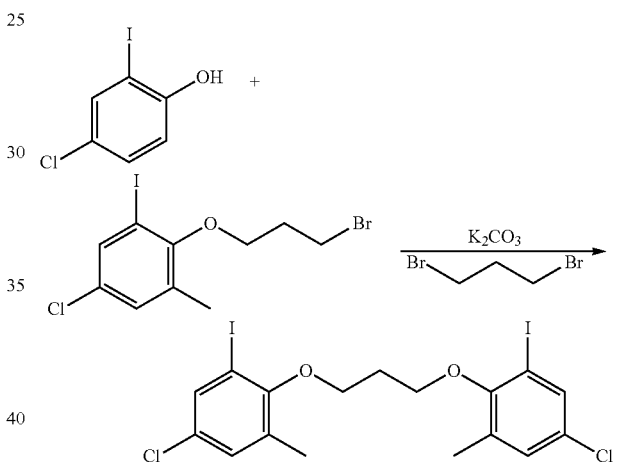

In 70 mL of acetone combine 4.08 g (10.48 mmol) of 2-(3-bromopropoxy)-5-chloro-1-iodo-3-methylbenzene, 2.67 g (10.49 mmol) of 2-iodo-4-chlorophenol (Prepared in a manner similar to Preparation 7) and 3.06 g (22.14 mmol) of potassium carbonate. Reflux overnight, filter, cool and concentrate to give an off white solid, which is crystallized using acetonitrile to yield 5.18 g (88%) of 5-chloro-2-(3-(4-chloro-2-iodophenoxy)propoxy)-1-iodo-3-methylbenzene as a white powder. $^1$H NMR (400 MHz, CDCl$_3$) δ 7.74 (d, J=2.5 Hz, 1H), 7.58 (d, J=2.4 Hz, 1H), 7.31-7.23 (m, 1H), 7.16-7.10 (m, 1H), 6.76 (d, J=8.8 Hz, 1H), 4.28 (t, J=5.8 Hz, 2H), 4.09 (t, J=6.0 Hz, 2H), 2.36 (p, J=5.9 Hz, 2H), 2.26 (s, 3H). $^{13}$C NMR (101 MHz, CDCl$_3$) δ 156.17, 155.57, 138.56, 136.17, 133.37, 131.34, 129.89, 129.24, 126.36, 112.21, 92.21, 86.64, 68.85, 65.57, 29.85, 17.02. GCMS (m/e): 562 (M$^+$).

Preparation 27: Preparation of 2-(4-methoxyphenoxy)tetrahydro-2H-pyran: in a manner similar to Preparation 5 stir 4-methoxyphenol (0.161 mol), 3,4-dihydro-2H-pyran (0.193 mol), CH$_2$Cl$_2$ (50 mL), p-TsOH (0.161 mol) at 0° C. for 10 minutes, then add triethylamine (1.77 mol). Evaporate, add diethyl ether (Et$_2$O), and extractively work up to give 33.5 g (100%) of 2-(4-methoxyphenoxy)tetrahydro-2H-pyran as a yellow oil. $^1$H NMR (400 MHz, CDCl$_3$) δ 7.06-6.95 (m, 2H), 6.89-6.77 (m, 2H), 5.31 (t, J=3.3 Hz, 1H), 4.00-3.89 (m, 1H), 3.78 (s, 3H), 3.64-3.56 (m, 1H), 2.07-1.93 (m, 1H), 1.88-1.83 (m, 2H), 1.65 (m, 3H). $^{13}$C NMR (101 MHz, CDCl$_3$) δ 154.49, 151.09, 117.78, 114.49, 97.31, 62.11, 55.67, 30.50, 25.27, 18.95.

Preparation 28: Preparation of 2-(4-methoxy-2-methylphenoxy)tetrahydro-2H-pyran:

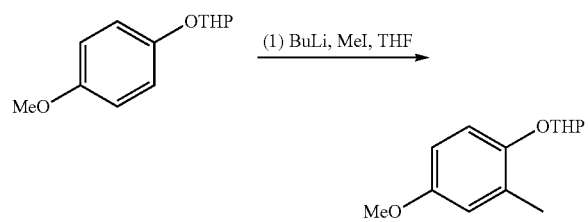

Dissolve 2-(4-methoxyphenoxy)tetrahydro-2H-pyran (20 g, 96 mmol, Preparation 27) in 200 mL anhydrous THF at 0° C. under nitrogen atmosphere. Add n-butyl lithium (n-BuLi) (78 mL, 1.6 M in hexanes, 125 mmol) dropwise via an additional funnel. Stir the resulting mixture at 0° C. for 3 hours. Add CH$_3$I (7.8 mL, 125 mmol) in one batch. After 10 minutes add water. Rotary evaporate off volatiles, extract residue with Et$_2$O and dry to give 21.3 g (100%) of 2-(4-methoxy-2-methyl-phenoxy)tetrahydro-2H-pyran as a yellow oil (21.3 g, 100%). $^1$H NMR (400 MHz, CDCl$_3$) δ 7.03 (d, J=8.8 Hz, 1H), 6.75 (d, J=3.0 Hz, 1H), 6.68 (dd, J=8.8, 3.1 Hz, 1H), 5.30 (t, J=3.3 Hz, 1H), 3.96 (ddd, J=12.0, 9.2, 3.1 Hz, 1H), 3.78 (s, 3H), 3.67-3.56 (m, 1H), 2.28 (s, 3H), 2.10-1.96 (m, 1H), 1.94-1.83 (m, 2H), 1.67 (m, 3H). $^{13}$C NMR (101 MHz, CDCl$_3$) δ 154.14, 149.33, 128.78, 116.55, 115.79, 111.08, 97.20, 62.15, 55.56, 30.73, 25.38, 19.14, 16.55.

Preparation 29: Preparation of 2-iodo-4-methoxy-6-methylphenol: Dissolve 2-(4-methoxy-2-methylphenoxy)tetrahydro-2H-pyran (5 g, 22 mmol, Preparation 28) in 60 mL anhydrous THF at 0° C. under nitrogen atmosphere. Add n-BuLi (22.5 mL, 36 mmol, 1.6 M in Hexanes) dropwise. Stir the resulting mixture at 0° C. for 3 hours. Add I$_2$ (7.4 g, 29 mmol). After 10 minutes add water. Extract the quenchate with Et$_2$O, wash using 10% Na$_2$S$_2$O$_3$ (aqueous), and rotary evaporate off volatiles. Add methanol (10 mL), THF (10 mL) and one drop of concentrated HCl (aqueous). Heat the resulting solution at reflux for 2 hours, rotary evaporate, and purify the resulting dark brown oil by flash chromatography using hexanes:EtOAc (95:5) as the eluent to give 3.0 g (47%) of 2-iodo-4-methoxy-6-methylphenol as a white solid. $^1$H NMR (400 MHz, CDCl$_3$) δ 7.03 (d, J=2.9 Hz, 1H), 6.73 (d, J=2.9 Hz, 1H), 4.94 (s, 1H), 3.75 (s, 3H), 2.30 (s, 3H).

Preparation 30: Preparation of 1,3-bis(2-iodo-4-methoxy-6-methylphenoxy)propane:

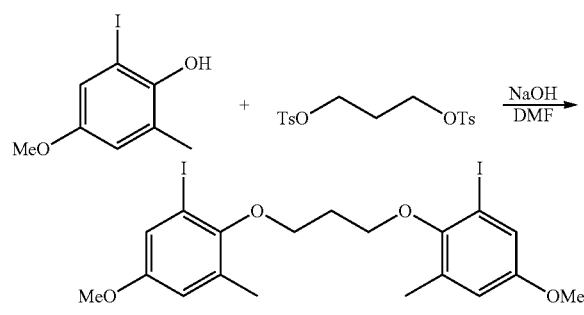

Add 2-iodo-4-methoxy-6-methylphenol (1.0 g, 3.79 mmol, Preparation 29), propane-1,3-ditosylate (0.728 g, 1.89 mmol), and NaOH (0.454 g, 11.36 mmol) to 20 mL anhydrous dimethylformamide (DMF) under nitrogen atmosphere. Heat the resulting mixture to reflux for 2 hours. Partition between water and Et$_2$O, and wash organic layer with water to remove DMF. Rotary evaporate Et2O layer, and purify residue by flash chromatography using Hexanes:EtOAc (95:5) as the eluent to give 0.82 g (75%) of 1,3-bis(2-iodo-4-methoxy-6-methylphenoxy)propane as a white solid. $^1$H NMR (400 MHz, CDCl$_3$) δ 7.15 (d, J=2.5 Hz, 2H), 6.73 (d, J=2.5 Hz, 2H), 4.09 (t, J=6.4 Hz, 4H), 3.77 (s, 6H), 2.53-2.39 (m, 2H), 2.35 (s, 6H). $^{13}$C NMR (101 MHz, CDCl$_3$) δ 156.16, 151.16, 132.46, 121.44, 117.32, 92.07, 70.30, 55.70, 31.14, 17.61.

Preparation 31: Preparation of 2-(2,3-dimethylphenoxy)tetrahydro-2H-pyran: in a manner similar to Preparation 27 except use 2,3-Dimethylphenol (20 g, 0.164 mol), 1,2-dihydropyran (17.9 mL, 0.196 mol), p-toluenesulfonic acid (1.64 mmol), and triethylamine (1.80 mmol) to give 33.0 g (100%) of 2-(2,3-dimethylphenoxy)tetrahydro-2H-pyran as a yellow oil. $^1$H NMR (400 MHz, CDCl$_3$) δ 7.02 (t, J=7.8 Hz, 1H), 6.94 (d, J=8.1 Hz, 1H), 6.79 (d, J=7.4 Hz, 1H), 5.38 (t, J=3.2 Hz, 1H), 3.95-3.81 (m, 1H), 3.58 (dtd, J=11.2, 4.1, 1.3 Hz, 1H), 2.26 (s, 3H), 2.18 (s, 3H), 2.08-1.97 (m, 1H), 1.91-1.85 (m, 2H), 1.74-1.57 (m, 3H). $^{13}$C NMR (101 MHz, CDCl$_3$) δ 155.00, 137.89, 125.92, 125.85, 123.15, 112.16, 96.46, 62.07, 30.75, 25.48, 20.23, 19.15, 11.90.

Preparation 32: Preparation of 2-iodo-5,6-dimethylphenol: in a manner similar to Preparation 28 except use 2-(2,3-dimethylphenoxy)tetrahydro-2H-pyran (Preparation 31) to give 2-iodo-5,6-dimethylphenol (34%) as an oil. $^1$H NMR (400 MHz, CDCl$_3$) δ 7.39 (d, J=8.1 Hz, 1H), 6.55 (d, J=8.1 Hz, 1H), 5.26 (s, 1H), 2.27 (s, 3H), 2.26 (s, 3H).

Preparation 33: Preparation of 1,3-bis(2-iodo-5,6-dimethylphenoxy)propane: replicate Preparation 8 except use 2-iodo-5,6-dimethylphenol (Preparation 32) instead of 2,4-difluoro-6-iodophenol (P7) to give 1,3-bis(2-iodo-5,6-dimethylphenoxy)propane (77%) as a white solid. $^1$H NMR (400 MHz, CDCl$_3$) δ 7.54 (d, J=7.9 Hz, 2H), 6.71 (d, J=7.9 Hz, 2H), 4.12 (t, J=6.5 Hz, 4H), 2.61-2.41 (m, 2H), 2.31 (s, 6H), 2.27 (s, 6H). $^{13}$C NMR (101 MHz, CDCl$_3$) δ 156.74, 139.11, 136.02, 131.31, 127.47, 88.79, 70.35, 31.12, 19.93, 13.65.

Preparation 34: Preparation of 1,3-bis(2-methyl-4-(1,1-dimethylethyl)phenoxy)propane: replicate Preparation 30 except use 2-methyl-4-(1,1-dimethylethyl)phenol (Aldrich Chemical) instead of 2-iodo-4-methoxy-6-methylphenol to give 1,3-bis(2-methyl-4-(1,1-dimethylethyl)phenoxy)propane (64%) after crystallization from methanol. $^1$H NMR (400 MHz, CDCl$_3$) δ 7.18-7.11 (m, 4H), 6.76 (d, J=8.2 Hz, 2H), 4.15 (t, J=6.1 Hz, 4H), 2.27 (p, J=6.1 Hz, 2H), 2.22 (s, 6H), 1.29 (s, 18H). $^{13}$C NMR (101 MHz, CDCl$_3$) δ 154.77, 142.90, 127.88, 126.04, 123.18, 110.35, 64.52, 33.96, 31.57, 29.64, 16.54.

Preparation 35: Preparation of 1,3-bis(6-bromo-2-methyl-4-(1,1-dimethylethyl)phenoxy)propane:

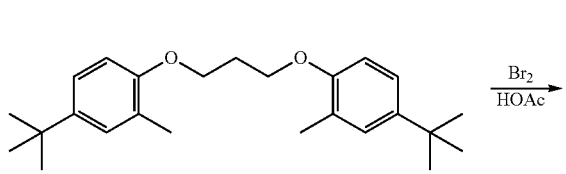

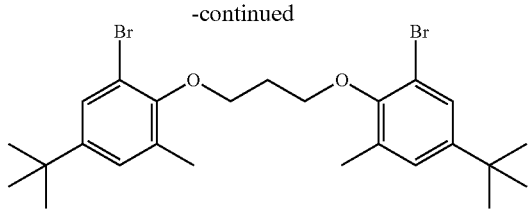

Charge a 50 mL round bottom flask with 1,3-bis(4-(tert-butyl)-2-methylphenoxy)propane (15 g, 40.7 mmol, Preparation 34) and Et$_2$O (5 mL). Gently heat the resulting mixture to get a clear solution. Add acetic acid (HOAc) (50 mL). Cool the resulting solution using a 10° C. water bath. Add bromine (5.0 mL, 97.68 mmol) dropwise. Stir the resulting mixture at room temperature for overnight, filter off white solids. Wash solids with MeOH, and dry in vacuo to give 17.36 g (81%) 1,3-bis(6-bromo-2-methyl-4-(1,1-dimethylethyl)phenoxy)propane. $^1$H NMR (400 MHz, CDCl$_3$) δ 7.35 (d, J=2.1 Hz, 2H), 7.10 (d, J=2.1 Hz, 2H), 4.13 (t, J=6.4 Hz, 4H), 2.40-2.33 (m, 2H), 2.32 (s, 6H), 1.27 (s, 18H). $^{13}$C NMR (101 MHz, CDCl$_3$) δ 152.07, 148.19, 132.30, 127.96, 127.49, 117.00, 69.90, 34.34, 31.34, 31.18, 17.17.

Preparation 36: Preparation of 2-bromo-5-(1,1-dimethylethyl)phenol: Dissolve tetrabutylammonium tribromide (48.1 g, 100 mmol) and 2-tert-butylphenol (15 g, 100 mmol) in CH$_2$Cl$_2$ (180 mL) and MeOH (120 mL) at 0° C., and stir overnight. Evaporate the solvent, and partition residue between Et$_2$O (150 mL×3) and water (200 mL). Combine organic layers, and wash with 1 M HCl (aqueous, 200 mL) and brine (100 mL), dry over MgSO$_4$, filter, and rotary evaporate to give 23 g (100%) of 2-bromo-5-(1,1-dimethylethyl)phenol as a yellowish oil. $^1$H NMR (400 MHz, CDCl$_3$) δ 7.39 (d, J=8.5 Hz, 1H), 7.09 (d, J=2.3 Hz, 1H), 6.87 (dd, J=8.5, 2.3 Hz, 1H), 5.57 (s, 1H), 1.31 (s, 9H). $^{13}$C NMR (101 MHz, CDCl$_3$) δ 153.15, 151.81, 131.37, 119.22, 113.48, 106.88, 34.68, 31.20.

Preparation 37: Preparation of 1,3-bis(2-bromo-5-(1,1-dimethylethyl)phenoxy)propane:

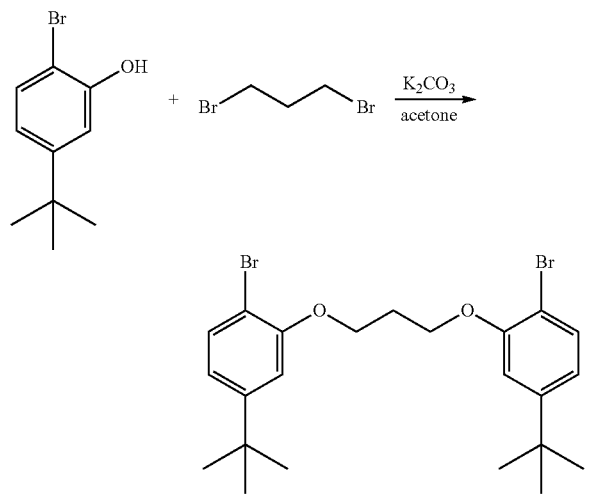

Replicate Preparation 8 except use 2-bromo-5-(1,1-dimethylethyl)phenol (Preparation 36) instead of 2,4-difluoro-6-iodophenol (P7) to give 1,3-bis(2-bromo-5-(1,1-dimethylethyl)phenoxy)propane (74%) as a white solid after crystallization using hot methanol. $^1$H NMR (400 MHz, CDCl$_3$) δ 7.46 (d, J=8.3 Hz, 2H), 7.02 (d, J=2.1 Hz, 2H), 6.90 (dd, J=8.3, 2.1 Hz, 2H), 4.35 (t, J=6.0 Hz, 4H), 2.40 (p, J=6.0 Hz, 2H), 1.33 (s, 18H). $^{13}$C NMR (101 MHz, CDCl$_3$) δ 154.83, 152.33, 132.55, 119.23, 111.25, 109.15, 65.60, 34.88, 31.31, 29.34.

Preparation 38: Preparation of 2-bromo-6-chloro-4-(1,1-dimethylethyl)phenol: replicate Preparation 36 except use 2-chloro-4-(1,1-dimethylethyl)phenol instead of 2-tert-butylphenol to give 2-bromo-6-chloro-4-(1,1-dimethylethyl)phenol (98%) as a yellow oil. $^1$H NMR (400 MHz, CDCl$_3$) δ 7.39 (d, J=2.2 Hz, 1H), 7.29 (d, J=2.2 Hz, 1H), 5.75 (s, 1H), 1.27 (s, 10H).

Preparation 39: Preparation of 1,3-bis(2-bromo-6-chloro-4-(1,1-dimethylethyl)phenoxy)propane:

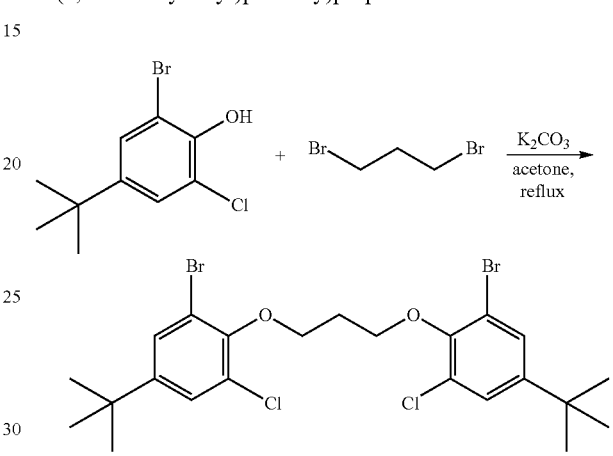

Replicate Preparation 8 except use 2-bromo-6-chloro-4-(1,1-dimethylethyl)phenol (Preparation 38) instead of 2,4-difluoro-6-iodophenol (P7) to give 1,3-bis(2-bromo-6-chloro-4-(1,1-dimethylethyl)phenoxy)propane as a white solid (59%). $^1$H NMR (400 MHz, CDCl$_3$) δ 7.43 (d, J=2.3 Hz, 2H), 7.31 (d, J=2.3 Hz, 2H), 4.27 (t, J=6.4 Hz, 4H), 2.41 (p, J=6.4 Hz, 2H), 1.28 (s, 18H). $^{13}$C NMR (101 MHz, CDCl$_3$) δ 150.00, 149.22, 129.02, 128.49, 126.89, 118.08, 70.70, 34.60, 31.12, 30.94.

Preparation 40: Preparation of 1,4-bis(2-bromo-5-(1,1-dimethylethyl)phenoxy)butane: replicate Preparation 37 except use 1,4-dibromobutane instead of 1,3-dibromopropane to give 1,4-bis(2-bromo-5-(1,1-dimethylethyl)phenoxy)butane (35%) as colorless crystals after crystallization using hexanes. $^1$H NMR (400 MHz, C$_6$D$_6$) δ 7.54 (d, J=8.4 Hz, 2H), 6.91 (d, J=2.1 Hz, 2H), 6.73 (dd, J=8.4, 2.1 Hz, 2H), 3.80 (t, J=5.1 Hz, 4H), 1.94 (t, J=5.3 Hz, 4H), 1.30 (s, 18H).

Preparation 41: Preparation of 4-chloro-2-ethylphenol: to a stirred solution of 1.7 g (9.96 mmol) of 1-(5-chloro-2-hydroxyphenyl)ethanone in 20 mL of CH$_2$Cl$_2$ and 11.34 g (99.47 mmol) of trifluoroacetic acid, slowly add 3.46 g of (29.82 mmol) of triethylsilane. Stir resulting solution at room temperature for 18 hours, and remove volatiles and excess reagents under reduced pressure to give 1.52 g (97.4%) of 4-chloro-2-ethylphenol as an oil. $^1$H NMR (500 MHz, CDCl$_3$) δ 7.09 (d, J=2.6 Hz, 1H), 7.03-7.01 (m, 1H), 6.65 (d, J=8.5 Hz, 1H), 4.82 (s, 1H), 2.58 (q, J=7.6 Hz, 2H) and 1.21 (t, J=7.6 Hz, 3H). $^{13}$C NMR (126 MHz, CDCl$_3$) δ 151.85, 131.82, 129.62, 126.62, 125.60, 116.28, 22.81 and 13.60. MS m/e 157. The 4-chloro-2-ethylphenol can be used in Preparation 13b.

Preparation 42: Preparation of 2-iodo-5-(1,1-dimethylethyl)phenol: replicate Preparation 2 except use 3-(1,1-dimethylethyl)phenol instead of 4-(2,4,4-trimethylpentan-2-yl)phenol to give 2-iodo-5-(1,1-dimethylethyl)phenol (84%) as clear, light red crystals after crystallization from hexanes. $^1$H NMR (400 MHz, CDCl$_3$) δ 7.55 (d, J=8.4 Hz, 1H), 7.04 (d, J=2.3 Hz, 1H), 6.73 (dd, J=8.4, 2.3 Hz, 1H), 5.20 (s, 1H), 1.29 (s, 8H). $^{13}$C NMR (101 MHz, CDCl$_3$) δ 154.39 (d, J=14.9 Hz), 137.53, 119.95, 112.54, 81.74, 77.32, 76.68, 34.62, 31.12. MS m/e 277 (M+H).

Preparation 43: Preparation of 4-chloro-2-iodo-5-(1,1-dimethylethyl)phenol: to 35 mL of trimethyl phosphate (TMP) at 0° C. to 10° C. add 2-iodo-5-(1,1-dimethylethyl)phenol (6.61 g, 23.95 mmol, Preparation 42). To this solution add dropwise over the period of one minute sulfuryl chloride (2.0 mL, 24.67 mmol) in 35 mL of TMP, and then stir the resulting mixture for 30 minutes still at 0-10° C. To the reaction mixture add 130 mL of water, and then extract the resulting quenchate into CH$_2$Cl$_2$. Dry combined organic phases over anhydrous MgSO$_4$, filter through silica gel, and concentrate filtrate. Purify residue by flash chromatography using 5% ethyl acetate in hexanes to give 3.79 g (51%) of 4-chloro-2-iodo-5-(1,1-dimethylethyl)phenol as a golden oil. $^1$H NMR (400 MHz, CDCl$_3$) δ 7.58 (s, 1H), 7.05 (s, 1H), 5.21 (s, 1H), 1.43 (s, 9H). $^{13}$C NMR (101 MHz, CDCl$_3$) δ 153.73, 149.02, 139.63, 125.69, 114.23, 81.61, 77.32, 76.68, 36.03, 29.29. MS m/e 310.

Preparation 44: Preparation of 1,3-bis(4-chloro-2-iodo-5-(1,1-dimethylethyl)phenoxy)propane:

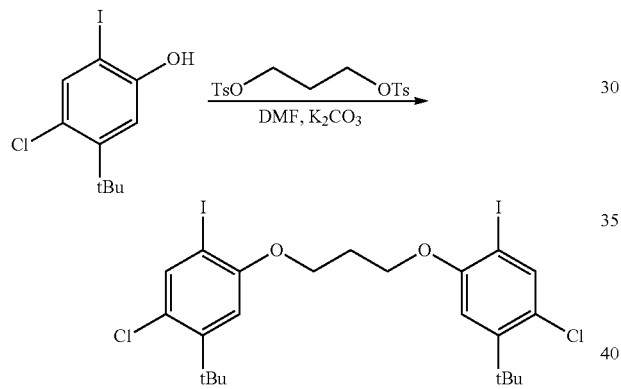

Replicate Preparation 30 except use 4-chloro-2-iodo-5-(1,1-dimethylethyl)phenol (Preparation 43) instead of 1,3-bis(2-iodo-4-methoxy-6-methylphenoxy)propane, potassium carbonate instead of NaOH, and a reaction temperature of 100° C. for 30 minutes instead of reflux for 2 hours to give 1,3-bis(4-chloro-2-iodo-5-(1,1-dimethylethyl)phenoxy)propane (86%) as an off-white solid. $^1$H NMR (400 MHz, CDCl$_3$) δ 7.68 (s, 2H), 6.91 (s, 2H), 4.28 (t, J=5.9 Hz, 4H), 2.34 (p, J=5.9 Hz, 2H), 1.45 (s, 18H). $^{13}$C NMR (101 MHz, CDCl$_3$) δ 156.20, 148.04, 140.92, 126.22, 111.83, 83.38, 65.93, 36.30, 29.35. MS m/e 660.

Some embodiments of the invention are described in more detail in the following Examples.

In some embodiments the invention provides the compound prepared in any one of the aforementioned Preparations.

LIGAND EXAMPLES

Example (Q1): preparation of ligand, 2',2''-(propane-1,3-diylbis(oxy))bis(3-(3,6-di-tert-butyl-9H-carbazol-9-yl)-3', 5'-difluoro-5-(2,4,4-trimethylpentan-2-yl)biphenyl-2-ol), (Q1).

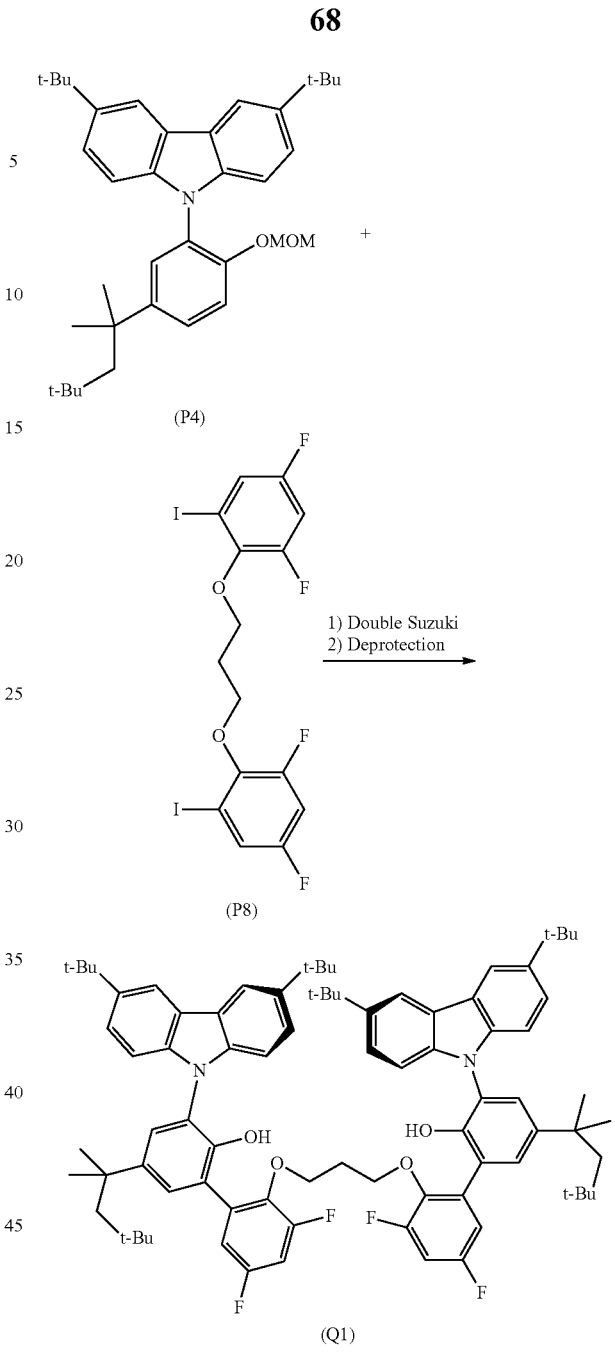

(General Procedure for Double Suzuki Reaction and Deprotection Reaction). To a stirred solution of 2.67 g of 3,6-di-tert-butyl-9-(2-(methoxymethoxy)-5-(2,4,4-trimethylpentan-2-yl)phenyl)-9H-carbazole (P4), Preparation 3 in 40 mL of tetrahydrofuran at 0° C. under nitrogen atmosphere add 3.50 mL (8.75 mmol) of n-butyl lithium (2.5 M solution in hexanes) over a period of 10 minutes. Stir the resulting solution at 0° C. for three more hours. Add tri-isopropyl borate (2.0 mL, 8.67 mmol) and continue stirring at 0° C. for 1 hour. Slowly warm the mixture to room temperature, and stir for 3 more hours at room temperature. Concentrate the warmed reaction mixture to dryness by rotary evaporation, and add 100 mL of ice cold water. Acidify the resulting mixture using 2 Normal (N) aqueous hydrochloric acid, and extract with methylene chloride. Remove the solvent (methylene chloride) by rotary evaporation, and dissolve the residue in 45 mL of dimethoxyethane. Treat this solution with a solution of 0.80 g of NaOH in 16 mL of water, 16 mL of tetrahydrofuran and 1.38 g of 1,3-bis(2,4-difluoro-6-iodophenoxy)propane (P8), Preparation 8. Purge the resulting system with nitrogen gas, and add 0.15 g (0.13 mmol) of Pd(PPh$_3$)$_4$ (Ph is phenyl). Heat the resulting mixture to 85° C. for 36 hours under nitrogen gas atmosphere. Cool the reaction mixture, and remove volatiles by rotary evaporation. Treat the resulting residue with 100 mL of water, and extract with methylene chloride. Wash the methylene chloride solution with water and brine, and dry over anhydrous magnesium sulfate. Pass the resulting dried solution through a small bed of silica gel, and concentrate by rotary evaporation. Dissolve the resulting residue in 25 mL of tetrahydrofuran, and treat the THF solution with 150 mL of methanol and 0.1 g of para-toluenesulfonic acid (0.40 mL of concentrated hydrochloric acid could be used instead). Reflux the resulting solution for 24 hours. Cool the solution and pass it through a small bed of silica gel, and wash with methanol. Keep the resulting solution in a fume hood and allow slow evaporation of the solvent. Purify the resulting crude product by flash chromatography using 5% ethyl acetate in hexanes to yield 2.1 g (66.6%) of (Q1) as a white powder.

$^1$H NMR (CDCl$_3$) δ 8.15 (d, J=1.51 Hz, 4H), 7.41-7.34 (m, 8H), 7.04 (d, J=8.6 Hz, 4H), 6.92 (m, 2H), 7.79 (m, 2H), 5.63 (s, 2H), 3.93 (t, J=5.7 Hz, 4H), 1.84 (quintet, J=5.7 Hz, 2H), 1.71 (s, 4H), 1.45 (s, 36H), 1.35 (s, 12H) and 0.78 (s, 18H).

$^{13}$C{$^1$H} NMR (75 MHz, CDCl$_3$) δ 157.71 (dd, J=244.5, 12.5 Hz), 155.39 (dd, J=249.7, 13.0 Hz), 149.87-147.30 (m), 142.98 (s), 142.86 (s), 140.20 (dd, J=11.5, 3.6 Hz), 139.39 (s), 134.27 (d, J=10.9 Hz), 128.75 (s), 127.29 (s), 124.78 (s), 123.67 (s), 123.48 (s), 116.34 (s), 113.36 (d, J=22.8 Hz), 109.22 (s), 104.32 (dd, J=25.9, 24.7 Hz), 71.25 (s), 57.09 (s), 38.32 (s), 34.82 (s), 32.51 (s), 32.13 (s), 31.95 (s), 31.66 (s), 30.56 (s), 30.45 (s).

$^{19}$F NMR (282 MHz) δ −114.73 (m), −124.09 (m).

ES-HRMS: m/e calcd for (M+Na, C$_{83}$H$_{98}$N$_2$F$_4$O$_4$Na) 1285.736. Found 1285.743.

Example Q2: preparation of ligand, 2',2"-(propane-1,3-diylbis(oxy))bis(3-(3,6-di-tert-butyl-9H-carbazol-9-yl)-3', 5'-dichloro-5-(2,4,4-trimethylpentan-2-yl)biphenyl-2-ol), (Q2).

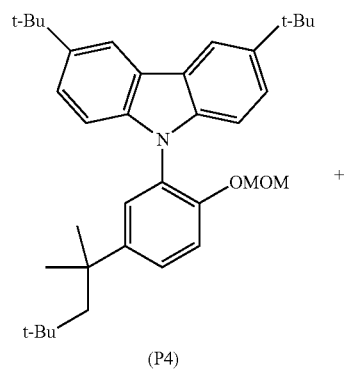

(P4)

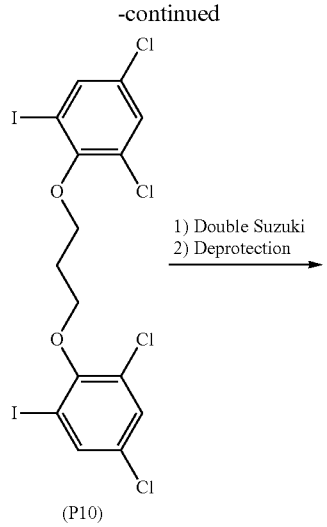

(P10)

1) Double Suzuki
2) Deprotection

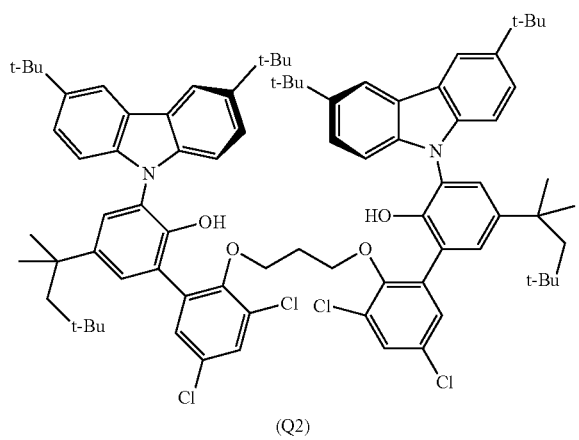

(Q2)

In a manner similar to the preparation of (Q1) (Example Q1) except use 3.4 g instead of 2.67 g of 3,6-di-tert-butyl-9-(2-(methoxymethoxy)-5-(2,4,4-trimethylpentan-2-yl)phenyl)-9H-carbazole (P4) and 1.89 g of (P10) instead of (P8) (Preparation 8), prepare crude (Q2). Purify crude (P12) by flash chromatography on silica gel using 3% tetrahydrofuran in hexanes to afford 1.95 g (48%) of (Q2) as a white solid.

$^1$H NMR (CDCl$_3$) δ 8.16 (d, J=1.8 Hz, 4H), 7.43-7.33 (m, 12H), 7.06 (d, J=8.5 Hz, 4H), 5.44 (s, 2H), 3.85 (t, J=6.4 Hz, 4H), 1.90 (quintet, J=6.4 Hz, 2H), 1.71 (s, 4H), 1.46 (s, 36H), 1.34 (s, 12H) and 0.78 (s, 18H).

$^{13}$C{$^1$H} NMR (CDCl$_3$) δ 151.12, 147.42, 143.29, 143.12, 139.42, 134.63, 130.53, 129.51, 129.45, 129.18, 128.81, 127.48, 124.75, 124.67, 123.86, 123.58, 116.45, 109.21, 71.23, 56.95, 38.26, 34.74, 32.39, 32.00, 31.86, 31.58, 30.56.

ES-HRMS: m/e calcd for (M+NH$_4$, C$_{83}$H$_{102}$N$_3$Cl$_4$O$_4$) 1344.662. Found 1344.663.

Example Q3: preparation of ligand, 2',2"-(propane-1,3-diylbis(oxy))bis(5'-chloro-3-(3,6-di-tert-butyl-9H-carbazol-9-yl)-3'-methyl-5-(2,4,4-trimethylpentan-2-yl)biphenyl-2-ol), (Q3).

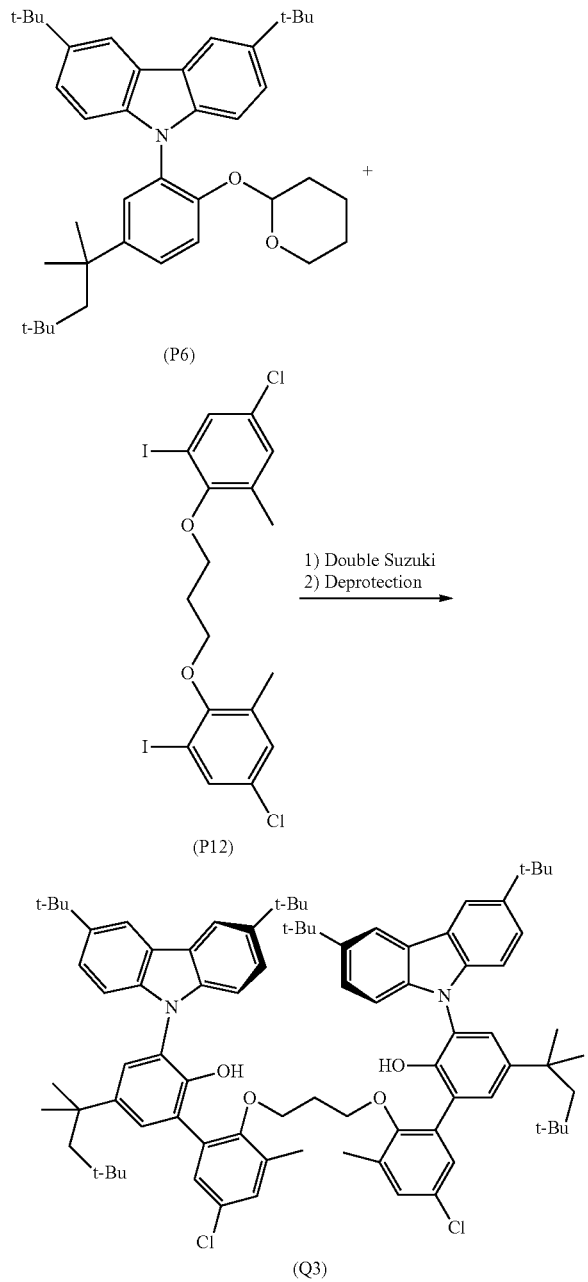

To a stirred solution of 2.5 g (4.41 mmol) of 3,6-di-tert-butyl-9-(2-(methoxymethoxy)-5-(2,4,4-trimethylpentan-2-yl)phenyl)-9H-carbazole (P6) (Preparation 6) in 25 mL of tetrahydrofuran at 0° C. under nitrogen atmosphere add 4.05 mL (10.13 mmol) of n-butyl lithium (2.5 M solution in hexanes) over a period of 10 minutes. Stir the resulting solution at 0° C. for three hours. To the resulting mixture add tri-isopropyl borate (2.40 mL, 10.40 mmol), and continue stirring at 0° C. for 1 hour. Allow the mixture to slowly warm to room temperature, and stir it at room temperature for 3 hours. Concentrate the reaction mixture to dryness by rotary evaporation, and add to the resulting residue 100 mL of ice cold water. Acidify the resulting mixture using 2 Normal (N) aqueous hydrochloric acid, and extract the acidified mixture with methylene chloride. Wash the methylene chloride solution extract with water and brine. Remove the methylene chloride by rotary evaporation, and dissolve the resulting residue in 50 mL of dimethoxyethane. Treat this solution with a solution of 0.53 g (13.25 mmol) of NaOH in 16 mL of water, 16 mL of tetrahydrofuran (THF), and 1.27 g (2.20 mmol) of 1,3-bis(4-chloro-2-iodo-6-methylphenoxy)propane (P12) (Preparation 12) to give a treated mixture in a flask. Purge the flask containing the treated mixture with nitrogen gas, and add 0.20 g (0.17 mmol) of palladium tetrakis(triphenylphosphine (Pd (PPh$_3$)$_4$). Heat the resulting mixture to 85° C. for 36 hours under nitrogen atmosphere. Cool the reaction mixture and remove volatiles by rotary evaporation. Treat the resulting residue with 100 mL of water, and extract with methylene chloride. Wash the methylene chloride solution with water and brine, dry over anhydrous magnesium sulfate, and rotary evaporate to give a residue. Dissolve the residue in 100 mL of THF/methanol (MeOH) (1:1), heat the solution to 50° C., add 50 mg of para-toluenesulfonic acid, and stir for 5 hours. Remove the THF and MeOH, and purify the resulting residue by flash chromatography on silica gel using 5% ethyl acetate in hexanes to give partially purified (Q3). Further purify by crystallization from THF/MeOH to afford 1.45 g (51.2%) of (Q3) as a white solid.

$^1$H NMR (CDCl$_3$) δ 8.14 (d, J=1.78 Hz, 4H), 7.42 (d, J=2.3 Hz, 2H), 7.36 (m, 6H), 7.23 (d, J=2.75 Hz, 2H), 7.13 (d, J=2.75 Hz, 2H), 7.02 (d, J=8.5 Hz, 4H), 6.14 (s, 2H), 3.65 (t, J=6.3 Hz, 4H), 2.05 (s, 6H), 1.72 (quintet, J=6.3 Hz, 2H), 1.71 (s, 4H), 1.43 (s, 36H), 1.34 (s, 12H) and 0.76 (s, 18H).

$^{13}$C{$^1$H} NMR (CDCl$_3$) δ 152.71, 147.50, 143.20, 142.69, 139.62, 133.28, 132.99, 130.55, 129.59, 129.57, 128.66, 127.39, 126.09, 125.32, 123.57, 123.37, 116.37, 109.18, 70.67, 57.01, 38.24, 34.70, 32.41, 32.02, 31.84, 31.63, 30.68, 16.25.

ES-HRMS: m/e calcd for (M+Na, C$_{85}$H$_{104}$N$_2$Cl$_2$O$_4$Na) 1309.727. Found 1309.719.

Example Q3a: preparation of ligand (Q3a): 2',2"-(propane-1,3-diylbis(oxy))bis(5'-chloro-3-(9H-carbazol-9-yl)-3'-methyl-5-(2,4,4-trimethylpentan-2-yl)biphenyl-2-ol), (Q3a).

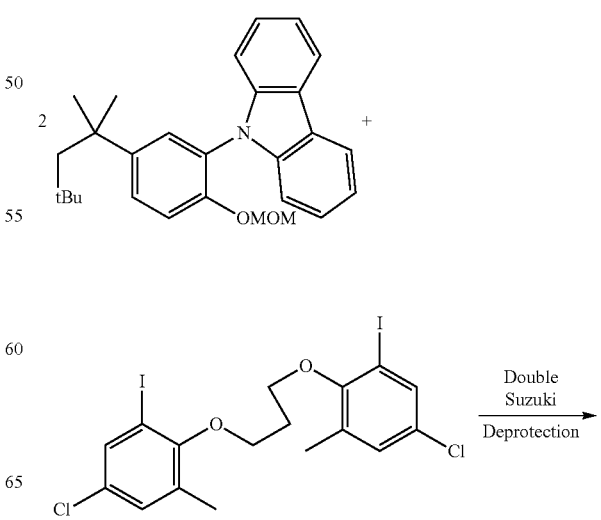

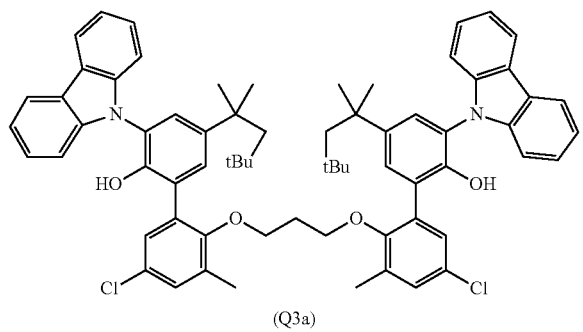

(Q3a)

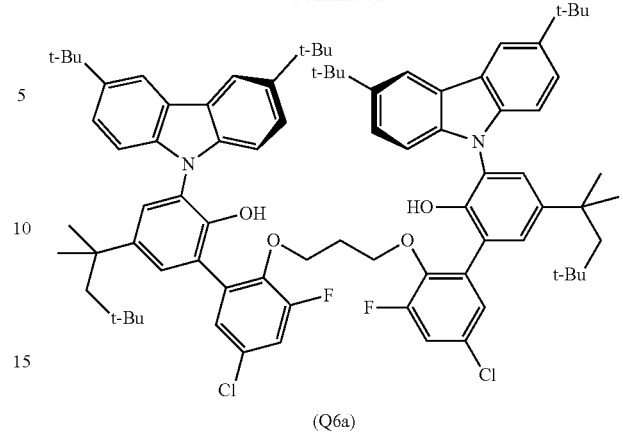

(Q6a)

Replicate procedure of Example Q2 except use (P12) and 9-(2-(methoxymethoxy)-5-(2,4,4-trimethylpentan-2-yl)phenyl)-9H-carbazole to give ligand (Q3a) as white solid (38% yield). $^1$H NMR (400 MHz, cdcl$_3$) δ 8.23-8.07 (m, 4H), 7.49 (d, J=2.4 Hz, 2H), 7.44 (d, J=2.4 Hz, 2H), 7.37-7.24 (m, 10H), 7.17 (dd, J=2.6, 0.7 Hz, 2H), 7.11 (d, J=8.0 Hz, 4H), 6.45 (s, 2H), 3.69 (t, J=6.1 Hz, 4H), 2.06 (s, 6H), 1.76 (m, 2H), 1.77 (s, 4H), 1.41 (s, 12H), 0.81 (s, 18H). $^{13}$C NMR (101 MHz, cdcl$_3$) δ 152.25, 147.69, 143.42, 141.27, 133.30, 132.96, 130.71, 129.92, 129.61, 128.97, 127.77, 126.30, 125.80, 125.23, 123.33, 120.34, 119.73, 109.71, 70.59, 57.01, 38.26, 32.41, 31.82, 31.61, 30.59, 16.11. HR MS m/e calcd for C$_{69}$H$_{76}$Cl$_2$N$_3$O$_4$ (M+NH$_4$) 1080.521. Found 1080.523.

Example Q6a: preparation of ligand (Q6a): 2',2"-(propane-1,3-diylbis(oxy))bis(5'-chloro-3-(3,6-di-tert-butyl-9H-carbazol-9-yl)-3'-fluoro-5-(2,4,4-trimethylpentan-2-yl)biphenyl-2-ol), (Q6a).

To a stirred solution of 3.16 g (4.55 mmol) of 3,6-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole and 1.33 g (2.27 mmol) of 1,3-bis(4-chloro-2-fluoro-6-iodophenoxy)propane in 60 mL of dimethoxyethane add a solution of 0.55 g of NaOH in 16 mL of water and 16 mL of tetrahydrofuran. Purge the system with nitrogen and add 0.14 g (0.12 mmol) of Pd(PPh$_3$)$_4$ (dissolved in anhydrous THF). Heat the mixture to 85° C. for 36 hours under nitrogen atmosphere. Cool the reaction mixture, and remove the volatiles by rotary evaporation. Treat the residue with 100 mL of water, and extract with methylene chloride. Wash the methylene chloride solution with water and brine, and dry over anhydrous magnesium sulfate. Pass this solution through a small bed of silica gel, and concentrate by rotary evaporation. Dissolve the residue in 50 mL of tetrahydrofuran, and treat with 100 mL of methanol and 0.05 g of p-toluene sulfonic acid. Heat the solution to 50° C. for 8 hours. Remove the solvent, and purify by flash chromatography using 3% ethyl acetate in hexanes to give 1.1 g (37.4%) of ligand (Q6a) as white solid. $^1$H NMR (500 MHz, CDCl$_3$) δ 8.14 (s, 4H), 7.38 (d, J=8.7 Hz, 6H), 7.30 (s, 2H), 7.15 (s, 2H), 7.07-6.95 (m, 6H), 5.39 (s, 2H), 3.93 (t, J=5.8 Hz, 4H), 1.81 (dd, J=11.9, 5.9 Hz, 2H), 1.69 (s, 4H), 1.44 (s, 36H), 1.32 (s, 12H), 0.77 (s, 18H). $^{13}$C NMR (126 MHz, CDCl$_3$) δ 155.33 (d, J=251.1 Hz), 147.49, 143.09 (d, J=2.4 Hz), 142.85, 139.45, 134.57, 128.85, 128.39 (d, J=10.8 Hz), 127.26, 126.84, 125.51, 124.56, 123.78, 123.61, 116.75 (d, J=22.8 Hz), 116.43, 109.27, 70.84 (d, J=5.1 Hz), 57.03, 38.25, 34.74, 32.41, 32.02, 31.85, 31.56, 30.50, 30.36. $^{19}$F NMR (470 MHz, CDCl$_3$) δ −126.58 (d, J=10.3 Hz). ES-HRMS: m/e calcd for (M+NH$_4$, C$_{83}$H$_{102}$Cl$_2$F$_2$N$_3$O$_4$) 1312.721. Found 1312.722.

Example Q6b: preparation of ligand (Q6a): 2',2"-(propane-1,3-diylbis(oxy))bis(5'-chloro-3-(3,6-di-tert-butyl-9H-carbazol-9-yl)-3'-(1-methylethyl)-5-(2,4,4-trimethylpentan-2-yl)biphenyl-2-ol), (Q6b).

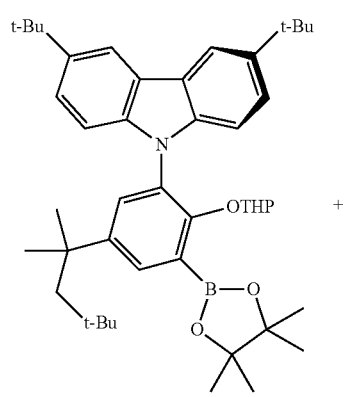

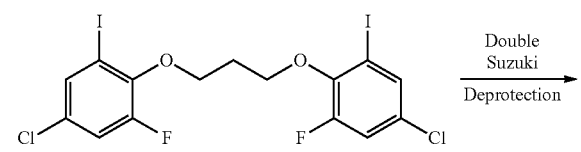

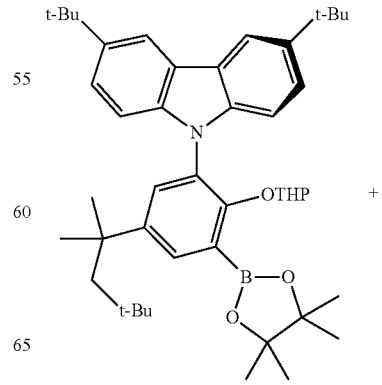

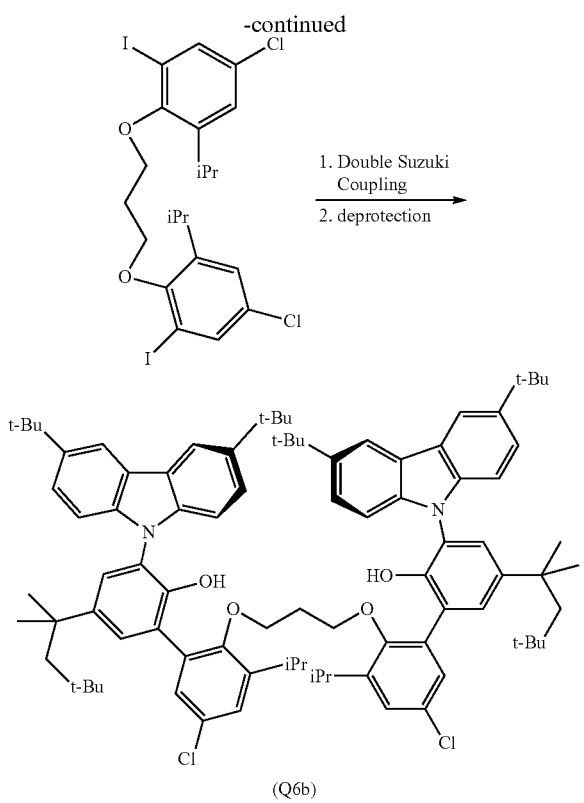

(Q6b)

To 60 mL of dimethoxyethane add 3,6-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole (3.33 g, 4.79 mmol), 1,3-bis(4-chloro-2-iodo-6-isopropylphenoxy)propane, (1.44 g, 2.28 mmol), NaOH (0.68 g, 17.00 mmol), 17 mL of water and 17 mL of tetrahydrofuran. Purge the system with nitrogen, and add Pd(PPh$_3$)$_4$ (192 mg, 0.166 mmol) (dissolved in anhydrous THF), and heat to 85° C. for 48 hours under nitrogen atmosphere. Cool the reaction mixture, and remove the volatiles by rotary evaporation. Dissolve the residue in methylene chloride, wash with brine, dry over anhydrous magnesium sulfate, filter, and concentrate to yield crude THP-protected ligand (Q6b). Dissolve this crude ligand in 100 mL of 1:1 THF:methanol, and heat to 65° C. in the presence of about 100 mg of p-toluenesulfonic acid monohydrate for 6 hours. Cool the reaction mixture, and concentrate to dryness, take residue up in methylene chloride, and wash with brine. Dry the organic phase over anhydrous magnesium sulfate, filter through a pad of silica gel, and concentrate to give crude (Q6b). Purify by flash chromatography using 3% ethyl acetate in hexanes to afford 2.23 g (79%) of pure (Q6b) as white powder. $^1$H NMR (400 MHz, CDCl$_3$) δ 8.14 (d, J=1.7 Hz, 4H), 7.46-7.31 (m, 8H), 7.22 (dd, J=12.1, 2.6 Hz, 4H), 7.02 (d, J=8.6 Hz, 4H), 6.16 (s, 2H), 3.65 (t, J=6.4 Hz, 4H), 3.09 (sept, J=13.6, 6.9 Hz, 2H), 1.72 (s, 7H), 1.43 (s, 33H), 1.34 (s, 12H), 1.05 (d, J=6.8 Hz, 12H), 0.77 (s, 17H). $^{13}$C NMR (101 MHz, CDCl$_3$) δ 151.51, 147.47, 144.03, 143.19, 142.65, 139.64, 133.15, 130.22, 129.46, 128.68, 127.37, 126.51, 126.28, 125.38, 123.57, 123.36, 116.36, 109.10, 71.52, 57.00, 38.22, 34.68, 32.40, 31.92, 31.62, 30.60, 26.81, 23.46.

Example Q19a: preparation of ligand (Q19a): 2',2"-(propane-1,3-diylbis(oxy))-(5'-chloro-3-(3,6-di-tert-butyl-9H-carbazol-9-yl)-3'-methyl-5-(2,4,4-trimethylpentan-2-yl)biphenyl-2-ol)-(5"-chloro-3-(3,6-di-tert-butyl-9H-carbazol-9-yl)-5-(2,4,4-trimethylpentan-2-yl)biphenyl-2-ol), (Q19a).

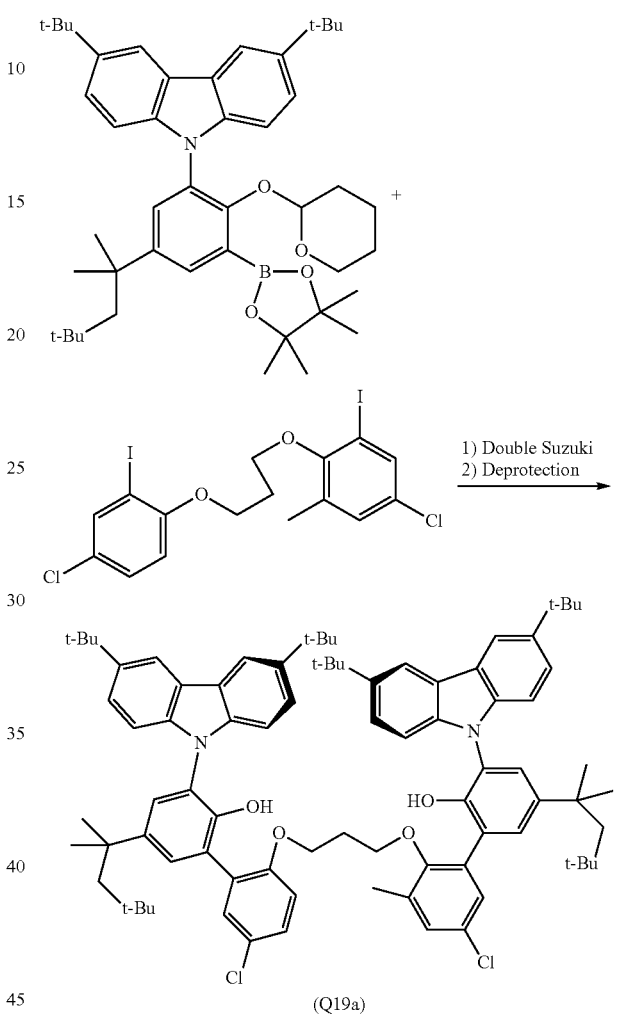

(Q19a)

Replicate Example Q6b except use 5-chloro-2-(3-(4-chloro-2-iodophenoxy)propoxy)-1-iodo-3-methylbenzene to give (Q19a) (72.4%) as white solid. $^1$H NMR (400 MHz, CDCl$_3$) δ 8.28-8.25 (m, 2H), 8.24-8.22 (m, 2H), 7.57 (d, J=2.1 Hz, 1H), 7.51-7.43 (m, 6H), 7.41-7.38 (m, 1H), 7.36 (d, J=2.2 Hz, 1H), 7.32 (d, J=2.2 Hz, 1H), 7.21-7.07 (m, 6H), 6.62 (d, J=8.9 Hz, 1H), 6.51 (s, 1H), 5.49 (s, 1H), 4.03 (t, J=5.2 Hz, 2H), 3.74 (t, J=5.0 Hz, 2H), 2.06 (s, 3H), 1.97 (p, J=5.8 Hz, 2H), 1.82 (s, 2H), 1.77 (s, 2H), 1.53 (s, 36H), 1.47 (s, 6H), 1.42 (s, 6H), 0.87 (s, 9H), 0.84 (s, 9H). $^{13}$C NMR (101 MHz, CDCl$_3$) δ 153.87 (s), 152.29, 147.63, 147.48, 143.30, 142.79, 142.74, 142.66, 139.69, 139.58, 133.40, 133.22, 131.56, 130.66, 129.92, 129.50, 128.93, 128.76, 128.68, 127.53, 126.77, 126.28, 125.66, 125.59, 124.37, 123.57, 123.55, 123.45, 123.39, 116.41, 116.38, 113.57, 109.35, 109.28, 70.02, 65.34, 57.09, 57.06, 38.30, 38.22, 34.74, 32.47, 32.41, 32.07, 31.89, 31.86, 31.67, 31.60, 29.76, 16.04. ES-HRMS: m/e calcd for (M+NH$_4$, C$_{84}$H$_{106}$N$_3$Cl$_2$O$_4$) 1290.755. Found 1290.757.

Examples Q4 to Q22: Preparation of Ligands (Q4) to (Q22)

In a manner similar to the preparation of Examples Q1 to Q3, the ligands (Q4) to (Q9) and (Q14) to (Q19) can be prepared and ligands (Q10), (Q11), (Q12), (Q13), and (Q20) to (Q22) are prepared.

Example (Q10): prepare ligand (Q10) in a manner similar to Example (Q3) except use (P14a) of Preparation P14a instead of (P12) to give, after crystallization from acetonitrile, ligand (Q10): $^1$H NMR (400 MHz, CDCl$_3$) δ 8.17 (d, J=1.6 Hz, 4H), 7.46-7.40 (m, 8H), 7.11-6.99 (m, 8H), 6.64 (s, 2H), 3.71 (t, J=6.3 Hz, 4H), 2.39 (s, 6H), 2.08 (s, 6H), 1.81 (m, 2H), 1.76 (s, 4H), 1.47 (s, 36H), 1.40 (s, 12H), 0.82 (s, 18H). $^{13}$C NMR (CDCl$_3$) δ 151.68, 147.68, 142.79, 142.25, 139.82, 134.42, 131.74, 131.18, 131.15, 130.45, 128.73, 127.57, 127.02, 125.42, 123.38, 123.19, 116.24, 109.28, 70.85, 57.09, 38.21, 34.67, 32.41, 32.05, 31.84, 31.66, 30.72, 20.83, 16.19. ES-HRMS: m/e calcd for (M+NH$_4$, C$_{87}$H$_{114}$N$_3$O$_4$) 1264.880. Found 1264.8849.

Example (Q11): prepare ligand (Q11) in a manner similar to Example (Q3) except use (P14b) of Preparation P14b instead of (P12). Alternatively, prepare ligand (Q11) in a manner similar to Example (Q6a) except use 1,3-bis(4-chloro-2-ethyl-6-iodophenoxy)propane, (P14b), of Preparation 14b instead of 1,3-bis(4-chloro-2-fluoro-6-iodophenoxy)propane to give, after flash chromatography on silica gel using hexanes:EtOAc (97.5:2.5), to give ligand (Q11): $^1$H NMR (400 MHz, cdcl$_3$) δ 8.23 (d, J=1.8 Hz, 4H), 7.49 (m, 8H), 7.33 (d, J=2.4 Hz, 2H), 7.25 (d, J=2.5 Hz, 2H), 7.11 (d, J=8.5 Hz, 4H), 6.26 (s, 2H), 3.74 (t, J=6.3 Hz, 4H), 2.54 (q, J=7.6 Hz, 4H), 1.81 (m, 2H), 1.79 (s, 4H), 1.54 (s, 36H), 1.43 (s, 12H), 1.11 (t, J=7.6 Hz, 6H), 0.85 (s, 18H); $^{13}$C NMR (CDCl$_3$) δ 152.24, 147.54, 143.22, 142.64, 139.67, 139.26, 133.07, 129.95, 129.58, 128.87, 128.66, 127.46, 126.21, 125.39, 123.56, 123.37, 116.38, 109.13, 71.14, 57.01, 38.24, 34.69, 32.40, 32.02, 31.85, 31.63, 30.66, 22.79 and 14.38. ES-HRMS: m/e calcd for (M+NH$_4$, C$_{87}$H$_{112}$Cl$_2$N$_3$O$_4$) 1332.802. Found 1332.806.

Example (Q12): prepare ligand (Q12) in a manner similar to Example (Q6a) except use 1,3-bis(6-bromo-2-methyl-4-(1,1-dimethylethyl)phenoxy)propane of Preparation 35 instead of 1,3-bis(4-chloro-2-fluoro-6-iodophenoxy)propane to give, after flash chromatography on silica gel using hexanes:EtOAc (95:5), ligand (Q12): $^1$H NMR (400 MHz, CDCl$_3$) δ 8.15 (d, J=1.8 Hz, 4H), 7.45 (dd, J=5.5, 2.3 Hz, 4H), 7.39 (d, J=8.9 Hz, 4H), 7.24 (d, J=2.5 Hz, 2H), 7.18 (d, J=2.3 Hz, 2H), 7.07 (d, J=8.5 Hz, 4H), 6.78 (s, 2H), 3.72 (t, J=6.1 Hz, 4H), 2.08 (s, 6H), 1.85-1.77 (m, 2H), 1.75 (s, 4H), 1.44 (s, 36H), 1.39 (s, 12H), 1.37 (s, 18H), 0.81 (s, 18H). $^{13}$C NMR (101 MHz, CDCl$_3$) δ 151.48, 147.86, 147.82, 142.79, 142.25, 139.94, 130.73, 128.99, 128.25, 128.09, 127.22, 127.16, 125.58, 123.46, 123.19, 116.34, 109.33, 70.86, 57.23, 38.26, 34.76, 34.49, 32.51, 32.15, 31.93, 31.54, 30.89, 16.61.

Example (Q13): prepare ligand (Q13) in a manner similar to Example (Q3) except use (P14c) of Preparation P14c instead of (P12) to give, after flash chromatography on silica gel using hexanes:EtOAc (95:5), ligand (Q13): $^1$H NMR (400 MHz, CDCl$_3$) δ 8.16 (d, J=1.9 Hz, 4H), 7.45 (d, J=2.4 Hz, 2H), 7.40 (d, J=2.3 Hz, 4H), 7.37 (d, J=1.8 Hz, 2H), 7.04 (d, J=8.6 Hz, 4H), 7.00-6.93 (m, 2H), 6.87 (dd, J=8.6, 3.1 Hz, 2H), 6.43 (s, 2H), 3.66 (t, J=6.4 Hz, 4H), 2.06 (s, 6H), 1.77 (quintet, J=6.4 Hz, 2H), 1.73 (s, 4H), 1.45 (s, 36H), 1.36 (s, 12H), 0.78 (s, 18H). $^{13}$C{$^1$H}NMR (CDCl$_3$) δ 158.97 (d, J=243.4 Hz), 149.91, 147.43, 143.15, 142.56, 139.68, 133.41 (d, J=8.7 Hz), 132.99 (d, J=8.8 Hz), 128.67, 127.45, 126.43, 125.56, 123.50, 123.32, 117.21 (d, J=22.5 Hz), 116.35, 116.10 (d, J=23.2 Hz), 109.19, 70.88, 57.06, 38.24, 34.70, 34.68, 32.42, 31.85, 31.61, 30.62, 16.44. $^{19}$F NMR (376 MHz, CDCl$_3$) δ −118.02 (t, J=8.7 Hz). ES-HRMS: m/e calcd for (M+NH$_4$) 1272.830. Found 1272.8342.

Example (Q20): prepare ligand (Q20) in a manner similar to Example (Q3) except use (P14d) of Preparation P14d instead of (P12) to give, after crystallization from methanol, ligand (Q20): $^1$H NMR (400 MHz, CDCl$_3$) δ 8.19 (d, J=1.7 Hz, 4H), 7.45 (d, J=1.9 Hz, 4H), 7.40-7.30 (m, 8H), 7.07 (d, J=8.6 Hz, 4H), 5.50 (s, 2H), 3.75 (t, J=6.7 Hz, 4H), 1.91 (m, 2H)), 1.71 (s, 4H), 1.47 (s, 36H), 1.33 (s, 12H), 0.80 (s, 18H); $^{13}$C NMR (101 MHz, CDCl$_3$) δ 157.73 (d, J=245.3 Hz), 150.73, 147.27, 143.66, 143.24, 139.41, 135.00 (d, J=8.2 Hz), 128.69, 127.76, 125.83-125.26 (m), 124.66 (d, J=15.4 Hz), 124.03, 123.91, 122.82 (t, J=14.8 Hz), 116.47, 113.97-113.24 (m), 109.14, 72.03, 56.92, 38.28, 34.74, 32.40, 31.99, 31.85, 31.44, 30.13; $^{19}$F NMR (376 MHz, CDCl$_3$) δ 92.00, 36.10 (t, J=8.2 Hz). ES-HRMS: m/e calcd for (M+H, C$_{85}$H$_{98}$F$_8$N$_2$O$_4$) 1362.740. Found 1363.7527.

Example (Q21): prepare ligand (Q21) in a manner similar to Example (Q3) except use (P15a) of Preparation P15a instead of (P12). Alternatively, prepare ligand (Q21) in a manner similar to Example (Q6a) except use 1,4-bis(4-chloro-2-iodo-6-methylphenoxy)butane, (P15a), of Preparation 15a instead of 1,3-bis(4-chloro-2-fluoro-6-iodophenoxy)propane to give, after flash chromatography on silica gel using hexanes:THF (95:5), to give ligand (Q21): $^1$H NMR (500 MHz, cdcl$_3$) δ 8.17 (d, J=1.6 Hz, 4H), 7.49 (d, J=2.3 Hz, 2H), 7.41 (dd, J=13.1, 5.3 Hz, 6H), 7.28 (d, J=2.4 Hz, 2H), 7.24-7.19 (m, 2H), 7.06 (d, J=8.6 Hz, 4H), 6.58 (s, 2H), 3.43 (s, 4H), 2.13 (s, 6H), 1.77 (s, 4H), 1.52-1.42 (m, 4H), 1.45 (s, 36H), 1.41 (s, 12H), 0.82 (s, 18H). $^{13}$C NMR (126 MHz, CDCl$_3$) δ 152.37, 147.59, 143.22, 142.48, 139.69, 133.36, 133.27, 130.50, 129.83, 129.54, 128.61, 127.52, 126.42, 125.77, 123.38, 123.27, 116.32, 109.20, 73.21, 57.08, 38.26, 34.67, 32.45, 32.01, 31.88, 31.66, 26.53, 16.18. ES-HRMS: m/e calcd for (M+NH$_4$, C$_{86}$H$_{110}$Cl$_2$N$_3$O$_4$) 1318.787. Found 1318.7905.

Example (Q22): prepare ligand (Q22) in a manner similar to Example (Q3) except use (P15b) of preparation P15b instead of (P12).

Names of ligands (Q4) to (Q22) are:

2',2"-(propane-1,3-diylbis(oxy))bis(5'-chloro-3-(3,6-di-tert-octyl-9H-carbazol-9-yl)-3'-methyl-5-(2,4,4-trimethylpentan-2-yl)biphenyl-2-ol), (Q4);

2',2"-(propane-1,3-diylbis(oxy))bis(3-(3,6-di-tert-butyl-9H-carbazol-9-yl)-3'-chloro-5-(2,4,4-trimethylpentan-2-yl)biphenyl-2-ol), (Q5);

2',2"-(propane-1,3-diylbis(oxy))bis(3'-chloro-3-(3,6-di-tert-butyl-9H-carbazol-9-yl)-5'-fluoro-5-(2,4,4-trimethylpentan-2-yl)biphenyl-2-ol), (Q6);

2',2"-(propane-1,3-diylbis(oxy))bis(5'-chloro-3-(3,6-di-tert-butyl-9H-carbazol-9-yl)-3'-fluoro-5-(2,4,4-trimethylpentan-2-yl)biphenyl-2-ol), (Q6a);

2',2"-(propane-1,3-diylbis(oxy))bis(5'-chloro-3-(3,6-di-tert-butyl-9H-carbazol-9-yl)-3'-(1-methylethyl)-5-(2,4,4-trimethylpentan-2-yl)biphenyl-2-ol), (Q6b);

2',2"-(propane-1,3-diylbis(oxy))bis(3-(3,6-di-tert-butyl-9H-carbazol-9-yl)-3'-methyl-5-(2,4,4-trimethylpentan-2-yl)biphenyl-2-ol), (Q7);

2',2"-(propane-1,3-diylbis(oxy))bis(5'-cyano-3-(3,6-di-tert-butyl-9H-carbazol-9-yl)-3'-methyl-5-(2,4,4-trimethylpentan-2-yl)biphenyl-2-ol), (Q8);

2',2"-(propane-1,3-diylbis(oxy))bis(5'-dimethylamino-3-(3,6-di-tert-butyl-9H-carbazol-9-yl)-3'-methyl-5-(2,4,4-trimethylpentan-2-yl)biphenyl-2-ol), (Q9);

2',2"-(propane-1,3-diylbis(oxy))bis(3',5'-dimethyl-3-(3,6-di-tert-butyl-9H-carbazol-9-yl)-5-(2,4,4-trimethylpentan-2-yl)biphenyl-2-ol), (Q10);

2',2"-(propane-1,3-diylbis(oxy))bis(5'-chloro-3-(3,6-di-tert-butyl-9H-carbazol-9-yl)-3'-ethyl-5-(2,4,4-trimethylpentan-2-yl)biphenyl-2-ol), (Q11);

2',2"-(propane-1,3-diylbis(oxy))bis(3-(3,6-di-tert-butyl-9H-carbazol-9-yl)-3'-methyl-5'-tert-butyl-5-(2,4,4-trimethylpentan-2-yl)biphenyl-2-ol), (Q12);

2',2"-(propane-1,3-diylbis(oxy))bis(3-(3,6-di-tert-butyl-9H-carbazol-9-yl)-5'-fluoro-3'-methyl-5-(2,4,4-trimethylpentan-2-yl)biphenyl-2-ol), (Q13);

2',2"-(propane-1,3-diylbis(oxy))bis(3-(9H-carbazol-9-yl)-5'-chloro-3'-methyl-5-(2,4,4-trimethylpentan-2-yl)biphenyl-2-ol), (Q14);

2',2"-(propane-1,3-diylbis(oxy))bis(3-(3,6-di-tert-butyl-9H-carbazol-9-yl)-3'-methyl-5'-trifluoromethyl-5-(2,4,4-trimethylpentan-2-yl)biphenyl-2-ol), (Q15);

2',2"-(2,2-dimethyl-2-silapropane-1,3-diylbis(oxy))bis(3',5'-dichloro-3-(3,6-di-tert-butyl-9H-carbazol-9-yl)-5-(2,4,4-trimethylpentan-2-yl)biphenyl-2-ol), (Q16);

2',2"-(2,2-dimethyl-2-silapropane-1,3-diylbis(oxy))bis(5'-chloro-3-(3,6-di-tert-butyl-9H-carbazol-9-yl)-3'-methyl-5-(2,4,4-trimethylpentan-2-yl)biphenyl-2-ol), (Q17);

2',2"-(propane-1,3-diylbis(oxy))bis(3'-bromo-5'-chloro-3-(3,6-di-tert-butyl-9H-carbazol-9-yl)-5-(2,4,4-trimethylpentan-2-yl)biphenyl-2-ol), (Q18);

2',2"-(propane-1,3-diylbis(oxy))-(5'-chloro-3-(3,6-di-tert-butyl-9H-carbazol-9-yl)-3'-fluoro-5-(2,4,4-trimethylpentan-2-yl)biphenyl-2-ol)-(3",5"-dichloro-3-(3,6-di-tert-butyl-9H-carbazol-9-yl)-5-(2,4,4-trimethylpentan-2-yl)biphenyl-2-ol), (Q19);

2',2"-(propane-1,3-diylbis(oxy))-(5'-chloro-3-(3,6-di-tert-butyl-9H-carbazol-9-yl)-3'-methyl-5-(2,4,4-trimethylpentan-2-yl)biphenyl-2-ol)-(5"-chloro-3-(3,6-di-tert-butyl-9H-carbazol-9-yl)-5-(2,4,4-trimethylpentan-2-yl)biphenyl-2-ol), (Q19a);

2',2"-(propane-1,3-diylbis(oxy))bis(3-(3,6-di-tert-butyl-9H-carbazol-9-yl)-5'-fluoro-3'-trifluoromethyl-5-(2,4,4-trimethylpentan-2-yl)biphenyl-2-ol), (Q20);

2',2"-(butane-1,4-diylbis(oxy))bis(5'-chloro-3-(3,6-di-tert-butyl-9H-carbazol-9-yl)-3'-methyl-5-(2,4,4-trimethylpentan-2-yl)biphenyl-2-ol), (Q21); and 2',2"-(ethane-1,2-diylbis(oxy))bis(5'-chloro-3-(3,6-di-tert-butyl-9H-carbazol-9-yl)-3'-methyl-5-(2,4,4-trimethylpentan-2-yl)biphenyl-2-ol), (Q22).

Figure 5:
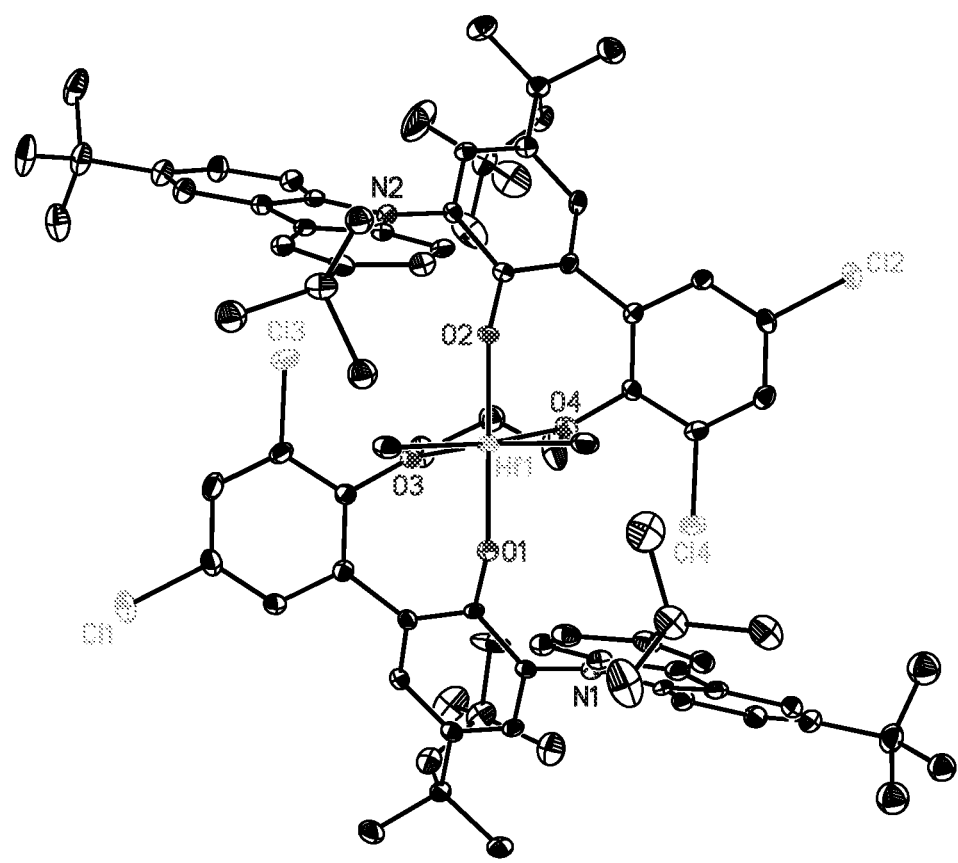
FIG. 5 shows structures of ligands (Q1) to (Q8) of Examples Q1 to Q8.
Figure 6:
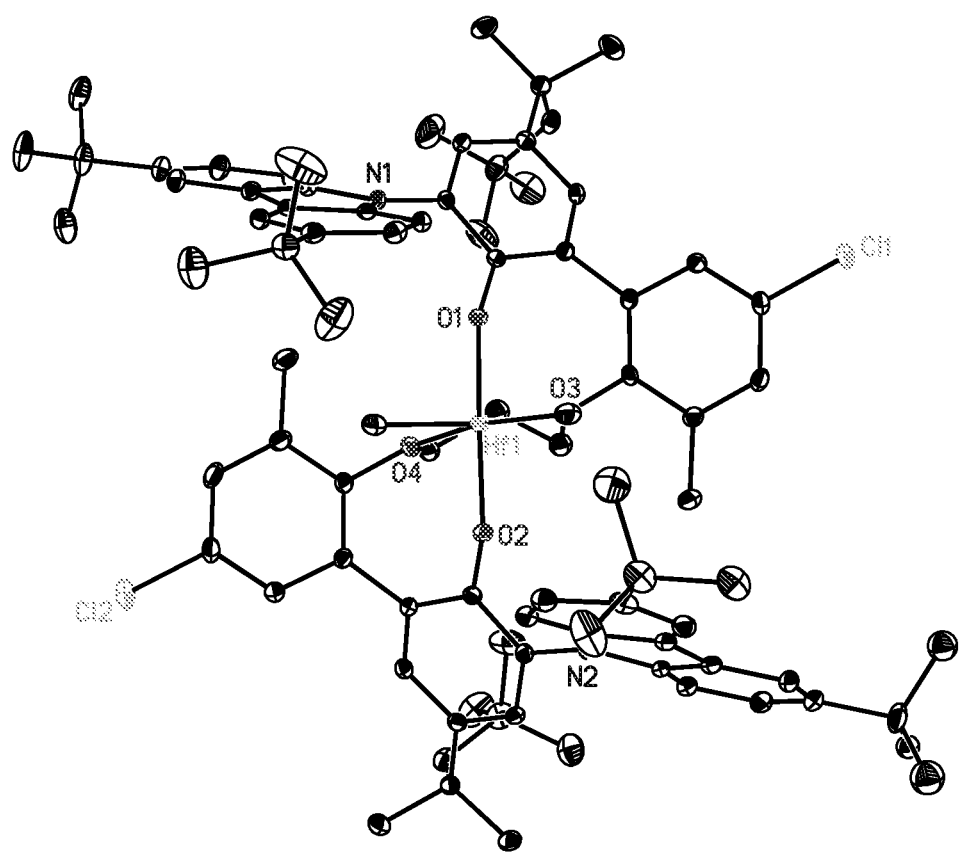
FIG. 6 shows structures of ligands (Q9) to (Q16) of Examples Q9 to Q16.
Figure 7:
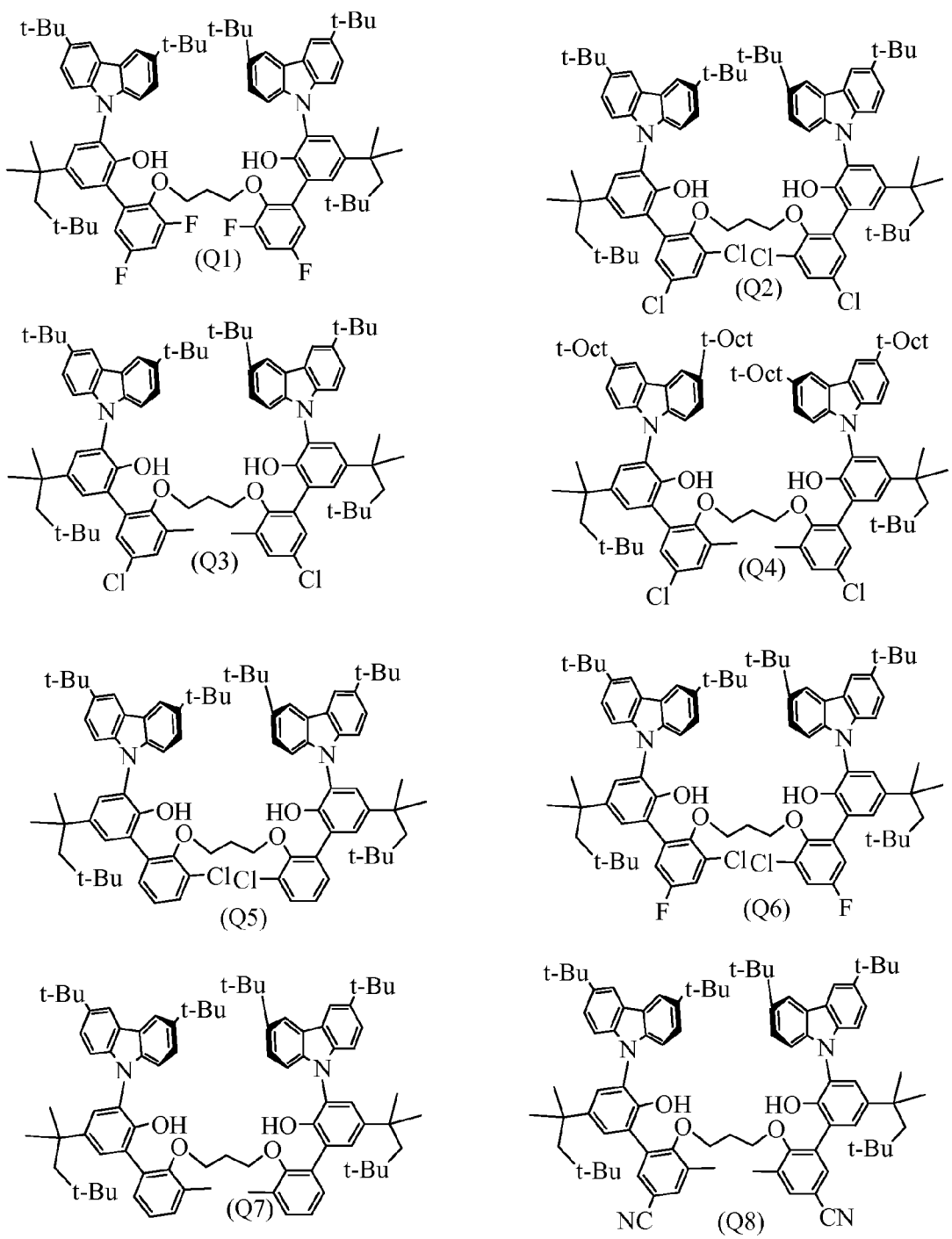
FIG. 7 shows structures of ligands (Q17) to (Q24) of Examples Q17 to Q24.
Figure 12:
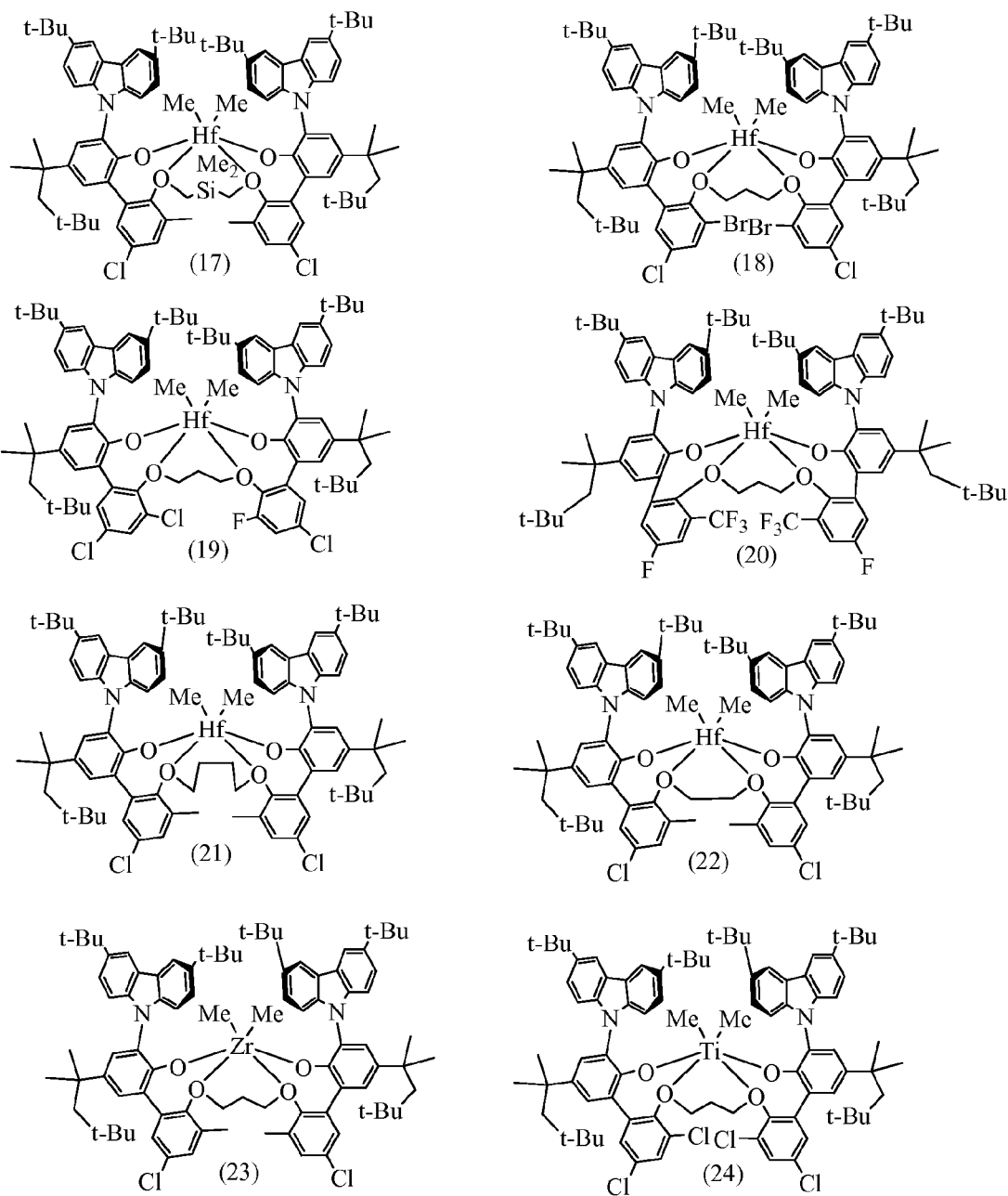
FIG. 12 shows structures of metal-ligand complexes (17) to (24) of Examples 17 to 24.
Figure 13:
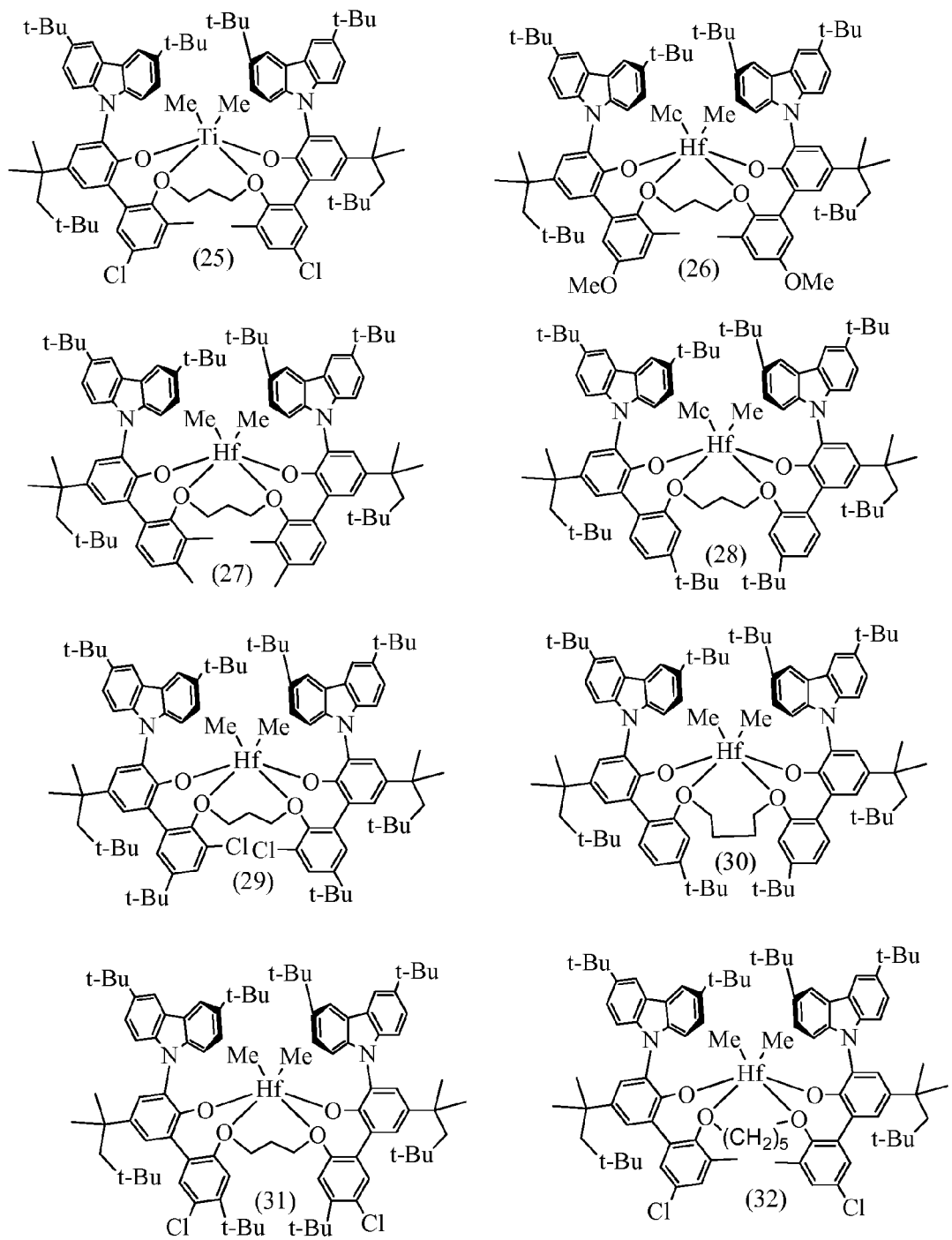
FIG. 13 shows structures of metal-ligand complexes (25) to (32) of Examples 25 to 32.
Figure 14:
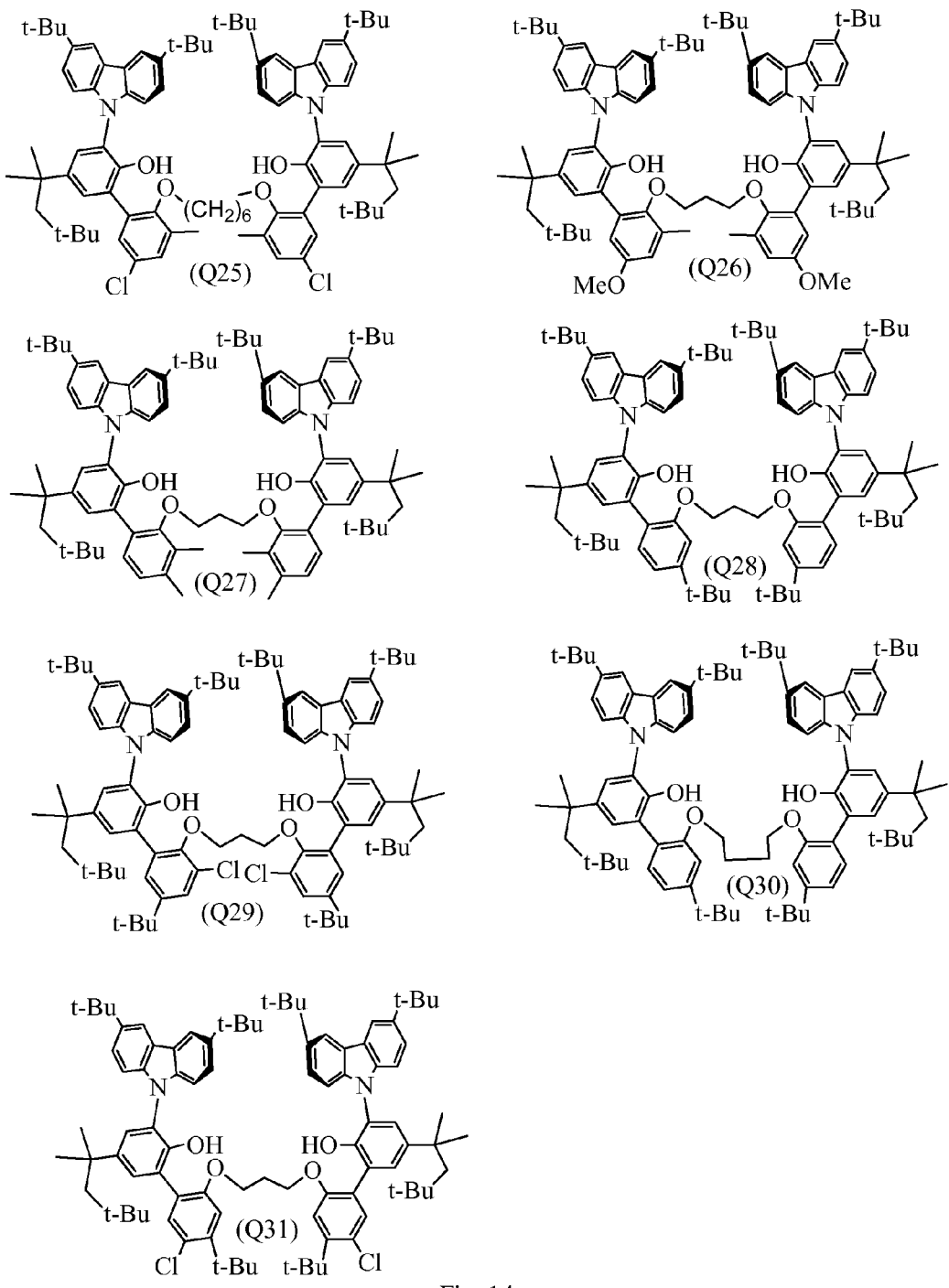
FIG. 14 shows structures of ligands (Q25) to (Q31) of Examples Q25 to Q31.

Structures of ligands (Q1) to (Q8) are shown in FIG. 5. Structures of ligands (Q9) to (Q16) are shown in FIG. 6. Structures of ligands (Q17) to (Q24) are shown in FIG. 7. Structures of ligands (Q25) to (Q31) are shown in FIG. 14. In FIGS. 5 to 14 and this specification, "t-butyl" is synonymous with tert-butyl, tertiary-butyl, and 1,1-dimethylethyl. The "Me" means methyl. The "Et" means ethyl. The "t-octyl" is synonymous with tert-octyl, tertiary-octyl, and 1,1-dimethylhexyl. The "—CN" is cyano. The "MeO" means methoxy.

In some embodiments the invention ligand is any one of ligands (Q1) to (Q3). In some embodiments the invention ligand is any one of ligands (Q10), (Q11), (Q13), and (Q20) to (Q22). In some embodiments the invention ligand is any one of ligands (Q4) to (Q9), (Q12), and (Q14) to (Q19). In some embodiments the invention ligand is ligand (Q3). In some embodiments the invention ligand is ligand (Q13). In some embodiments the invention ligand is any one of ligands (Q1), (Q2), (Q10), (Q11), and (Q20) to (Q22).

In some embodiments the invention ligand is any one of ligands (Q23) to (Q25):

2',2"-(pentane-1,5-diylbis(oxy))bis(5'-chloro-3-(3,6-di-tert-butyl-9H-carbazol-9-yl)-3'-methyl-5-(2,4,4-trimethylpentan-2-yl)biphenyl-2-ol), (Q23);

2',2"-(pentane-2,4-diylbis(oxy))bis(5'-chloro-3-(3,6-di-tert-butyl-9H-carbazol-9-yl)-3'-methyl-5-(2,4,4-trimethylpentan-2-yl)biphenyl-2-ol), (Q24); and 2',2"-(hexane-1,6-diylbis(oxy))bis(5'-chloro-3-(3,6-di-tert-butyl-9H-carbazol-9-yl)-3'-methyl-5-(2,4,4-trimethylpentan-2-yl)biphenyl-2-ol), (Q25).

Ligands (Q23) to (Q25) can be prepared by replicating the preparation of ligand (Q21) except replace 1,4-dibromobutane in Preparation 15a with 1,5-dibromopentane, 2,4-dibromopentane, and 1,6-dibromohexane, respectively. Alternatively, corresponding ditosylates, prepared from corresponding diols, can be used in place of the aforementioned dibromides.

In some embodiments the invention ligand is any one of ligands (Q26) to (Q31):

2',2"-(propane-1,3-diylbis(oxy))bis(5'-methoxy-3-(3,6-di-tert-butyl-9H-carbazol-9-yl)-3'-methyl-5-(2,4,4-trimethylpentan-2-yl)biphenyl-2-ol), (Q26);

2',2"-(propane-1,3-diylbis(oxy))bis(3',4'-dimethyl-3-(3,6-di-tert-butyl-9H-carbazol-9-yl)-5-(2,4,4-trimethylpentan-2-yl)biphenyl-2-ol), (Q27);

2',2"-(propane-1,3-diylbis(oxy))bis(4'-(tert-butyl)-3-(3,6-di-tert-butyl-9H-carbazol-9-yl)-5-(2,4,4-trimethylpentan-2-yl)biphenyl-2-ol), (Q28);

2',2"-(propane-1,3-diylbis(oxy))bis(3'-chloro-3-(3,6-di-tert-butyl-9H-carbazol-9-yl)-5'-(tert-butyl)-5-(2,4,4-trimethylpentan-2-yl)biphenyl-2-ol), (Q29);

2',2"-(butane-1,4-diylbis(oxy))bis(4'-(tert-butyl)-3-(3,6-di-tert-butyl-9H-carbazol-9-yl)-5-(2,4,4-trimethylpentan-2-yl)biphenyl-2-ol), (Q30); and 2',2"-(propane-1,3-diylbis(oxy))bis(5'-chloro-4'-(tert-butyl)-3-(3,6-di-tert-butyl-9H-carbazol-9-yl)-5-(2,4,4-trimethylpentan-2-yl)biphenyl-2-ol), (Q31).

Prepare ligand (Q26) in a manner similar to Example (Q6a) except use 1,3-bis(2-iodo-4-methoxy-6-methylphenoxy)propane of Preparation 30 instead of 1,3-bis(4-chloro-2-fluoro-6-iodophenoxy)propane to give, after crystallization using Et$_2$O and methanol, ligand (Q26): $^1$H NMR (400 MHz, CDCl$_3$) δ 8.17 (d, J=1.7 Hz, 4H), 7.47 (s, 4H), 7.40 (d, J=7.8 Hz, 4H), 7.07 (d, J=8.6 Hz, 4H), 6.81 (d, J=3.1 Hz, 2H), 6.79 (s, 2H), 6.74 (d, J=2.9 Hz, 2H), 3.86 (s, 6H), 3.68 (t, J=6.2 Hz, 4H), 2.07 (s, 6H), 1.80-1.76 (m, 2H), 1.76 (s, 4H), 1.47 (s, 36H), 1.40 (s, 12H) 0.81 (s, 18H).

Prepare ligand (Q27) in a manner similar to Example (Q6a) except use 1,3-bis(2-iodo-5,6-dimethylphenoxy)propane of Preparation 33 instead of 1,3-bis(4-chloro-2-fluoro-6-iodophenoxy)propane to give, after flash chromatography on silica gel using hexanes:EtOAc (95:5), ligand (Q27): $^1$H NMR (400 MHz, CDCl$_3$) δ 8.15 (d, J=1.7 Hz, 4H), 7.43 (s, 4H), 7.38 (d, J=8.8 Hz, 4H), 7.18 (d, J=7.8 Hz, 2H), 7.09 (d, J=8.2 Hz, 2H), 7.06 (d, J=8.6 Hz, 4H), 6.68 (s, 2H), 3.70 (t, J=6.3 Hz, 4H), 2.26 (s, 6H), 1.98 (s, 6H), 1.82-1.77 (m, 2H), 1.73 (s, 4H), 1.45 (s, 36H), 1.37 (s, 12H), 0.79 (s, 18H). $^{13}$C NMR (101 MHz, CDCl$_3$) δ 153.51, 147.64, 142.65, 142.18, 139.78, 138.52, 130.07, 129.09, 129.03, 128.83, 127.66, 126.84, 126.61, 125.38, 123.36, 123.16, 116.21, 109.31, 71.01, 57.09, 38.14, 34.65, 32.40, 32.05, 31.82, 31.63, 20.01, 12.37.

Prepare ligand (Q28) in a manner similar to Example (Q6a) except use 1,3-bis(2-bromo-5-(1,1-dimethylethyl)phenoxy)propane of Preparation 37 instead of 1,3-bis(4-chloro-2-fluoro-6-iodophenoxy)propane to give, after crystallization using Et$_2$O and methanol, ligand (Q28): $^1$H NMR (400 MHz, CDCl$_3$) δ 8.41 (d, J=1.7 Hz, 4H), 7.54 (d, J=2.1 Hz, 2H), 7.51 (d, J=2.1 Hz, 2H), 7.49-7.48 (m, 4H), 7.45 (d, J=8.0 Hz, 2H), 7.41 (d, J=8.6 Hz, 4H), 6.99 (dd, J=8.0, 1.7 Hz, 2H), 6.83 (d, J=1.6 Hz, 2H), 6.19 (s, 2H), 3.87 (t, J=5.6 Hz, 4H), 1.78 (m, 2H), 1.59 (s, 4H), 1.43 (s, 36H), 1.25 (S, 12H), 1.14 (s, 18H), 0.84 (s, 18H). $^{13}$C NMR (101 MHz, CDCl$_3$) δ 154.78, 153.05, 147.99, 142.37, 142.25, 139.87, 131.75, 129.28, 126.92, 126.57, 124.63, 124.58, 123.35, 123.23, 119.29, 116.29, 110.63, 109.38, 65.71, 57.18, 38.16, 34.75, 34.69, 32.44, 32.09, 31.86, 31.64, 31.58, 31.21, 29.53, 22.65, 14.15.

Prepare ligand (Q29) in a manner similar to Example (Q6a) except use 1,3-bis(2-bromo-6-chloro-4-(1,1-dimethylethyl) phenoxy)propane of Preparation 39 instead of 1,3-bis(4-chloro-2-fluoro-6-iodophenoxy)propane and 3,6-di-tert-butyl-9-(2-((tetrahydro-2H-pyran-2-yl)oxy)-5-(2,4,4-trimethylpentan-2-yl)phenyl)-9H-carbazole-3-boronic acid instead of 3,6-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole to give, after flash chromatography on silica gel using hexanes:EtOAc (95:5) and crystallization using Et$_2$O and methanol, ligand (Q29): $^1$H NMR (400 MHz, CDCl$_3$) δ 8.13 (d, J=1.7 Hz, 4H), 7.42 (d, J=2.3 Hz, 2H), 7.41 (d, J=1.8 Hz, 2H), 7.40-7.36 (m, 6H), 7.28 (d, J=2.4 Hz, 2H), 7.07 (d, J=8.6 Hz, 4H), 6.04 (s, 2H), 3.87 (t, J=6.3 Hz, 4H), 1.91 (p, J=6.6 Hz, 2H), 1.71 (s, 4H), 1.53 (s, 2H), 1.43 (s, 36H), 1.34 (s, 12H), 1.34 (s, 18H), 0.78 (s, 18H). $^{13}$C NMR (101 MHz, CDCl$_3$) δ 149.35, 148.57, 147.63, 142.95, 142.57, 139.68, 132.64, 128.98, 127.86, 127.81, 127.29, 127.17, 126.65, 125.19, 123.63, 123.32, 116.31, 109.31, 75.00, 71.44, 65.85, 57.07, 38.21, 34.71, 34.65, 32.41, 32.04, 31.86, 31.59, 31.29, 30.71, 15.27.

Prepare ligand (Q30) in a manner similar to Example (Q6a) except use 1,4-bis(2-bromo-5-(1,1-dimethylethyl)phenoxy) butane of Preparation 40 instead of 1,3-bis(4-chloro-2-fluoro-6-iodophenoxy)propane and 3,6-di-tert-butyl-9-(2-((tetrahydro-2H-pyran-2-yl)oxy)-5-(2,4,4-trimethylpentan-2-yl)phenyl)-9H-carbazole-3-boronic acid instead of 3,6-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole to give, after flash chromatography on silica gel using hexanes:EtOAc (95:5) and crystallization using THF and methanol, ligand (Q30): $^1$H NMR (400 MHz, CDCl$_3$) δ 8.12 (d, J=1.6 Hz, 4H), 7.39-7.33 (m, 10H), 7.18 (dd, J=8.1, 1.7 Hz, 2H), 7.06 (d, J=8.6 Hz, 4H), 6.93 (d, J=1.6 Hz, 2H), 6.18 (s, 2H), 3.87 (t, J=4.3 Hz, 4H), 1.70 (s, 4H), 1.68 (broad, 4H), 1.55 (s, 4H), 1.40 (s, 36H), 1.33 (s, 30H), 0.79 (s, 18H). $^{13}$C NMR (101 MHz, CDCl$_3$) δ 154.72, 152.97, 147.95, 142.45, 142.14, 139.78, 131.79, 129.15, 127.17, 126.61, 124.93, 124.72, 123.34, 123.03, 119.48, 116.16, 110.76, 109.36, 68.99, 57.09, 38.12, 34.85, 34.62, 32.42, 32.02, 31.84, 31.59, 31.32, 25.75.

Prepare ligand (Q31) in a manner similar to Example (Q6a) except use 1,3-bis(4-chloro-2-iodo-5-(1,1-dimethylethyl) phenoxy)propane of Preparation 44 instead of 1,3-bis(4-chloro-2-fluoro-6-iodophenoxy)propane to give, after flash chromatography on silica gel using hexanes:EtOAc (95:5), ligand (Q31): $^1$H NMR (400 MHz, cdcl$_3$) δ 8.16 (d, J=1.5 Hz, 4H), 7.40 (m, 8H), 7.26 (s, 2H), 7.71 (m, 4H), 6.91 (s, 2H), 5.72 (s, 2H), 4.05 (t, J=5.7 Hz, 4H), 2.08 (m, 2H), 1.73 (s, 4H), 1.47 (s, 36H), 1.38 (s, 12H), 1.37 (s, 18H), 0.81 (s, 18H). $^{13}$C NMR (101 MHz, CDCl$_3$) δ 153.60, 147.85, 147.45, 142.76, 142.66, 139.70, 134.67, 129.04, 126.87, 126.62, 126.37, 125.26, 124.58, 123.53, 123.40, 116.37, 113.28, 109.31, 66.18, 57.14, 38.23, 36.15, 34.71, 32.44, 32.05, 31.86, 31.62, 30.34, 29.37. ES-HRMS: m/e calcd for (M+NH$_4$, C$_{91}$H$_{120}$Cl$_2$N$_3$O$_4$) 1388.865. Found 1388.866.

Metal-Ligand Complex Examples

Example 1: preparation of (2',2"-(propane-1,3-diylbis (oxy))bis(3-(3,6-di-tert-butyl-9H-carbazol-9-yl)-3',5'-difluoro-5-(2,4,4-trimethylpentan-2-yl)biphenyl-2-ol))dimethyl-hafnium, (1).

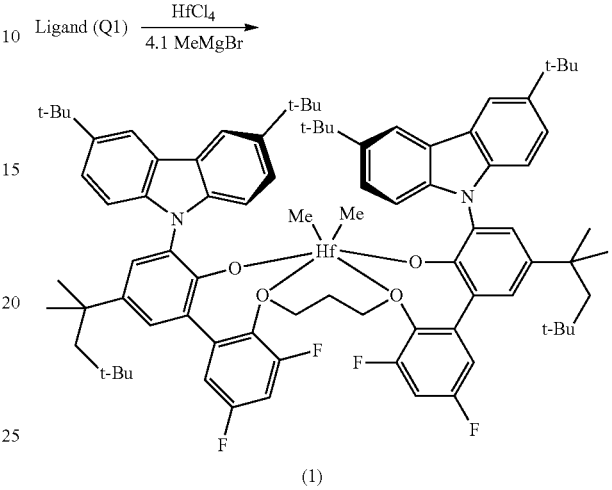

To a 30 mL toluene solution containing 0.508 g (0.4 mmol) of 2',2"-(propane-1,3-diylbis(oxy))bis(3-(3,6-di-tert-butyl-9H-carbazol-9-yl)-3',5'-difluoro-5-(2,4,4-trimethylpentan-2-yl)biphenyl-2-ol) ligand (Q1), Preparation 9, and HfCl$_4$ add 4.1 mole equivalents of methyl magnesium bromide (MeMgBr) at room temperature. After stirring for 1.5 hours, remove solvent under reduced pressure. To the resulting residue add 10 mL of toluene and 25 mL of hexane. Filter the resulting mixture to give an off-white filtrate. Remove solvent to give an off-white solid. NMR of this solid shows formation of essentially pure (1) with small impurities in aliphatic region. Dissolve the solid in about 1.5 mL of toluene, and then add 3 mL of hexane. Filter the resulting solution, and place filtrate into freezer overnight. Decant resulting liquid, and wash the remaining white crystalline solid with 1 mL of hexane and then dry it under reduced pressure to yield 0.32 g (55.5%) of (1).

$^1$H NMR (500 MHz, C$_6$D$_6$) δ 8.54 (d, J=1.7 Hz, 2H), 8.35 (d, J=1.9 Hz, 2H), 7.84 (d, J=2.4 Hz, 2H), 7.83 (dd, J=8.1, 2.0 Hz, 2H), 7.73 (dd, J=8.6, 1.9 Hz, 2H), 7.56 (dd, J=8.7, 0.4 Hz, 2H), 7.40 (dd, J=8.8, 1.9 Hz, 2H), 7.19 (d, J=2.5 Hz, 2H), 6.65 (ddd, J=8.9, 2.9, 1.7 Hz, 2H), 6.02 (ddd, J=8.8, 8.1, 3.1 Hz, 2H), 3.84 (dt, J=10.7, 5.6 Hz, 2H), 3.16 (dt, J=10.6, 5.3 Hz, 2H), 1.64 (d, J=14.5 Hz, 2H), 1.58 (s, 18H), 1.57 (d, J=14.5 Hz, 2H), 1.31 (s, 18H), 1.25 (s, 6H), 1.21 (s, 6H), 1.19 (p, J=5.7 Hz, 2H), 0.83 (s, 18H), −0.88 (s, 6H).

$^{13}$C{$^1$H} NMR (126 MHz, C$_6$D$_6$) δ 159.84 (dd, J=248.4, 11.6 Hz), 155.50 (dd, J=255.9, 13.6 Hz), 153.76 (s), 142.72 (s), 142.37 (s), 141.10 (s), 140.26 (d, J=2.6 Hz), 139.87 (s), 138.94 (dd, J=12.9, 3.8 Hz), 136.86 (d, J=9.5 Hz), 128.62 (s), 128.40 (s), 128.29 (s), 127.63 (s), 127.33 (s), 125.33 (s), 124.29 (s), 123.54 (s), 122.73 (s), 116.85 (s), 116.07 (s), 113.93 (dd, J=22.9, 3.2 Hz), 112.68 (s), 109.93 (d, J=4.1 Hz), 103.82 (dd, J=26.5, 22.6 Hz), 76.32 (d, J=2.6 Hz), 57.38 (s), 48.72 (s), 38.21 (s), 34.95 (s), 34.70 (s), 32.52 (s), 32.42 (s), 32.03 (s), 31.98 (s), 31.91 (s), 31.28 (s), 28.96 (s).

$^{19}$F NMR (470 MHz, C$_6$D$_6$) δ −111.15 (m), −120.40 (t, J=6.8 Hz).

Example 2: preparation of (2',2''-(propane-1,3-diylbis(oxy))bis(3-(3,6-di-tert-butyl-9H-carbazol-9-yl)-3',5'-dichloro-5-(2,4,4-trimethylpentan-4-yl)biphenyl-2-ol)dimethyl-hafnium, (2).

Ligand (Q2) $\xrightarrow{\text{HfCl}_4}{\text{4.1 MeMgBr}}$

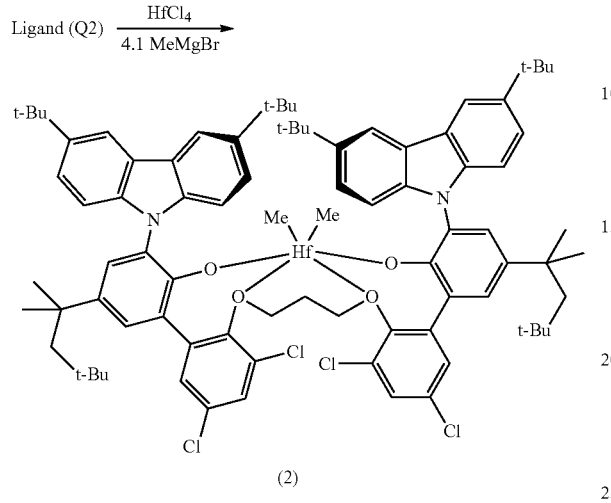

(2)

To a 30 mL toluene solution containing 0.342 g (0.27 mmol) of 2',2''-(propane-1,3-diylbis(oxy))bis(3',5'-dichloro-3-(3,6-di-tert-butyl-9H-carbazol-9-yl)-5-(2,4,4-trimethylpentan-2-yl)biphenyl-2-ol), ligand (Q2), Example Q2; and HfCl$_4$ add 3 M diethyl ether solution of MeMgBr at room temperature. After stirring for 1.5 hour, remove solvent under reduced pressure. To the resulting residue add 10 mL of toluene and 25 mL of hexane. Filter the resulting mixture to give an off-white filtrate. Remove solvent under reduced pressure to yield 0.374 g (89.9%) of (2) as an off-white solid.

$^1$H NMR (500 MHz, C$_6$D$_6$) δ 8.54 (d, J=1.8 Hz, 2H), 8.34 (d, J=1.8 Hz, 2H), 7.98 (d, J=8.5 Hz, 2H), 7.94 (d, J=2.4 Hz, 2H), 7.80 (dd, J=8.6, 1.9 Hz, 2H), 7.65 (d, J=8.8 Hz, 2H), 7.43 (dd, J=8.8, 1.9 Hz, 2H), 7.16 (d, J=2.4 Hz, 2H), 7.06 (d, J=2.6 Hz, 2H), 6.66 (d, J=2.6 Hz, 2H), 3.91 (dt, J=10.3, 5.1 Hz, 2H), 3.28 (dt, J=10.6, 5.5 Hz, 2H), 1.65 (d, J=14.5 Hz, 2H), 1.59 (s, 18H), 1.56 (d, J=14.5 Hz, 2H), 1.35 (s, 18H), 1.31 (dt, J=10.6, 5.1 Hz, 2H), 1.24 (s, 6H), 1.21 (s, 6H), 0.83 (s, 18H), −0.73 (s, 6H).

$^{13}$C{$^1$H} NMR (126 MHz, C$_6$D$_6$) δ 153.27 (s), 149.70 (s), 142.90 (s), 142.82 (s), 141.01 (s), 139.97 (s), 139.59 (s), 132.18 (s), 131.96 (s), 130.46 (s), 129.43 (s), 128.90 (s), 128.60 (s), 127.24 (s), 127.10 (s), 125.78 (s), 124.42 (s), 123.64 (s), 123.31 (s), 117.40 (s), 116.09 (s), 113.48 (s), 110.22 (s), 76.49 (s), 57.49 (s), 50.04 (s), 38.23 (s), 35.00 (s), 34.72 (s), 32.53 (s), 32.37 (s), 32.03 (s), 31.97 (s), 31.75 (s), 31.29 (s), 29.67 (s).

Figure 8:
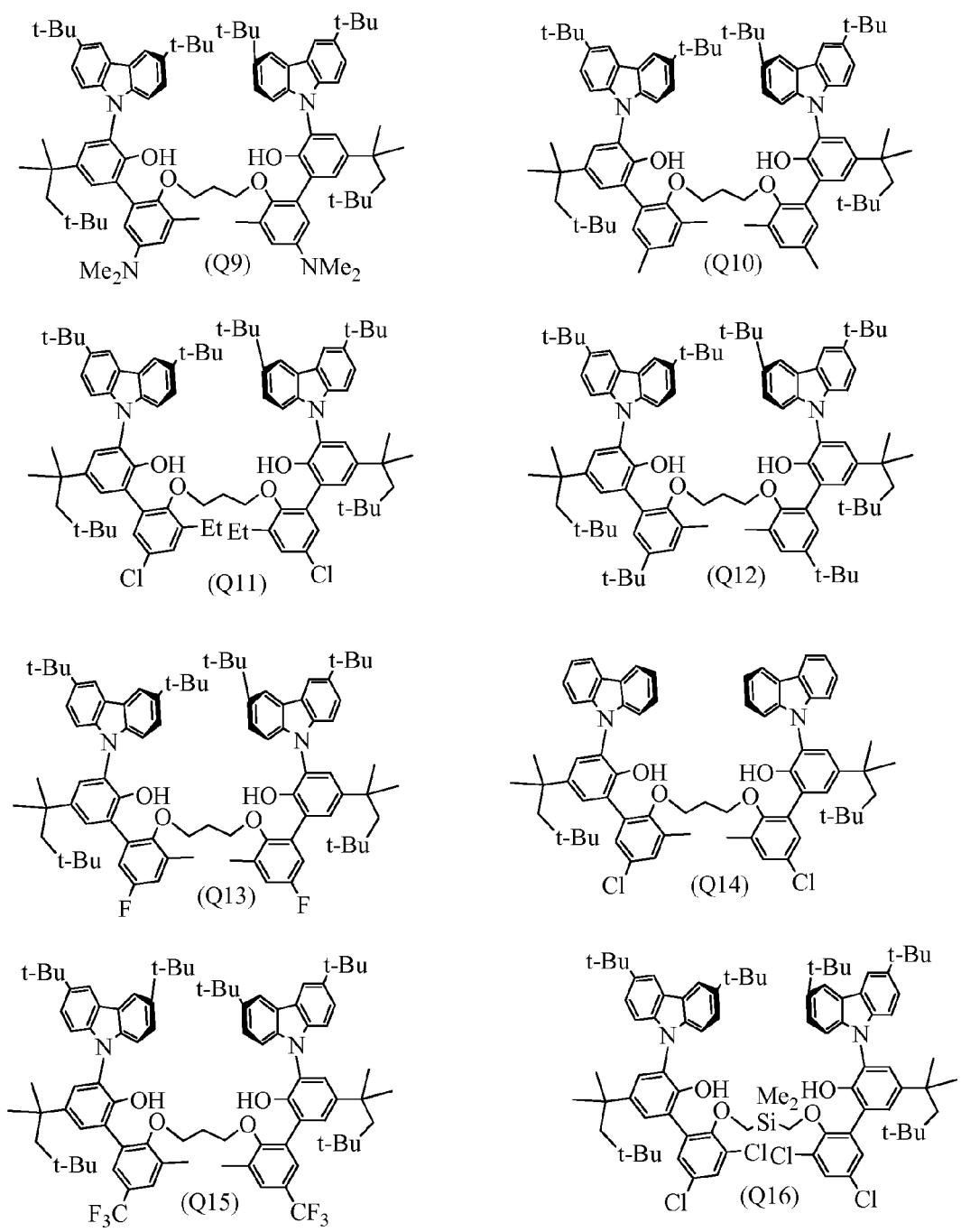
FIG. 8 shows an Oak Ridge Thermal Ellipsoid Plot (ORTEP) depiction of a single crystal structure derived by x-ray analysis of invention metal-ligand complex (2) (Example 2) with hydrogen atoms omitted for clarity.

FIG. 8 shows an ORTEP depiction of a single crystal structure derived by x-ray analysis of invention metal-ligand complex (2) (Example 2). In FIG. 8 hydrogen atoms are omitted for clarity.

Example 3: preparation of (2',2''-(propane-1,3-diylbis(oxy))bis(5'-chloro-3-(3,6-di-tert-butyl-9H-carbazol-9-yl)-3'-methyl-5-(2,4,4-trimethylpentan-2-yl)biphenyl-2-ol))dimethyl-hafnium, (3).

Ligand (Q3) $\xrightarrow{\text{HfCl}_4}{\text{4.1 MeMgBr}}$

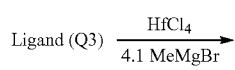

-continued

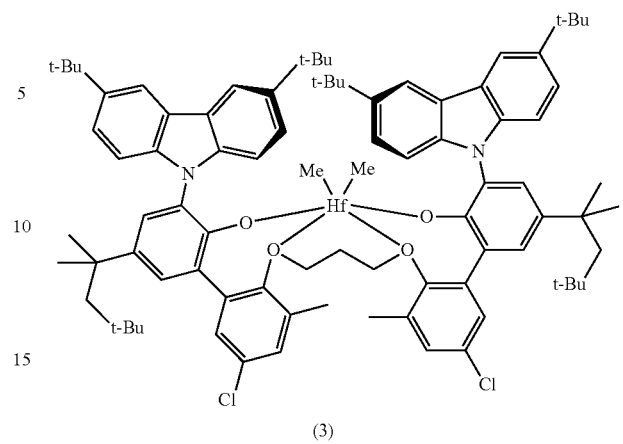

(3)

To a 30 mL toluene solution containing 0.5 g (0.39 mmol) of ligand (Q3) (Example Q3) and 124 mg (0.39 mmol) of HfCl$_4$ add 0.53 mL of 3 Molar (M) diethyl ether solution of MeMgBr at room temperature. After stirring for 1.5 hours, remove solvent under reduced pressure. To the resulting residue add 10 mL of toluene and 20 mL of hexane, filter the resulting mixture to give a colorless filtrate. Remove solvent from the colorless filtrate under reduced pressure to yield 0.456 g (78.6%) of (3) as an off-white solid.

$^1$H NMR (500 MHz, C$_6$D$_6$) δ 8.53 (d, J=1.9 Hz, 2H), 8.35 (d, J=1.9 Hz, 1H), 7.92 (d, J=8.6 Hz, 2H), 7.91 (d, J=2.5 Hz, 2H), 7.74 (dd, J=8.6, 2.0 Hz, 2H), 7.68 (d, J=8.8 Hz, 2H), 7.43 (dd, J=8.8, 1.9 Hz, 2H), 7.28 (d, J=2.5 Hz, 2H), 7.16 (d, J=2.6 Hz, 2H), 6.50 (dd, J=2.6, 0.6 Hz, 2H), 3.59 (dt, J=9.9, 4.9 Hz, 2H), 3.24 (dt, J=10.7, 5.5 Hz, 2H), 1.65 (d, J=14.5 Hz, 2H), 1.56 (s, 18H), 1.56 (d, J=14.5 Hz, 2H), 1.33 (s, 18H), 1.32 (p, J=5.0 Hz, 2H), 1.24 (s, 6H), 1.21 (s, 6H), 1.20 (s, 6H), 0.83 (s, 18H), −0.74 (s, 6H).

$^{13}$C{$^1$H} NMR (126 MHz, C$_6$D$_6$) δ 153.28 (s), 152.24 (s), 143.17 (s), 142.98 (s), 140.85 (s), 140.02 (s), 139.47 (s), 135.53 (s), 134.60 (s), 132.08 (s), 131.46 (s), 130.58 (s), 130.09 (s), 128.11 (s), 127.76 (s), 126.57 (s), 125.75 (s), 124.72 (s), 123.36 (s), 123.02 (s), 117.17 (s), 115.92 (s), 113.82 (s), 110.44 (s), 76.10 (s), 57.48 (s), 49.70 (s), 38.20 (s), 34.95 (s), 34.71 (s), 32.51 (d, J=7.3 Hz), 32.35 (s), 31.98 (s), 31.96 (s), 31.79 (s), 31.26 (s), 30.13 (s), 16.23 (s).

Figure 9:
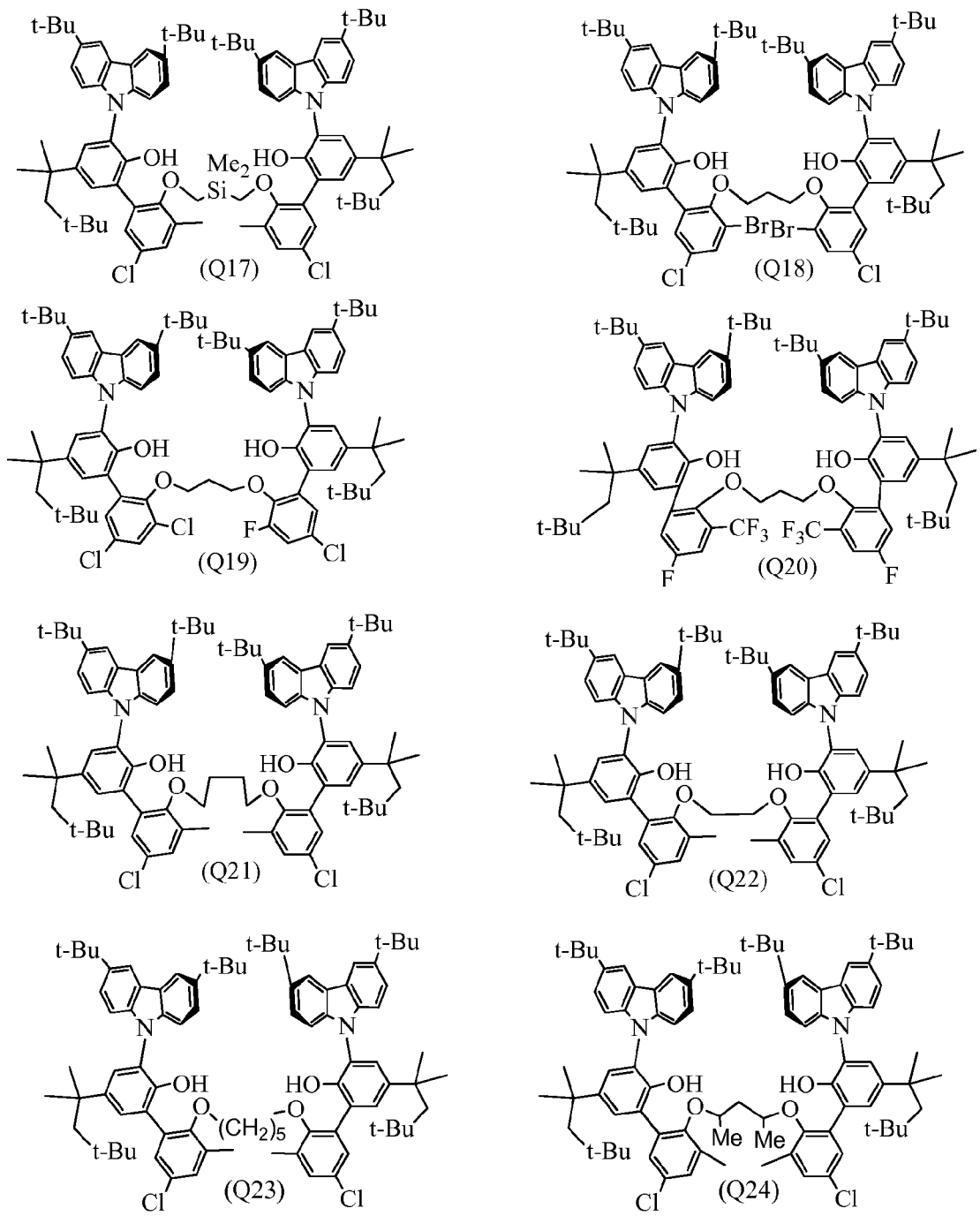
FIG. 9 shows an ORTEP depiction of a single crystal structure derived by x-ray analysis of invention metal-ligand complex (3) (Example 3) with hydrogen atoms omitted for clarity.

FIG. 9 shows an ORTEP depiction of a single crystal structure derived by x-ray analysis of invention metal-ligand complex (3) (Example 3). In FIG. 9 hydrogen atoms are omitted for clarity.

Example 3a: preparation of metal-ligand complex (3a): (2',2''-(propane-1,3-diylbis(oxy))bis(5'-chloro-3-(9H-carbazol-9-yl)-3'-methyl-5-(2,4,4-trimethylpentan-2-yl)biphenyl-2-ol))dimethyl-hafnium, (3a).

Ligand (Q3a) $\xrightarrow{\text{HfCl}_4}{\text{4.5 MeMgBr}}$

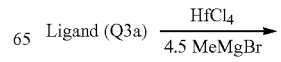

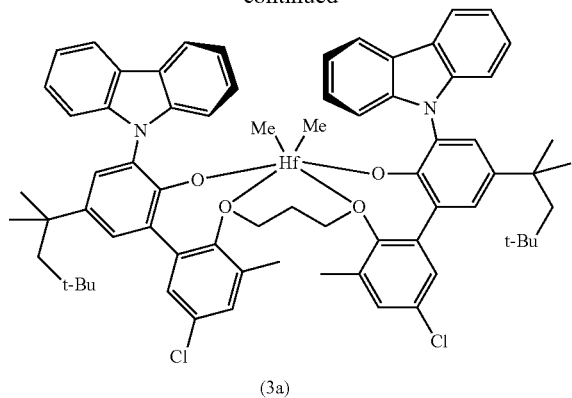

(3a)

Replicate Example 3 except use ligand (Q3a) and 4.5 mole equivalents of MeMgBr to give metal-ligand complex (3a). Yield 35%. $^1$H NMR (400 MHz, CD$_2$Cl$_2$) δ 8.26-8.19 (m, 2H), 8.15-8.07 (m, 2H), 7.75 (d, J=2.5 Hz, 2H), 7.70 (d, J=8.2 Hz, 2H), 7.51 (ddd, J=8.3, 7.2, 1.2 Hz, 2H), 7.40-7.33 (m, 6H), 7.27 (ddd, J=8.3, 7.0, 1.3 Hz, 2H), 7.18 (ddd, J=7.8, 7.1, 1.1 Hz, 2H), 7.07 (d, J=2.7 Hz, 2H), 6.68 (dd, J=2.7, 0.7 Hz, 2H), 3.94 (dt, J=9.9, 5.0 Hz, 2H), 3.76-3.65 (m, 2H), 1.86-1.80 (m, 1H), 1.77 (d, J=14.6 Hz, 1H), 1.46 (s, 6H), 1.39 (s, 6H), 1.36-1.14 (m, 10H), 0.93 (s, 1H), 0.83 (s, 18H), −1.47 (s, 6H). $^{13}$C NMR (101 MHz, CD$_2$Cl$_2$) δ 153.01, 152.04, 141.35, 140.61, 135.62, 134.71, 131.71, 131.26, 130.34, 129.93, 128.51, 127.05, 126.54, 126.03, 125.80, 124.93, 123.40, 120.79, 120.00, 119.95, 119.88, 113.86, 111.19, 76.92, 57.71, 48.41, 38.56, 32.00, 31.96, 31.45, 30.40, 15.90.

Example 6a: preparation of metal-ligand complex (6a): (2',2"-(propane-1,3-diylbis(oxy))bis(5'-chloro-3-(3,6-di-tert-butyl-9H-carbazol-9-yl)-3'-fluoro-5-(2,4,4-trimethylpentan-2-yl)biphenyl-2-ol))dimethyl-hafnium, (6a).

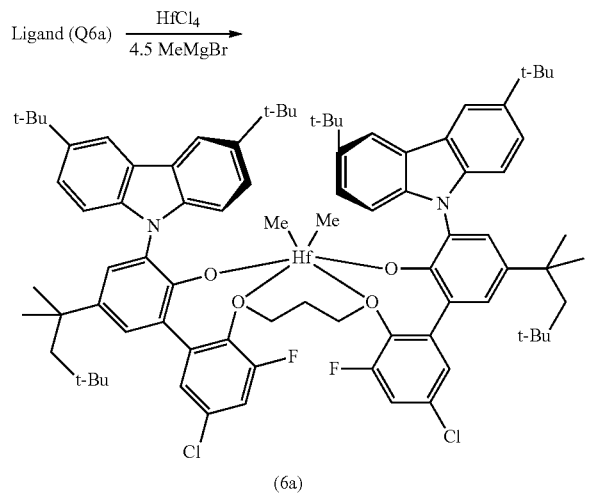

(6a)

Replicate Example 1 except use (Q6a) and 4.5 mole equivalents of MeMgBr to give metal-ligand complex (6a). $^1$H NMR (400 MHz, C$_6$D$_6$) δ 8.55 (d, J=1.6 Hz, 2H, H39), 8.34 (d, J=1.5 Hz, 2H, H36), 7.84 (d, J=2.4 Hz, 2H, H3), 7.83 (dd, J=8.5, 1.8 Hz, 2H, H41), 7.74 (dd, J=8.6, 1.9 Hz, 2H, H42), 7.53 (d, J=8.7 Hz, 2H, H33), 7.38 (dd, J=8.8, 1.9 Hz, 2H, H34), 7.20 (d, J=2.4 Hz, 2H, H5), 6.97 (dd, J=2.2 Hz, J$_{H-F}$=1.7, 2H, H12), 6.32 (dd, J$_{H-F}$=8.7, J=2.5 Hz, 2H, H10), 3.89 (dt, J=10.2, 5.0 Hz, 2H, H27a), 3.22 (dt, J=10.3, 5.0 Hz, 2H, H28b), 1.63 (d, J=14.6 Hz, 2H, t-Oct CH$_2$), 1.60 (s, 18H, carbazole C(CH$_3$)$_3$), 1.56 (d, J=14.6 Hz, 2H, t-Oct CH$_2$), 1.31 (s, 18H, carbazole C(CH$_3$)$_3$), 1.23 (s, 6H, t-Oct CH$_3$), 1.20 (s, 6H, t-Oct CH$_3$), 1.17 (m, 2H, H28), 0.83 (s, 18H, t-Oct C(CH$_3$)$_3$), −0.90 (s, 6H, Hf—CH$_3$). $^{13}$C{$^1$H} NMR (101 MHz, C$_6$D$_6$) δ 155.16 (d, J=256.9 Hz), 153.74 (quat), 142.74 (quat), 142.42 (quat), 141.30 (quat), 141.19 (quat), 140.16 (d, J=2.4 Hz, quat), 139.80 (quat), 136.78 (quat), 131.83 (d, J=9.9 Hz, quat), 128.53 (quat), 128.14 (d, J=2.3 Hz, quat), 127.60 (s), 127.54 (d, J=3.2 Hz, C12), 127.30 (s), 125.29 (quat), 124.29 (C34), 123.56 (quat), 122.78 (C43), 116.88 (C39), 116.20 (d, J$_{C-F}$=21.7 Hz, C10), 116.13 (C36), 112.57 (C33), 109.92 (d, J=4.4 Hz, C42), 75.88 (d, J=3.6 Hz, OCH$_2$), 57.35 (CH$_2$), 48.97 (Hf—CH$_3$), 38.20 (quat), 34.96 (quat), 34.68 (quat), 32.51 (quat), 32.42 (C(CH$_3$)$_3$), 32.01 (C(CH$_3$)$_3$), 31.98 (C(CH$_3$)$_3$), 31.81 (CH$_3$), 31.32 (CH$_3$), 28.85 (C28). $^{19}$F NMR (376 MHz, C$_6$D$_6$) δ −122.02 (d, J=8.6 Hz). Assignments were made based on 1D and 2D NMR measurements.

Example 6b: preparation of metal-ligand complex (6b): (2',2"-(propane-1,3-diylbis(oxy))bis(5'-chloro-3-(3,6-di-tert-butyl-9H-carbazol-9-yl)-3'-(1-methylethyl)-5-(2,4,4-trimethylpentan-2-yl)biphenyl-2-ol))dimethyl-hafnium, (6b).

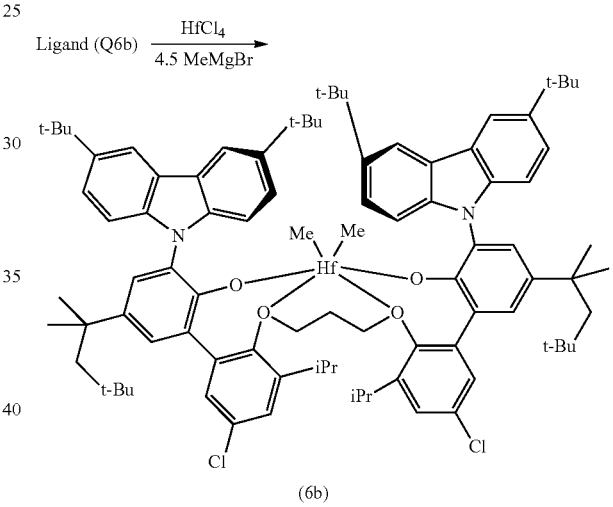

(6b)

Replicate Example 1 except use (Q6b) and 4.5 mole equivalents of MeMgBr to give metal-ligand complex (6b). Yield 27%. $^1$H NMR (400 MHz, C$_6$D$_6$) δ 8.44 (d, J=1.7 Hz, 2H), 8.30 (d, J=1.6 Hz, 2H), 7.91 (d, J=8.6 Hz, 2H), 7.89 (d, J=2.4 Hz, 2H), 7.73 (dd, J=8.6, 1.9 Hz, 2H), 7.55 (d, J=8.7 Hz, 2H), 7.40 (dd, J=8.8, 1.9 Hz, 2H), 7.35 (d, J=2.4 Hz, 2H), 7.20 (d, J=2.7 Hz, 2H), 7.08 (d, J=2.7 Hz, 2H), 4.02 (dt, J=11.7, 6.0 Hz, 2H), 3.52 (dt, J=11.6, 5.8 Hz, 2H), 2.70 (hept, J=6.2 Hz, 2H), 1.68 (d, J=14.5 Hz, 2H), 1.62 (d, J=14.7 Hz, 2H), 1.56 (s, 18H), 1.38 (s, 18H), 1.36-1.30 (m, 2H), 1.24 (s, 6H), 1.21 (s, 6H), 1.00 (d, J=6.7 Hz, 6H), 0.86 (s, 18H), 0.27 (d, J=6.7 Hz, 6H), −0.77 (s, 6H). $^{13}$C NMR (101 MHz, C$_6$D$_6$) δ 152.65, 151.40, 144.99, 143.14, 143.09, 141.52, 139.62, 139.32, 135.52, 131.97, 131.83, 130.54, 127.57, 125.86, 125.78, 124.47, 123.75, 123.58, 117.37, 115.92, 113.44, 110.25, 74.06, 57.45, 51.04, 38.27, 34.93, 34.72, 32.53, 32.29, 32.04, 32.02, 31.81, 31.29, 28.84, 27.00, 25.01, 22.32.

Example 19a: preparation of metal-ligand complex (19a): (2',2"-(propane-1,3-diylbis(oxy))-(5'-chloro-3-(3,6-di-tert-butyl-9H-carbazol-9-yl)-3'-methyl-5-(2,4,4-trimethylpentan-2-yl)biphenyl-2-ol)-(5"-chloro-3-(3,6-di-tert-butyl-9H-carbazol-9-yl)-5-(2,4,4-trimethylpentan-2-yl)biphenyl-2-ol))dimethyl-hafnium, (19a).

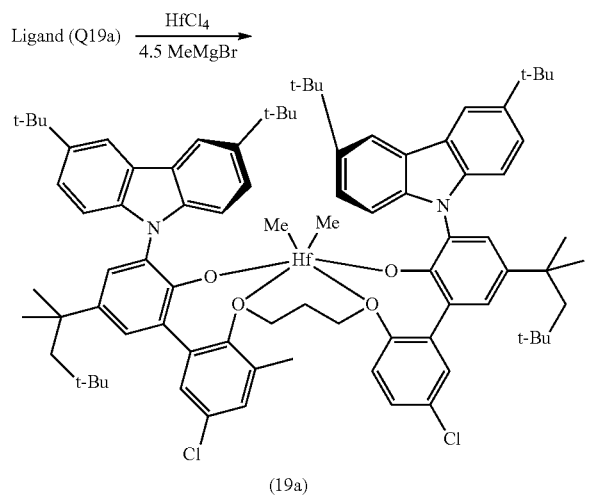

(19a)

Replicate Example 1 except use (Q19a) and 4.5 mole equivalents of MeMgBr to give metal-ligand complex (19a). Yield 71.3%, $^1$H NMR (400 MHz, C$_6$D$_6$) δ 8.64 (d, J=1.6 Hz, 2H, cbz), 8.55 (d, J=1.1 Hz, 1H, cbz), 8.43 (d, J=1.5 Hz, 1H), 8.31 (d, J=1.5 Hz, 2H, cbz), 7.91 (d, J=8.6 Hz, 1H, cbz), 7.83 (d, J=2.4 Hz, 1H), 7.80 (dd, J=8.6, 1.8 Hz, 1H, cbz), 7.74 (d, J=2.4 Hz, 1H), 7.73-7.65 (m, 3H), 7.62 (d, J=8.8 Hz, 1H, cbz), 7.45 (dd, J=9.0, 1.8 Hz, 2H, cbz), 7.43 (dd, J=8.9, 1.8 Hz, 1H, cbz), 7.30 (d, J=2.3 Hz, 1H), 7.25 (d, J=2.6 Hz, 1H), 7.22 (d, J=2.6 Hz, 2H), 6.53 (dd, J=8.6, 2.6 Hz, 2H), 6.40 (d, J=2.4 Hz, 2H), 5.81 (d, J=8.6 Hz, 2H), 3.68-3.56 (m, 2H, OCH$_2$), 3.25 (ddd, J=9.9, 8.0, 4.0 Hz, 1H, OCH$_2$), 2.99 (ddd, J=10.3, 7.5, 2.3 Hz, 1H, OCH$_2$), 1.67 (d, J=14.5 Hz, 1H), 1.60 (d, J=14.5 Hz, 1H, CH$_2$), 1.60 (s, 9H, C(CH$_3$)$_3$), 1.58 (d, J=14.5 Hz, 1H, CH$_2$), 1.56 (s, 9H, C(CH$_3$)$_3$), 1.54 (d, J=14.5 Hz, 1H, CH$_2$) 1.30 (s, 9H, C(CH$_3$)$_3$), 1.29 (s, 9H, C(CH$_3$)$_3$), 1.24 (s, 3H, CH$_3$), 1.24 (m, 1H, H28), 1.21 (s, 6H, CH$_3$), 1.18 (s, 3H, CH$_3$), 1.14 (m, 1H, H28), 0.86 (s, 3H, CH$_3$), 0.84 (s, 9H, C(CH$_3$)$_3$), 0.80 (s, 9H, C(CH$_3$)$_3$), −0.68 (s, 3H, Hf—CH$_3$), −0.98 (s, 3H, Hf—CH$_3$). $^{13}$C{$^1$H} NMR (101 MHz, C$_6$D$_6$) δ 154.19 (quat), 153.48 (quat), 152.77 (quat), 151.48 (quat), 143.20 (quat), 143.18 (quat), 142.93 (quat), 142.76 (quat), 141.13 (quat), 141.05 (quat), 140.30 (quat), 139.87 (quat), 139.84 (quat), 139.82 (quat), 135.48 (quat), 135.29 (quat), 134.41 (quat), 132.81 (quat), 132.49 (CH), 131.74 (quat), 130.78 (CH), 130.53 (CH), 130.10 (quat), 129.23 (CH), 129.17 (quat), 128.10 (CH), 127.88 (quat), 127.76 (CH), 127.23 (CH), 126.82 (CH), 125.83 (quat), 125.80 (CH), 125.62 (quat), 124.93 (CH), 123.42 (CH), 123.16 (quat), 123.06 (CH), 123.01 (quat), 117.55 (CH), 117.09 (CH), 115.98 (CH), 115.73 (CH), 113.32 (CH), 113.27 (CH), 109.52 (CH), 109.38 (CH), 76.76 (OCH$_2$), 74.96 (OCH$_2$), 57.27 (CH$_2$), 50.05 (Hf—CH$_3$), 48.62 (Hf—CH$_3$), 38.19 (quat), 38.17 (quat), 35.05 (quat), 34.93 (quat), 34.73 (quat), 34.70 (quat), 32.52 (quat), 32.35 (C(CH$_3$)$_3$), 32.06 (CH$_3$)$_3$), 32.00 (C(CH$_3$)$_3$), 31.98 ((C(CH$_3$)$_3$), 31.90 (CH$_3$), 31.75 (CH$_3$), 31.65 (CH$_3$), 31.20 (CH$_3$), 29.44 (CH$_2$), 15.28 (CH$_3$). Assignments were made based on 1D and 2D NMR measurements.

Examples 4 to 25: preparation of metal-ligand complexes (4) to (25)

In a manner similar to the preparation of Examples 1 to 3, the metal-ligand complexes (4) to (9), (14) to (19), (24), and (25) can be prepared, and metal-ligand complexes (10), (11), (12), (13), and (20) to (23) are prepared. The metal-ligand complexes (4) to (22), (23), (24), and (25) can be or are prepared from ligands (Q4) to (Q22), (Q3), (Q2), and (Q3), respectively.

For example, prepare metal-ligand complex (10), (12), (11), (13), (20), (21), and (22) in a manner similar to Example (3) except respectively use ligand (Q10) of Example Q10, (Q11) of Example Q11, (Q13) of Example Q13, (Q20) of Example Q20, (Q21) of Example Q21, or (Q22) of Example Q22 instead of ligand (Q3).

Example 10: metal-ligand complex (10): $^1$H NMR (400 MHz, C$_6$D$_6$) δ 8.57 (d, J=1.9 Hz, 2H), 8.34-8.28 (m, 2H), 8.02 (d, J=8.6 Hz, 2H), 7.93 (d, J=2.5 Hz, 2H), 7.78 (dd, J=8.7, 2.0 Hz, 2H), 7.75 (d, J=8.8 Hz, 2H), 7.43 (d, J=2.5 Hz, 2H), 7.39 (dd, J=8.8, 1.9 Hz, 2H), 6.93 (d, J=2.1 Hz, 2H), 6.35 (d, J=2.3 Hz, 2H), 3.72 (dt, J=9.8, 4.8 Hz, 2H), 3.41 (dt, J=10.5, 5.5 Hz, 2H), 1.79 (s, 6H), 1.70 (d, J=14.5 Hz, 2H), 1.63 (d, J=14.5 Hz, 2H), 1.61 (s, 18H), 1.40 (dt, J=10.3, 5.0 Hz, 2H), 1.34 (s, 6H), 1.32 (s, 6H), 1.30 (s, 18H), 1.28 (s, 6H), 0.87 (s, 18H), −0.74 (s, 6H). $^{13}$C NMR (101 MHz, C$_6$D$_6$) δ 153.64, 151.68, 142.71 (d, J=16.8 Hz), 140.14, 139.65, 136.33, 133.58, 132.44, 132.20, 131.91, 131.67, 127.90, 125.73, 124.66, 123.26, 122.97, 116.97, 115.81, 113.98, 110.68, 76.11, 57.58, 49.07, 38.23, 34.98, 34.67, 32.58, 32.42, 32.04, 31.98, 31.33, 30.30, 20.50, 16.26.

Example 11: metal-ligand complex (11): $^1$H NMR (500 MHz, C$_6$D$_6$) δ 8.51 (d, J=1.2 Hz, 2H), 8.31 (d, J=1.1 Hz, 2H), 8.01 (d, J=8.5 Hz, 2H), 7.92 (d, J=2.3 Hz, 2H), 7.75 (dm, J=7.7 Hz, 2H), 7.62 (d, J=8.8 Hz, 2H), 7.40 (dm, J=8.8 Hz, 2H), 7.28 (d, J=2.3 Hz, 2H), 7.18 (d, J=2.6 Hz, 2H), 6.62 (d, J=2.5 Hz, 2H), 3.65-3.55 (m, 4H), 2.11 (dq, J=14.8, 7.4 Hz, 2H), 1.66 (d, J=14.5 Hz, 2H), 1.576 (d, J=14.5 Hz, 2H), 1.57 (s, 18H), 1.33 (s, 18H), 1.26 (s, 6H), 1.24 (s, 6H), 1.18 (td, J=15.1, 7.5 Hz, 2H), 0.84 (s, 18H), 0.62 (t, J=7.5 Hz, 6H), −0.85 (s, 6H). $^{13}$C NMR (126 MHz, C$_6$D$_6$) δ 153.32, 151.38, 143.04, 142.88, 140.74, 140.59, 139.91, 139.64, 135.98, 132.36, 131.70, 130.35, 129.49, 128.06, 127.77, 126.20, 125.63, 124.73, 123.36, 123.20, 117.20, 115.90, 113.84, 110.34, 76.97, 57.61, 49.84, 38.23, 34.95, 34.71, 32.54, 32.33, 31.99, 31.93, 31.89, 31.14, 30.01, 22.32, 16.05.

Example 12: metal-ligand complex (12): $^1$H NMR (400 MHz, C$_6$D$_6$) δ 8.66 (d, J=1.6 Hz, 2H), 8.31 (d, J=1.5 Hz, 2H), 8.18 (d, J=8.6 Hz, 2H), 8.07 (d, J=2.2 Hz, 2H), 7.92 (dd, J=8.6, 1.7 Hz, 2H), 7.81 (d, J=8.8 Hz, 2H), 7.73 (d, J=2.3 Hz, 2H), 7.48 (d, J=2.3 Hz, 2H), 7.36 (dd, J=8.8, 1.8 Hz, 2H), 6.96 (d, J=2.2 Hz, 2H), 3.89 (m, 2H), 3.50 (m, 2H), 1.85 (d, J=14.4 Hz, 2H), 1.73 (s, 18H), 1.73 (d, J=14.4 Hz, 2H), 1.60 (s, 6H), 1.52 (s, 6H), 1.48 (m, 2H), 1.45 (s, 6H), 1.38 (s, 18H), 1.12 (s, 18H), 0.99 (s, 18H), −0.59 (s, 6H). $^{13}$C NMR (101 MHz, C$_6$D$_6$) δ 153.44, 153.36, 142.52, 142.29, 139.91, 139.28, 138.12, 131.48, 131.25, 130.85, 130.60, 129.08, 128.32, 127.29, 125.64, 125.45, 125.36, 124.50, 122.87, 122.73, 116.56, 115.33, 113.66, 110.34, 75.89, 57.42, 48.48, 38.01, 34.72, 34.44, 32.40, 32.19, 31.96, 31.78, 31.73, 31.01, 19.33, 12.56.

Example 13: metal-ligand complex (13): $^1$H NMR (500 MHz, C$_6$D$_6$) δ 8.54 (d, J=1.7 Hz, 2H), 8.36 (d, J=1.5 Hz, 2H), 7.92 (d, J=8.5 Hz, 2H), 7.90 (d, J=2.5 Hz, 2H), 7.74 (dd, J=8.6, 1.9 Hz, 2H), 7.71 (d, J=8.9 Hz, 2H), 7.45 (dd, J=8.8, 1.9 Hz, 2H), 7.28 (d, J=2.5 Hz, 2H), 6.80 (dd, J=8.9, 3.1 Hz, 2H), 6.14 (dd, J=8.2, 2.9 Hz, 2H), 3.56 (dt, J=9.9, 4.8 Hz, 2H), 3.24 (dt, J=10.6, 5.5 Hz, 2H), 1.65 (d, J=14.5 Hz, 2H), 1.57 (d, J=14.4 Hz, 2H), 1.57 (s, 18H), 1.33 (s, 18H), 1.33-1.29 (m, 2H), 1.26 (s, 6H), 1.22 (s, 6H), 1.19 (s, 6H), 0.83 (s, 18H), −0.73 (s, 6H). $^{13}$C NMR (101 MHz, C$_6$D$_6$) δ160.28 (d, J=246.1 Hz), 153.30, 149.65 (d, J=2.7 Hz), 143.14, 142.94, 140.72, 140.08, 139.50, 135.66 (d, J=8.5 Hz), 134.92 (d, J=8.9 Hz), 130.37 (d, J=1.4 Hz), 128.09, 127.83, 126.55, 125.74, 124.72, 123.34, 123.03, 117.74 (d, J=23.3 Hz), 117.34 (d, J=22.5 Hz), 117.11, 115.89, 113.82 (s), 110.45, 76.23, 57.49, 49.45, 38.19, 34.96, 34.72, 32.53, 32.36, 31.99, 31.95, 31.89, 31.21, 30.17, 16.43. $^{19}$F NMR (376 MHz, C$_6$D$_6$) δ −115.29 (t, J=8.5 Hz).

Example 20: metal-ligand complex (20): $^1$H NMR (500 MHz, C$_6$D$_6$) δ 8.43 (d, J=1.7 Hz, 2H), 8.32 (s, 2H), 7.85 (d, J=8.6 Hz, 2H), 7.80 (dd, J=9.3, 2.1 Hz, 4H), 7.44-7.39 (m, 4H), 7.14 (d, J=2.5 Hz, 2H), 6.88 (dd, J=8.2, 3.1 Hz, 2H), 6.60 (dd, J=7.6, 3.1 Hz, 2H), 4.29 (dt, J=10.5, 7.2 Hz, 2H), 3.39 (dt, J=10.3, 5.1 Hz, 2H), 1.64 (d, J=14.5 Hz, 2H), 1.57 (s, 18H), 1.55 (d, J=14.5 Hz, 2H), 1.50-1.44 (m, 2H), 1.41 (s, 18H), 1.24 (s, 6H), 1.19 (s, 6H), 0.85 (d, J=5.2 Hz, 18H), −1.02 (s, 6H). $^{13}$C NMR (101 MHz, C$_6$D$_6$) δ 158.17 (d, J=247.8 Hz), 153.51, 149.71, 142.90, 142.64, 142.35, 139.98, 139.35, 136.59 (d, J=7.7 Hz), 129.24, 128.60, 127.51, 127.26, 125.18 (dd, J=31.0, 8.2 Hz), 124.70, 124.27, 123.94, 123.88, 123.66, 116.97, 116.44, 113.50 (dd, J=25.9, 4.9 Hz), 111.98, 110.10, 72.33, 57.42, 51.60, 38.29, 34.95, 34.77, 32.49, 32.29, 32.10, 31.95, 31.56, 31.46. $^{19}$F NMR (376 MHz, C$_6$D$_6$) δ −60.44 (s, 6F), −114.70 (t, J=7.9 Hz, 2F).

Example 21: metal-ligand complex (21): $^1$H NMR (500 MHz, C$_6$D$_6$) δ 8.52 (d, J=1.8 Hz, 2H), 8.39 (d, J=1.9 Hz, 2H), 7.94-7.87 (m, 4H), 7.71 (dd, J=8.6, 1.9 Hz, 2H), 7.69 (d, J=8.8 Hz, 2H), 7.43 (dd, J=8.8, 1.9 Hz, 2H), 7.30 (d, J=2.4 Hz, 2H), 7.14 (d, J=2.7 Hz, 2H), 6.48 (d, J=2.7 Hz, 2H), 4.00 (t, J=10.7 Hz, 2H), 3.41 (dd, J=11.4, 3.4 Hz, 2H), 1.65 (d, J=14.6 Hz, 2H), 1.58 (d, J=14.6 Hz, 2H), 1.55 (s, 18H), 1.35 (s, 18H), 1.28-1.22 (m, 2H), 1.21 (s, 6H), 1.17 (s, 6H), 1.05 (s, 6H), 0.84 (s, 18H), −0.66 (s, 6H). $^{13}$C NMR (126 MHz, C$_6$D$_6$) δ 152.83, 152.29, 143.30, 143.13, 141.24, 139.97, 139.31, 135.61, 134.43, 131.54, 131.44, 131.23, 130.84, 127.90, 127.53, 126.22, 125.97, 124.72, 123.46, 123.08, 117.13, 115.72, 114.04, 110.49, 77.48, 57.31, 49.24, 38.19, 34.94, 34.74, 32.53, 32.33, 32.07, 32.01, 31.90, 31.39, 26.62, 16.46.

Example 23: prepare metal-ligand complex (23) in a manner similar to Example (3) except use ZrCl$_4$ instead of HfCl$_4$ to give (23): $^1$H NMR (500 MHz, C$_6$D$_6$) δ 8.52 (d, J=1.5 Hz, 2H), 8.34 (d, J=1.4 Hz, 2H), 7.92 (d, J=8.5 Hz, 2H), 7.89 (d, J=2.4 Hz, 2H), 7.74 (dd, J=8.4, 1.8 Hz, 2H), 7.72 (d, J=8.6 Hz, 2H), 7.42 (dd, J=8.8, 1.9 Hz, 2H), 7.28 (d, J=2.3 Hz, 2H), 7.18 (d, J=2.3 Hz, 2H), 6.52 (d, J=2.0 Hz, 2H), 3.50 (dt, J=9.8, 4.8 Hz, 2H), 3.24 (dt, J=10.5, 5.4 Hz, 2H), 1.65 (d, J=14.5 Hz, 3H), 1.57 (d, J=14.7 Hz, 20H), 1.56 (s, 21H), 1.32 (s, 18H), 1.29-1.25 (m, 2H), 1.24 (s, 6H), 1.22 (s, 6H), 1.19 (s, 6H), 0.83 (s, 18H), −0.54 (s, 6H). $^{13}$C NMR (126 MHz, C$_6$D$_6$) δ 152.91, 152.39, 143.09, 142.96, 140.94, 139.99, 139.48, 135.47, 134.51, 131.97, 131.40, 130.52, 130.36, 129.28, 128.50, 127.76, 127.64, 126.47, 125.66, 125.63, 124.65, 123.36, 123.06, 117.14, 115.93, 113.74, 110.39, 76.19, 57.49, 43.81, 38.24, 34.96, 34.72, 32.56, 32.37, 32.00, 31.98, 31.84, 31.27, 30.27, 16.21.

Examples 26 to 31: the metal-ligand complexes (26) to (31) are prepared in a manner similar to the preparation of Examples 1 to 3 except use ligands (Q26) to (Q31), respectively.

Example 26: metal-ligand complex (26): $^1$H NMR (400 MHz, C$_6$D$_6$) δ 8.67 (d, J=1.3 Hz, 2H), 8.42 (d, J=1.2 Hz, 2H), 8.14 (d, J=8.5 Hz, 2H), 8.04 (d, J=2.0 Hz, 2H), 7.96-7.83 (m, 4H), 7.57 (d, J=1.9 Hz, 2H), 7.51 (dd, J=8.8, 1.6 Hz, 2H), 6.91 (d, J=2.7 Hz, 2H), 6.35 (d, J=2.5 Hz, 2H), 3.93-3.72 (m, 2H), 3.62-3.33 (m, 2H), 3.14 (s, 6H), 1.79 (d, J=14.4 Hz, 2H), 1.71 (d, J=14.4 Hz, 2H), 1.70 (s, 18H), 1.53-1.38 (m, 40H), 0.96 (s, 18H), −0.55 (s, 6H). $^{13}$C NMR (101 MHz, C$_6$D$_6$) δ 157.50, 153.40, 147.37, 142.61, 142.42, 140.02, 139.96, 139.42, 134.73, 133.56, 131.35, 129.08, 128.32, 127.26, 125.97, 125.53, 125.45, 124.55, 123.00, 122.78, 116.96, 116.85, 115.67, 115.61, 113.77, 110.41, 76.28, 75.00, 57.26, 54.47, 48.77, 37.96, 34.75, 34.45, 32.34, 32.17, 31.74, 31.10, 30.06, 16.53.

Example 27: metal-ligand complex (27): $^1$H NMR (400 MHz, C$_6$D$_6$) δ 8.66 (d, J=1.3 Hz, 2H), 8.44 (d, J=1.2 Hz, 2H), 8.11 (d, J=8.6 Hz, 2H), 8.04 (d, J=2.3 Hz, 2H), 7.86 (dd, J=8.6, 1.5 Hz, 2H), 7.77 (d, J=8.8 Hz, 2H), 7.59 (d, J=2.2 Hz, 2H), 7.45 (dd, J=8.8, 1.5 Hz, 3H), 7.21 (dd, 2H), 6.83 (d, J=7.9 Hz, 2H), 3.76 (m, 2H), 3.49 (m, 2H), 1.83 (d, J=14.6 Hz, 2H), 1.81 (s, 6H), 1.77 (d, J=14.6 Hz, 2H), 1.70 (s, 18H), 1.50-1.48 (m, 2H), 1.49 (s, 6H), 1.44 (s, 6H), 1.41 (s, 18H), 1.29 (s, 6H), 1.00 (s, 18H), −0.77 (s, 6H). $^{13}$C NMR (101 MHz, C$_6$D$_6$) δ 153.44, 153.36, 142.52, 142.29, 139.91, 139.28, 138.12, 131.48, 131.25, 130.85, 130.60, 129.08, 128.32, 127.29, 125.64, 125.45, 125.36, 124.50, 122.87, 122.73, 116.56, 115.33, 113.66, 110.34, 75.89, 57.42, 48.48, 38.01, 34.72, 34.44, 32.40, 32.19, 31.96, 31.78, 31.73, 31.01, 19.33, 12.56.

Example 28: metal-ligand complex (28): $^1$H NMR (400 MHz, C$_6$D$_6$) δ 8.48 (d, J=1.8 Hz, 2H), 8.33 (d, J=1.7 Hz, 2H), 7.96 (d, J=8.8 Hz, 2H), 7.91 (d, J=8.6 Hz, 2H), 7.78 (dd, J=8.6, 1.9 Hz, 2H), 7.70 (d, J=2.5 Hz, 2H), 7.40 (d, J=2.5 Hz, 2H), 7.37 (dd, J=8.8, 1.9 Hz, 2H), 7.29 (d, J=8.0 Hz, 2H), 7.00 (dd, J=8.1, 1.9 Hz, 2H), 6.24 (d, J=1.9 Hz, 2H), 4.00-3.95 (m, 2H), 3.45-3.39 (m, 2H), 1.65 (d, J=14.5 Hz, 2H), 1.55 (d, J=14.5 Hz, 2H), 1.53 (s, 18H), 1.34 (s, 18H), 1.31 (s, 6H), 1.36-1.29 (m, 2H), 1.14 (s, 6H), 0.91 (s, 6H), 0.85 (s, 18H), −0.49 (s, 6H).

Example 29: metal-ligand complex (29): $^1$H NMR (400 MHz, C$_6$D$_6$) δ 8.61 (d, J=1.8 Hz, 2H), 8.28 (d, J=1.8 Hz, 2H), 8.22 (d, J=8.6 Hz, 2H), 8.10 (d, J=2.4 Hz, 2H), 7.96 (dd, J=8.6, 1.9 Hz, 2H), 7.79 (d, J=8.8 Hz, 2H), 7.61 (d, J=2.5 Hz, 2H), 7.44 (d, J=2.5 Hz, 2H), 7.37 (dd, J=8.8, 1.9 Hz, 2H), 7.11 (d, J=2.4 Hz, 2H), 4.24-4.19 (m, 4H), 3.55-3.50 (m, 4H), 1.81 (d, J=14.5 Hz, 4H), 1.71 (s, 18H), 1.70 (d, J=14.5 Hz, 4H), 1.47 (s, 6H), 1.46-1.43 (m, 3H), 1.40 (s, 6H), 1.39 (s, 18H), 0.97 (s, 18H), 0.96 (s, 18H), −0.55 (s, 6H). $^{13}$C NMR (101 MHz, C$_6$D$_6$) δ 154.24, 151.19, 149.56, 143.03, 143.00, 140.87, 140.82, 140.40, 138.46, 135.96, 131.52, 130.29, 129.89, 129.71, 129.34, 129.26, 129.13, 129.07, 128.86, 128.62, 128.50, 128.38, 128.25, 127.99, 127.29, 126.50, 126.26, 125.06, 124.11, 123.81, 118.08, 116.69, 114.34, 111.13, 77.22, 58.18, 50.00, 38.86, 35.61, 35.25, 35.00, 33.19, 33.00, 32.57, 32.54, 32.07, 31.37, 30.31.

Example 30: metal-ligand complex (30): $^1$H NMR (400 MHz, C$_6$D$_6$) δ 8.58 (d, J=1.7 Hz, 2H), 8.43 (d, J=1.7 Hz, 2H), 8.01 (d, J=8.8 Hz, 2H), 7.93 (d, J=8.6 Hz, 2H), 7.84 (dd, J=8.6, 1.8 Hz, 2H), 7.77 (d, J=2.4 Hz, 2H), 7.51 (d, J=2.4 Hz, 2H), 7.46 (dd, J=8.8, 1.9 Hz, 2H), 7.37 (d, J=8.1 Hz, 2H), 7.22 (d, J=7.7 Hz, 2H), 7.08 (dd, J=8.2, 1.7 Hz, 2H), 6.21 (s, 2H), 4.61-4.51 (m, 2H), 3.77-3.68 (m, 2H), 1.73 (d, J=14.5 Hz, 2H), 1.67 (d, J=14.5 Hz, 2H), 1.61 (s, 18H), 1.44 (s, 18H), 1.40 (s, 6H), 1.35-1.30 (s, 4H), 1.18 (s, 6H), 1.09 (s, 18H), 0.95 (s, 18H), −0.40 (s, 6H).

Example 31: metal-ligand complex (31): $^1$H NMR (400 MHz, C$_6$D$_6$) δ 8.41 (d, J=1.8 Hz, 2H), 8.29 (d, J=1.9 Hz, 2H), 7.66 (d, J=8.7 Hz, 4H), 7.61 (d, J=2.5 Hz, 2H), 7.55 (s, 2H), 7.47 (d, J=8.6 Hz, 2H), 7.45 (dd, J=8.8, 1.9 Hz, 2H), 7.36 (d, J=2.5 Hz, 2H), 6.59 (s, 2H), 3.71-3.39 (m, 2H), 1.64 (d, J=14.5 Hz, 2H), 1.56 (s, 18H), 1.52 (d, J=14.5 Hz, 2H), 1.39-1.33 (m, 2H), 1.31 (s, 18H), 1.21 (s, 6H), 1.20 (s, 18H), 0.85 (s, 18H), −0.79 (s, 6H). $^{13}$C NMR (101 MHz, C$_6$D$_6$) δ 154.52, 153.53, 147.97, 143.39, 142.73, 141.86, 141.43, 141.22, 135.91, 132.06, 130.60, 129.40, 129.30, 127.01, 126.25, 124.65, 124.01, 120.86, 117.99, 116.02, 112.65, 109.90, 72.99, 57.15, 50.80, 38.20, 35.83, 34.93, 34.71, 32.54, 32.34, 32.10, 32.03, 32.00, 31.24, 29.74, 28.83.

Examples 32 to 34: the metal-ligand complexes (32) to (34) are prepared in a manner similar to the preparation of Examples 1 to 3 except use ligands (Q23) to (Q25), respectively.

Names of metal-ligand complexes (4) to (25) are:

(2',2"-(propane-1,3-diylbis(oxy))bis(5'-chloro-3-(3,6-di-tert-octyl-9H-carbazol-9-yl)-3'-methyl-5-(2,4,4-trimethylpentan-2-yl)biphenyl-2-ol))dimethyl-hafnium, (4);

(2',2"-(propane-1,3-diylbis(oxy))bis(3-(3,6-di-tert-butyl-9H-carbazol-9-yl)-3'-chloro-5-(2,4,4-trimethylpentan-2-yl)biphenyl-2-ol))dimethyl-hafnium, (5);

(2',2"-(propane-1,3-diylbis(oxy))bis(3'-chloro-3-(3,6-di-tert-butyl-9H-carbazol-9-yl)-5'-fluoro-5-(2,4,4-trimethylpentan-2-yl)biphenyl-2-ol))dimethyl-hafnium, (6);

(2',2"-(propane-1,3-diylbis(oxy))bis(5'-chloro-3-(3,6-di-tert-butyl-9H-carbazol-9-yl)-3'-fluoro-5-(2,4,4-trimethylpentan-2-yl)biphenyl-2-ol))dimethyl-hafnium, (6a);

(2',2"-(propane-1,3-diylbis(oxy))bis(5'-chloro-3-(3,6-di-tert-butyl-9H-carbazol-9-yl)-3'-(1-methylethyl)-5-(2,4,4-trimethylpentan-2-yl)biphenyl-2-ol))dimethyl-hafnium, (6b);

(2',2"-(propane-1,3-diylbis(oxy))bis(3-(3,6-di-tert-butyl-9H-carbazol-9-yl)-3'-methyl-5-(2,4,4-trimethylpentan-2-yl)biphenyl-2-ol))dimethyl-hafnium, (7);

(2',2"-(propane-1,3-diylbis(oxy))bis(5'-cyano-3-(3,6-di-tert-butyl-9H-carbazol-9-yl)-3'-methyl-5-(2,4,4-trimethylpentan-2-yl)biphenyl-2-ol))dimethyl-hafnium, (8);

(2',2"-(propane-1,3-diylbis(oxy))bis(5'-dimethylamino-3-(3,6-di-tert-butyl-9H-carbazol-9-yl)-3'-methyl-5-(2,4,4-trimethylpentan-2-yl)biphenyl-2-ol))dimethyl-hafnium, (9);

(2',2"-(propane-1,3-diylbis(oxy))bis(3',5'-dimethyl-3-(3,6-di-tert-butyl-9H-carbazol-9-yl)-5-(2,4,4-trimethylpentan-2-yl)biphenyl-2-ol))dimethyl-hafnium, (10);

(2',2"-(propane-1,3-diylbis(oxy))bis(5'-chloro-3-(3,6-di-tert-butyl-9H-carbazol-9-yl)-3'-ethyl-5-(2,4,4-trimethylpentan-2-yl)biphenyl-2-ol))dimethyl-hafnium, (11);

(2',2"-(propane-1,3-diylbis(oxy))bis(3-(3,6-di-tert-butyl-9H-carbazol-9-yl)-3'-methyl-5'-tert-butyl-5-(2,4,4-trimethylpentan-2-yl)biphenyl-2-ol))dimethyl-hafnium, (12);

(2',2"-(propane-1,3-diylbis(oxy))bis(3-(3,6-di-tert-butyl-9H-carbazol-9-yl)-5'-fluoro-3'-methyl-5-(2,4,4-trimethylpentan-2-yl)biphenyl-2-ol))dimethyl-hafnium, (13);

(2',2"-(propane-1,3-diylbis(oxy))bis(3-(9H-carbazol-9-yl)-5'-chloro-3'-methyl-5-(2,4,4-trimethylpentan-2-yl)biphenyl-2-ol))dimethyl-hafnium, (14);

(2',2"-(propane-1,3-diylbis(oxy))bis(3-(3,6-di-tert-butyl-9H-carbazol-9-yl)-3'-methyl-5'-trifluoromethyl-5-(2,4,4-trimethylpentan-2-yl)biphenyl-2-ol))dimethyl-hafnium, (15);

(2',2"-(2,2-dimethyl-2-silapropane-1,3-diylbis(oxy))bis(3',5'-dichloro-3-(3,6-di-tert-butyl-9H-carbazol-9-yl)-5-(2,4,4-trimethylpentan-2-yl)biphenyl-2-ol)dimethyl-hafnium, (16);

(2',2"-(2,2-dimethyl-2-silapropane-1,3-diylbis(oxy))bis(5'-chloro-3-(3,6-di-tert-butyl-9H-carbazol-9-yl)-3'-methyl-5-(2,4,4-trimethylpentan-2-yl)biphenyl-2-ol))dimethyl-hafnium, (17);

(2',2"-(propane-1,3-diylbis(oxy))bis(3'-bromo-5'-chloro-3-(3,6-di-tert-butyl-9H-carbazol-9-yl)-5-(2,4,4-trimethylpentan-2-yl)biphenyl-2-ol))dimethyl-hafnium, (18);

(2',2"-(propane-1,3-diylbis(oxy))-(5'-chloro-3-(3,6-di-tert-butyl-9H-carbazol-9-yl)-3'-fluoro-5-(2,4,4-trimethylpentan-2-yl)biphenyl-2-ol)-(3",5"-dichloro-3-(3,6-di-tert-butyl-9H-carbazol-9-yl)-5-(2,4,4-trimethylpentan-2-yl)biphenyl-2-ol))dimethyl-hafnium, (19);

(2',2"-(propane-1,3-diylbis(oxy))-(5'-chloro-3-(3,6-di-tert-butyl-9H-carbazol-9-yl)-3'-methyl-5-(2,4,4-trimethylpentan-2-yl)biphenyl-2-ol)-(5"-chloro-3-(3,6-di-tert-butyl-9H-carbazol-9-yl)-5-(2,4,4-trimethylpentan-2-yl)biphenyl-2-ol))dimethyl-hafnium, (19a);

(2',2"-(propane-1,3-diylbis(oxy))bis(3-(3,6-di-tert-butyl-9H-carbazol-9-yl)-5'-fluoro-3'-trifluoromethyl-5-(2,4,4-trimethylpentan-2-yl)biphenyl-2-ol))dimethyl-hafnium, (20);

(2',2"-(butane-1,4-diylbis(oxy))bis(5'-chloro-3-(3,6-di-tert-butyl-9H-carbazol-9-yl)-3'-methyl-5-(2,4,4-trimethylpentan-2-yl)biphenyl-2-ol)dimethyl-hafnium, (21);

(2',2"-(ethane-1,2-diylbis(oxy))bis(5'-chloro-3-(3,6-di-tert-butyl-9H-carbazol-9-yl)-3'-methyl-5-(2,4,4-trimethylpentan-2-yl)biphenyl-2-ol))dimethyl-hafnium, (22);

(2',2"-(propane-1,3-diylbis(oxy))bis(5'-chloro-3-(3,6-di-tert-butyl-9H-carbazol-9-yl)-3'-methyl-5-(2,4,4-trimethylpentan-2-yl)biphenyl-2-ol))dimethyl-zirconium, (23);

(2',2"-(propane-1,3-diylbis(oxy))bis(3-(3,6-di-tert-butyl-9H-carbazol-9-yl)-3',5'-dichloro-5-(2,4,4-trimethylpentan-2-yl)biphenyl-2-ol))dimethyl-titanium, (24); and (2',2"-(propane-1,3-diylbis(oxy))bis(5'-chloro-3-(3,6-di-tert-butyl-9H-carbazol-9-yl)-3'-methyl-5-(2,4,4-trimethylpentan-2-yl)biphenyl-2-ol))dimethyl-titanium, (25).

The names of metal-ligand complexes (26) to (31) are:

(2',2"-(propane-1,3-diylbis(oxy))bis(5'-methoxy-3-(3,6-di-tert-butyl-9H-carbazol-9-yl)-3'-methyl-5-(2,4,4-trimethylpentan-2-yl)biphenyl-2-ol))dimethyl-hafnium, (26);

(2',2"-(propane-1,3-diylbis(oxy))bis(3',4'-dimethyl-3-(3,6-di-tert-butyl-9H-carbazol-9-yl)-5-(2,4,4-trimethylpentan-2-yl)biphenyl-2-ol)dimethyl-hafnium, (27);

(2',2"-(propane-1,3-diylbis(oxy))bis(4'-(tert-butyl)-3-(3,6-di-tert-butyl-9H-carbazol-9-yl)-5-(2,4,4-trimethylpentan-2-yl)biphenyl-2-ol))dimethyl-hafnium, (28);

(2',2"-(propane-1,3-diylbis(oxy))bis(3'-chloro-3-(3,6-di-tert-butyl-9H-carbazol-9-yl)-5'-(tert-butyl)-5-(2,4,4-trimethylpentan-2-yl)biphenyl-2-ol))dimethyl-hafnium, (29);

(2',2"-(butane-1,4-diylbis(oxy))bis(4'-(tert-butyl)-3-(3,6-di-tert-butyl-9H-carbazol-9-yl)-5-(2,4,4-trimethylpentan-2-yl)biphenyl-2-ol))dimethyl-hafnium, (30); and (2',2"-(propane-1,3-diylbis(oxy))bis(5'-chloro-4'-(tert-butyl)-3-(3,6-di-tert-butyl-9H-carbazol-9-yl)-5-(2,4,4-trimethylpentan-2-yl)biphenyl-2-ol))dimethyl-hafnium, (31).

The names of metal-ligand complexes (32) to (34) are:

(2',2"-(pentane-1,5-diylbis(oxy))bis(5'-chloro-3-(3,6-di-tert-butyl-9H-carbazol-9-yl)-3'-methyl-5-(2,4,4-trimethylpentan-2-yl)biphenyl-2-ol))dimethyl-hafnium, (32);

(2',2"-(pentane-2,4-diylbis(oxy))bis(5'-chloro-3-(3,6-di-tert-butyl-9H-carbazol-9-yl)-3'-methyl-5-(2,4,4-trimethylpentan-2-yl)biphenyl-2-ol))dimethyl-hafnium, (33); and (2',2"-(hexane-1,6-diylbis(oxy))bis(5'-chloro-3-(3,6-di-tert-butyl-9H-carbazol-9-yl)-3'-methyl-5-(2,4,4-trimethylpentan-2-yl)biphenyl-2-ol))dimethyl-hafnium, (34).

Figure 10:
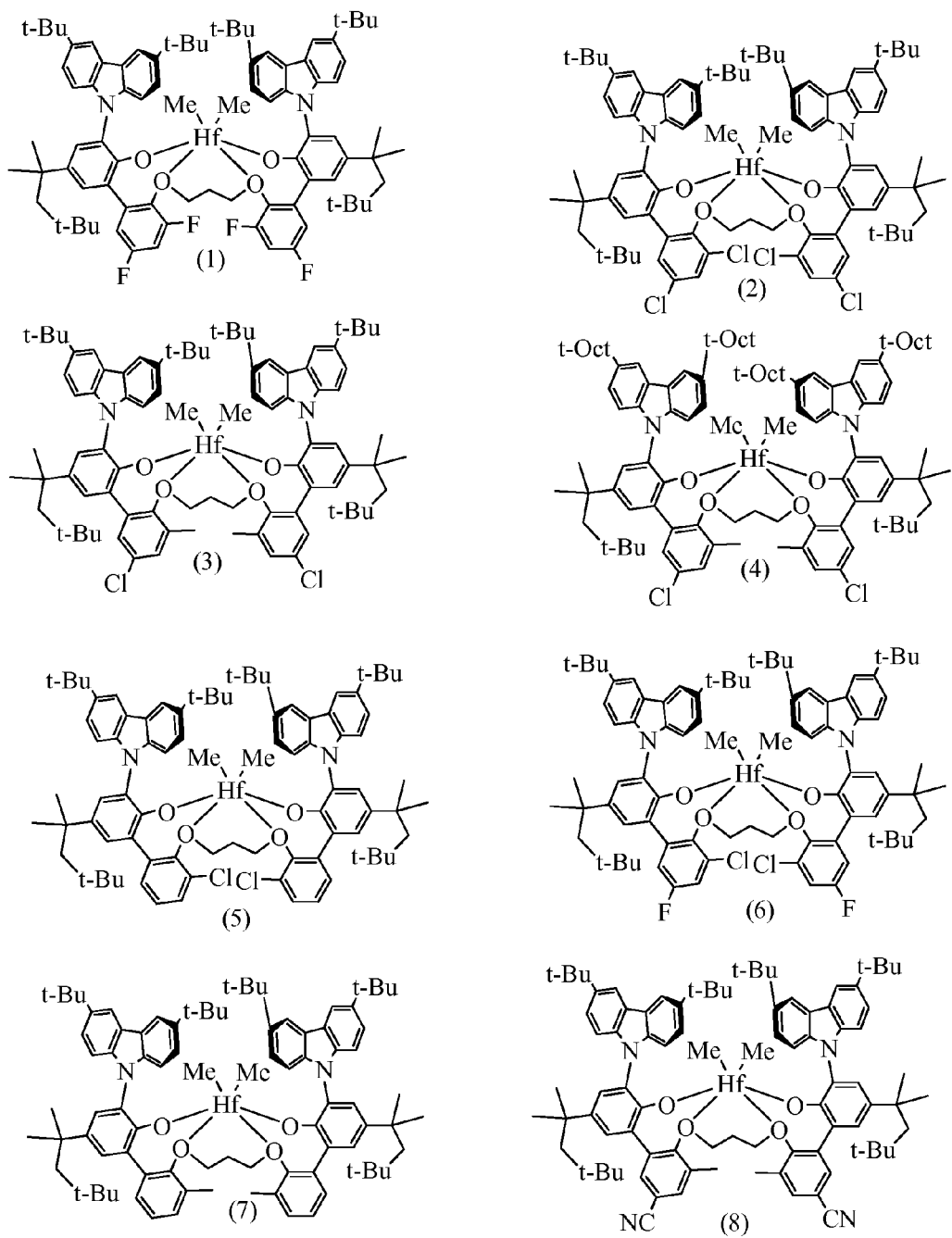
FIG. 10 shows structures of metal-ligand complexes (1) to (8) of Examples 1 to 8.
Figure 11:
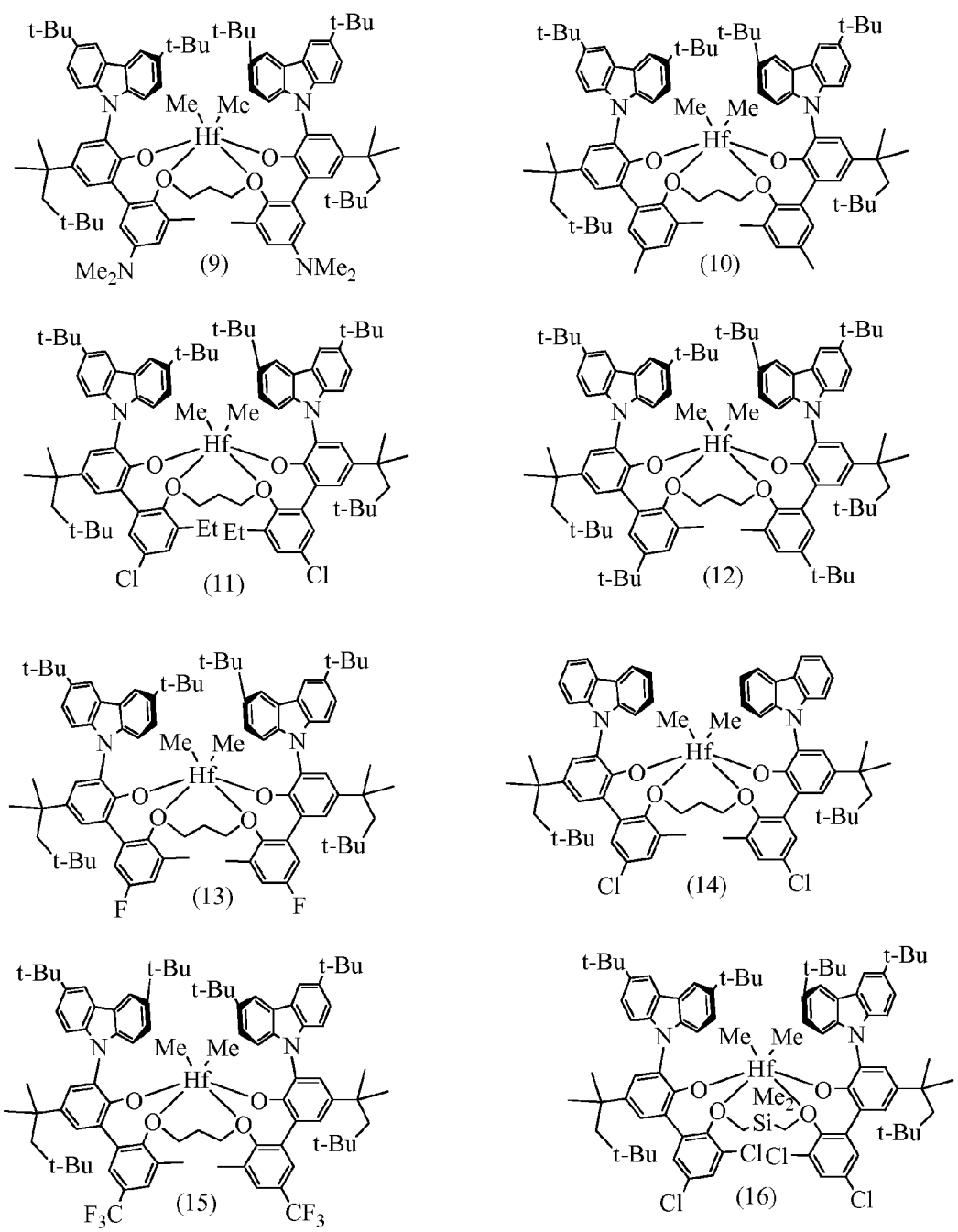
FIG. 11 shows structures of metal-ligand complexes (9) to (16) of Examples 9 to 16.
Figure 15:
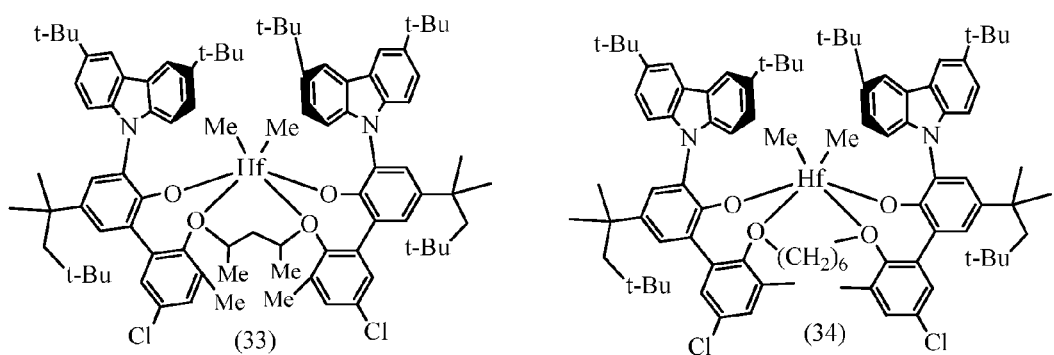
FIG. 15 shows structures of metal-ligand complexes (33) and (34) of Examples 33 and 34.

Structures of metal-ligand complexes (1) to (8) are shown in FIG. 10. Structures of metal-ligand complexes (9) to (16) are shown in FIG. 11. Structures of metal-ligand complexes (17) to (24) are shown in FIG. 12. Structure of metal-ligand complexes (25) to (32) are shown in FIG. 13. Structures of metal-ligand complexes (33) and (34) are shown in FIG. 15. In FIGS. 10 to 13 and in this specification, "t-butyl" is synonymous with tert-butyl, tertiary-butyl, and 1,1-dimethylethyl. The "Me" means methyl. The "Et" means ethyl. The "t-octyl" is synonymous with tert-octyl, tertiary-octyl, and 1,1-dimethylhexyl. The "—CN" is cyano. The "MeO" means methoxy. The structures of metal-ligand complex (33) and (34) are the same as the structure of metal-ligand complex

(32) except the $(CH_2)_5$ of (32) is replaced by —$CH(CH_3)CH_2CH(CH_3)$— or $(CH_2)_6$, respectively, in (33) and (34).

In some embodiments at least one of the one or more metal-ligand complexes of formula (I) is any one of metal-ligand complexes (1) to (3). In some embodiments at least one of the one or more metal-ligand complexes of formula (I) is any one of metal-ligand complexes (10), (11), (13), and (20) to (23). In some embodiments at least one of the one or more metal-ligand complexes of formula (I) is any one of metal-ligand complexes (4) to (9), (12), (14) to (19), (24), and (25). In some embodiments at least one of the one or more metal-ligand complexes of formula (I) is metal-ligand complex (3). In some embodiments at least one of the one or more metal-ligand complexes of formula (I) is metal-ligand complex (13). In some embodiments at least one of the one or more metal-ligand complexes of formula (I) is any one of metal-ligand complexes (1), (2), (10), (11), and (20) to (23). In some embodiments at least one of the one or more metal-ligand complexes of formula (I) is any one of metal-ligand complexes (26) to (31). In some embodiments at least one of the one or more metal-ligand complexes of formula (I) is any one of metal-ligand complexes (32) to (34).

General procedure for selective polymerization of ethylene in the presence of a $(C_3$-$C_{40})$alpha-olefin (e.g., 1-octene) to give an ethylene-enriched polyolefin Summary: conduct ethylene polymerization reactions at a temperature of 150° C. or 170° C. (as indicated), or even 190° C., in a 2 liter (L) batch reactor with feeds of 250 grams (g) of 1-octene; 533 g of mixed alkanes solvent (e.g., isopar-E); 460 pounds per square inch gauge (psig; 3.17 megapascals (MPa)) of ethylene gas pressure; and optionally 45 psig (0.31 MPa) hydrogen gas as a molecular weight control agent. Prepare catalyst by activating a metal-ligand complex of formula (I) (e.g., the metal ligand complex of Example Q1, Q2, or Q3) with 1.2 mole equivalents (relative to the number of moles of the metal ligand complex of formula (I)) of an activating co-catalyst that is either trityl borate or the BOMATPB or BOMATPB$^{mix}$) and another activating co-catalyst that is a triisobutylaluminum-modified methylaluminoxane-3A (MMAO-3A). Carry out all polymerization reactions for 10 minutes and then stop them by venting the ethylene to atmospheric pressure (i.e., about 101 kilopascals (kPa).

Pass all feeds through columns of alumina and Q-5™ catalyst (available from Engelhard Chemicals Inc.) prior to introduction into the 2 L batch reactor. Handle mixtures and solutions of the metal-ligand complex of formula (I) (e.g., in toluene) and solutions of the activating co-catalysts (e.g., in toluene) in a glove box under an inert gas atmosphere (e.g., nitrogen or argon gas). With stirring, charge the 2-liter batch reactor with about 533 g of mixed alkanes solvent (Isopar E) and 250 g of 1-octene. Add 45 psig hydrogen gas ($H_2$) as a molecular weight control agent by differential pressure expansion from a 75 mL volume addition tank at 300 psi (2070 kPa). Heat contents of the batch reactor to a polymerization temperature of from 140° C. to 190° C. (e.g., 150° C. or 170° C.), as the case may be, and saturate the contents with ethylene at 460 psig (3.4 MPa). Premix dilute toluene solutions of the metal-ligand complex of formula (I) and dilute toluene solutions of the activating co-catalysts. Then transfer the resulting premixture to a catalyst addition tank, and inject the premixture therefrom into the batch reactor. Maintain the olefin polymerization conditions (e.g., temperature) for 15 minutes, adding ethylene on demand to maintain a pressure at or above 5 pounds per square inch (psi) (34.5 kilopascals (kPa)); record weight of ethylene added. Continuously remove heat from the resulting reaction mixture via heat transfer to an internal cooling coil. After the 15 minutes, remove the resulting solution from the batch reactor, quench the reaction with 2-propanol, and stabilize the resulting quenched mixture against further olefin polymerization by adding 10 mL of a toluene solution containing approximately 67 milligrams (mg) of a hindered phenol antioxidant (IRGANOX™ 1010 from Ciba Geigy Corporation) and 133 mg of a phosphorus stabilizer (IRGAFOS™ 168 from Ciba Geigy Corporation). Recover the resulting ethylene-enriched polyethylene polymer products by drying them for about 12 hours in a temperature-ramped vacuum oven with a starting temperature of about 25° C. and a final drying temperature of 140° C.

Determine melting and crystallization temperatures of ethylene-enriched polyethylene polymer products by DSC. Determine $M_w$ and ratio of $M_w/M_n$ (polydispersity index or PDI). Determine mole percent (mol %) 1-octene incorporation and density.

Illustrative procedures are: Determine melting and crystallization temperatures of ethylene-enriched polyethylene polymer products by DSC using DSC 2910 instrument from TA Instruments, Inc. DSC samples are first heated from room temperature to 180° C. at a heating rate of 10° C. per minute. Hold at 180° C. for from 2 minutes to 4 minutes, then cool the sample to −40° C. at a cooling rate of 10° C. per minute. Hold at −40° C. for from 2 minutes to 4 minutes, and then heat the sample to 160° C. at a heating rate of 10° C. per minute. Determine $M_w$ and ratio of $M_w/M_n$ (polydispersity index or PDI) using a Polymer Labs™ 210 high temperature gel permeation calorimeter. Determine mole percent (mol %) 1-octene incorporation and density, Prepare samples using 13 milligrams (mg) of polyolefin sample. Dilute the polyolefin sample with 16 mL of 1,2,4-trichlorobenzene (TCB; stabilized with BHT), and heat and shake the resulting diluted mixture at 160° C. for 2 hours to give a solution, which is cooled to room temperature. Deposit 140 microliters of cooled polyolefin solution onto a silica wafer, heat to 140° C. until the sample is dried, and analyze the dried sample using a Nicolet Nexus 670 FT-IR instrument with version 7.1 software and equipped with an AutoPro auto sampler.

Between polymerization runs, wash the batch reactor out by adding thereto 850 g of mixed alkanes and heating to 150° C. Then empty the batch reactor of the resulting heated mixed alkanes immediately before beginning a new polymerization run.

For perspective, employing non-invention catalysts prepared from non-invention metal-ligand complexes that are of formula (I) except they lack $R^{1a}$ and $R^{1b}$ in the general procedure prepare polyethylenes having either greater than 14.0 mol %, and in some cases greater than 17 mol %, covalent incorporation of 1-octene (i.e., are not ethylene-enriched); a density of less than 0.86 grams per milliliter (g/mL); a melting temperature of less than 50° C., and in some cases less than 30° C.; or a combination thereof when prepared by the aforementioned process.

Examples A to N: Selective polymerization of ethylene in the presence of 1-octene to give a high density polyethylene (ethylene-enriched, having low incorporation of 1-octene) using the metal-ligand complex (1), (2), (3) (seven times), (11) (two times), (13) (two times), and (21) of Examples 1, 2, 3 (seven times), 11 (two times), 13 (two times), and 21, respectively.

Follow the general procedure described above using the metal-ligand complex (1), (2), or (3) of Example 1, 2, or 3, respectively, as the metal-ligand complex of formula (I) in three separate runs for Examples A, B, and C, respectively:

Example A: using 0.3 micromoles (μmol) of the metal-ligand complex (1) of Example 1; activating co-catalysts that are BOMATPB$^{mix}$ (0.36 μmol) and MMAO-3A (3 μmol); and a polymerization reaction temperature of 150° C.; and Example B: using 0.2 μmol of the metal-ligand complex of (2) of Example 2; activating co-catalysts that are BOMAT-PB$^{mix}$ (0.24 μmol) and MMAO-3A (2 μmol); and a polymerization reaction temperature of 150° C.

Example C: using 0.1 μmol of the metal-ligand complex (3) of Example 3; activating co-catalysts that are BOMAT-PB$^{mix}$ (0.12 μmol) and MMAO-3A (1.2 μmol); and a polymerization reaction temperature of 170° C.

Follow the general procedure described previously using the metal-ligand complex (3) (six times), (11) (two times), (13) (two times), and (21) of Examples 3 (six times), 11 (two times), 13 (two times), and 21, respectively in eleven separate runs for Examples D to N, respectively:

Examples D and E: using 0.1 μmol of the metal-ligand complex (3) of Example 3; activating co-catalysts that are BOMATPB$^{mix}$ (0.12 μmol) and MMAO-3A (1.0 μmol); and a polymerization reaction temperature of 170° C.

Examples F and G: using 0.075 μmol of the metal-ligand complex (3) of Example 3; activating co-catalysts that are BOMATPB$^{mix}$ (0.09 μmol) and MMAO-3A (0.75 μmol); and a polymerization reaction temperature of 170° C.

Examples H and I: using 0.05 μmol of the metal-ligand complex (3) of Example 3; activating co-catalysts that are BOMATPB$^{mix}$ (0.06 μmol) and MMAO-3A (0.5 μmol); and a polymerization reaction temperature of 170° C.

Example J: using 0.05 μmol of the metal-ligand complex (11) of Example 11; activating co-catalysts that are BOMAT-PB$^{mix}$ (0.06 μmol) and MMAO-3A (0.5 μmol); and a polymerization reaction temperature of 170° C.

Example K: using 0.08 μmol of the metal-ligand complex (11) of Example 11; activating co-catalysts that are BOMAT-PB$^{mix}$ (0.096 μmol) and MMAO-3A (0.8 μmol); and a polymerization reaction temperature of 170° C.

Example L: using 0.1 μmol of the metal-ligand complex (13) of Example 13; activating co-catalysts that are BOMAT-PB$^{mix}$ (0.12 μmol) and MMAO-3A (1.0 μmol); and a polymerization reaction temperature of 170° C.

Example M: using 0.075 μmol of the metal-ligand complex (13) of Example 13; activating co-catalysts that are BOMAT-PB$^{mix}$ (0.09 μmol) and MMAO-3A (0.75 μmol); and a polymerization reaction temperature of 170° C.

Example N: using 0.08 μmol of the metal-ligand complex (21) of Example 21; activating co-catalysts that are BOMAT-PB$^{mix}$ (0.096 μmol) and MMAO-3A (0.8 μmol); and a polymerization reaction temperature of 170° C.

Example O: using 605 g mixed alkanes, 300 g 1-octene, 288 psi (1,990 kPa) ethylene, 0.15 μmol of the metal-ligand complex (6a) of Example 6a; activating co-catalysts that are BOMATPB$^{mix}$ (0.18 μmol) and MMAO-3A (1.5 μmol); and a polymerization reaction temperature of 140° C. and run time of 10 minutes.

Example P: using 605 g mixed alkanes, 300 g 1-octene, 288 psi (1,990 kPa) ethylene, 0.2 μmol of the metal-ligand complex (6b) of Example 6b; activating co-catalysts that are BOMATPB$^{mix}$ (0.24 μmol) and MMAO-3A (2 μmol); and a polymerization reaction temperature of 140° C. and run time of 10 minutes.

Results of Examples A to N are shown below in Tables 1 and 2.

TABLE 1 certain characterizations of processes of Examples A to P employing metal-ligand complexes (1) to (3) (seven times), (11) (two times), (13) (two times), (21), (6a), and (6b), respectively.

| Ex. No. | Metal-ligand complex Number | Metal-ligand complex amount (μmol) | Activating co-catalysts (amount in μmol) | Weight of Ethylene added (g) | Yield of PEO (g) | Catalyst Efficiency (gPEO/gM) |
|---|---|---|---|---|---|---|
| A | (1) | 0.3 | BOMATPB$^{mix}$ (0.36)/MMAO-3A (3) | 21.7 | 26.6 | 497,000 |
| B | (2) | 0.2 | BOMATPB$^{mix}$ (0.24)/MMAO-3A (2) | 11.0 | 12.6 | 353,000 |
| C | (3) | 0.1 | BOMATPB$^{mix}$ (0.12)/MMAO-3A (1.2) | 16.8 | 17.3 | 969,000 |
| D | (3) | 0.1 | BOMATPB$^{mix}$ (0.12)/MMAO-3A (1.0) | 11.7 | 13.2 | 740,000 |
| E | (3) | 0.1 | BOMATPB$^{mix}$ (0.12)/MMAO-3A (1.0) | 25.1 | 26.6 | 1,490,000 |
| F | (3) | 0.075 | BOMATPB$^{mix}$ (0.09)/MMAO-3A (0.75) | 11.7 | 13.0 | 971,000 |
| G | (3) | 0.075 | BOMATPB$^{mix}$ (0.09)/MMAO-3A (0.75) | 12.8 | 14.6 | 1,091,000 |
| H | (3) | 0.05 | BOMATPB$^{mix}$ (0.06)/MMAO-3A (0.5) | 8.3 | 8.3 | 930,000 |
| I | (3) | 0.05 | BOMATPB$^{mix}$ (0.06)/MMAO-3A (0.5) | 25.1 | 26.0 | 2,913,000 |
| J | (11) | 0.05 | BOMATPB$^{mix}$ (0.06)/MMAO-3A (0.5) | 8.6 | 8.4 | 941,000 |
| K | (11) | 0.08 | BOMATPB$^{mix}$ (0.096)/MMAO-3A (0.8) | 19.8 | 21.2 | 1,485,000 |
| L | (13) | 0.1 | BOMATPB$^{mix}$ (0.12)/MMAO-3A (1.0) | 13.5 | 34.5 | 1,933,000 |
| M | (13) | 0.075 | BOMATPB$^{mix}$ (0.09)/MMAO-3A (0.75) | 12.8 | 14.3 | 1,068,000 |

TABLE 1-continued certain characterizations of processes of Examples A to P employing metal-ligand complexes (1) to (3) (seven times), (11) (two times), (13) (two times), (21), (6a), and (6b), respectively.

| Ex. No. | Metal-ligand complex Number | Metal-ligand complex amount (μmol) | Activating co-catalysts (amount in μmol) | Weight of Ethylene added (g) | Yield of PEO (g) | Catalyst Efficiency (gPEO/gM) |
|---|---|---|---|---|---|---|
| N | (21) | 0.08 | BOMATPB$^{mix}$ (0.096)/ MMAO-3A (0.8) | 1.3 | 1.2 | 84,000 |
| O | (6a) | 0.15 | BOMATPB$^{mix}$ (0.18)/ MMAO-3A (1.5) | 22.2 | 34.3 | 1,281,000 |
| P | (6b) | 0.2 | BOMATPB$^{mix}$ (0.24)/ MMAO-3A (2) | 18.1 | 25.9 | 726,000 |

Ex. No. = Example Number;
PEO = ethylene-enriched poly(ethylene-co-1-octene) copolymer;
Catalyst Efficiency (gPEO/gM) = catalyst efficiency calculated by dividing weight in grams of PEO product by weight in grams of metal M in metal-ligand complex used.

The reactivity ratio for metal-ligand complex (1) is $r_1=40$. The reactivity ratio for metal-ligand complex (2) is $r_1=75$. The reactivity ratio for metal-ligand complex (3) is $r_1=60$. The reactivity ratio for metal-ligand complex (6b) is $r_1=100$. The reactivity ratio for metal-ligand complex (19a) is $r_1=15$.

TABLE 2 certain characterizations of high density polyethylenes of Examples A to P.

| Ex. No. | Tm (° C.) | $M_w$ (g/mol) | $M_w/M_n$ | Density (g/mL) | Mol % octene (NMR) |
|---|---|---|---|---|---|
| A | 103.6 | 22,200 | 2.5 | 0.903 | 4.4 |
| B | 115.2 | 56,400 | 4.1 | 0.924 | 2.4 |
| C | 114.8 | 153,800 | 4.7 | 0.922 | 3.1 |
| D | 113.0 | 111,000 | 6.6 | N/p | N/p |
| E | 115.5 | 97,600 | 4.9 | N/p | N/p |
| F | 115.5 | 98,000 | 8.7 | N/p | N/p |
| G | 117.0 | 92,000 | 10.4 | N/p | N/p |
| H | 116.9 | 123,000 | 5.0 | N/p | N/p |
| I | 117.1 | 114,000 | 4.5 | N/p | N/p |
| J | 116.5 | 83,400 | 3.4 | N/p | N/p |
| K | 117.9 | 75,300 | 3.8 | N/p | N/p |
| L | 111.6 | 94,900 | 2.8 | N/p | N/p |
| M | 114.8 | 111,000 | 5.7 | N/p | N/p |
| N | 107.8 | 136,000 | 2.7 | N/p | N/p |
| O | 85.4 | 24,000 | 2.1 | N/p | 8.7 (by FT-IR) |
| P | 117.1 | 90,000 | 1.9 | N/p | 1.9 (FT-IR) |

Ex. No. = Example Number; $T_m$ = melting temperature; $M_w$ (g/mol) [or $M_w$ (g/mol)] = weight average molecular weight in grams per mole determined by GPC; $M_w/M_n$ = polydispersity index (PDI) = $M_w$ divided by number average molecular weight ($M_n$) (g/mol); Mol % octene (NMR) = mole percent of 1-octene incorporated into PEO (ethylene-enriched) as determined by $^1$H-NMR spectroscopy; N/p means not provided.

Examples AA to AG: repeat the General polymerization procedure except use a 1 gallon (3.8 liter) reactor, 190° C. polymerization temperature, 250 g 1-octene, 450 psi overall pressure, 10 minute run time, metal-ligand complexes (26), (27), (12), (28), (29), (30), and (13), a molar ratio of metal-ligand complex to BOMATPB$^{mix}$ to MMAO-3A of 1 to 1.2 to 50, and the conditions described below in Table 3.

TABLE 3 preparation of ethylene-enriched PEO.

| Ex. No. | Metal-ligand complex Number | Metal-ligand complex amount (μmol) | H$_2$ gas (mmol) | Yield of PEO (g) | Catalyst Efficiency (gPEO/gM) | Tm (° C.) | $M_w$ (g/mol) | $M_w/M_n$ | $r_1$ |
|---|---|---|---|---|---|---|---|---|---|
| AA | (26) | 1.75 | 0 | 18 | 60,000 | 119.8 | 70,100 | 2.0 | |
| AB | (27) | 1.75 | 0 | 38 | 120,000 | 116.2 | 102,500 | 2.0 | |
| AC | (12) | 1.75 | 0 | 12 | 40,000 | 117.1 | 76,100 | 2.1 | |
| AD | (28) | 0.5 | 20 | 20 | 220,000 | 110.2/98.8 | 33,200 | 2.7 | |
| AE | (29) | 1 | 20 | 43 | 240,000 | 120 | 24,200 | 3.2 | |
| AF | (30) | 2 | 20 | 12 | 30,000 | 100 | 197,600 | 2.3 | |
| AG | (13) | 1.75 | 0 | 20 | 60,000 | 116.4 | 80,100 | 2.0 | |

Examples BA to BG: repeat the General polymerization procedure except use a 2 liter batch reactor, 140° C. polymerization temperature, 605 g mixed alkanes, 300 g 1-octene, 288 psi ethylene pressure, 10 minute run time, metal-ligand complexes (10), (6b), (3), (31), (2), (19a), and (13), a molar ratio of metal-ligand complex to BOMATPB$^{mix}$ to MMAO-3A of 1 to 1.2 to 10, and the conditions described below in Table 4.

TABLE 4 preparation of ethylene-enriched PEO.

| Ex. No. | Metal-ligand complex Number | Metal-ligand complex amount (µmol) | Yield of PEO (g) | Catalyst Efficiency (gPEO/gM) | Tm (° C.) | $M_w$ (g/mol) | $M_w/M_n$ | $r_1$ |
|---|---|---|---|---|---|---|---|---|
| BA | (10) | 0.02 | 17.8 | 4,986,000 | 108.2 | 269,000 | 1.6 | 82 |
| BB | (6b) | 0.2 | 25.9 | 726,000 | 117.1 | 89,600 | 1.9 | 95 |
| BC | (3) | 0.055 | 36.6 | 3,728,000 | 101.1 | 298,000 | 1.7 | 44 |
| BD | (31) | 0.35 | 21.9 | 351,000 | 72.7/91.0 | 15,700 | 3.1 | 17 |
| BE | (2) | 0.12 | 31.7 | 1,480,000 | 106.9 | 42,900 | 6.9 | 45 |
| BF | (19a) | 0.03 | 30.3 | 5,659,000 | 53.9 | 986,000 | 1.7 | 15 |
| BG | (13) | 0.017 | 10.5 | 3,460,000 | 102.0 | 253,000 | 2.3 | 33 |

Example A': replicate Example A except further employ diethyl zinc as a chain shuttling agent, twice the amounts of BOMATPB$^{mix}$ and MMAO-3A, and 0.3 µmol of the Catalyst (A1) as the promiscuous olefin polymerization catalyst (i.e., the first olefin polymerization catalyst) to give a poly(ethylene-co-1-octene)olefin block copolymer.

Examples A" to P", AA" to AG", and BA" to BG" except substitute BOMATPB for BOMATPB$^{mix}$.

As shown by the above description, including the Examples, the invention catalysts prepared from the invention metal-ligand complexes selectively polymerize ethylene in presence of an alpha-olefin when used in the invention process. This selective polymerization of the invention process desirably yields the rich polyethylene (also referred to herein as a rich polyethylene), or the rich polyethylene segment of a poly(ethylene alpha-olefin) copolymer, the rich polyethylene and rich polyethylene segment independently having low mole percent incorporation of alpha-olefin therein. Thus in chain shuttling embodiments described previously, the invention process would selectively give an ethylene-derived hard segment of an OBC in the presence of a ($C_3$-$C_{40}$)alpha-olefin. A particularly preferred metal-ligand complex(es) of formula (I) is one capable of preparing such a catalyst(s) that can achieve a high selectivity for polymerizing ethylene in the presence of the ($C_3$-$C_{40}$)alpha-olefin, wherein the high selectivity is characterized in the preferred embodiments as described previously. The invention process is also useful for preparing the aforementioned polymer blends with good catalyst efficiency.

The present invention is described herein by its preferred advantages, embodiments and features such as preferred selections, ranges, constituents, elements, steps, examples, and other preferred features. However, the intent of this description is not to limit the present invention to the particular preferred advantages, embodiments and features so described, but to also cover, and the present invention does cover, any and all advantages, modifications, equivalents, variations, adaptations, and alternatives falling within the spirit and scope of the description. Thus, characterizations of such embodiments and features as "preferred" should in no way be interpreted as designating such advantages, embodiments and features as being required, essential or critical to the present invention described herein, including the aspects thereof hereupon claimed.

What is claimed is:

1. A process for selectively polymerizing ethylene in the presence of an alpha-olefin, the process comprising a step of contacting together a catalytic amount of a catalyst, ethylene, and an alpha-olefin, wherein the catalyst comprises a mixture or reaction product of components (a) and (b) that is prepared before the contacting step, wherein component (a) comprises a metal-ligand complex and component (b) comprises an activating co-catalyst; ethylene comprises ingredient (c);

and the alpha-olefin comprises component (d);

the metal-ligand complex of component (a) being one or more metal-ligand complexes of formula (I):

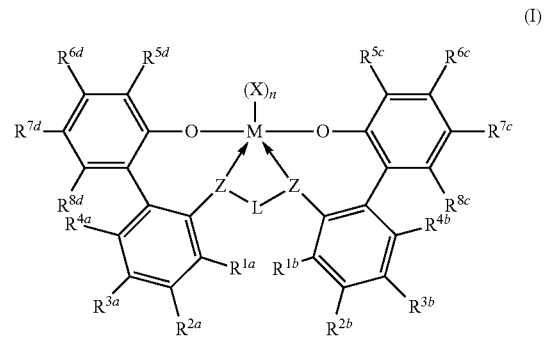

wherein:

M is titanium, zirconium, or hafnium, each independently being in a formal oxidation state of +2, +3, or +4;

n is an integer of from 0 to 3, wherein when n is 0, X is absent;

each X independently is a monodentate ligand that is neutral, monoanionic, or dianionic; or two X are taken together to form a bidentate ligand that is neutral, monoanionic, or dianionic;

X and n are chosen in such a way that the metal-ligand complex of formula (I) is, overall, neutral;

each Z independently is O, S, Nhydrocarbyl, or Phydrocarbyl;

L is hydrocarbylene or heterohydrocarbylene, wherein the hydrocarbylene has a portion that comprises a 1-carbon atom to 6-carbon atom linker backbone linking the Z atoms in formula (I) and the heterohydrocarbylene has a portion that comprises a 1-atom to 6-atom linker backbone linking the Z atoms in formula (I), wherein each atom of the 1-atom to 6-atom linker backbone of the heterohydrocarbylene independently is a carbon atom or a heteroatom, wherein each heteroatom independently is O, S, S(O), S(O)$_2$, Si(R$^C$)$_2$, Ge(R$^C$)$_2$, P(R$^P$), or N(R$^N$), wherein independently each R$^C$ is unsubstituted (C$_1$-C$_{18}$)hydrocarbyl or the two R$^C$ are taken together to form a (C$_2$-C$_{19}$) alkylene, each R$^P$ is unsubstituted (C$_1$-C$_{18}$)hydrocarbyl; and each R$^N$ is unsubstituted (C$_1$-C$_{18}$)hydrocarbyl, a hydrogen atom or absent;

at least one of R$^{1a}$, R$^{2a}$, R$^{1b}$, and R$^{2b}$ independently is a hydrocarbyl, heterohydrocarbyl, or halogen atom; and each of the other of R$^{1a}$, R$^{2a}$, R$^{1b}$, and R$^{2b}$ independently is a hydrogen atom, hydrocarbyl, heterohydrocarbyl, or halogen atom;

each of R$^{3a}$, R$^{4a}$, R$^{3b}$, R$^{4b}$, R$^{6c}$, R$^{7c}$, R$^{8c}$, R$^{6d}$, R$^{7d}$, and R$^{8d}$ independently is a hydrogen atom; hydrocarbyl; heterohydrocarbyl; or halogen atom;

each of R$^{5c}$ and R$^{5d}$ independently is an aryl or heteroaryl;

each of the aforementioned aryl, heteroaryl, hydrocarbyl, heterohydrocarbyl, hydrocarbylene, and heterohydrocarbylene groups independently is unsubstituted or substituted with one or more substituents R$^S$; and each R$^S$ independently is a halogen atom, polyfluoro substituted, perfluoro substituted, unsubstituted (C$_1$-C$_{18}$)alkyl, F$_3$C—, FCH$_2$O—, F$_2$HCO—, F$_3$CO—, R$_3$Si—, R$_3$Ge—, RO—, RS—, RS(O)—, RS(O)$_2$—, R$_2$P—, R$_2$N—, R$_2$C=N—, NC—, RC(O)—, ROC(O)—, RC(O)N(R)—, or R$_2$NC(O)—, or two of the R$^S$ are taken together to form an unsubstituted (C$_1$-C$_{18}$)alkylene, wherein each R independently is an unsubstituted (C$_1$-C$_{18}$)alkyl;

wherein the activating co-catalyst of the ingredient (b) comprises one or more activating co-catalysts, or a reaction product thereof, wherein the ratio of total number of moles of the one or more metal-ligand complexes of formula (I) to total number of moles of the one or more activating co-catalysts is from 1:10,000 to 100:1;

wherein the contacting step is performed under olefin polymerizing conditions and prepares a rich polyethylene in presence of unpolymerized alpha-olefin, wherein the rich polyethylene is a polymeric molecule, or segment thereof, consisting substantially of ethylene repeat units; or a mixture or blend of two or more such polymeric molecules; and wherein the process forms reactive chains and is characterized by a reaction rate constant $k_{11}$ for adding the ethylene to a first reactive chain end comprising an ethylene residual; a reaction rate constant $k_{12}$ for adding the alpha-olefin to a second reactive chain end comprising an ethylene residual; and a reactivity ratio $r_1$ equal to $k_{11}$ divided by $k_{12}$ of greater than 14; and wherein every metal-ligand complex of formula (I) and catalyst based on any one or more of the following ligands (a) to (f) are excluded:

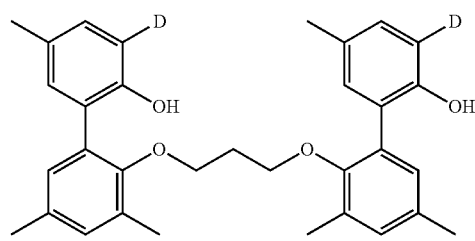

(a) Each D is anthracen-9-yl;
(b) Each D is 1,2,3,4,5,6,7,8-octahydroanthracen-9-yl;
(c) Each D is 9H-carbozol-9-yl; or
(d) Each D is 3,5-bis(1,1-dimethylethyl)phenyl;

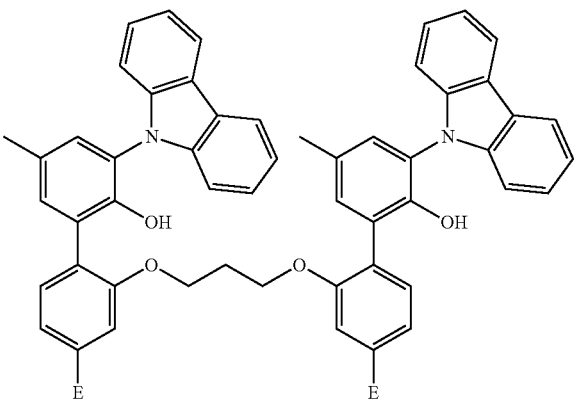

(e) Each E is 1,1-dimethylethyl; or
(f) Each E is methoxy;

wherein at least one of the one or more than one metal-ligand complexes of formula (I) is any one of metal-ligand complexes (1), (2), (10), (11), (20) to (22), and (23):

(2',2"-(propane-1,3-diylbis(oxy))bis(3-(3,6-di-tert-butyl-9H-carbazol-9-yl)-3',5'-difluoro-5-(2,4,4-trimethylpentan-2-yl)biphenyl-2-ol))dimethyl-hafnium, (1);

(2',2"-(propane-1,3-diylbis(oxy))bis(3-(3,6-di-tert-butyl-9H-carbazol-9-yl)-3',5'-dichloro-5-(2,4,4-trimethylpentan-2-yl)biphenyl-2-ol))dimethyl-hafnium, (2);

(2',2"-(propane-1,3-diylbis(oxy))bis(3',5'-dimethyl-3-(3,6-di-tert-butyl-9H-carbazol-9-yl)-5-(2,4,4-trimethylpentan-2-yl)biphenyl-2-ol))dimethyl-hafnium, (10);

(2',2"-(propane-1,3-diylbis(oxy))bis(5'-chloro-3-(3,6-di-tert-butyl-9H-carbazol-9-yl)-3'-ethyl-5-(2,4,4-trimethylpentan-2-yl)biphenyl-2-ol))dimethyl-hafnium, (11);

(2',2"-(propane-1,3-diylbis(oxy))bis(3-(3,6-di-tert-butyl-9H-carbazol-9-yl)-5'-fluoro-3'-trifluoromethyl-5-(2,4,4-trimethylpentan-2-yl)biphenyl-2-ol))dimethyl-hafnium, (20);

(2',2"-(butane-1,4-diylbis(oxy))bis(5'-chloro-3-(3,6-di-tert-butyl-9H-carbazol-9-yl)-3'-methyl-5-(2,4,4-trimethylpentan-2-yl)biphenyl-2-ol))dimethyl-hafnium, (21);

(2',2"-(ethane-1,2-diylbis(oxy))bis(5'-chloro-3-(3,6-di-tert-butyl-9H-carbazol-9-yl)-3'-methyl-5-(2,4,4-trimethylpentan-2-yl)biphenyl-2-ol))dimethyl-hafnium, (22); and (2',2''-(propane-1,3-diylbis(oxy))bis(5'-chloro-3-(3,6-di-tert-butyl-9H-carbazol-9-yl)-3'-methyl-5-(2,4,4-trimethylpentan-2-yl)biphenyl-2-ol))dimethyl-zirconium, (23); or at least one of the one or more than one metal-ligand complexes of formula (I) is metal-ligand complex (3):

(2',2''-(propane-1,3-diylbis(oxy))bis(5'-chloro-3-(3,6-di-tert-butyl-9H-carbazol-9-yl)-3'-methyl-5-(2,4,4-trimethylpentan-2-yl)biphenyl-2-ol))dimethyl-hafnium, (3); or at least one of the one or more than one metal-ligand complexes of formula (I) is metal-ligand complex (13):

(2',2''-(propane-1,3-diylbis(oxy))bis(3-(3,6-di-tert-butyl-9H-carbazol-9-yl)-5'-fluoro-3'-methyl-5-(2,4,4-trimethylpentan-2-yl)biphenyl-2-ol))dimethyl-hafnium, (13); or at least one of the one or more than one metal-ligand complexes of formula (I) is any one of metal-ligand complexes (3a), (6a), (6b), (19a), (4) to (9), (12), (14) to (19), (24), and (25):

(2',2''-(propane-1,3-diylbis(oxy))bis(5'-chloro-3-(9H-carbazol-9-yl)-3'-methyl-5-(2,4,4-trimethylpentan-2-yl)biphenyl-2-ol))dimethyl-hafnium, (3a);

(2',2''-(propane-1,3-diylbis(oxy))bis(5'-chloro-3-(3,6-di-tert-octyl-9H-carbazol-9-yl)-3'-methyl-5-(2,4,4-trimethylpentan-2-yl)biphenyl-2-ol))dimethyl-hafnium, (4);

(2',2''-(propane-1,3-diylbis(oxy))bis(3-(3,6-di-tert-butyl-9H-carbazol-9-yl)-3'-chloro-5-(2,4,4-trimethylpentan-2-yl)biphenyl-2-ol))dimethyl-hafnium, (5);

(2',2''-(propane-1,3-diylbis(oxy))bis(3'-chloro-3-(3,6-di-tert-butyl-9H-carbazol-9-yl)-5'-fluoro-5-(2,4,4-trimethylpentan-2-yl)biphenyl-2-ol))dimethyl-hafnium, (6);

(2',2''-(propane-1,3-diylbis(oxy))bis(5'-chloro-3-(3,6-di-tert-butyl-9H-carbazol-9-yl)-3'-fluoro-5-(2,4,4-trimethylpentan-2-yl)biphenyl-2-ol))dimethyl-hafnium, (6a);

(2',2''-(propane-1,3-diylbis(oxy))bis(5'-chloro-3-(3,6-di-tert-butyl-9H-carbazol-9-yl)-3'-(1-methylethyl)-5-(2,4,4-trimethylpentan-2-yl)biphenyl-2-ol))dimethyl-hafnium, (6b);

(2',2''-(propane-1,3-diylbis(oxy))bis(3-(3,6-di-tert-butyl-9H-carbazol-9-yl)-3'-methyl-5-(2,4,4-trimethylpentan-2-yl)biphenyl-2-ol))dimethyl-hafnium, (7);

(2',2''-(propane-1,3-diylbis(oxy))bis(5'-cyano-3-(3,6-di-tert-butyl-9H-carbazol-9-yl)-3'-methyl-5-(2,4,4-trimethylpentan-2-yl)biphenyl-2-ol))dimethyl-hafnium, (8);

(2',2''-(propane-1,3-diylbis(oxy))bis(5'-dimethylamino-3-(3,6-di-tert-butyl-9H-carbazol-9-yl)-3'-methyl-5-(2,4,4-trimethylpentan-2-yl)biphenyl-2-ol))dimethyl-hafnium, (9);

(2',2''-(propane-1,3-diylbis(oxy))bis(3-(3,6-di-tert-butyl-9H-carbazol-9-yl)-3'-methyl-5'-tert-butyl-5-(2,4,4-trimethylpentan-2-yl)biphenyl-2-ol))dimethyl-hafnium, (12);

(2',2''-(propane-1,3-diylbis(oxy))bis(3-(9H-carbazol-9-yl)-5'-chloro-3'-methyl-5-(2,4,4-trimethylpentan-2-yl)biphenyl-2-ol))dimethyl-hafnium, (14);

(2',2''-(propane-1,3-diylbis(oxy))bis(3-(3,6-di-tert-butyl-9H-carbazol-9-yl)-3'-methyl-5'-trifluoromethyl-5-(2,4,4-trimethylpentan-2-yl)biphenyl-2-ol))dimethyl-hafnium, (15);

(2',2''-(2,2-dimethyl-2-silapropane-1,3-diylbis(oxy))bis(3',5'-dichloro-3-(3,6-di-tert-butyl-9H-carbazol-9-yl)-5-(2,4,4-trimethylpentan-2-yl)biphenyl-2-ol))dimethyl-hafnium, (16);

(2',2''-(2,2-dimethyl-2-silapropane-1,3-diylbis(oxy))bis(5'-chloro-3-(3,6-di-tert-butyl-9H-carbazol-9-yl)-3'-methyl-5-(2,4,4-trimethylpentan-2-yl)biphenyl-2-ol))dimethyl-hafnium, (17);

(2',2''-(propane-1,3-diylbis(oxy))bis(3'-bromo-5'-chloro-3-(3,6-di-tert-butyl-9H-carbazol-9-yl)-5-(2,4,4-trimethylpentan-2-yl)biphenyl-2-ol))dimethyl-hafnium, (18);

(2',2''-(propane-1,3-diylbis(oxy))-(5'-chloro-3-(3,6-di-tert-butyl-9H-carbazol-9-yl)-3'-fluoro-5-(2,4,4-trimethylpentan-2-yl)biphenyl-2-ol)-(3'',5''-dichloro-3-(3,6-di-tert-butyl-9H-carbazol-9-yl)-5-(2,4,4-trimethylpentan-2-yl)biphenyl-2-ol))dimethyl-hafnium, (19);

(2',2''-(propane-1,3-diylbis(oxy))-(5'-chloro-3-(3,6-di-tert-butyl-9H-carbazol-9-yl)-3'-methyl-5-(2,4,4-trimethylpentan-2-yl)biphenyl-2-ol)-(5''-chloro-3-(3,6-di-tert-butyl-9H-carbazol-9-yl)-5-(2,4,4-trimethylpentan-2-yl)biphenyl-2-ol))dimethyl-hafnium, (19a);

(2',2''-(propane-1,3-diylbis(oxy))bis(3-(3,6-di-tert-butyl-9H-carbazol-9-yl)-3',5'-dichloro-5-(2,4,4-trimethylpentan-2-yl)biphenyl-2-ol))dimethyl-titanium, (24); and (2',2''-(propane-1,3-diylbis(oxy))bis(5'-chloro-3-(3,6-di-tert-butyl-9H-carbazol-9-yl)-3'-methyl-5-(2,4,4-trimethylpentan-2-yl)biphenyl-2-ol))dimethyl-titanium, (25); or at least one of the one or more than one metal-ligand complexes of formula (I) is any one of metal-ligand complexes (26) to (31):

(2',2''-(propane-1,3-diylbis(oxy))bis(5'-methoxy-3-(3,6-di-tert-butyl-9H-carbazol-9-yl)-3'-methyl-5-(2,4,4-trimethylpentan-2-yl)biphenyl-2-ol))dimethyl-hafnium, (26);

(2',2''-(propane-1,3-diylbis(oxy))bis(3',4'-dimethyl-3-(3,6-di-tert-butyl-9H-carbazol-9-yl)-5-(2,4,4-trimethylpentan-2-yl)biphenyl-2-ol))dimethyl-hafnium, (27);

(2',2''-(propane-1,3-diylbis(oxy))bis(4'-(tert-butyl)-3-(3,6-di-tert-butyl-9H-carbazol-9-yl)-5-(2,4,4-trimethylpentan-2-yl)biphenyl-2-ol))dimethyl-hafnium, (28);

(2',2''-(propane-1,3-diylbis(oxy))bis(3'-chloro-3-(3,6-di-tert-butyl-9H-carbazol-9-yl)-5'-(tert-butyl)-5-(2,4,4-trimethylpentan-2-yl)biphenyl-2-ol))dimethyl-hafnium, (29);

(2',2''-(butane-1,4-diylbis(oxy))bis(4'-(tert-butyl)-3-(3,6-di-tert-butyl-9H-carbazol-9-yl)-5-(2,4,4-trimethylpentan-2-yl)biphenyl-2-ol))dimethyl-hafnium, (30); and (2',2''-(propane-1,3-diylbis(oxy))bis(5'-chloro-4'-(tert-butyl)-3-(3,6-di-tert-butyl-9H-carbazol-9-yl)-5-(2,4,4-trimethylpentan-2-yl)biphenyl-2-ol))dimethyl-hafnium, (31); or at least one of the one or more than one metal-ligand complexes of formula (I) is any one of metal-ligand complexes (32) to (34):

(2',2''-(pentane-1,5-diylbis(oxy))bis(5'-chloro-3-(3,6-di-tert-butyl-9H-carbazol-9-yl)-3'-methyl-5-(2,4,4-trimethylpentan-2-yl)biphenyl-2-ol))dimethyl-hafnium, (32);

(2',2''-(pentane-2,4-diylbis(oxy))bis(5'-chloro-3-(3,6-di-tert-butyl-9H-carbazol-9-yl)-3'-methyl-5-(2,4,4-trimethylpentan-2-yl)biphenyl-2-ol))dimethylhafnium, (33); and (2',2''-(hexane-1,6-diylbis(oxy))bis(5'-chloro-3-(3,6-di-tert-butyl-9H-carbazol-9-yl)-3'-methyl-5-(2,4,4-trimethylpentan-2-yl)biphenyl-2-ol))dimethylhafnium, (34).

2. A metal-ligand complex of formula (I)

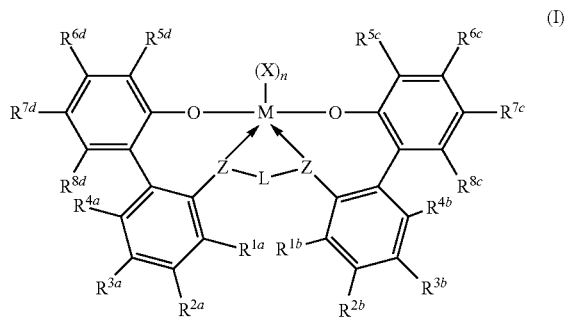

wherein:

M is titanium, zirconium, or hafnium, each independently being in a formal oxidation state of +2, +3, or +4;

n is an integer of from 0 to 3, wherein when n is 0, X is absent;

each X independently is a monodentate ligand that is neutral, monoanionic, or dianionic; or two X are taken together to form a bidentate ligand that is neutral, monoanionic, or dianionic;

X and n are chosen in such a way that the metal-ligand complex of formula (I) is, overall, neutral;

each Z independently is O, S, Nhydrocarbyl, or Phydrocarbyl;

L is hydrocarbylene or heterohydrocarbylene, wherein the hydrocarbylene has a portion that comprises a 1-carbon atom to 6-carbon atom linker backbone linking the Z atoms in formula (I) and the heterohydrocarbylene has a portion that comprises a 1-atom to 6-atom linker backbone linking the Z atoms in formula (I), wherein each atom of the 1-atom to 6-atom linker backbone of the heterohydrocarbylene independently is a carbon atom or a heteroatom, wherein each heteroatom independently is O, S, S(O), S(O)$_2$, Si(R$^C$)$_2$, Ge(R$^C$)$_2$, P(R$^P$), or N(R$^N$), wherein independently each R$^C$ is unsubstituted (C$_1$-C$_{18}$)hydrocarbyl or the two R$^C$ are taken together to form a (C$_2$-C$_{19}$)alkylene, each R$^P$ is unsubstituted (C$_1$-C$_{18}$)hydrocarbyl; and each R$^N$ is unsubstituted (C$_1$-C$_{18}$) hydrocarbyl, a hydrogen atom or absent;

at least one of R$^{1a}$, R$^{2a}$, R$^{1b}$, and R$^{2b}$ independently is a hydrocarbyl, heterohydrocarbyl, or halogen atom; and each of the other of R$^{1a}$, R$^{2a}$, R$^{1b}$, and R$^{2b}$ independently is a hydrogen atom, hydrocarbyl, heterohydrocarbyl, or halogen atom;

each of R$^{3a}$, R$^{4a}$, R$^{3b}$, R$^{4b}$, R$^{6c}$, R$^{7c}$, R$^{8c}$, R$^{6d}$, R$^{7d}$, and R$^{8d}$ independently is a hydrogen atom; hydrocarbyl; heterohydrocarbyl; or halogen atom;

each of R$^{5c}$ and R$^{5d}$ independently is an aryl or heteroaryl;

each of the aforementioned aryl, heteroaryl, hydrocarbyl, heterohydrocarbyl, hydrocarbylene, and heterohydrocarbylene groups independently is unsubstituted or substituted with one or more substituents R$^S$; and each R$^S$ independently is a halogen atom, polyfluoro substituted, perfluoro substituted, unsubstituted (C$_1$-C$_{18}$) alkyl, F$_3$C—, FCH$_2$O—, F$_2$HCO—, F$_3$CO—, R$_3$Si—, R$_3$Ge—, RO—, RS—, RS(O)—, RS(O)$_2$—, R$_2$P—, R$_2$N—, R$_2$C=N—, NC—, RC(O)O—, ROC(O)—, RC(O)N(R)—, or R$_2$NC(O)—, or two of the R$^S$ are taken together to form an unsubstituted (C$_1$-C$_{18}$)alkylene, wherein each R independently is an unsubstituted (C$_1$-C$_{18}$)alkyl;

wherein the activating co-catalyst of the ingredient (b) comprises one or more activating co-catalysts, or a reaction product thereof, wherein the ratio of total number of moles of the one or more metal-ligand complexes of formula (I) to total number of moles of the one or more activating co-catalysts is from 1:10,000 to 100:1;

wherein the contacting step is performed under olefin polymerizing conditions and prepares a rich polyethylene in presence of unpolymerized alpha-olefin, wherein the rich polyethylene is a polymeric molecule, or segment thereof, consisting substantially of ethylene repeat units; or a mixture or blend of two or more such polymeric molecules; and wherein the process forms reactive chains and is characterized by a reaction rate constant $k_{11}$ for adding the ethylene to a first reactive chain end comprising an ethylene residual; a reaction rate constant $k_{12}$ for adding the alpha-olefin to a second reactive chain end comprising an ethylene residual; and a reactivity ratio $r_1$ equal to $k_{11}$ divided by $k_{12}$ of greater than 14; and wherein every metal-ligand complex of formula (I) and catalyst based on any one or more of the following ligands (a) to (f) are excluded:

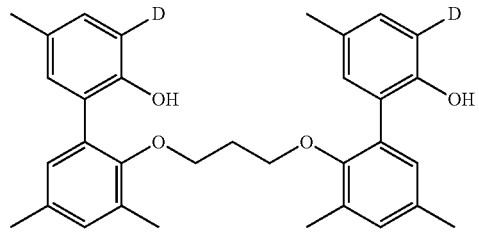

(a) Each D is anthracen-9-yl;
(b) Each D is 1,2,3,4,5,6,7,8-octahydroanthracen-9-yl;
(c) Each D is 9H-carbozol-9-yl; or
(d) Each D is 3,5-bis(1,1-dimethylethyl)phenyl;

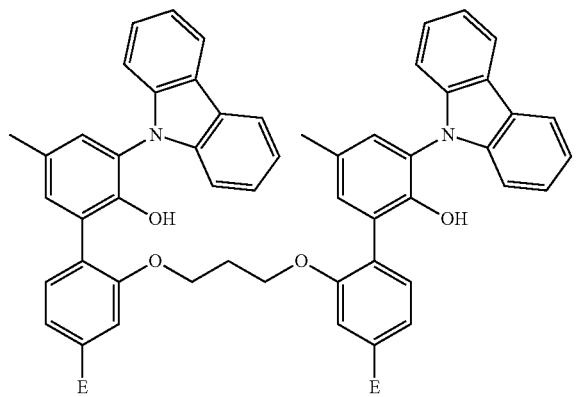

(e) Each E is 1,1-dimethylethyl; or
(f) Each E is methoxy;

wherein at least one of the one or more than one metal-ligand complexes of formula (I) is any one of metal-ligand complexes (1), (2), (10), (11), (20) to (22), and (23):
(2',2"-(propane-1,3-diylbis(oxy))bis(3-(3,6-di-tert-butyl-9H-carbazol-9-yl)-3',5'-difluoro-5-(2,4,4-trimethylpentan-2-yl)biphenyl-2-ol))dimethyl-hafnium, (1);
(2',2"-(propane-1,3-diylbis(oxy))bis(3-(3,6-di-tert-butyl-9H-carbazol-9-yl)-3',5'-dichloro-5-(2,4,4-trimethylpentan-2-yl)biphenyl-2-ol))dimethyl-hafnium, (2);
(2',2"-(propane-1,3-diylbis(oxy))bis(3',5'-dimethyl-3-(3,6-di-tert-butyl-9H-carbazol-9-yl)-5-(2,4,4-trimethylpentan-2-yl)biphenyl-2-ol))dimethyl-hafnium, (10);
(2',2"-(propane-1,3-diylbis(oxy))bis(5'-chloro-3-(3,6-di-tert-butyl-9H-carbazol-9-yl)-3'-ethyl-5-(2,4,4-trimethylpentan-2-yl)biphenyl-2-ol))dimethyl-hafnium, (11);
(2',2"-(propane-1,3-diylbis(oxy))bis(3-(3,6-di-tert-butyl-9H-carbazol-9-yl)-5'-fluoro-3'-trifluoromethyl-5-(2,4,4-trimethylpentan-2-yl)biphenyl-2-ol))dimethyl-hafnium, (20);
(2',2"-(butane-1,4-diylbis(oxy))bis(5'-chloro-3-(3,6-di-tert-butyl-9H-carbazol-9-yl)-3'-methyl-5-(2,4,4-trimethylpentan-2-yl)biphenyl-2-ol))dimethyl-hafnium, (21);
(2',2"-(ethane-1,2-diylbis(oxy))bis(5'-chloro-3-(3,6-di-tert-butyl-9H-carbazol-9-yl)-3'-methyl-5-(2,4,4-trimethylpentan-2-yl)biphenyl-2-ol))dimethyl-hafnium, (22); and
(2',2"-(propane-1,3-diylbis(oxy))bis(5'-chloro-3-(3,6-di-tert-butyl-9H-carbazol-9-yl)-3'-methyl-5-(2,4,4-trimethylpentan-2-yl)biphenyl-2-ol))dimethyl-zirconium, (23); or
at least one of the one or more than one metal-ligand complexes of formula (I) is metal-ligand complex (3):
(2',2"-(propane-1,3-diylbis(oxy))bis(5'-chloro-3-(3,6-di-tert-butyl-9H-carbazol-9-yl)-3'-methyl-5-(2,4,4-trimethylpentan-2-yl)biphenyl-2-ol))dimethyl-hafnium, (3); or
at least one of the one or more than one metal-ligand complexes of formula (I) is metal-ligand complex (13):
(2',2"-(propane-1,3-diylbis(oxy))bis(3-(3,6-di-tert-butyl-9H-carbazol-9-yl)-5'-fluoro-3'-methyl-5-(2,4,4-trimethylpentan-2-yl)biphenyl-2-ol))dimethyl-hafnium, (13); or
at least one of the one or more than one metal-ligand complexes of formula (I) is any one of metal-ligand complexes (3a), (6a), (6b), (19a), (4) to (9), (12), (14) to (19), (24), and (25):
(2',2"-(propane-1,3-diylbis(oxy))bis(5'-chloro-3-(9H-carbazol-9-yl)-3'-methyl-5-(2,4,4-trimethylpentan-2-yl)biphenyl-2-ol))dimethyl-hafnium, (3a);
(2',2"-(propane-1,3-diylbis(oxy))bis(5'-chloro-3-(3,6-di-tert-octyl-9H-carbazol-9-yl)-3'-methyl-5-(2,4,4-trimethylpentan-2-yl)biphenyl-2-ol))dimethyl-hafnium, (4);
(2',2"-(propane-1,3-diylbis(oxy))bis(3-(3,6-di-tert-butyl-9H-carbazol-9-yl)-3'-chloro-5-(2,4,4-trimethylpentan-2-yl)biphenyl-2-ol))dimethyl-hafnium, (5);
(2',2"-(propane-1,3-diylbis(oxy))bis(3'-chloro-3-(3,6-di-tert-butyl-9H-carbazol-9-yl)-5'-fluoro-5-(2,4,4-trimethylpentan-2-yl)biphenyl-2-ol))dimethyl-hafnium, (6);
(2',2"-(propane-1,3-diylbis(oxy))bis(5'-chloro-3-(3,6-di-tert-butyl-9H-carbazol-9-yl)-3'-fluoro-5-(2,4,4-trimethylpentan-2-yl)biphenyl-2-ol))dimethyl-hafnium, (6a);
(2',2"-(propane-1,3-diylbis(oxy))bis(5'-chloro-3-(3,6-di-tert-butyl-9H-carbazol-9-yl)-3'-(1-methylethyl)-5-(2,4,4-trimethylpentan-2-yl)biphenyl-2-ol))dimethyl-hafnium, (6b);
(2',2"-(propane-1,3-diylbis(oxy))bis(3-(3,6-di-tert-butyl-9H-carbazol-9-yl)-3'-methyl-5-(2,4,4-trimethylpentan-2-yl)biphenyl-2-ol))dimethyl-hafnium, (7);
(2',2"-(propane-1,3-diylbis(oxy))bis(5'-cyano-3-(3,6-di-tert-butyl-9H-carbazol-9-yl)-3'-methyl-5-(2,4,4-trimethylpentan-2-yl)biphenyl-2-ol))dimethyl-hafnium, (8);
(2',2"-(propane-1,3-diylbis(oxy))bis(5'-dimethylamino-3-(3,6-di-tert-butyl-9H-carbazol-9-yl)-3'-methyl-5-(2,4,4-trimethylpentan-2-yl)biphenyl-2-ol))dimethyl-hafnium, (9);
(2',2"-(propane-1,3-diylbis(oxy))bis(3-(3,6-di-tert-butyl-9H-carbazol-9-yl)-3'-methyl-5'-tert-butyl-5-(2,4,4-trimethylpentan-2-yl)biphenyl-2-ol))dimethyl-hafnium, (12);
(2',2"-(propane-1,3-diylbis(oxy))bis(3-(9H-carbazol-9-yl)-5'-chloro-3'-methyl-5-(2,4,4-trimethylpentan-2-yl)biphenyl-2-ol))dimethyl-hafnium, (14);
(2',2"-(propane-1,3-diylbis(oxy))bis(3-(3,6-di-tert-butyl-9H-carbazol-9-yl)-3'-methyl-5'-trifluoromethyl-5-(2,4,4-trimethylpentan-2-yl)biphenyl-2-ol))dimethyl-hafnium, (15);
(2',2"-(2,2-dimethyl-2-silapropane-1,3-diylbis(oxy))bis(3',5'-dichloro-3-(3,6-di-tert-butyl-9H-carbazol-9-yl)-5-(2,4,4-trimethylpentan-2-yl)biphenyl-2-ol))dimethyl-hafnium, (16);
(2',2"-(2,2-dimethyl-2-silapropane-1,3-diylbis(oxy))bis(5'-chloro-3-(3,6-di-tert-butyl-9H-carbazol-9-yl)-3'-methyl-5-(2,4,4-trimethylpentan-2-yl)biphenyl-2-ol))dimethyl-hafnium, (17);
(2',2"-(propane-1,3-diylbis(oxy))bis(3'-bromo-5'-chloro-3-(3,6-di-tert-butyl-9H-carbazol-9-yl)-5-(2,4,4-trimethylpentan-2-yl)biphenyl-2-ol))dimethyl-hafnium, (18);
(2',2"-(propane-1,3-diylbis(oxy))-(5'-chloro-3-(3,6-di-tert-butyl-9H-carbazol-9-yl)-3'-fluoro-5-(2,4,4-trimethylpentan-2-yl)biphenyl-2-ol)-(3",5"-dichloro-3-(3,6-di-tert-butyl-9H-carbazol-9-yl)-5-(2,4,4-trimethylpentan-2-yl)biphenyl-2-ol))dimethyl-hafnium, (19);
(2',2"-(propane-1,3-diylbis(oxy))-(5'-chloro-3-(3,6-di-tert-butyl-9H-carbazol-9-yl)-3'-methyl-5-(2,4,4-trimethylpentan-2-yl)biphenyl-2-ol)-(5"-chloro-3-(3,6-di-tert-butyl-9H-carbazol-9-yl)-5-(2,4,4-trimethylpentan-2-yl)biphenyl-2-ol))dimethyl-hafnium, (19a);
(2',2"-(propane-1,3-diylbis(oxy))bis(3-(3,6-di-tert-butyl-9H-carbazol-9-yl)-3',5'-dichloro-5-(2,4,4-trimethylpentan-2-yl)biphenyl-2-ol))dimethyl-titanium, (24); and
(2',2"-(propane-1,3-diylbis(oxy))bis(5'-chloro-3-(3,6-di-tert-butyl-9H-carbazol-9-yl)-3'-methyl-5-(2,4,4-trimethylpentan-2-yl)biphenyl-2-ol))dimethyl-titanium, (25); or
at least one of the one or more than one metal-ligand complexes of formula (I) is any one of metal-ligand complexes (26) to (31):
(2',2"-(propane-1,3-diylbis(oxy))bis(5'-methoxy-3-(3,6-di-tert-butyl-9H-carbazol-9-yl)-3'-methyl-5-(2,4,4-trimethylpentan-2-yl)biphenyl-2-ol))dimethyl-hafnium, (26);
(2',2"-(propane-1,3-diylbis(oxy))bis(3',4'-dimethyl-3-(3,6-di-tert-butyl-9H-carbazol-9-yl)-5-(2,4,4-trimethylpentan-2-yl)biphenyl-2-ol))dimethyl-hafnium, (27);

(2',2"-(propane-1,3-diylbis(oxy))bis(4'-(tert-butyl)-3-(3, 6-di-tert-butyl-9H-carbazol-9-yl)-5-(2,4,4-trimethyl-pentan-2-yl)biphenyl-2-ol))dimethyl-hafnium, (28);

(2',2"-(propane-1,3-diylbis(oxy))bis(3'-chloro-3-(3,6-di-tert-butyl-9H-carbazol-9-yl)-5'-(tert-butyl)-5-(2,4,4-trimethylpentan-2-yl)biphenyl-2-ol))dimethyl-hafnium, (29);

(2',2"-(butane-1,4-diylbis(oxy))bis(4'-(tert-butyl)-3-(3,6-di-tert-butyl-9H-carbazol-9-yl)-5-(2,4,4-trimethylpentan-2-yl)biphenyl-2-ol))dimethyl-hafnium, (30); and (2',2"-(propane-1,3-diylbis(oxy))bis(5'-chloro-4'-(tert-butyl)-3-(3,6-di-tert-butyl-9H-carbazol-9-yl)-5-(2,4,4-trimethylpentan-2-yl)biphenyl-2-ol))dimethyl-hafnium, (31); or at least one of the one or more than one metal-ligand complexes of formula (I) is any one of metal-ligand complexes (32) to (34):

(2',2"-(pentane-1,5-diylbis(oxy))bis(5'-chloro-3-(3,6-di-tert-butyl-9H-carbazol-9-yl)-3'-methyl-5-(2,4,4-trimethylpentan-2-yl)biphenyl-2-ol))dimethyl-hafnium, (32);

(2',2"-(pentane-2,4-diylbis(oxy))bis(5'-chloro-3-(3,6-di-tert-butyl-9H-carbazol-9-yl)-3'-methyl-5-(2,4,4-trimethylpentan-2-yl)biphenyl-2-ol))dimethyl-hafnium, (33); and (2',2"-(hexane-1,6-diylbis(oxy))bis(5'-chloro-3-(3,6-di-tert-butyl-9H-carbazol-9-yl)-3'-methyl-5-(2,4,4-trimethylpentan-2-yl)biphenyl-2-ol))dimethyl-hafnium, (34).

3. A catalyst comprising or prepared from one or more metal-ligand complexes of formula (I) as described in claim 2 and one or more activating co-catalysts, or a reaction product thereof, wherein the ratio of total number of moles of the one or more metal-ligand complexes of formula (I) to total number of moles of the one or more activating co-catalysts is from 1:10,000 to 100:1.

4. A ligand of formula (Q):

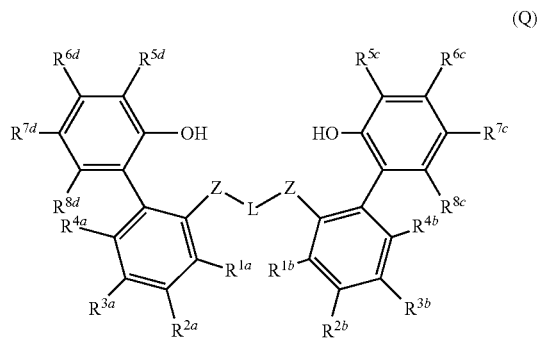

or a Group 1 or 2 metal salt thereof, wherein the Group 1 or 2 metal is a cation of any one of the metals of Groups 1 and 2 of the Periodic Table of the Elements; and L, Z, $R^{1a}$, $R^{2a}$, $R^{3a}$, $R^{4a}$, $R^{1b}$, $R^{2b}$, $R^{3b}$, $R^{4b}$, $R^{5c}$, $R^{6c}$, $R^{7c}$, $R^{8c}$, $R^{5d}$, $R^{6d}$, $R^{7d}$, and $R^{8d}$ are as defined in claim 1 except at least one of $R^{1a}$, $R^{1b}$, $R^{3a}$, and $R^{3b}$ is not methyl when $R^{7c}$ and $R^{7d}$ are each methyl, wherein the ligand is any one of ligands (Q1), (Q2), (Q10), (Q11), and (Q20) to (Q22):

2',2"-(propane-1,3-diylbis(oxy))bis(3-(3,6-di-tert-butyl-9H-carbazol-9-yl)-3',5'-difluoro-5-(2,4,4-trimethylpentan-2-yl)biphenyl-2-ol), (Q1);

2',2"-(propane-1,3-diylbis(oxy))bis(3-(3,6-di-tert-butyl-9H-carbazol-9-yl)-3',5'-dichloro-5-(2,4,4-trimethylpentan-2-yl)biphenyl-2-ol), (Q2);

2',2"-(propane-1,3-diylbis(oxy))bis(3',5'-dimethyl-3-(3,6-di-tert-butyl-9H-carbazol-9-yl)-5-(2,4,4-trimethylpentan-2-yl)biphenyl-2-ol), (Q10);

2',2"-(propane-1,3-diylbis(oxy))bis(5'-chloro-3-(3,6-di-tert-butyl-9H-carbazol-9-yl)-3'-ethyl-5-(2,4,4-trimethylpentan-2-yl)biphenyl-2-ol), (Q11);

2',2"-(propane-1,3-diylbis(oxy))bis(3-(3,6-di-tert-butyl-9H-carbazol-9-yl)-5'-fluoro-3'-trifluoromethyl-5-(2,4,4-trimethylpentan-2-yl)biphenyl-2-ol), (Q20);

2',2"-(butane-1,4-diylbis(oxy))bis(5'-chloro-3-(3,6-di-tert-butyl-9H-carbazol-9-yl)-3'-methyl-5-(2,4,4-trimethylpentan-2-yl)biphenyl-2-ol), (Q21); and 2',2"-(ethane-1,2-diylbis(oxy))bis(5'-chloro-3-(3,6-di-tert-butyl-9H-carbazol-9-yl)-3'-methyl-5-(2,4,4-trimethylpentan-2-yl)biphenyl-2-ol), (Q22); or the ligand is ligand (Q3) or (Q13):

2',2"-(propane-1,3-diylbis(oxy))bis(5'-chloro-3-(3,6-di-tert-butyl-9H-carbazol-9-yl)-3'-methyl-5-(2,4,4-trimethylpentan-2-yl)biphenyl-2-ol), (Q3); or 2',2"-(propane-1,3-diylbis(oxy))bis(3-(3,6-di-tert-butyl-9H-carbazol-9-yl)-5'-fluoro-3'-methyl-5-(2,4,4-trimethylpentan-2-yl)biphenyl-2-ol), (Q13); or the ligand is any one of ligands (Q3a), (Q6a), (Q6b), (Q19a), (Q4) to (Q9), (Q12), and (Q14) to (Q19):

2',2"-(propane-1,3-diylbis(oxy))bis(5'-chloro-3-(9H-carbazol-9-yl)-3'-methyl-5-(2,4,4-trimethylpentan-2-yl)biphenyl-2-ol), (Q3a);

2',2"-(propane-1,3-diylbis(oxy))bis(5'-chloro-3-(3,6-di-tert-octyl-9H-carbazol-9-yl)-3'-methyl-5-(2,4,4-trimethylpentan-2-yl)biphenyl-2-ol), (Q4);

2',2"-(propane-1,3-diylbis(oxy))bis(3-(3,6-di-tert-butyl-9H-carbazol-9-yl)-3'-chloro-5-(2,4,4-trimethylpentan-2-yl)biphenyl-2-ol), (Q5);

2',2"-(propane-1,3-diylbis(oxy))bis(3'-chloro-3-(3,6-di-tert-butyl-9H-carbazol-9-yl)-5'-fluoro-5-(2,4,4-trimethylpentan-2-yl)biphenyl-2-ol), (Q6);

2',2"-(propane-1,3-diylbis(oxy))bis(5'-chloro-3-(3,6-di-tert-butyl-9H-carbazol-9-yl)-3'-fluoro-5-(2,4,4-trimethylpentan-2-yl)biphenyl-2-ol), (Q6a);

2',2"-(propane-1,3-diylbis(oxy))bis(5'-chloro-3-(3,6-di-tert-butyl-9H-carbazol-9-yl)-3'-(1-methylethyl)-5-(2,4,4-trimethylpentan-2-yl)biphenyl-2-ol), (Q6b);

2',2"-(propane-1,3-diylbis(oxy))bis(3-(3,6-di-tert-butyl-9H-carbazol-9-yl)-3'-methyl-5-(2,4,4-trimethylpentan-2-yl)biphenyl-2-ol), (Q7);

2',2"-(propane-1,3-diylbis(oxy))bis(5'-cyano-3-(3,6-di-tert-butyl-9H-carbazol-9-yl)-3'-methyl-5-(2,4,4-trimethylpentan-2-yl)biphenyl-2-ol), (Q8);

2',2"-(propane-1,3-diylbis(oxy))bis(5'-dimethylamino-3-(3,6-di-tert-butyl-9H-carbazol-9-yl)-3'-methyl-5-(2,4,4-trimethylpentan-2-yl)biphenyl-2-ol), (Q9);

2',2"-(propane-1,3-diylbis(oxy))bis(3-(3,6-di-tert-butyl-9H-carbazol-9-yl)-3'-methyl-5'-tert-butyl-5-(2,4,4-trimethylpentan-2-yl)biphenyl-2-ol), (Q12);

2',2"-(propane-1,3-diylbis(oxy))bis(3-(9H-carbazol-9-yl)-5'-chloro-3'-methyl-5-(2,4,4-trimethylpentan-2-yl)biphenyl-2-ol), (Q14);

2',2"-(propane-1,3-diylbis(oxy))bis(3-(3,6-di-tert-butyl-9H-carbazol-9-yl)-3'-methyl-5'-trifluoromethyl-5-(2,4,4-trimethylpentan-2-yl)biphenyl-2-ol), (Q15);

2',2"-(2,2-dimethyl-2-silapropane-1,3-diylbis(oxy))bis(3',5'-dichloro-3-(3,6-di-tert-butyl-9H-carbazol-9-yl)-5-(2,4,4-trimethylpentan-2-yl)biphenyl-2-ol), (Q16);

2',2"-(2,2-dimethyl-2-silapropane-1,3-diylbis(oxy))bis(5'-chloro-3-(3,6-di-tert-butyl-9H-carbazol-9-yl)-3'-methyl-5-(2,4,4-trimethylpentan-2-yl)biphenyl-2-ol), (Q17);

2',2"-(propane-1,3-diylbis(oxy))bis(3'-bromo-5'-chloro-3-(3,6-di-tert-butyl-9H-carbazol-9-yl)-5-(2,4,4-trimethylpentan-2-yl)biphenyl-2-ol), (Q18);

2',2"-(propane-1,3-diylbis(oxy))-(5'-chloro-3-(3,6-di-tert-butyl-9H-carbazol-9-yl)-3'-fluoro-5-(2,4,4-trimethylpentan-2-yl)biphenyl-2-ol)-(3",5'-dichloro-3-(3,6-di-tert-butyl-9H-carbazol-9-yl)-5-(2,4,4-trimethylpentan-2-yl)biphenyl-2-ol), (Q19); and 2',2"-(propane-1,3-diylbis(oxy))-(5'-chloro-3-(3,6-di-tert-butyl-9H-carbazol-9-yl)-3'-methyl-5-(2,4,4-trimethylpentan-2-yl)biphenyl-2-ol)-(5"-chloro-3-(3,6-di-tert-butyl-9H-carbazol-9-yl)-5-(2,4,4-trimethylpentan-2-yl)biphenyl-2-ol), (Q19a); or the ligand is any one of ligands (Q23) to (Q25):

2',2"-(pentane-1,5-diylbis(oxy))bis(5'-chloro-3-(3,6-di-tert-butyl-9H-carbazol-9-yl)-3'-methyl-5-(2,4,4-trimethylpentan-2-yl)biphenyl-2-ol), (Q23);

2',2"-(pentane-2,4-diylbis(oxy))bis(5'-chloro-3-(3,6-di-tert-butyl-9H-carbazol-9-yl)-3'-methyl-5-(2,4,4-trimethylpentan-2-yl)biphenyl-2-ol), (Q24); and 2',2"-(hexane-1,6-diylbis(oxy))bis(5'-chloro-3-(3,6-di-tert-butyl-9H-carbazol-9-yl)-3'-methyl-5-(2,4,4-trimethylpentan-2-yl)biphenyl-2-ol), (Q25); or the ligand is any one of ligands (Q26) to (Q31):

2',2"-(propane-1,3-diylbis(oxy))bis(5'-methoxy-3-(3,6-di-tert-butyl-9H-carbazol-9-yl)-3'-methyl-5-(2,4,4-trimethylpentan-2-yl)biphenyl-2-ol), (Q26);

2',2"-(propane-1,3-diylbis(oxy))bis(3',4'-dimethyl-3-(3,6-di-tert-butyl-9H-carbazol-9-yl)-5-(2,4,4-trimethylpentan-2-yl)biphenyl-2-ol), (Q27);

2',2"-(propane-1,3-diylbis(oxy))bis(4'-(tert-butyl)-3-(3,6-di-tert-butyl-9H-carbazol-9-yl)-5-(2,4,4-trimethylpentan-2-yl)biphenyl-2-ol), (Q28);

2',2"-(propane-1,3-diylbis(oxy))bis(3'-chloro-3-(3,6-di-tert-butyl-9H-carbazol-9-yl)-5'-(tert-butyl)-5-(2,4,4-trimethylpentan-2-yl)biphenyl-2-ol), (Q29);

2',2"-(butane-1,4-diylbis(oxy))bis(4'-(tert-butyl)-3-(3,6-di-tert-butyl-9H-carbazol-9-yl)-5-(2,4,4-trimethylpentan-2-yl)biphenyl-2-ol), (Q30); and 2',2"-(propane-1,3-diylbis(oxy))bis(5'-chloro-4'-(tert-butyl)-3-(3,6-di-tert-butyl-9H-carbazol-9-yl)-5-(2,4,4-trimethylpentan-2-yl)biphenyl-2-ol), (Q31).

\* \* \* \* \*